US010602133B2

(12) United States Patent
Valdivia et al.

(10) Patent No.: US 10,602,133 B2
(45) Date of Patent: Mar. 24, 2020

(54) CONTROLS AND INTERFACES FOR USER INTERACTIONS IN VIRTUAL SPACES

(71) Applicant: Facebook, Inc., Menlo Park, CA (US)

(72) Inventors: Gabriel Valdivia, London (GB); Cliff Warren, San Francisco, CA (US); Maheen Sohail, Surrey (CA); Christophe Marcel Rene Tauziet, San Francisco, CA (US); Alexandros Alexander, Mountain View, CA (US); Michael Stephen Booth, Newport Beach, CA (US); Charles Matthew Sutton, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 71 days.

(21) Appl. No.: 15/722,833

(22) Filed: Oct. 2, 2017

(65) Prior Publication Data

US 2018/0095616 A1    Apr. 5, 2018

Related U.S. Application Data

(60) Provisional application No. 62/404,152, filed on Oct. 4, 2016, provisional application No. 62/485,886, filed on Apr. 14, 2017.

(51) Int. Cl.
*H04N 13/398* (2018.01)
*G06F 3/0482* (2013.01)
(Continued)

(52) U.S. Cl.
CPC ........... *H04N 13/398* (2018.05); *G06F 3/011* (2013.01); *G06F 3/013* (2013.01); *G06F 3/017* (2013.01);
(Continued)

(58) Field of Classification Search
CPC .................................................... H04N 13/398
(Continued)

(56) References Cited

U.S. PATENT DOCUMENTS 9,323,325 B2    4/2016  Perez
9,690,103 B2 *  6/2017  Lyren ....................... H04R 1/00
(Continued)

FOREIGN PATENT DOCUMENTS

WO    WO 2016/014878 A1    1/2016
WO    WO2016014872 A1     1/2016
WO    WO 2016/043537 A1    3/2016

OTHER PUBLICATIONS

European search report received from the European Patent Office for European Patent Application No. 17194757.5-1216, dated Feb. 19, 2018.
(Continued)

*Primary Examiner* — William D Titcomb
(74) *Attorney, Agent, or Firm* — Baker Botts L.L.P.

(57) ABSTRACT

In one embodiment, a method includes sending information configured to render a virtual space on a display device associated with a first user, the virtual space comprising a virtual room; receiving an input from a first user selecting a particular virtual object; calculating a score for a set of interactive-surface types, the score being based on a current context, wherein the current context is based on information associated with the virtual object; selecting, from the set of interactive-surface types, one of the interactive-surface types based on the selected interactive-surface type having a score greater than a threshold score; and sending information configured to render an interactive surface that is of the selected interactive-surface type.

24 Claims, 72 Drawing Sheets

(51) Int. Cl.

| | |
|---|---|
| *G06F 3/0481* | (2013.01) |
| *G06T 13/40* | (2011.01) |
| *G06T 11/60* | (2006.01) |
| *G06T 19/00* | (2011.01) |
| *G06F 3/16* | (2006.01) |
| *G06Q 50/00* | (2012.01) |
| *H04M 1/725* | (2006.01) |
| *H04N 7/14* | (2006.01) |
| *G06F 3/0484* | (2013.01) |
| *H04L 12/58* | (2006.01) |
| *G06F 3/01* | (2006.01) |
| *G06F 3/0346* | (2013.01) |
| *G06F 3/0485* | (2013.01) |
| *G06T 15/20* | (2011.01) |
| *H04L 29/06* | (2006.01) |
| *H04N 13/156* | (2018.01) |
| *H04N 13/183* | (2018.01) |
| *H04N 5/232* | (2006.01) |
| *H04N 7/15* | (2006.01) |
| *H04N 13/383* | (2018.01) |
| *H04L 29/08* | (2006.01) |

(52) U.S. Cl.
CPC .......... *G06F 3/0346* (2013.01); *G06F 3/0481* (2013.01); *G06F 3/0482* (2013.01); *G06F 3/0485* (2013.01); *G06F 3/04815* (2013.01); *G06F 3/04842* (2013.01); *G06F 3/04845* (2013.01); *G06F 3/04847* (2013.01); *G06F 3/167* (2013.01); *G06Q 50/01* (2013.01); *G06T 11/60* (2013.01); *G06T 13/40* (2013.01); *G06T 15/20* (2013.01); *G06T 19/003* (2013.01); *G06T 19/006* (2013.01); *H04L 51/16* (2013.01); *H04L 51/24* (2013.01); *H04L 51/32* (2013.01); *H04L 67/38* (2013.01); *H04M 1/72519* (2013.01); *H04N 5/23238* (2013.01); *H04N 7/142* (2013.01); *H04N 7/147* (2013.01); *H04N 7/157* (2013.01); *H04N 13/156* (2018.05); *H04N 13/183* (2018.05); *G06T 2200/24* (2013.01); *G06T 2210/16* (2013.01); *H04L 51/10* (2013.01); *H04L 67/02* (2013.01); *H04L 67/42* (2013.01); *H04N 13/383* (2018.05)

(58) Field of Classification Search
USPC .......................................................... 715/747
See application file for complete search history.

(56) References Cited

U.S. PATENT DOCUMENTS

| | | | |
|---|---|---|---|
| 9,917,804 B2* | 3/2018 | Valdivia | H04L 51/16 |
| 10,417,799 B2* | 9/2019 | Tran | G06T 11/60 |
| 2007/0242131 A1 | 10/2007 | Sanz-Pastor | |
| 2008/0218515 A1* | 9/2008 | Fukushima | G06T 19/006 345/424 |
| 2011/0225516 A1 | 9/2011 | Goldman | |
| 2013/0178257 A1 | 7/2013 | Langseth | |
| 2014/0049452 A1 | 2/2014 | Maltz | |
| 2014/0204117 A1 | 7/2014 | Kinnebrew et al. | |
| 2014/0237366 A1 | 8/2014 | Poulos et al. | |
| 2014/0267400 A1 | 9/2014 | Mabbutt et al. | |
| 2014/0372957 A1 | 12/2014 | Keane | |
| 2014/0380230 A1 | 12/2014 | Venable | |
| 2015/0212322 A1 | 7/2015 | Moravetz | |
| 2015/0212576 A1 | 7/2015 | Ambrus | |
| 2015/0242575 A1 | 8/2015 | Abovitz | |
| 2015/0332514 A1 | 11/2015 | Lotto | |
| 2016/0026253 A1* | 1/2016 | Bradski | G02B 27/225 345/8 |
| 2016/0093105 A1 | 3/2016 | Rimon et al. | |
| 2016/0109947 A1 | 4/2016 | George-Svahn | |
| 2016/0132289 A1 | 5/2016 | Vennstrom | |
| 2016/0240009 A1* | 8/2016 | Lyren | H04R 1/00 |
| 2016/0246384 A1 | 8/2016 | Mullins et al. | |
| 2016/0259405 A1 | 9/2016 | Wilson | |
| 2016/0283081 A1* | 9/2016 | Johnston | G06T 19/006 |
| 2017/0102791 A1* | 4/2017 | Hosenpud | G06F 3/03545 |
| 2017/0309057 A1* | 10/2017 | Vaganov | H04N 13/30 |
| 2019/0052841 A1* | 2/2019 | Lyren | H04R 1/00 |

OTHER PUBLICATIONS

European search report received from the European Patent Office for European Patent Application No. 17194761.7-1216, dated Feb. 26, 2018.
PCT International Search Report and Written Opinion received for PCT Application No. PCT/US2017/054867, dated Jan. 17, 2018.
PCT International Search Report and Written Opinion received for PCT Application No. PCT/US2017/054860, dated Jan. 18, 2018.

\* cited by examiner

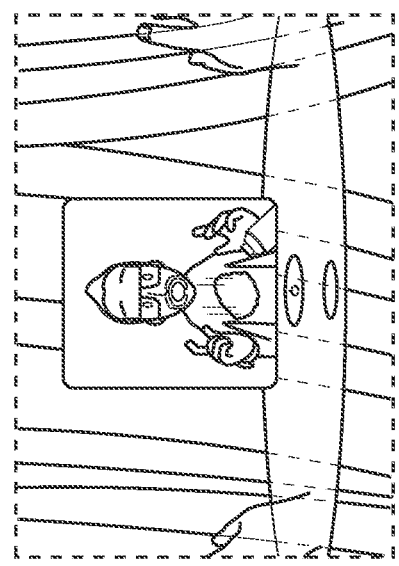
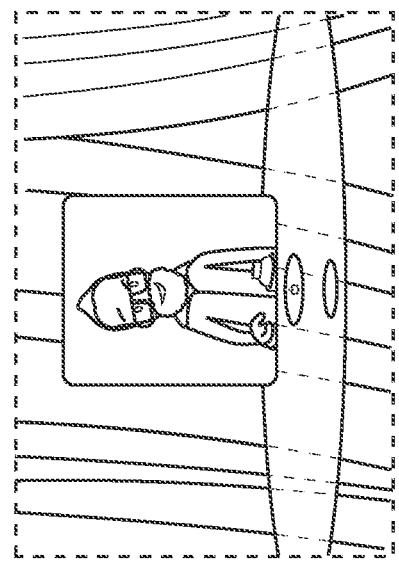
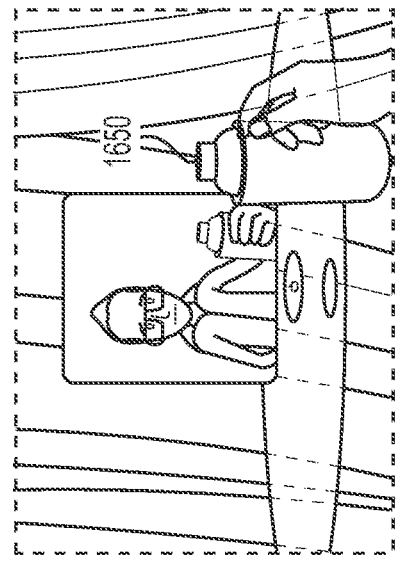

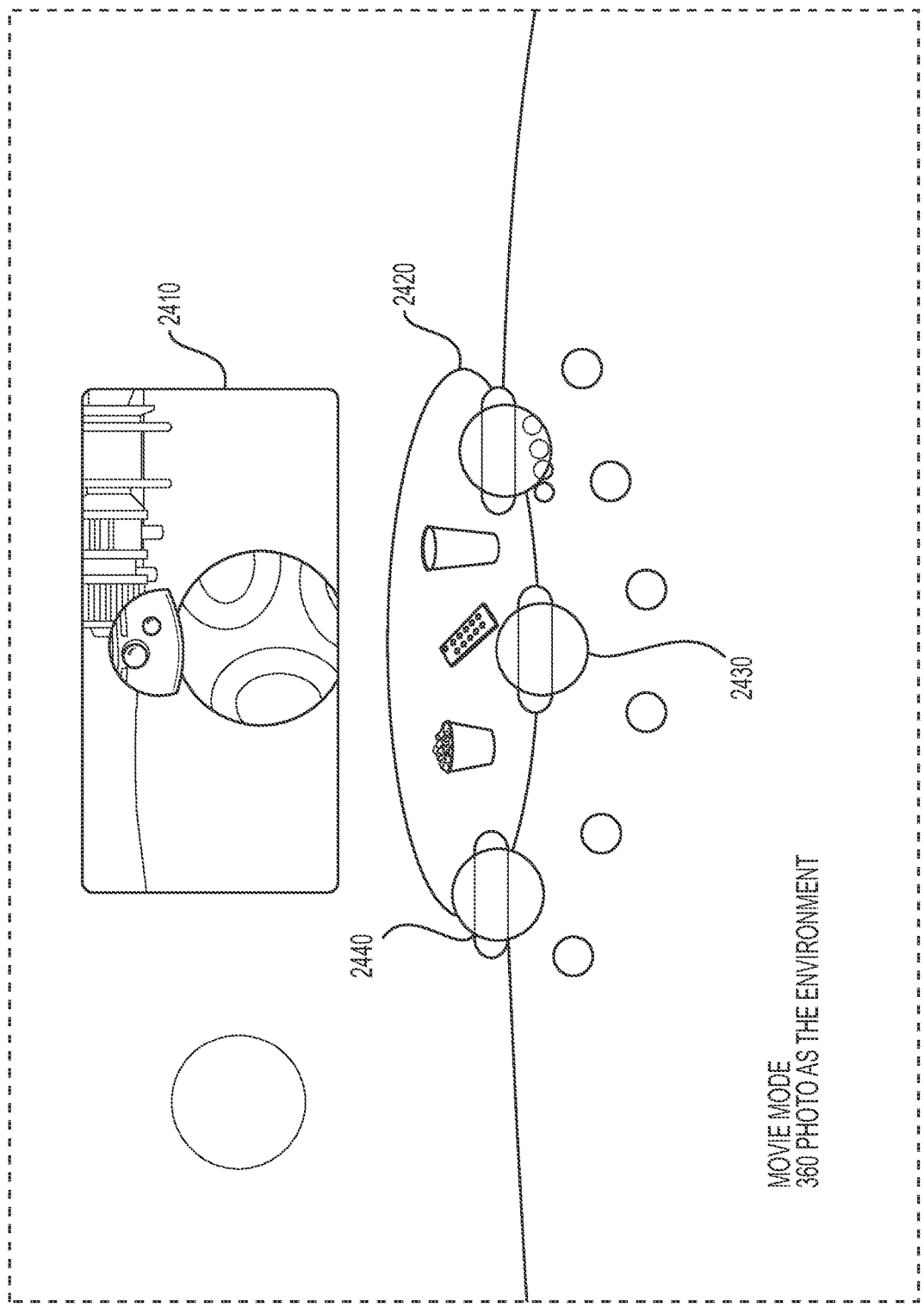

CONTROLS AND INTERFACES FOR USER INTERACTIONS IN VIRTUAL SPACES

PRIORITY

This application claims the benefit, under 35 U.S.C. § 119(e), of U.S. Provisional Patent Application No. 62/404,152, filed 4 Oct. 2016, and U.S. Provisional Patent Application No. 62/485,886, filed 14 Apr. 2017, which are incorporated herein by reference.

TECHNICAL FIELD

This disclosure generally relates to controls and interfaces for user interactions and experiences in a virtual reality environment.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset may capture a real-world scene (as an image or video) and display a composite of the captured scene with computer-generated virtual objects. The virtual objects may be, for example, two-dimensional and/or three-dimensional objects, and may be stationary or animated.

SUMMARY OF PARTICULAR EMBODIMENTS

Disclosed herein are a variety of different ways of rendering and interactive with a virtual (or augmented) reality environment. A virtual reality system may render a virtual environment, which may include a virtual space that is rendered for display to one or more users. The users may view and interact within this virtual space and the broader virtual environment through any suitable means. One goal of the disclosed methods is to provide an intuitive experience for users—one that gives the users a sense of "presence," or the feeling that they are actually in the virtual environment. In particular embodiments, the virtual reality system may provide for a method of interacting with a virtual space by way of a "gaze input," i.e., an input that is associated with the gaze of a user in the virtual space. As an example and not by way of limitation, a gaze input may be used to control video or slide-show playback. For example, a user may use a gaze input to control a scrubber element. As another example and not by way of limitation, gaze input may be used to activate "hit targets," or regions associated with a virtual object or an interactive element (e.g., to pick up a virtual object, to browse or navigate through content). In particular embodiments, the virtual reality system may render a reticle that dynamically changes types in response to a predicted user intent (e.g., based on a context of the current virtual space, based on information associated with the user, based on the trajectory of the reticle). The different types of reticles may have different functions within the virtual space (e.g., approaching a hit target of a photo may change the reticle into a grab or a zoom reticle, while approaching a hit target at the edge of a page may change the reticle into a next-page-type reticle). Although the disclosure focuses on virtual reality, it contemplates applying the disclosed concepts to augmented reality.

In particular embodiments, the virtual reality system may render one or more virtual tools that can be used to interact with the virtual space. These tools may appear in suitable locations at suitable points, and their appearance may be contingent on a number of factors (e.g., a current context, whether a user has access, information associated with a user, information associated with a current virtual space. As an example and not by way of limitation, the tools may include means for commenting/reacting to content (e.g., likes, voice comments, video comments, or text comments with spatial and/or temporal elements), taking a selfie, customizing user avatars, creating virtual objects, painting or drawing in the virtual space, etc. In particular embodiments, the virtual reality system may render a "virtual room," and the virtual room may have an interactive surface. The interactive surface may be a surface in the virtual room that facilitates interactions or the sharing of content among uses in the virtual room. The interactive surface may be dynamically altered based on factors such as information associated with the user or the other people in room (e.g., affinities of the user or the other people, age or other demographic information), the number of people in the room, an virtual tool that the user has picked up (e.g., a ping pong paddle), a current context (e.g., the time of day, a date, a current event), etc.

In particular embodiments, the virtual reality system may provide for a method of using controllers (e.g., handheld controllers) to interact with the virtual space. A number of different ways of interactions with controllers are disclosed. As an example and not by way of limitation, a first controller (e.g., held by the right hand) may be used to perform a trigger gesture (e.g., rotating the forearm to display the underside of the wrist), upon which a panel of items (e.g., with the items varying based on a current context) may be displayed in the virtual space. In this example, a second controller (e.g., held by the left hand) may be used to select one or more of the items.

In particular embodiments, the virtual reality system may provide various methods of initiating and receiving communications within a virtual space. As an example and not by way of limitation, a user may receive an incoming video communication on a virtual watch. In this example, the receiving user may accept the video communication, which may initially project outward from the watch, but may only be visible to the receiving user. In this example, the receiving user may then make the video communication visible to others in a virtual room by "picking up" the video and putting it on an interactive surface. Other communications methods (e.g., involving the rendering of avatars, involving text/audio communications) are disclosed herein. In particular embodiments, a user in a virtual environment may "wear" a virtual wristband or watch that, aside from providing notifications of incoming messages and calls, may provide notifications of new user experiences.

In particular embodiments, part of a virtual space may display items outside of the current virtual environment (e.g., slides, photos, video streams of other users). As an example and not by way of limitation, this partial display may be presented when a content item that makes up the virtual space is not a fully spherical content item (e.g., a video from a 180-degree camera). Alternatively, it may even be presented otherwise (e.g., as a transparent overlay over a portion of the virtual space).

In particular embodiments, a content item may have reactions or comments associated with it that have a spatial and/or temporal element. As an example and not by way of limitation, a video may have a like associated with a particular region of a the video at a particular time-point in the video. Users viewing the content item may be able to see these reactions or comments and may also be able to submit their own reactions or comments. In particular embodiments, as a user is viewing a content item, the field of view may include "hints" or indications of already submitted reactions in the periphery (e.g., in the direction of the location of the submitted reactions)—this may act to direct the user to interesting areas in the content (e.g., locations liked by other users).

In particular embodiments, the virtual reality system may render, in a virtual space (e.g., a virtual room), a virtual sign (e.g., in the form of a "jumbotron" or a ticker that may be rotating or scrolling) for presenting relevant notifications (e.g., identifying a user who just joined the meeting or started viewing the same video, comments/reactions as they appear in the video). In particular embodiments, a user may be able to manipulate or otherwise interact with comments, posts, reactions, or other elements by grabbing them with a suitable input (e.g., by way of a gaze input, hand controllers) and placing it somewhere in the virtual space or throwing it away. The elements may come out of a virtual sign or may come out of a page that a user is browsing (either privately, or collaboratively with others in the virtual space).

In particular embodiments, the virtual reality system may allow users to get an aerial view of a virtual space. The aerial view may, for example, show a virtual room and the positions of all users in the virtual room. In this example, a user may be able to "move" from one position to another (e.g., from one seat to another in a virtual meeting room) by selecting an available location.

In particular embodiments, the virtual reality system may allow users to enter, at any time or place in a virtual space, "pause mode," which may effectively pause the experience for the user. This may be in response to the user performing a "safety gesture" or selecting some interactive element (e.g., a pause button on a virtual wristband). In particular embodiments, other avatars and/or content may disappear, get blurry, become faded, etc., which may thereby make the user feel unplugged from the experience while in pause mode. In particular embodiments, the user may be transported to a personal space (e.g., one with a virtual mirror in which the user can see himself/herself). The user may be able to exit pause mode by performing a gesture (e.g., a handshake gesture, a thumbs-up gesture) or selecting some interactive element (e.g., an "unpause" button on a virtual wristband).

In particular embodiments, the virtual reality system may allow users to customize their avatars using special virtual tools (e.g., a virtual hair dryer), or simply by selecting and altering/switching out features. Users may view and alter their avatars with the help of a virtual mirror that simulates a real mirror within a virtual space. Users may accessorize (e.g., adding hats, glasses, etc.) or add filter effects. In particular embodiments, to further facilitate avatar customization the virtual reality system may provide users with "virtual magazines" with style templates that can be implemented directly to avatars.

In particular embodiments, the virtual reality system may enable users to alter and share content items (e.g., photos/videos) in a virtual space. For example, a user may select a photo and write the word "hello" across the photo. The user may then share the altered photo. In particular embodiments, the altering may be done live, with others in the virtual space watching or collaborating in the process.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims

BRIEF DESCRIPTION OF THE DRAWINGS

FIGS. 16A-16G illustrate example uses of virtual tools to customize an avatar.

FIG. 24 illustrates an example of an interactive surface that has been altered to become a content-player surface.

DESCRIPTION OF EXAMPLE EMBODIMENTS

Figure 1:
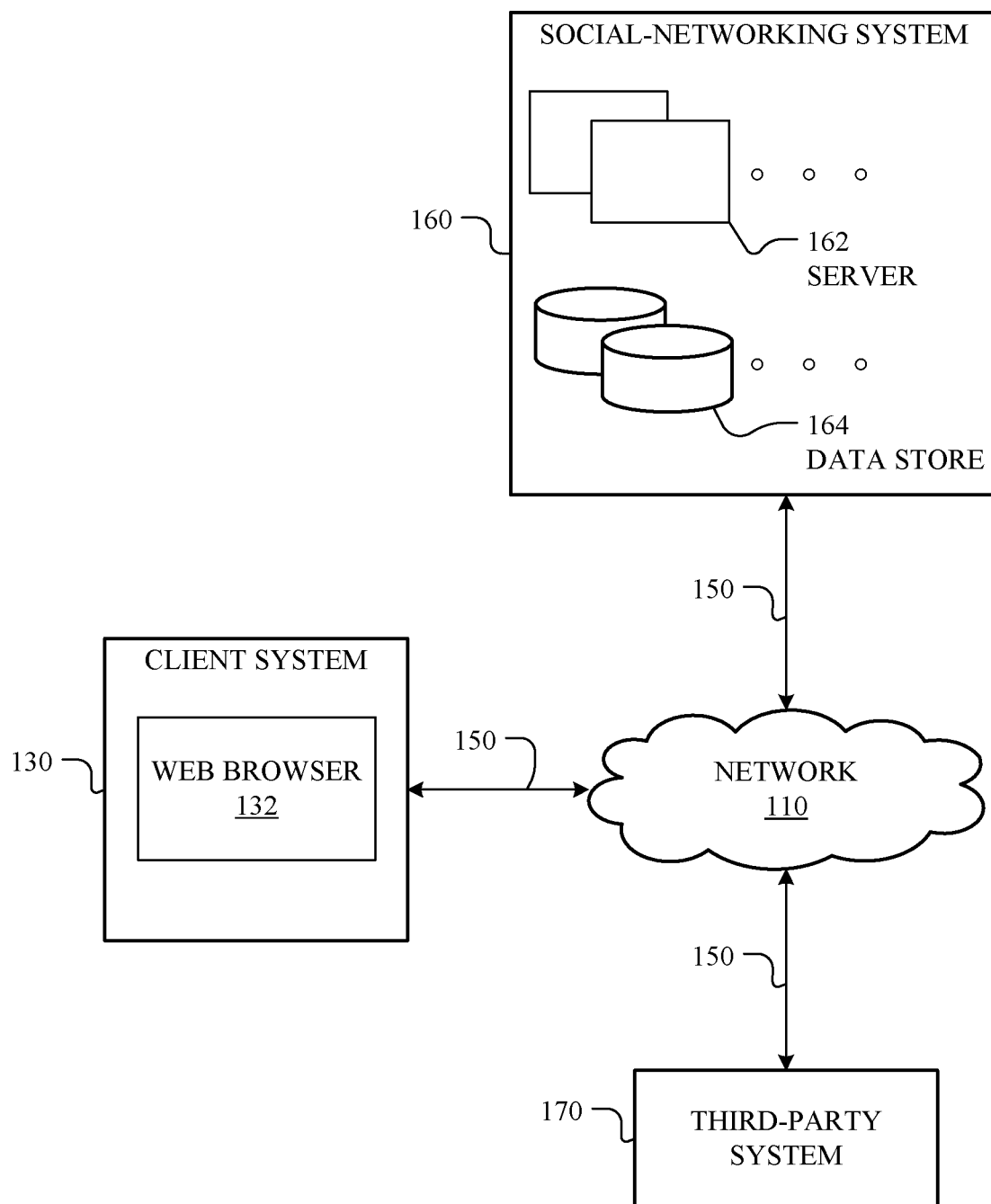
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
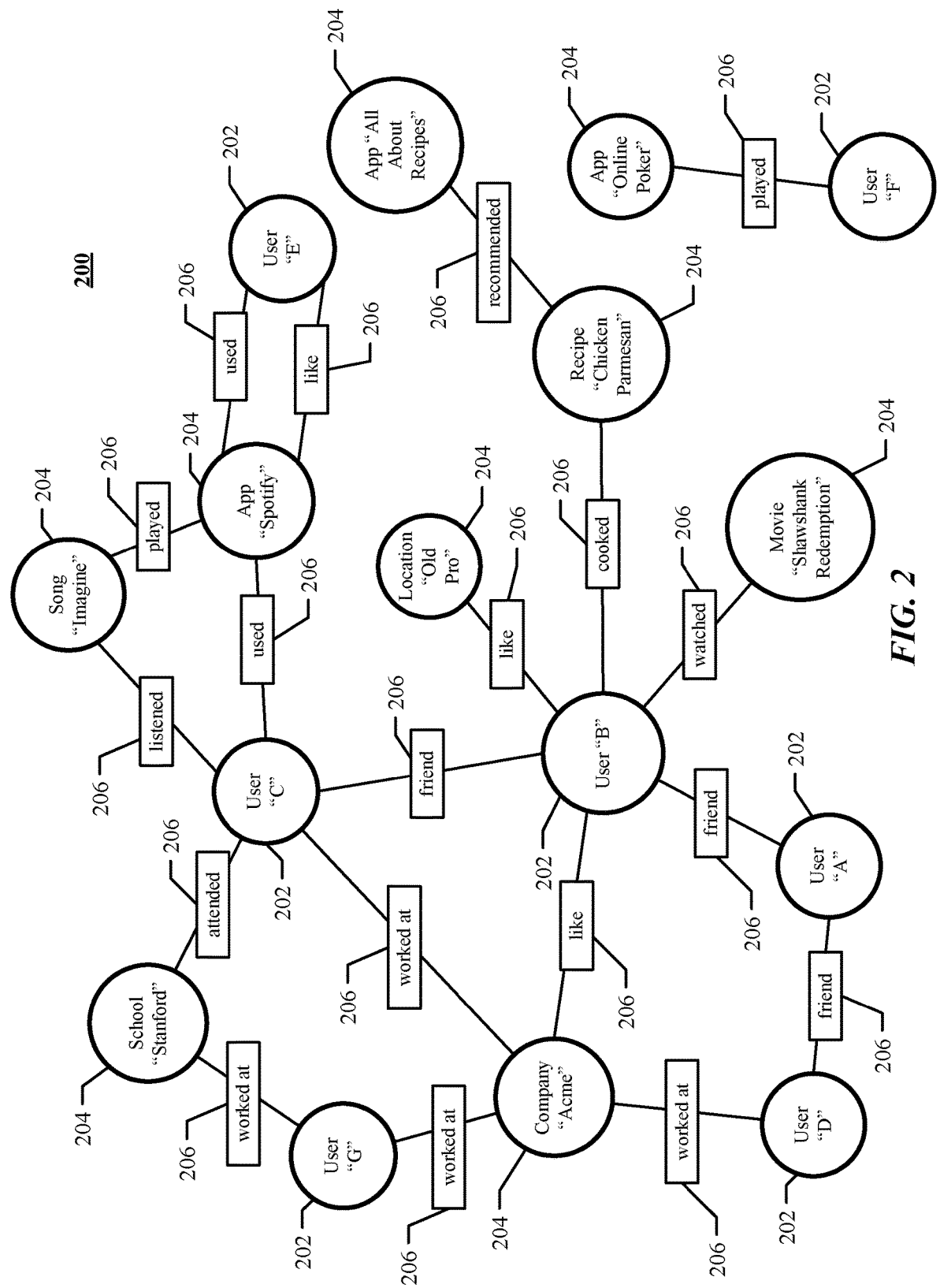
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3A:
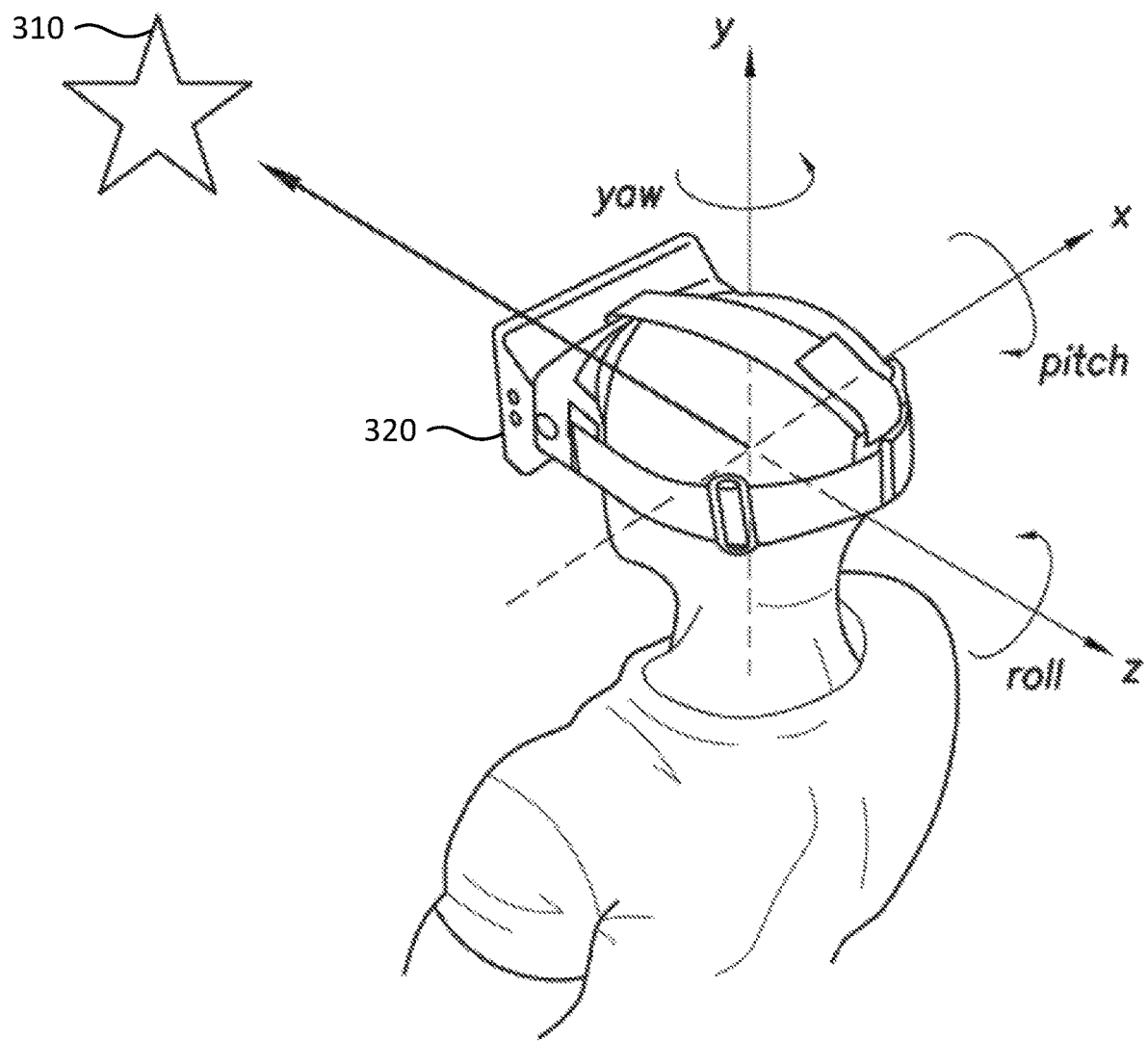
FIGS. 3A-3B illustrate a headset display device of a virtual reality system
Figure 3B:
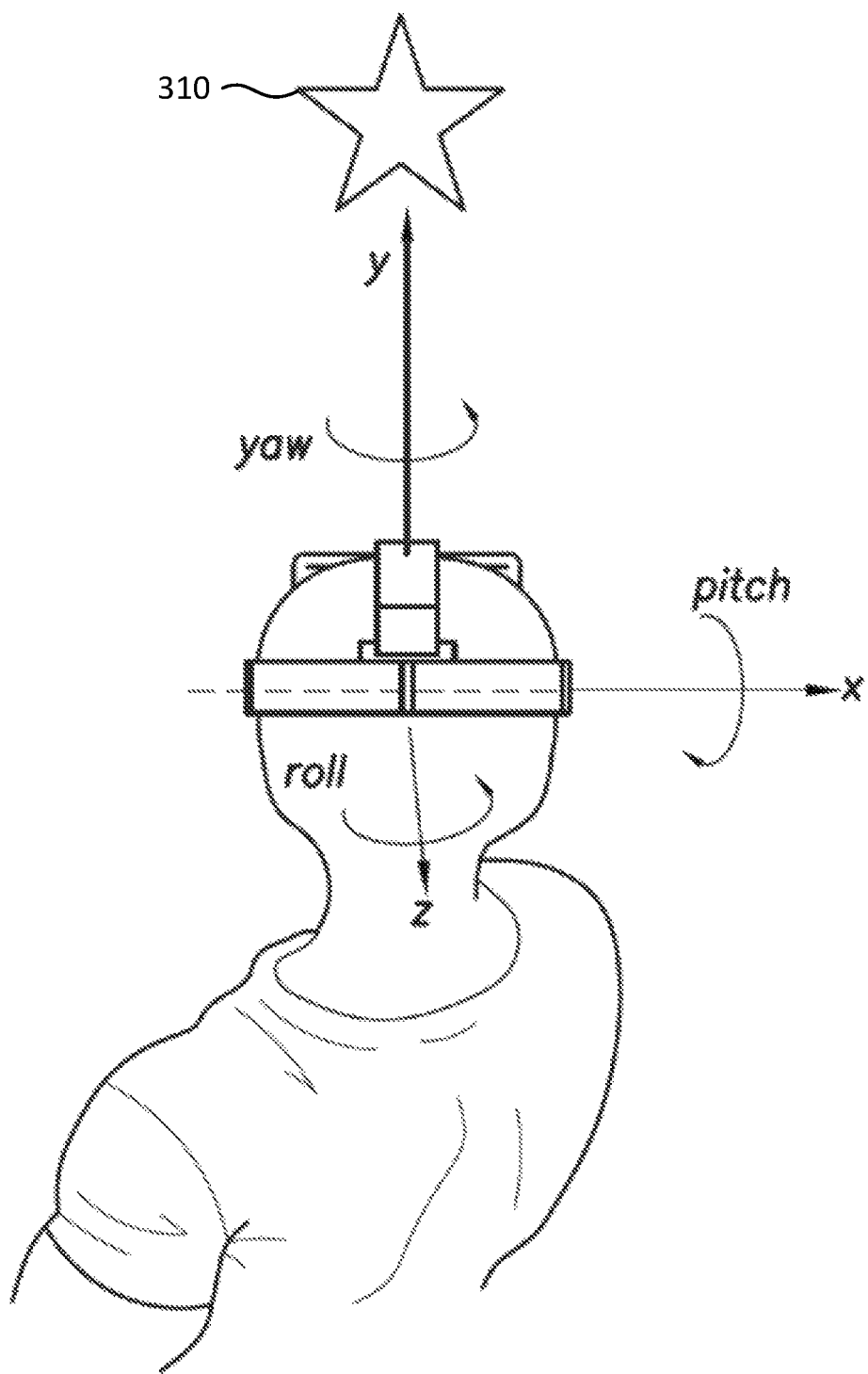

FIGS. 3A-3B illustrate a headset display device of a virtual reality system. In particular embodiments, a virtual reality system may render a virtual space for display to a user on a display device. In particular embodiments, the virtual reality system may be a local system that includes devices present locally with respect to a user of the virtual reality system. In particular embodiments, the virtual reality system may be a remote device (e.g., a remote server computing machine) or may at least include a remote device. As an example and not by way of limitation, the virtual reality system may be defined to include a server of the social-networking system 160. As another example and not by way of limitation, the virtual reality system may be defined to include a server of the social-networking system 160 as well as a local computing device. In particular embodiments, the virtual space may be an augmented reality space in which virtual elements are overlaid on the real world. As an example and not by way of limitation, the virtual reality system may continuously capture images of the real world (e.g., using a camera on the headset of the user) and overlay virtual objects or avatars of other users on these images, such that a user may interact simultaneously with the real world and the virtual world. In particular embodiments, the user may view the virtual space using a headset device. As an example and not by way of limitation, referencing FIG. 3A, the user may mount the headset device 320 on the user's head. In particular embodiments, the headset device may be a device that may be mounted, placed, or otherwise connected to the user's head. In particular embodiments, the headset device may include a display mechanism that displays a region of the virtual space to the user. As an example and not by way of limitation, the display mechanism may include a screen that displays the region of the virtual space. As another example and not by way of limitation, the display mechanism may be a projector that directly projects a display of the region of the virtual space to an optimal point in the user's eyes (e.g., to the fovea of each of the user's eyes). In particular embodiments, the headset device may include a gaze-tracking mechanism (e.g., employing one or more sensor devices or transmitter devices) that allow for the tracking of the user's gaze (i.e., an estimated focal point of the user with respect to the virtual space). Although this disclosure focuses on virtual reality and uses terms commonly associated virtual reality, the disclosure contemplates applying the described methods to augmented reality.

In particular embodiments, the virtual reality system may receive one or more inputs from an input device (e.g., the headset device) that specify an intent by the user to view a particular region of the virtual space. In particular embodiments, these inputs may include a gaze input that indicates a location of a user-intended focal point within a region of the virtual space. As an example and not by way of limitation, referencing FIGS. 3A and 3B, the user may specify the gaze input by moving the headset device 320 to adjust the focal point 310. In particular embodiments, the focal point may be at a predetermined location on the user's field of view (e.g., the center of the user's field of view) of the region of the virtual space. In particular embodiments, the gaze input may be based on sensor data that tracks the location of the headset device. The virtual reality system may make use of outside-in tracking, in which a tracking camera is placed external to the headset device and within the line of sight of the headset device. In outside-in tracking, the tracking camera may track the location of the headset (e.g., by tracking one or more infrared LED markers on the headset device). Alternatively or additionally, the virtual reality system may make use of inside-out tracking, in which a tracking camera may be placed on or within the headset device itself. In inside-out tracking, the tracking camera may capture images around it in the real world and may use the changing perspectives of the real world to determine its own position in space. In particular embodiments, the virtual reality system may track the user's pupils to determine a focal point location, such that the user may be able to shift the focal point by moving the pupils accordingly without any head movement. In particular embodiments, the gaze-tracking mechanism may also track one or more tilt angles of the user's head or headset device, tracking the pitch, yaw, and roll (e.g., tracking the six degrees of freedom) with respect to a virtual pivot point. FIGS. 3A-3B provide example illustrations of pitch, yaw, and roll with respect to axes defined by the user's head or headset. These tilt angles may be determined based on inputs from one or more tracking cameras. As an example and not by way of limitation, in an inside-out tracking system, the virtual reality system may calculate the tilt angles based on the locations of two or more regions of the headset (e.g., two or more infrared LED markers). The tilt angles may also be determined based on one or more sensor units located on or within the headset device such as inertial measuring units, which may include any combination of sensors such as accelerometers, gyroscopes, and magnetometers. The virtual reality system may use data from the inertial measuring units to determine velocity, orientation, and gravitation forces with respect to the headset. The virtual pivot point may be a point associated with a head model that the virtual reality system creates to represent the user's head (e.g., based on an average head, based on custom measurements tailored to the user). As an example and not by way of limitation, the virtual pivot point may be at or near the center of the head model. Based on the current location of the user's head or pupils and the current location of the virtual pivot point, the virtual reality system may model a virtual ray that represents the user's gaze, where the ray points to the focal point. In particular embodiments, the user may be able to shift or maintain the focal point and/or the displayed region based on a gaze input (or another suitable input, such as a gesture input using a controller). As an example and not by way of limitation, the user may be able to shift the region of the virtual space that is currently being displayed by pivoting the user's head around the virtual pivot point or by otherwise moving the head (e.g., strafing to the left or right). In this example, the virtual reality system may determine a new focal point based on the virtual ray (i.e., adjusting the focal point to the location pointed to by the virtual ray), and the displayed region of the virtual space may shift to maintain the focal point at the same location on the user's field of view (e.g., at the center).

In particular embodiments, the headset device may not include a display mechanism and may simply have a gaze-tracking mechanism. As an example and not by way of limitation, the virtual space may be displayed on one or more screens (e.g., surrounding all or a portion of the user's viewable radius). In particular embodiments, the headset device may not include a gaze-tracking mechanism and may simply have a display mechanism. As an example and not by way of limitation, the user's gaze may be tracked by one or more devices located remotely (e.g., one or more cameras or other sensors pointed toward the user that track the head and/or pupils of the user). In particular embodiments, the virtual reality system may not require a headset device, in which case the display of the virtual space and the tracking of the user's gaze may occur using other means. As an example and not by way of limitation, the virtual space may be displayed on one or more screens (e.g., surrounding all or a portion of the user's viewable radius), and the user's gaze may be tracked by one or more devices located remotely (e.g., one or more cameras pointed at the user that track the head or pupils of the user).

In particular embodiments, a reticle may be superimposed directly over, around, or near the focal point of the user's field of view in the displayed region of the virtual space. As used herein, the term "reticle" refers to a guide that may visually indicate a location of the focal point. In particular embodiments, the reticle may be a generated image that is overlaid by the virtual reality system on the display. In particular embodiments, the reticle may be a physical element (e.g., fibers embedded on a display screen). The reticle may act as a sighting guide that aids the user in shifting or adjusting the focal point with added precision.

In particular embodiments, gaze inputs may be used as a means of interacting with content in the virtual space. In particular embodiments, the user may be able to interact with virtual objects in the virtual space by aiming the focal point at "hit targets," which may be regions associated with the virtual object or an interactive element. As an example and not by way of limitation, a hit target associated with a particular virtual object may be a subregion of the currently displayed region having a boundary extending around the particular virtual object. In this example, the user may aim the focal point at the subregion (e.g., by adjusting the position of a reticle to a point within the subregion) to interact with (e.g., select, pick up, push, etc.) the virtual object. In particular embodiments, the interaction may only occur once the user has aimed the focal point at the associated hit target for a threshold period of time. As an example and not by way of limitation, a virtual object may only be selected once the focal point has been aimed at the associated hit target for one second. In particular embodiments, one or more of the hit targets may be "sticky" such that a reticle may gravitate toward the hit targets as the focal point approaches these hit targets. In these embodiments, the virtual reality system may effectively be predicting a user intent to aim at these hit targets. The virtual reality system may predict such user intent based on any of several factors. As an example and not by way of limitation, such an intent may be predicted when the focal point gets within a threshold distance of the boundary of the hit target, when there is a threshold degree of inertia toward the boundary of the hit target based on a location and a trajectory of the focal point. In particular embodiments, the virtual reality system may not render a reticle until the virtual reality system predicts that there is a user intent to interact with virtual objects (or the virtual space generally). As an example and not by way of limitation, a reticle may not be rendered on the display until it is determined that the focal point is approaching a hit target. Although the disclosure focuses on selecting hit targets using a gaze input, the disclosure contemplates selecting hit targets using any suitable input. As an example and not by way of limitation, a user may select a hit target using a controller that corresponds to a rendering of the user's hand. In this example, the user may move the controller and cause the rendering of the user's hand to point at the hit target, tap the hit target, grab the hit target, etc., and may as a result activate the hit target in an intended manner. A point gesture may be performed with a controller by pressing a button, performing some gesture in the virtual world, performing some gesture in the real world (e.g., lifting the finger in the real world off a controller, causing the finger to point in the virtual world—this may be particularly intuitive since users may be acting out the act of pointing in real life), and/or by any other suitable method. In particular embodiments, the point gesture may cause a beam (e.g., a laser-pointer beam) to emanate from the finger to aid with pointing at particular areas or items with accuracy (e.g., especially in cases where the area or item that is being pointed to is far away within the virtual space).

In particular embodiments, the user may be able to use gaze inputs to navigate a menu of images (e.g., photos, renderings), videos, interactive content (e.g., games or other experiences that give users a degree of control over what occurs in the content), etc.—collectively termed herein as "visual media items"—and to view particular visual media items. In particular embodiments, the visual media items may be spherical or otherwise immersive in nature (e.g., 360-degree visual media items, 180-degree visual media items, panorama or wide-angle visual media items, etc.). For purposes of this disclosure, the terms "spherical" and "360-degree" may be used interchangeably. In these embodiments, the user may be able to use gaze inputs to view different regions of the images or videos by adjusting the focal point, as described herein.

Figure 4A:
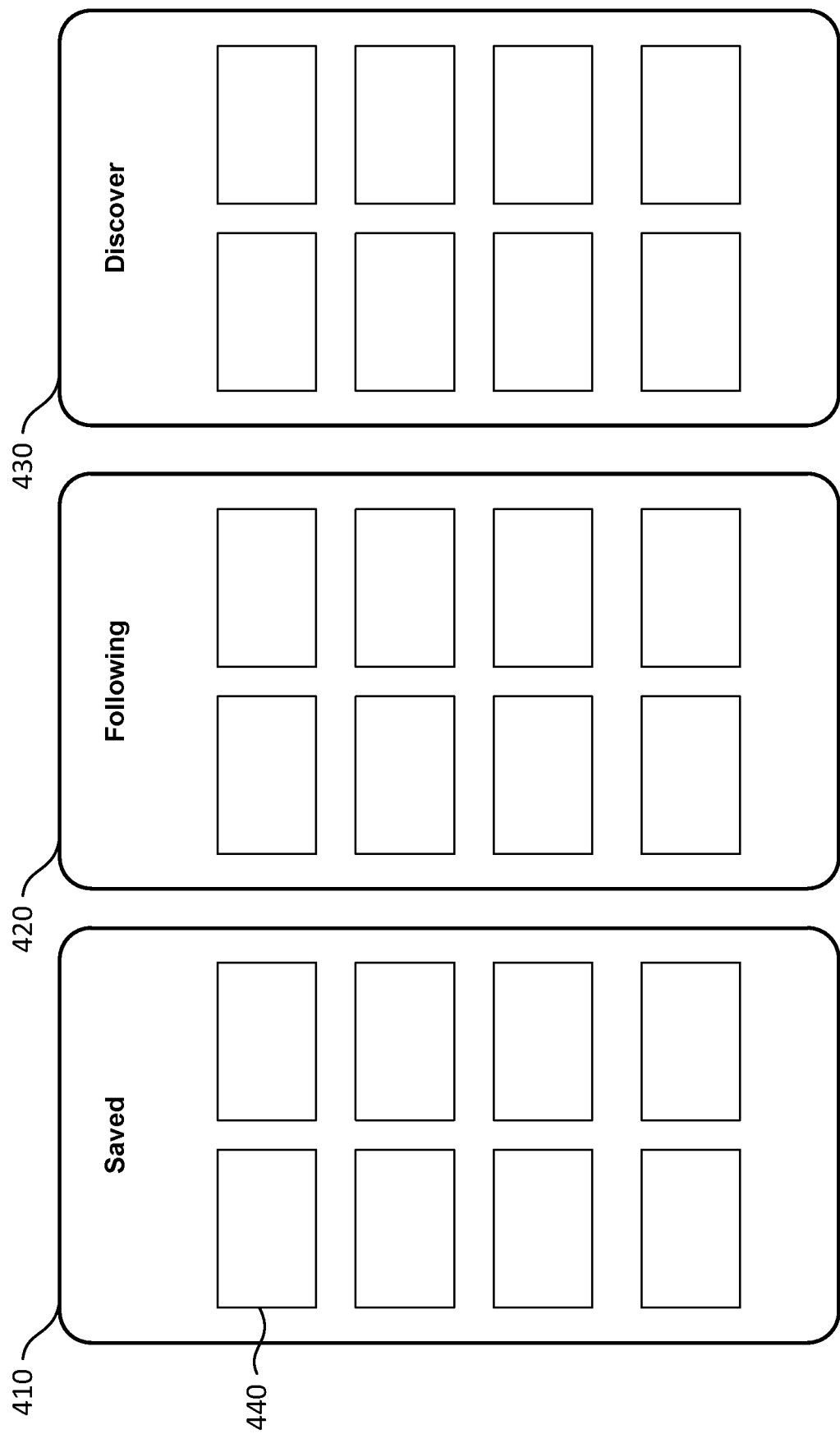
FIG. 4A illustrates an example menu of media item feeds

FIG. 4A illustrates an example menu of media item feeds. In particular embodiments, the virtual reality system may initially display a menu of different categories of visual media items. The menu may include a variety of different feeds that include visual media items. As an example and not by way of limitation, referencing FIG. 4A, the menu may include the "Saved" feed 410 that includes visual media items (e.g., the visual media item 440) that the user previously saved (e.g., from a newsfeed of an online social network) or received (e.g., from a friend or contact, from a social connection on an online social network), the "Following" feed 420 that includes visual media items that were posted or uploaded by social connections or organizations (e.g., a page or group on an online social network) that the user may have opted to follow, the "Discover" feed 430 that may promote visual media items by including newly uploaded visual media items and/or visual media items that may be of interest to the user (e.g., determined based on profile information, demographic information, geo-location information, affinities toward concepts, history of visual media items previously viewed by the user, history of visual media items previously liked by the user, views previous viewing history or habits, or any other suitable information associated with the user), or any other suitable feeds. In particular embodiments, not all feeds may be visible within the currently displayed region, in which case, the user may be able to aim the focal point at areas that prompt the display of additional feeds. As an example and not by way of limitation, the user may aim the focal point toward an area on the right of the currently displayed region, prompting the displayed feeds to scroll and display additional feeds. In particular embodiments, the user may be able to navigate through content online (e.g., by accessing webpages using a browser application), or perform other suitable actions. Although this disclosure focuses on visual media items, it contemplates applying the described concepts to other content items (e.g., audio items).

Figure 4B:
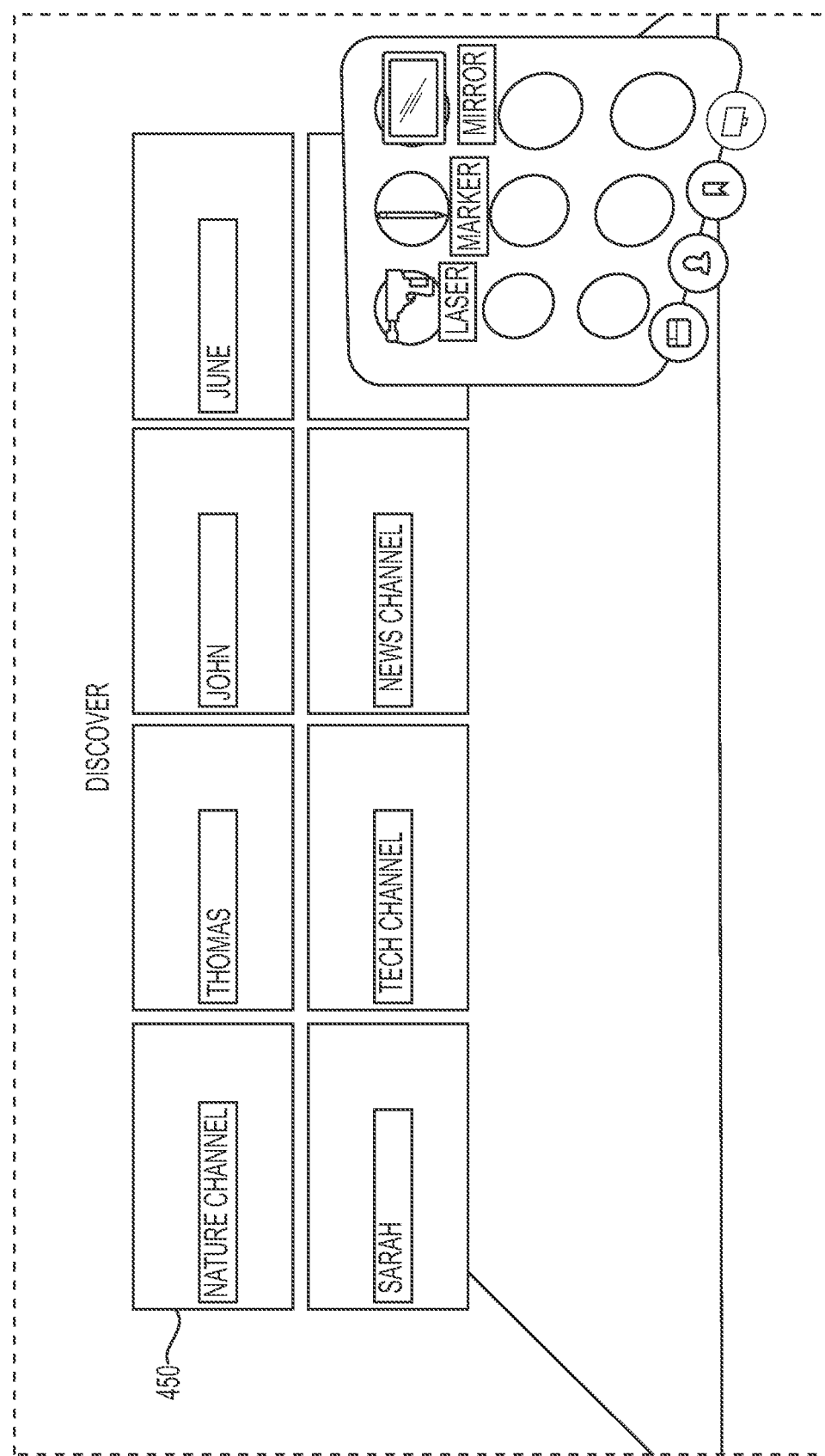
FIG. 4B illustrates an example feed with several subfeeds.

FIG. 4B illustrates an example feed with several subfeeds. In particular embodiments, the user may be able to select a particular feed by submitting an appropriate gaze input. As an example and not by way of limitation, the user may be able to select the "Discover" feed by aiming the focal point at a hit target associated with the following feed. Once a particular feed is selected, the particular feed may shift into the center of the displayed region of the virtual space. In particular embodiments, each of the feeds may be subcategorized further into subfeeds, which may be selectable by the user in the same manner as the feeds. As an example and not by way of limitation, referencing FIG. 4B, within the "Discover" feed, the user may be able to select a subfeed of a particular group (e.g., the subfeed 450 associated with a group named "Nature Channel"), which may include visual media items uploaded in associated with the particular group (e.g., nature videos). In particular embodiments, just as with feeds, the user may be able to prompt the display of additional subfeeds by aiming the focal point in a suitable manner.

In particular embodiments, the user may be able to select individual visual media items that are presented within a feed or subfeed to view their respective content. In particular embodiments, the visual media items may be presented as pages, with a set of visual media items on each page (e.g., as illustrated in FIGS. 4A-4B). Each of the visual media items may be represented by a respective thumbnail. The user may be able to navigate among different pages of visual media items using gaze inputs (e.g., looking to the right, left, top, or bottom to prompt the display of a different page that includes a different set of visual media items).

FIGS. 5A-5E illustrate an example interface of a slide show of visual media items. In particular embodiments, the user may select one or more images from the feed or subfeed to view. In particular embodiments, the images may be displayed in a slide show that includes the selected images. In particular embodiments, the virtual reality system may also display related images (or other visual media items) in the slide show that were not explicitly selected by the user (e.g., other images in the feed or subfeed, other images that may be interesting to the user based on information associated with the user as described herein, other related images, etc.). The slide show may proceed from one image to the next automatically, allowing for each image to be displayed for a period of time. As an example and not by way of limitation, each image may be displayed for twenty seconds, after which the next image may be displayed. In particular embodiments, a time element may display an indication of a duration of time remaining before the slide show proceeds to the next image. As an example and not by way of limitation, referencing FIGS. 5A-5C, the time element 510 may indicate a proceeding countdown as time passes, In particular embodiments, the user may be able to control the procession of the images using gaze inputs. In particular embodiments, the user may aim the focal point at virtual buttons displayed in the virtual space (e.g., overlaid in a suitable image on the displayed visual media item). As an example and not by way of limitation, referencing FIG. 5A, the user may be able to aim the focal point at a hit target associated with the "pause" button 540 that halts a timer associated with the time element 510. As another example and not by way of limitation, the user may be able to aim the focal point at hit targets associated with a "next" or a "previous" button to move forward or backward, respectively, in the procession of visual media items. As an example and not by way of limitation, referencing FIG. 5A, the user may be able to aim at the "previous" button 520 to switch to a corresponding previous visual media item, or aim at the "next" button 530 to switch to a corresponding next visual media item.

Figure 5A:
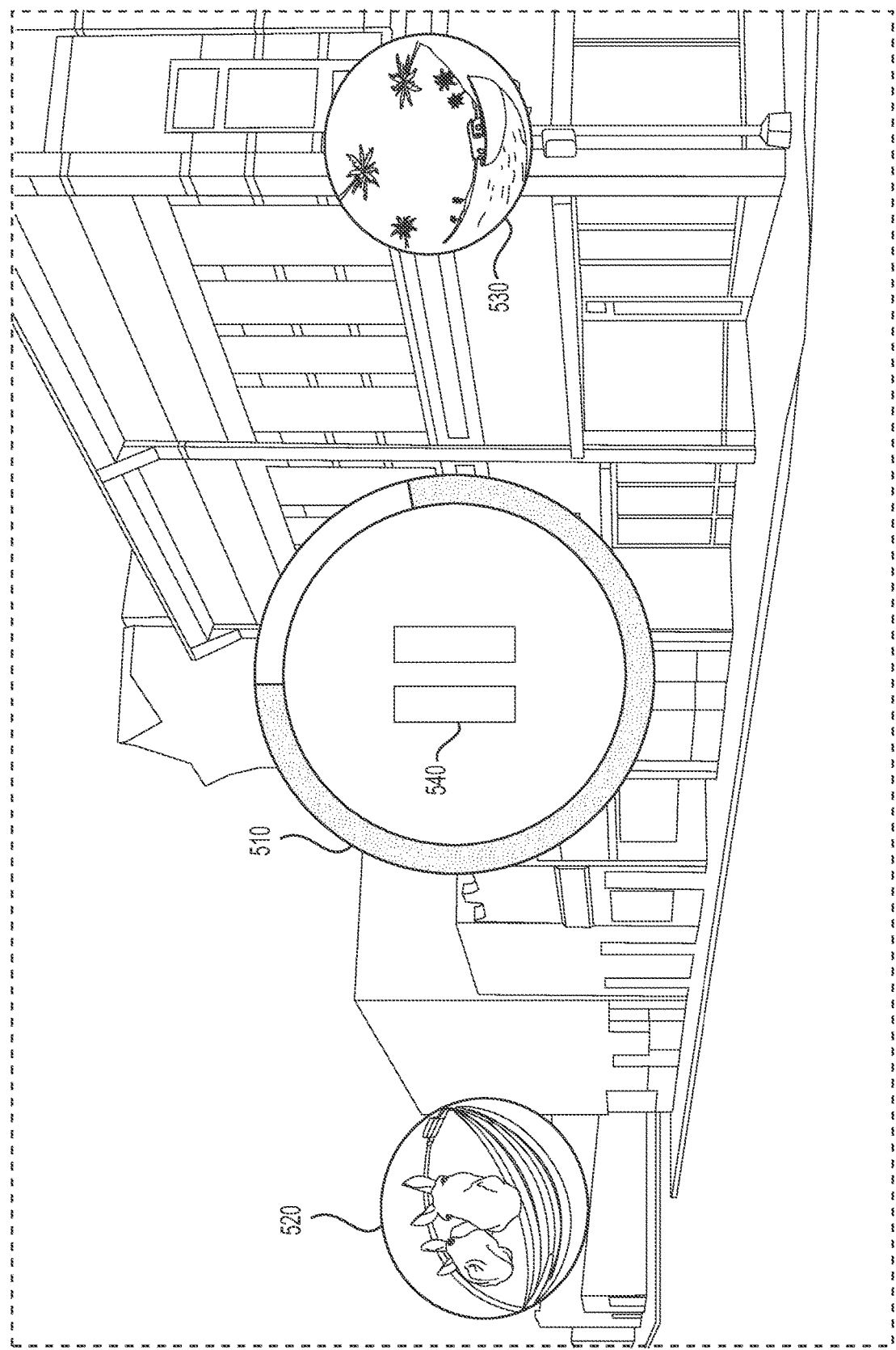
FIGS. 5A-5E illustrate an example interface of a slide show of visual media items.
Figure 5B:
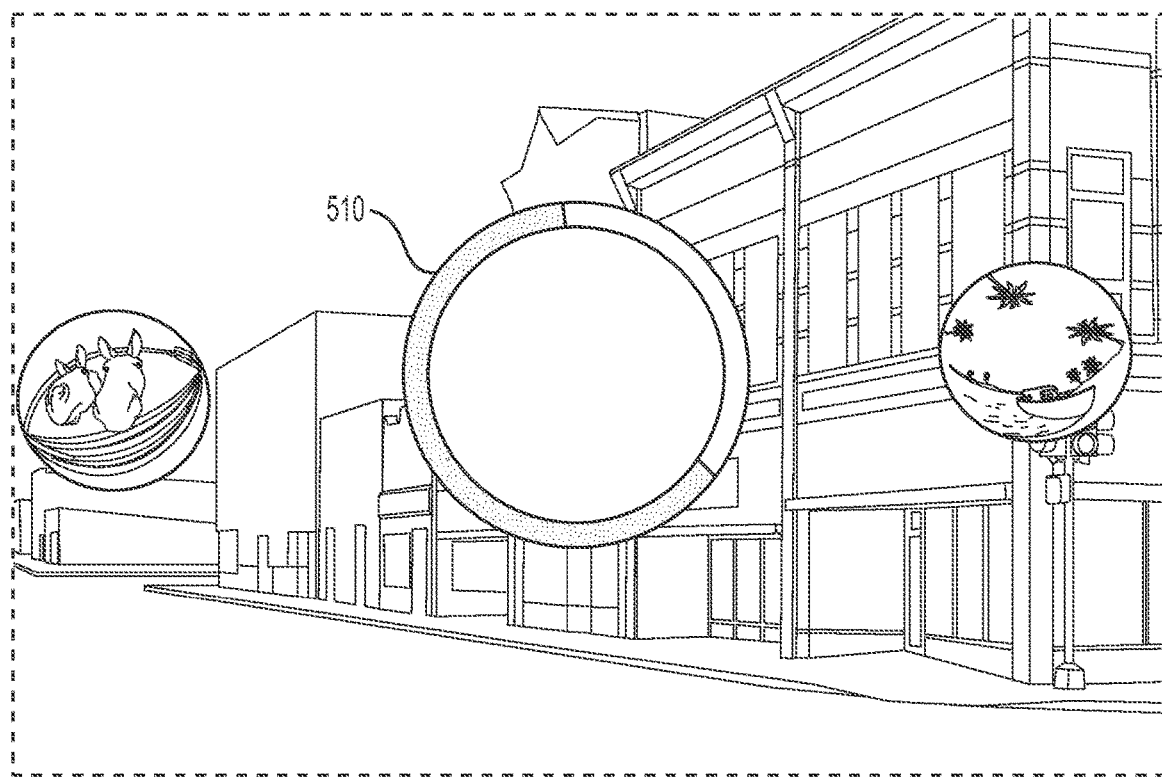
Figure 5C:
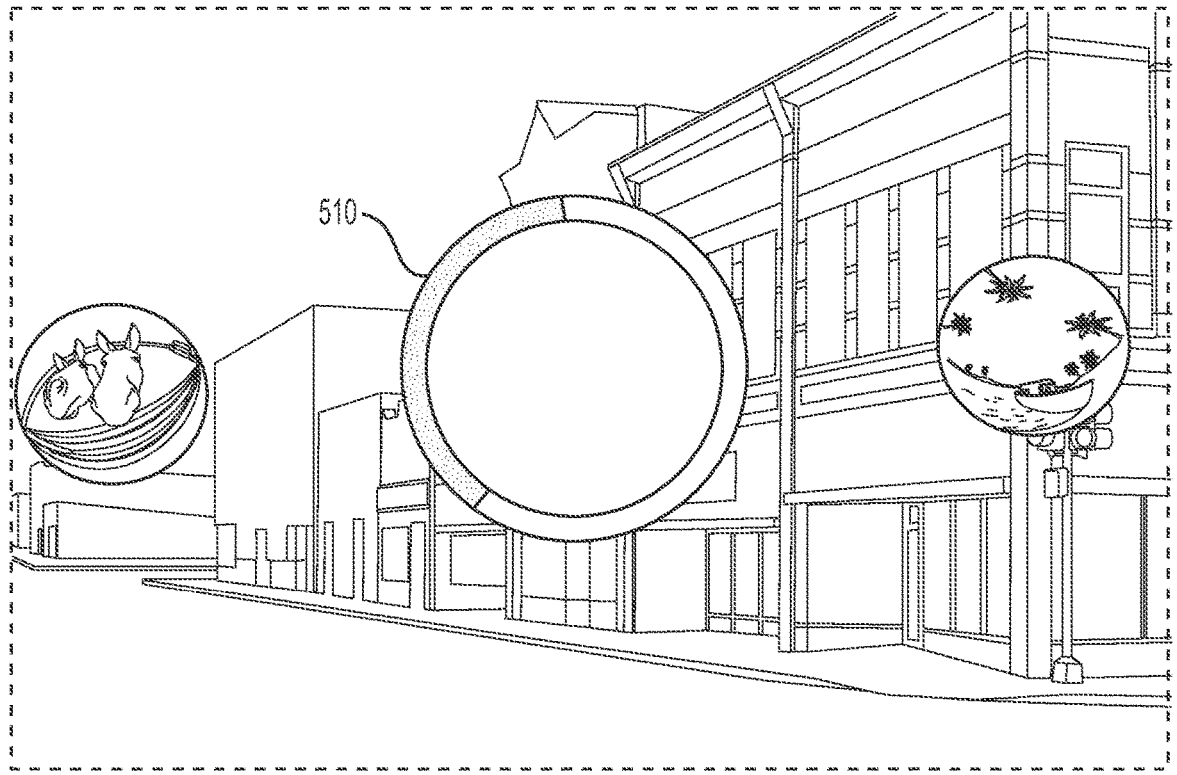
Figure 5D:
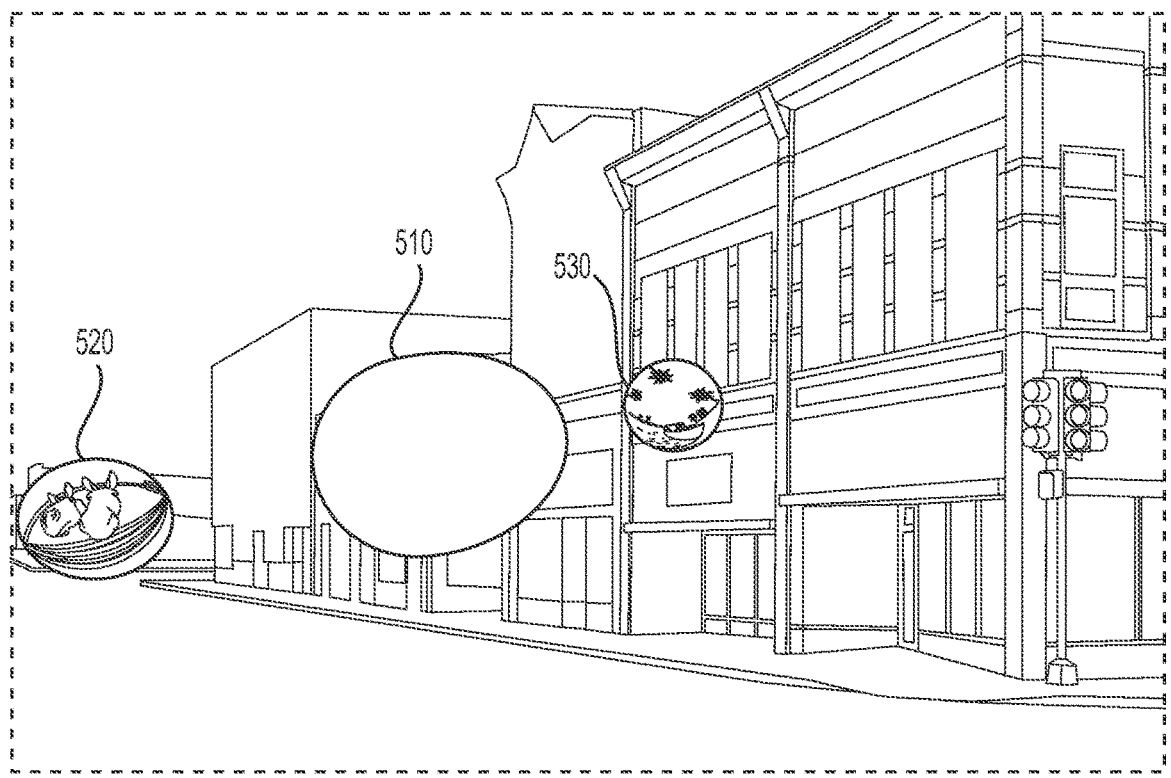
Figure 5E:
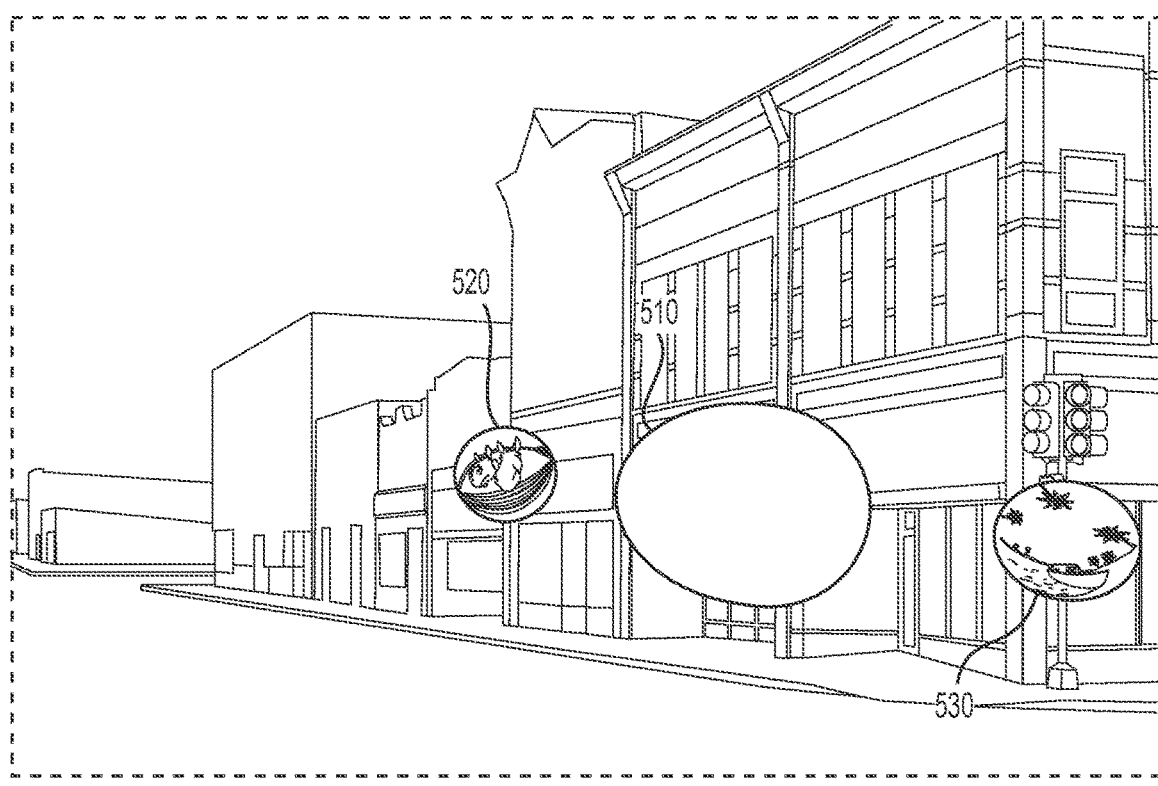
Figure 6A:
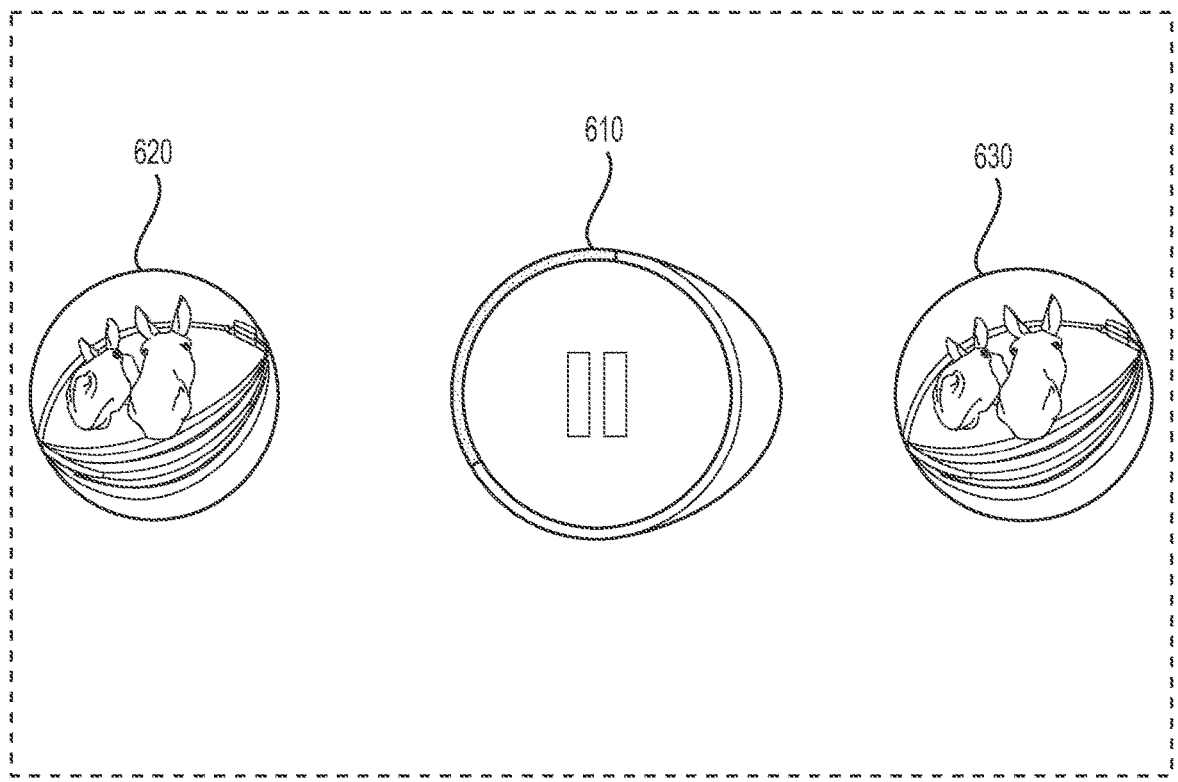
FIGS. 6A-6D illustrate an example transition from a current visual media item to a next visual media item in response to a user input.
Figure 6B:
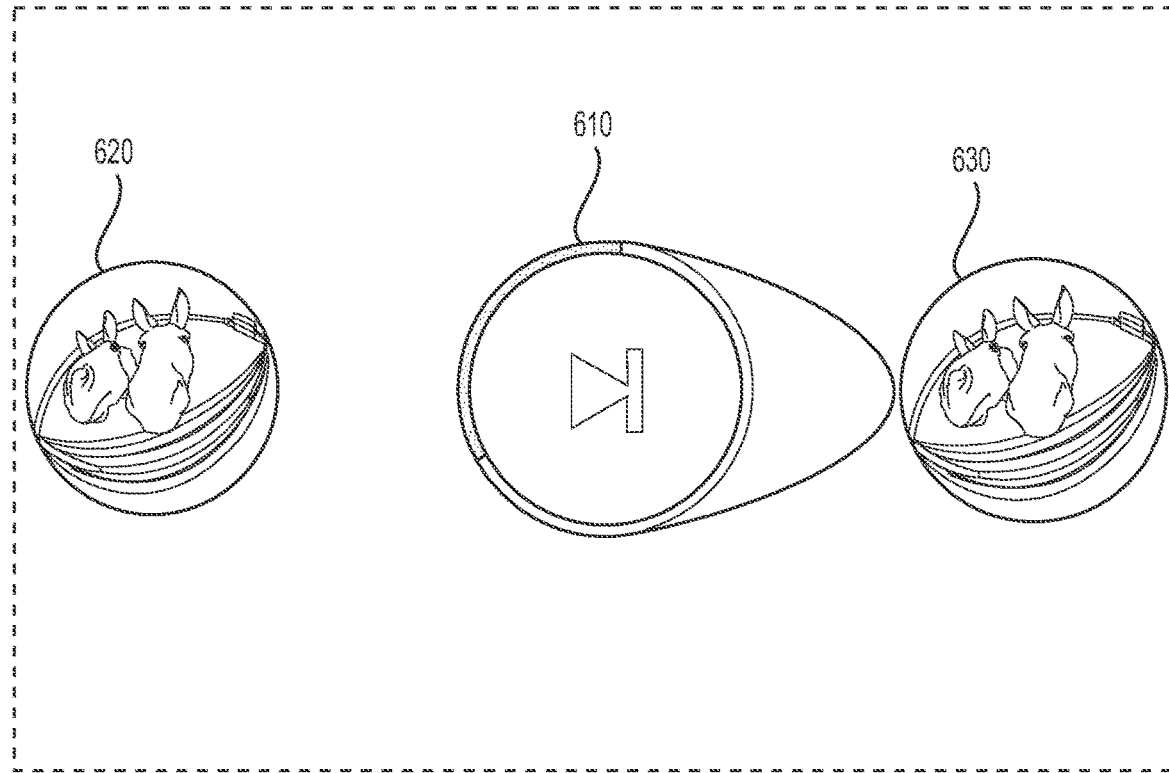
Figure 6C:
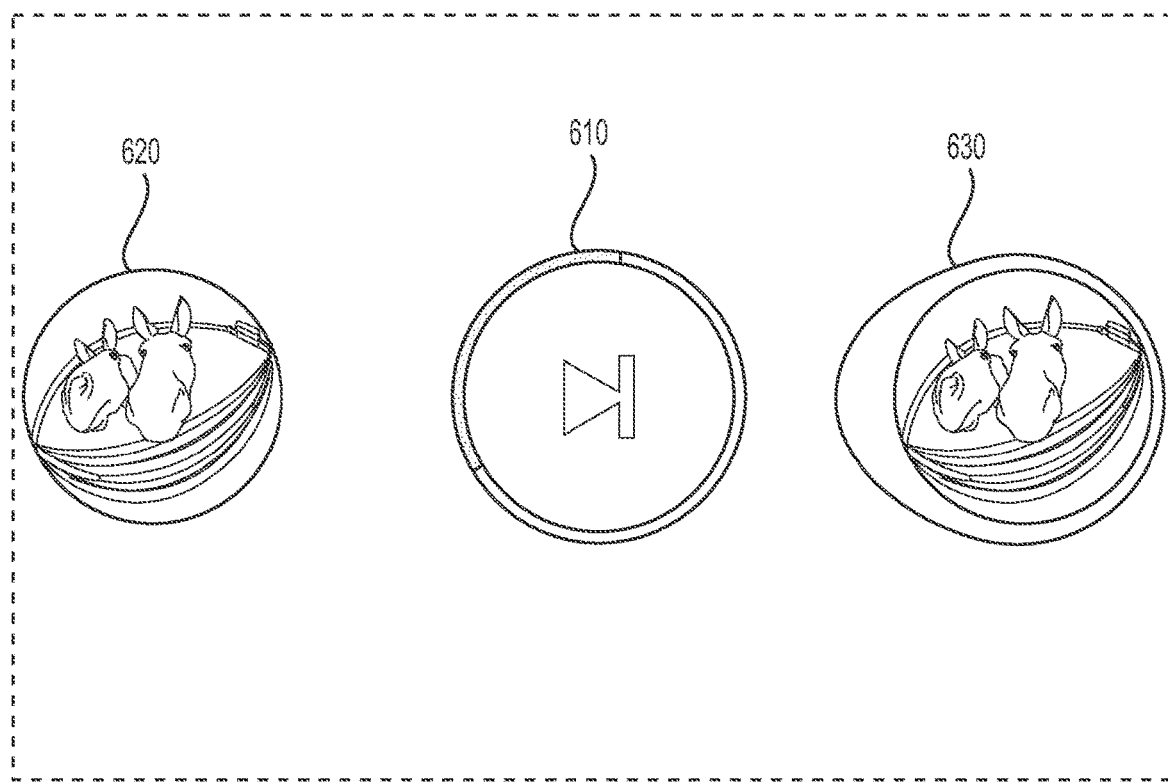
Figure 6D:
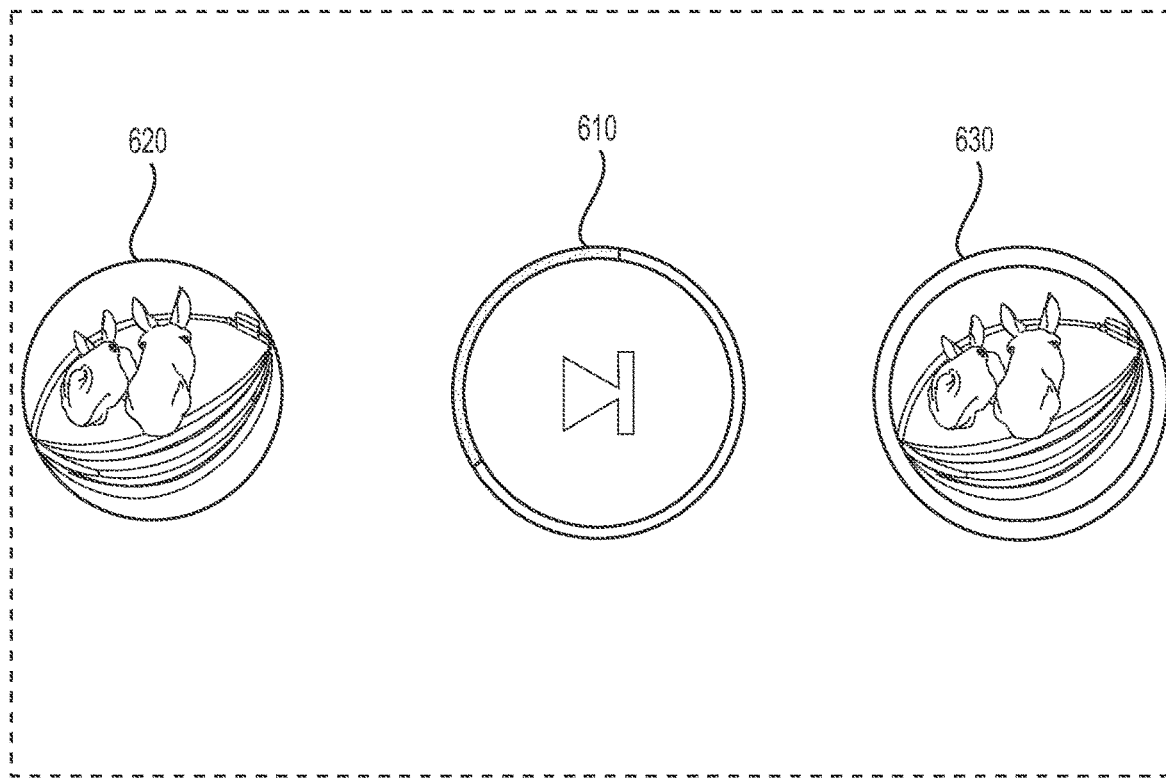

FIGS. 6A-6D illustrate an example transition from a current visual media item to a next visual media item in response to a user input. In these series of example figures, the user moves the focal point from the time element 610 to the "next" button 630. By FIG. 6D, the "next" button 630 may have been selected, causing the virtual reality system to display the corresponding next visual media item. Referencing FIG. 6A, a transition to a previous visual media item may occur if the user aims the focal point toward the "previous" button 620. In particular embodiments, the slide show may proceed only in response to user inputs (e.g., gaze inputs aiming the focal point at hit targets of a "next" or "previous" button). In particular embodiments, the user may be able to speed up the timer to reduce or increase the duration of time remaining for the display of a particular image. In particular embodiments, this may be done using a timeline-scrubber element that may be displayed at a suitable location on the user's field of view (e.g., overlaying or near the display of a respective image). The timeline-scrubber element may include a display of a timeline indicating the period of time for which the image is to be displayed and a movable scrubber component that may indicate the current point in time on the timeline. As an example and not by way of limitation, the user may aim the focal point at a hit target associated with a scrubber within a timeline-scrubber element to select the scrubber and then may shift the focal point to move the scrubber along the timeline-scrubber element (e.g., to the right to reduce the time remaining and to the left to increase the time remaining). For example, referencing FIG. 5A, the time element 510 may include a timeline-scrubber element such that the countdown may be affected by user inputs (e.g., increasing or decreasing the time remaining). Although this disclosure focuses on timeline-scrubber elements that are oriented horizontally, it contemplates any suitable orientation (e.g., vertical, diagonal, circular, etc.). In particular embodiments, the scrubber may include a display of a mini version, or some other representation, of the currently displayed image. As an example and not by way of limitation, the previous" button 520 may include a representation (e.g., a spherical representation) of its corresponding visual media item, and the "next" button 530 may similarly include a representation of its corresponding visual media item. In particular embodiments, the timeline-scrubber/time element (e.g., the time element 510 in FIGS. 5A-5C) and other elements (e.g., the "previous" button 520 and the "next" button 530 in FIGS. 5A-5C) may be a spherical representation of the image that may account for visual effects like parallax and/or perspective to create an illusion of depth. FIGS. 5D-5E provide example illustrations of parallax and/or perspective for these elements as a user looks right and left, respectively, in the virtual space.

In particular embodiments, the user may be able to use speech input (e.g., using voice commands) to perform some of the same functions described herein in the context of gaze inputs. As an example and not by way of limitation, the user may be able to pause or skip to the next visual media item by speaking appropriate voice commands (e.g., "pause," "next"). In particular embodiments, speech inputs may be used in addition to alternative to gaze inputs.

Figure 7A:
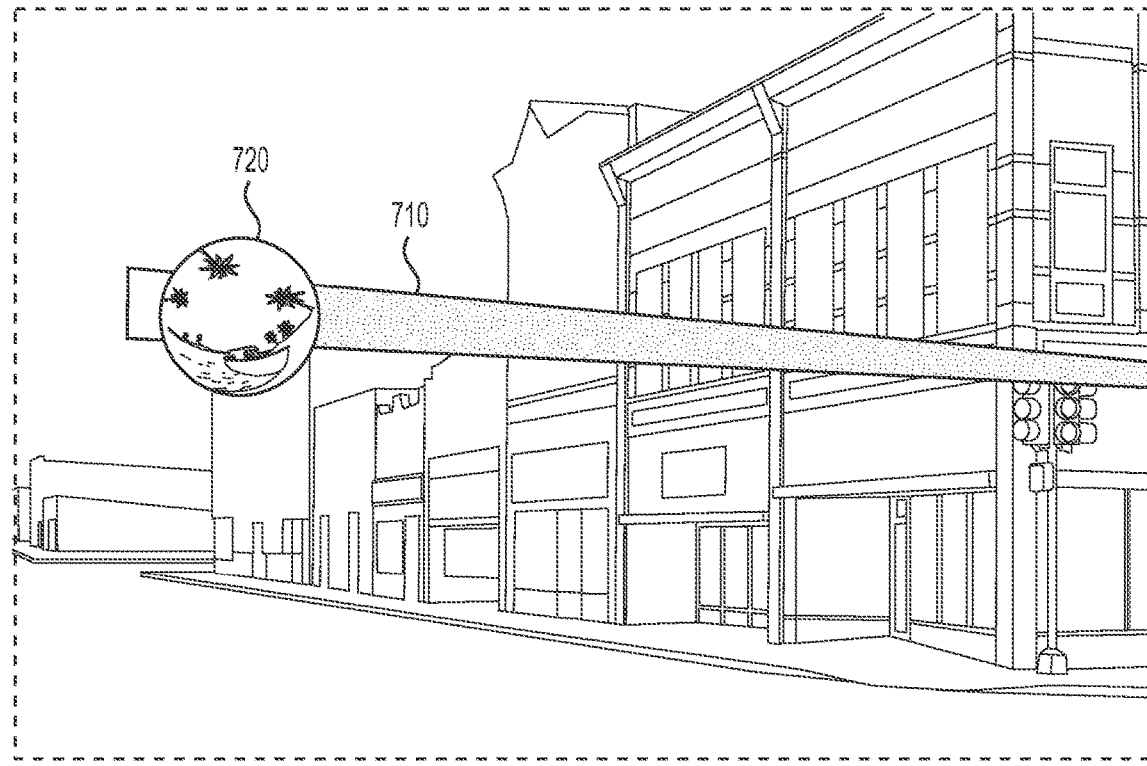
FIGS. 7A-7C illustrate an example timeline-scrubber element associated with a video.
Figure 7B:
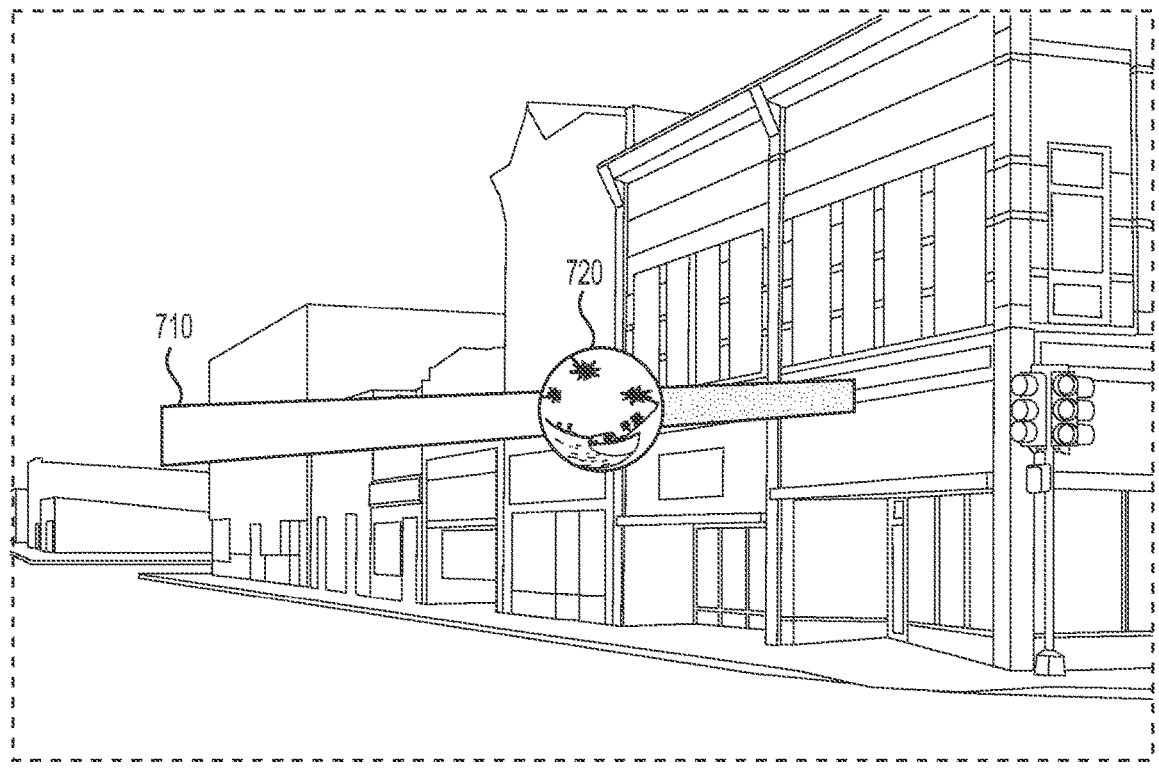
Figure 7C:
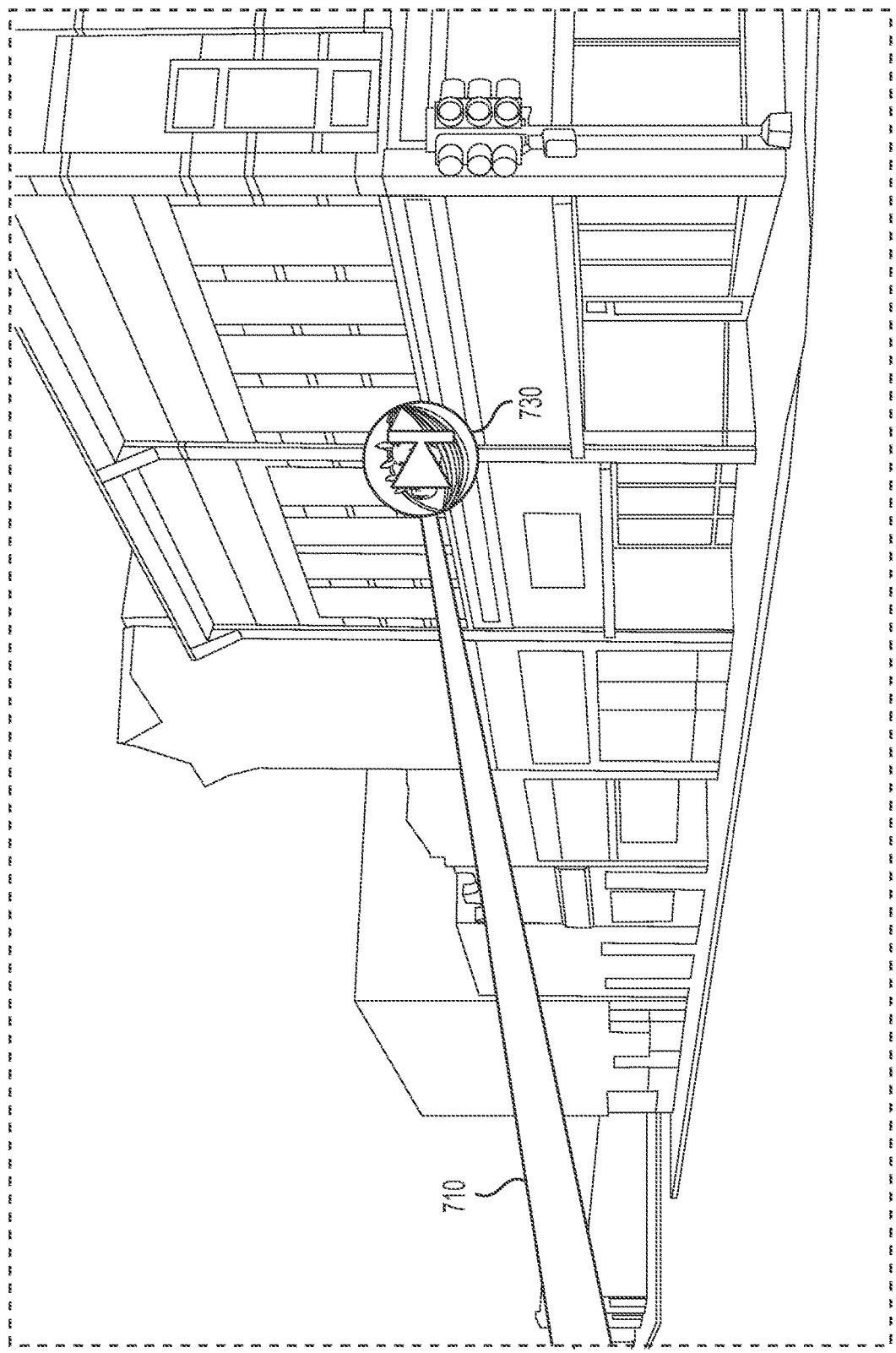
Figure 8:
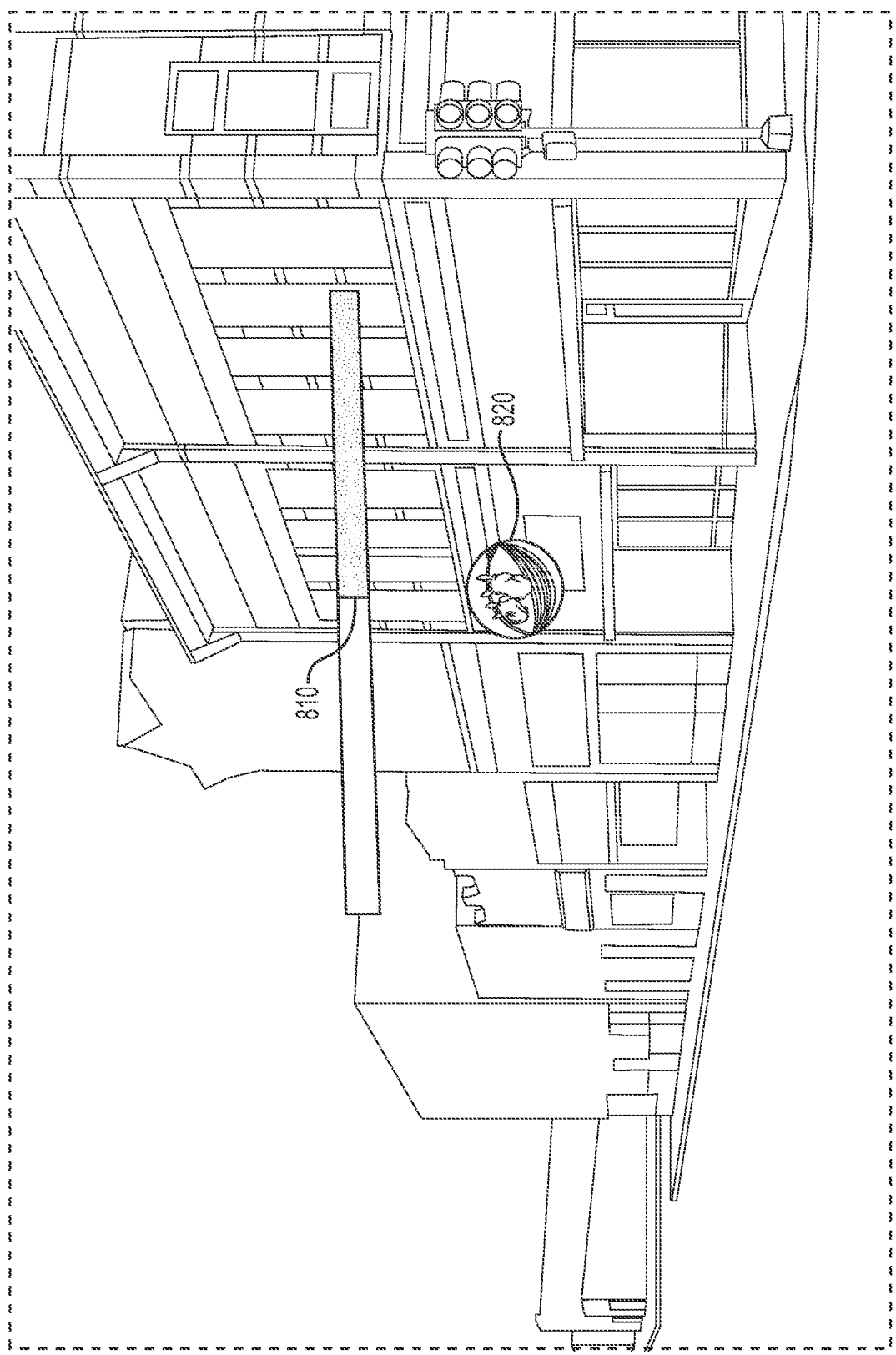
FIG. 8 illustrates an alternative example timeline-scrubber element associated with a video.
Figure 9A:
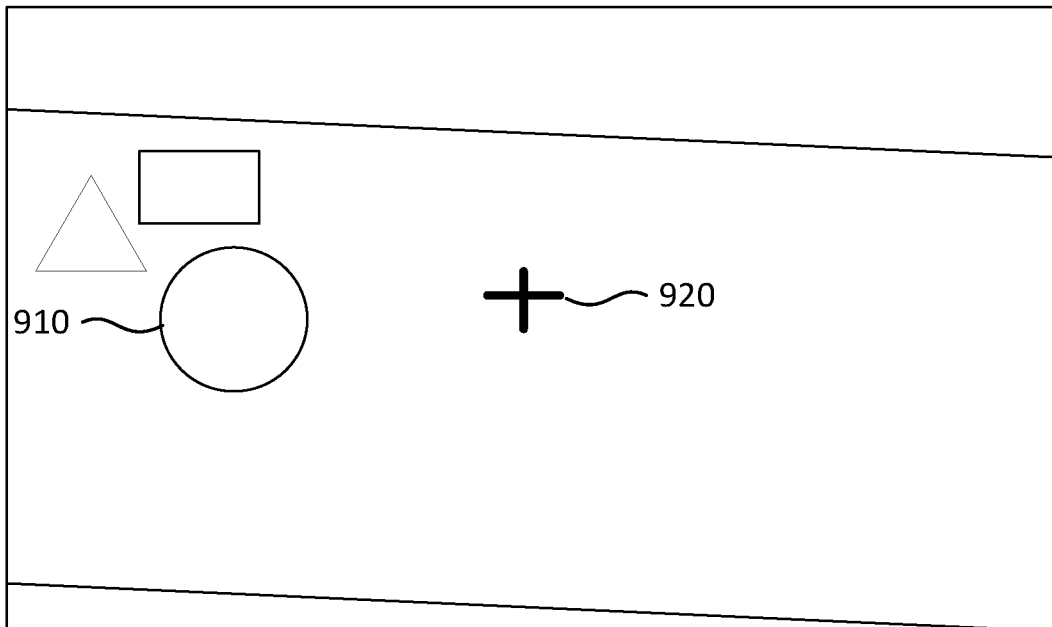
FIGS. 9A-9D illustrate different example reticles that dynamically change based on context.
Figure 9B:
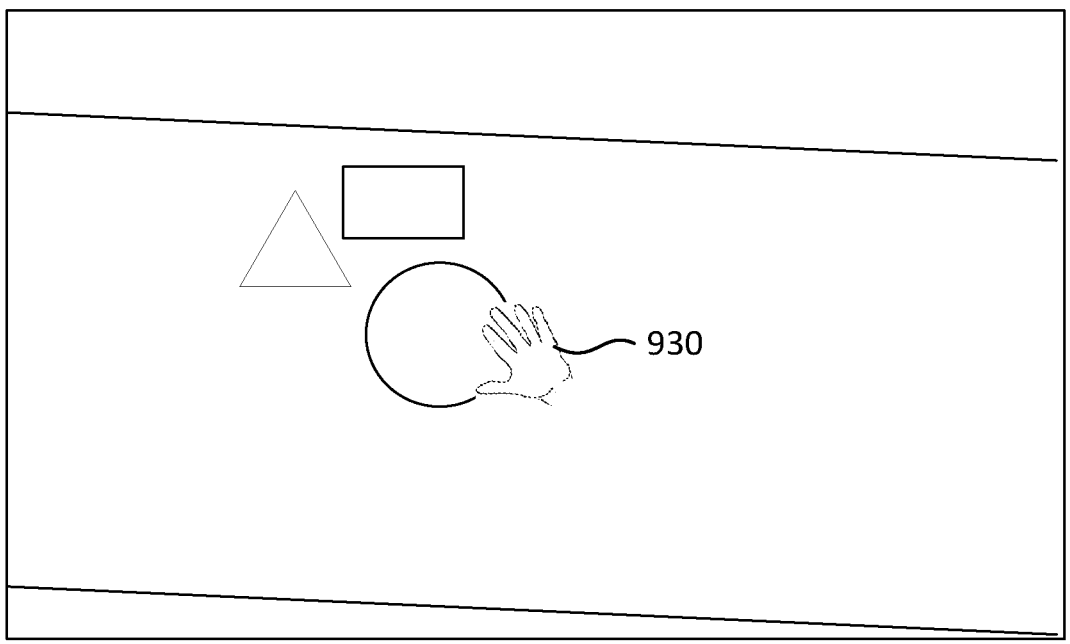
Figure 9C:
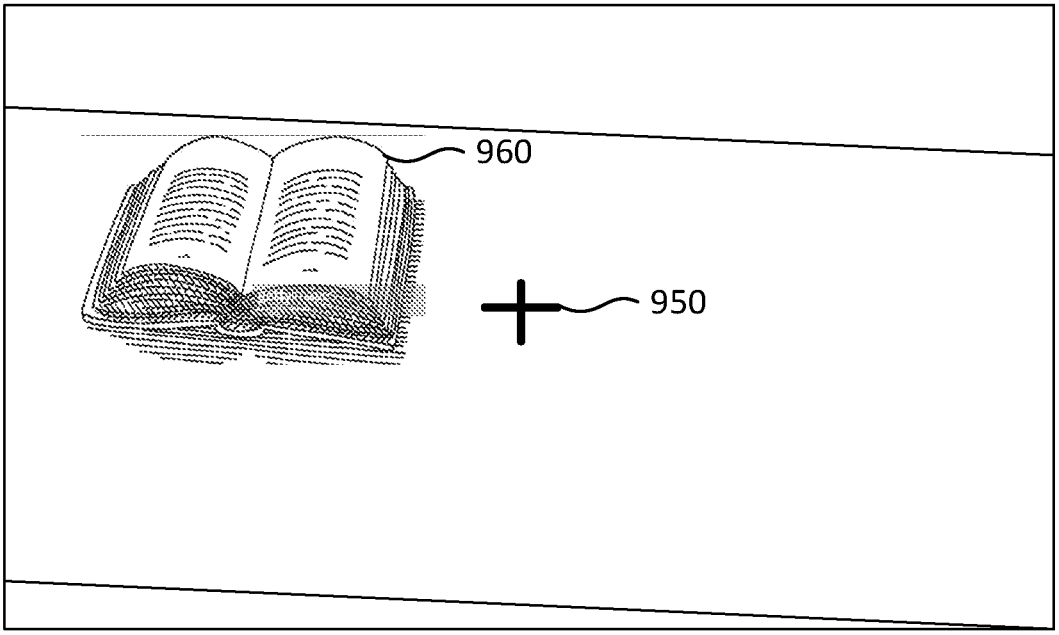
Figure 9D:

FIGS. 7A-7C illustrate an example timeline-scrubber element associated with a video. FIG. 8 illustrates an alternative example timeline-scrubber element associated with a video. In particular embodiments, the user may select one or more videos to view, which may prompt the virtual reality system to display one of the selected videos. In particular embodiments, for a currently displayed video, the user may be presented with a timeline-scrubber element that may be used to navigate through the video, with a timeline corresponding to the timeline of the respective video and a movable scrubber. The user may be able to select the movable scrubber (e.g., using gaze inputs as described herein, "grabbing" and moving the scrubber by appropriately using a controller that corresponds to a rendering of the hand of the user, etc.) and move it to a different location on the timeline, and may thereby move to a different point in time in the video. As an example and not by way of limitation, referencing FIG. 7A, the timeline-scrubber element may include a horizontal timeline 710 representing the timeline of the video and a movable scrubber 720 that is positioned over the current point in time in the video. In this example, the user may select and move the movable scrubber 720 to the left or right to navigate backward or forward, respectively, in the video. FIGS. 7A-7B illustrates the moving of the movable scrubber from its position in FIG. 7A to its position in FIG. 7B. In particular embodiments, the scrubber may include a display of a mini version, or some other representation, of a frame of the video (e.g., a numerical time-point, a spherical representation of the frame). The displayed frame may be the current frame or may change according to the location of the scrubber on the timeline. As an example and not by way of limitation, referencing FIG. 7A, the displayed frame in the movable scrubber 720 may correspond to the frame that exists at or around the time-point where the scrubber is positioned and may update as the scrubber is moved along the timeline. In particular embodiments, the timeline-scrubber element may be presented to the user in response to an appropriate user input. As an example and not by way of limitation, the timeline-scrubber element may be presented to the user in response to the user tapping a touch-sensitive location on a headset device, aiming the focal point at a particular region of the display (e.g., the bottom of the display), performing a particular gesture with a controller, or any other suitable input. In particular embodiments, the timeline-scrubber element may be presented along with one or more other menu-option elements. As an example and not by way of limitation, the user may be presented with a "previous" button (e.g., to revert to a previous visual media item in a sequence), a "next" button (e.g., to proceed to the next visual media item in a sequence), a "forward" button (e.g., to speed up the playback), a "rewind" button (e.g., to slow down the playback), a closed-captioning button, or any other menu-option elements that may be suitable for visual media items. For example, referencing FIG. 7C, the "next" button 730 may appear to the right of the timeline 710. In particular embodiments, these menu-option elements may be activated by a gaze input (e.g., by way of aiming the focal point at the intended menu-option element for a threshold period of time) or any other suitable input (e.g., using the controller system described herein). In particular embodiments, the timeline-scrubber element and the menu-option elements may be presented to the user as part of a single heads-up display. In particular embodiments, the timeline-scrubber element and/or the menu-option elements may appear at a particular region of the display (e.g., at the bottom of the currently displayed region) and may remain fixed in place until the user submits an input or until a period of time lapses without input from the user. FIG. 8 illustrates an alternative rendition of the timeline-scrubber element, in which the movable scrubber 810 does not include a representation of its corresponding frame, the representation being instead displayed in an associated element (e.g., the element 820). Although the disclosure focuses on scrubber elements being used to navigate through videos or slideshows, the disclosure contemplates other uses for the scrubber-element interface. As an example and not by way of limitation, a scrubber element may be used to navigate through a menu of items or navigate through a document. For example, the scrubber element may function like a scroll bar, such that a user may grab the scrubber and move it to proceed in an intended direction.

In particular embodiments, just as in the case with images, videos may be presented as a slide show (i.e., proceeding from one to the next). Furthermore, in particular embodiments, just as in the case with images, the virtual reality system may also display related videos (or other visual media items) that were not explicitly selected by the user. In particular embodiments, the user may be able to proceed to a next or previous video by aiming the focal point at appropriate hit targets (e.g., a "next" or a "previous" button). In particular embodiments, the user may select both images and videos for display and both types of visual media items may be presented to the user one in succession.

In particular embodiments, the content that appears in the feeds, subfeeds, or next in a slide show of visual media items may be based on a conversation analysis performed by the virtual reality system. The conversation analysis may be based on speech recognition of conversations (which may comprise speech between two or more users, or may simply comprise speech by a user with no other user present/listening), text or image (e.g., emoji) analysis of conversations (e.g., if users are communication in text or images), video analysis (e.g., analyzing communications in sign language and/or body language), etc. The conversation analysis may determine particular topics. As an example and not by way of limitation, the conversation analysis may determine a particular topic when one or more keywords associated with the particular topic are detected. In particular embodiments, the virtual reality system may promote for presentation in a feed, subfeed, or slide show one or more visual media content items that are associated with these determined particular topics (e.g., related photos, videos, posts, ads, etc.). As an example and not by way of limitation, a first user and a second user may have started discussing the results of a recent election debate while viewing a cat video. In this example, the virtual reality system may detect the topic "Election Debate" and may promote videos associated with that topic (e.g., because the users may have changed conversations and as a result their interest in content may have changed). The presentation may be private to the user or may be presented to a group of users in a shared virtual space (e.g., to the subset of users who are engaged in a conversation within a virtual room, to users who have meet the user's and the content's privacy settings for sharing, users who fulfill both criteria, etc.). Similarly, in particular embodiments, the determination of the particular topics may be performed on an individual basis or may be performed for the group of users in the shared virtual space. In particular embodiments, the determination of the particular topics may be based on a current context as described herein, including information related to the user (e.g., social graph information from the social graph 200) for whom the particular topics are being determined. In particular embodiments, the virtual reality system may use one or more suitable machine learning algorithms to optimize its conversation analysis functionality over time. In particular embodiments, a machine learning algorithm may be based on or may be focused on data specifically acquired from user interactions in virtual reality. In particular embodiments, a machine learning algorithm may be based on data acquired from the social-networking system 160 (e.g., conversations on the online social network, topics on the online social network, trending topics on the online social network, etc.). In particular embodiments, users may leverage this functionality as a search tool. As an example and not by way of limitation, the user may be able to identify cat videos by speaking words associated with the topic "Cat" (e.g., "cat," "meow").

In particular embodiments, a transition effect may be employed when transitioning from one virtual space to another. In particular embodiments, when transitioning from one content item (which may be rendered as an entire virtual space or as part of a virtual space) to another, the virtual reality system may employ a transition effect. As an example and not by way of limitation, the virtual reality system may employ a transition effect when transitioning from one photo, video, or any other media item, to another photo, video, or any other media item. Significant user testing has revealed that many users find it jarring to cut or switch immediately from one content item to another, such that it may negatively affect user experience generally. Sometimes, it even led to feelings of motion sickness, nausea, or unease (e.g., because of a cognitive disconnect resulting from the sudden change in visual input accompanied by a lack of corresponding movement). By employing a transition effect, the virtual reality system may mitigate some of these negative effects. Any suitable transition effect may be employed. As an example and not by way of limitation, the virtual reality system may employ a "telescoping" or a "camera-shutter" effect, in which a current view of a first content item is contracted toward a central point (e.g., with the surrounding area fading to black) to be replaced with a view of a second content item that expands outward from the central point. As other examples and not by way of limitation, a fade effect, a dissolve effect, a wipe effect, etc., may be employed. In particular embodiments, the user may be able to specify a particular transition effect or customize a transition effect and when they are to be employed (e.g., a certain transition effect when transitioning among photos, a certain transition effect when transitioning between a photo and a video), so that the virtual reality system may use the selected or customized transition effect according to the user's specifications.

Although this disclosure focuses on interacting with particular types of content in a virtual space, it contemplates interacting with any suitable types of content in a virtual space. As an example and not by way of limitation, the user may be able to use gaze inputs to navigate menus of content generally (e.g., a newsfeed interface of an online social network, web pages) in a manner similar to that described with respect to menus of image and/or video content. As another example and not by way of limitation, the user may be able to navigate through pages of a book. As another example and not by way of limitation, the user may be able to navigate through a map. As another example and not by way of limitation, the user may be able to navigate through a virtual world (e.g., in a game).

In particular embodiments, the virtual reality system may include reticles of different types that may be generated and overlaid on the user's field of view. In particular embodiments, the different types may have different functions that may have different effects in the virtual space (e.g., on virtual objects) in association with a gaze input. This may allow the user to submit the same types of gaze input to interact with the virtual spaces in different ways, with the effect of the interaction depending at least in part on the type of the current reticle. As an example and not by way of limitation, the user may aim a grab-type reticle at a hit target associated with a virtual object for a threshold period of time, upon which the virtual object may be grabbed or picked up (e.g., the virtual object may appear to be secured to a location associated with the reticle such that it may follow the path of the reticle). As another example and not by way of limitation, the user may aim a next-page-type reticle (or previous-page-type reticle) at a hit target near the right edge (or left edge) of a page (e.g., the edge of a page of a virtual book), upon which the current page may switch to the next page (or previous page). As another example and not by way of limitation, the user may aim a highlighter-type reticle at text on a page, upon which the appropriate text may be highlighted. As an example and not by way of limitation, the user may aim a selection-type reticle at text or a virtual object, upon which the text or virtual object may be selected (e.g., for further input). As another example and not by way of limitation, the user may aim a paintbrush-type reticle (or pen-type reticle) at a region of the virtual space or at a region or hit target associated a virtual object, upon which the appropriate area may be painted (or drawn/written upon as appropriate). As another example and not by way of limitation, the user may aim a push-type reticle (or pull-type reticle) at a hit target associated with a virtual object, upon which the virtual object may be pushed (or pulled). As another example and not by way of limitation, the user may aim a fire-type reticle, a laser-type or slingshot-type reticle, or another suitable gamified reticle at a region in the virtual space or at a hit target associated with a virtual object, upon which a gamified function may occur (e.g., burning a region of the virtual space or a virtual object, shooting at it with a laser, launching an object, etc.).

In particular embodiments, the different types of reticles may appear visually different (e.g., in shape, color, size, etc.) to the user. This may help the user distinguish among the reticles and determine the effect a gaze input with the reticle would have in the virtual space. As an example and not by way of limitation, a grab reticle may be in the shape of a hand. As another example and not by way of limitation, a next-page-type reticle may be in the shape of an arrow. As another example and not by way of limitation, a laser-type reticle may be in the shape of a crosshair.

In particular embodiments, the user may be able to select a reticle type based on a suitable input. As an example and not by way of limitation, the user may select a desired reticle from a menu of reticles.

FIGS. 9A-9D illustrate different example reticles that dynamically change based on context. In particular embodiments, a reticle type of a reticle displayed on the user's field of view may be dynamically determined by the virtual reality system. In particular embodiments, in determining a reticle type, the virtual reality system may effectively be attempting to predict the user's intended type of interaction based on contextual information. In particular embodiments, the reticle may automatically change as appropriate based on a determined current context, which may be based on any combination of several different factors described herein (or any other suitable factors). As an example and not by way of limitation, referencing FIGS. 9A-9B, the neutral reticle 920 in FIG. 9A may change into the grab-type reticle 930 in FIG. 9B as the neutral reticle 920, in response to a user input, approaches or reaches the virtual object 910 (or in response to the neutral reticle hovering near or over the virtual object 910 for a threshold period of time). As another example and not by way of limitation, referencing FIGS. 9C-9D, the neutral reticle 950 may change into the pen- or highlighter-type reticle 970 in response to a user input selecting the virtual object 960 (e.g., a representation of a book), which summons a view of text content associated with the virtual object 960 (e.g., a page of a book associated with the virtual object 960). In particular embodiments, in determining the reticle type that is appropriate for a current context, the virtual reality system may calculate a score for the different reticle types based on one or more of the different described factors (or any other suitable factors). In these embodiments, the virtual reality system may determine a subset of the reticle types that are appropriate based on the respective scores of the reticle types. As an example and not by way of limitation, the virtual reality system may determine that only reticle types with a score above a threshold score are appropriate. In particular embodiments, the virtual reality system may rank the different reticle types based on their score, and may determine that only reticle types with a rank above a threshold rank are appropriate. As an example and not by way of limitation, the virtual reality system may determine that only the top-ranked reticle type is appropriate.

In particular embodiments, the reticle type may be based on a determined context based on the location and/or trajectory of the reticle with respect to one or more virtual objects. As an example and not by way of limitation, the reticle may change as it approaches a particular virtual object (e.g., as determined by the location and/or trajectory of the reticle), or when it is within a threshold distance of the boundary of a hit target associated with the particular virtual object. In particular embodiments, each virtual object may have a particular object type, such that a reticle approaching different virtual objects of different object types in the same manner may cause the virtual reality system to determine reticles of different types based on the respective object type. As an example and not by way of limitation, a reticle that approaches a hit target associated with a virtual object that may be grabbed, the reticle may become a grab-type reticle. As another example and not by way of limitation, a reticle that approaches a hit target associated with an edge of a page may become a next-page-type or previous-page-type reticle. As another example and not by way of limitation, a reticle that approaches a play or pause button (e.g., within a video-viewing environment), or any other suitable interactive element, may change to a selection-type reticle.

In particular embodiments, the reticle type may be based on a determined context based on information associated with the current virtual space. Such information may include a virtual-space type of the current virtual space (e.g., whether it is a space associated with a game, a space associated with visual media items, a space associated with an online social network, etc.). As an example and not by way of limitation, a laser-type reticle may appear within a particular game-type virtual space when the reticle approaches a hit target associated with an enemy unit. As another example and not by way of limitation, a highlight-type reticle may appear within a book-browsing virtual space when the reticle in within a threshold distance of text.

In particular embodiments, the reticle type may be based on a determined context based on information associated with the user (e.g., social-graph information from the social graph 200). In particular embodiments, this information may include demographic information. As an example and not by way of limitation, users of a particular age group may be more likely to use a laser-type reticle than users of a different age group. In particular embodiments, this information may be based on previous interactions of the user. As an example and not by way of limitation, a user who frequently highlights and/or reads books in the virtual space may be more likely to intend a highlighter-type reticle, in which case the virtual reality system may be more likely to determine such a reticle for this user. In particular embodiments, the determined context may be based on information associated with social connections of the user (e.g., as determined based on the social graph 200). As an example and not by way of limitation, if a particular reticle type is used frequently among the user's first-degree connections generally, or among a subset of the user's first-degree connections (e.g., first-degree connections for whom the user has at least a threshold affinity level, first-degree connections who are family members), the user may be more likely to favor that particular reticle type (and the virtual reality system may therefore be more likely to determine that particular reticle type than otherwise). In particular embodiments, the determined context may be based on information associated with users generally. As an example and not by way of limitation, the virtual reality system may be more likely to determine a reticle type that is currently popular among users (e.g., one that is frequently being used) that a reticle type that is less popular. In particular embodiments, this information may include account information of the user that determines whether the user has access to particular reticles. As an example and not by way of limitation, some reticle types may be premium content, and the user may be required to pay for access to these reticles. As another example and not by way of limitation, some reticle types may be restricted for users who are members of a particular group (e.g., a particular age group).

In particular embodiments, the reticle type may be based on a determined context based on the environment external to the virtual space. As an example and not by way of limitation, the reticle type may be based on a current time of day or a current date. For example, a laser-type reticle may appear more frequently at a time and date associated with leisure time (e.g., in the evening, during the weekend). As another example and not by way of limitation, the reticle type may be based on a current or future event (e.g., as determined based on the user's calendar, based on trending news or topics, etc.). For example, a highlighter-type reticle may be more likely to appear if the virtual reality system determines based on the user's calendar that the user is about to have final exams in school.

In particular embodiments, the reticle type may be based on a determined context based on one or more suitable inputs from the user. As an example and not by way of limitation, the user may perform a particular gesture with a controller (e.g., a controller positioned on a hand) while approaching a virtual object, and the reticle type that is determined may be based in part on this particular gesture. As another example and not by way of limitation, the user may perform a gesture that may be a pattern or other gesture traced by the reticle by a series of gaze inputs by the user. As another example and not by way of limitation, the user may speak a voice command that causes the reticle type to be changed accordingly. For example, the user may say the word "laser," which may change the reticle to a laser-type reticle.

Figure 10:
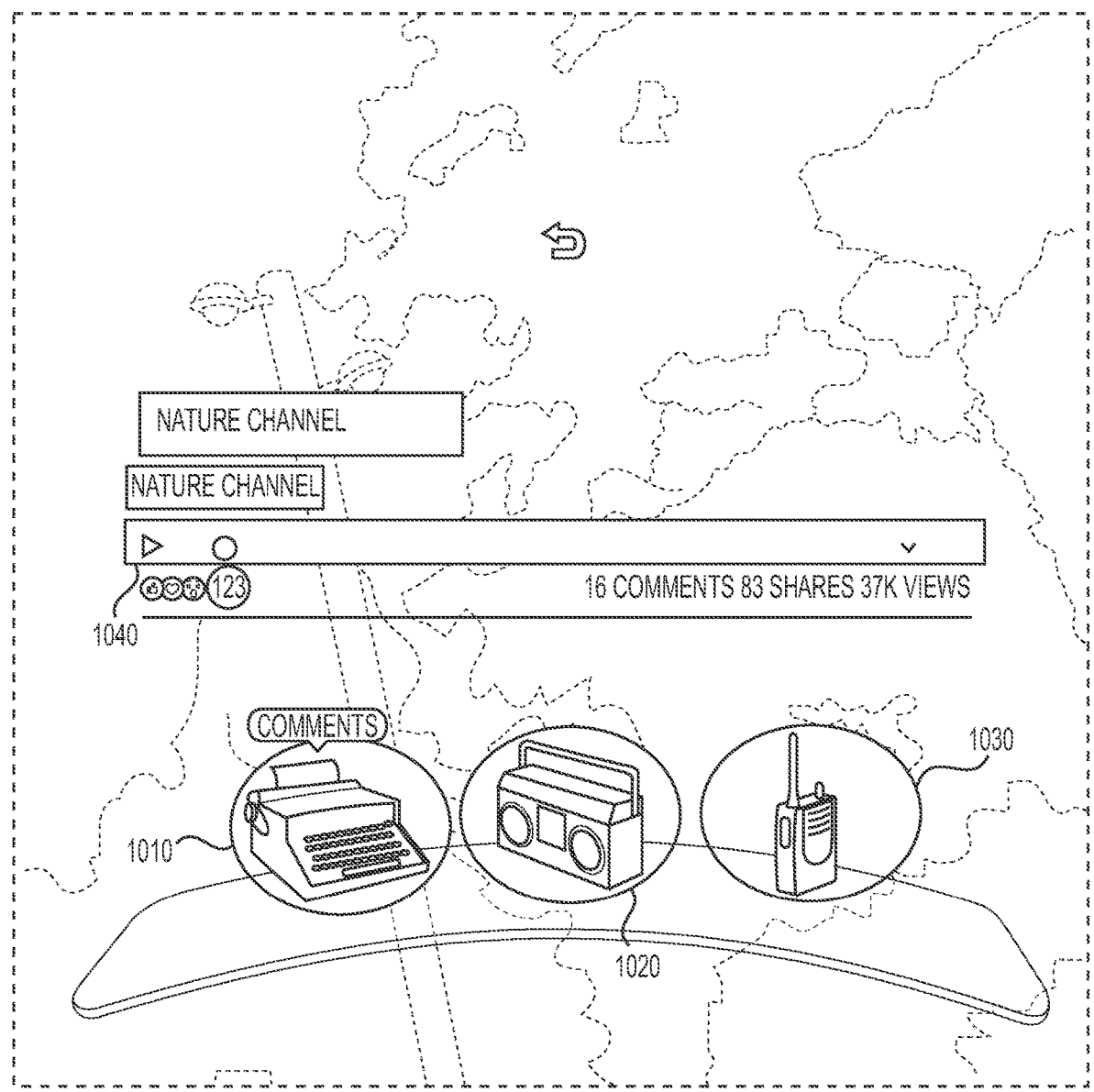
FIG. 10 and FIGS. 11A-11D illustrate example interfaces for selecting one or more virtual tools.
Figure 11A:
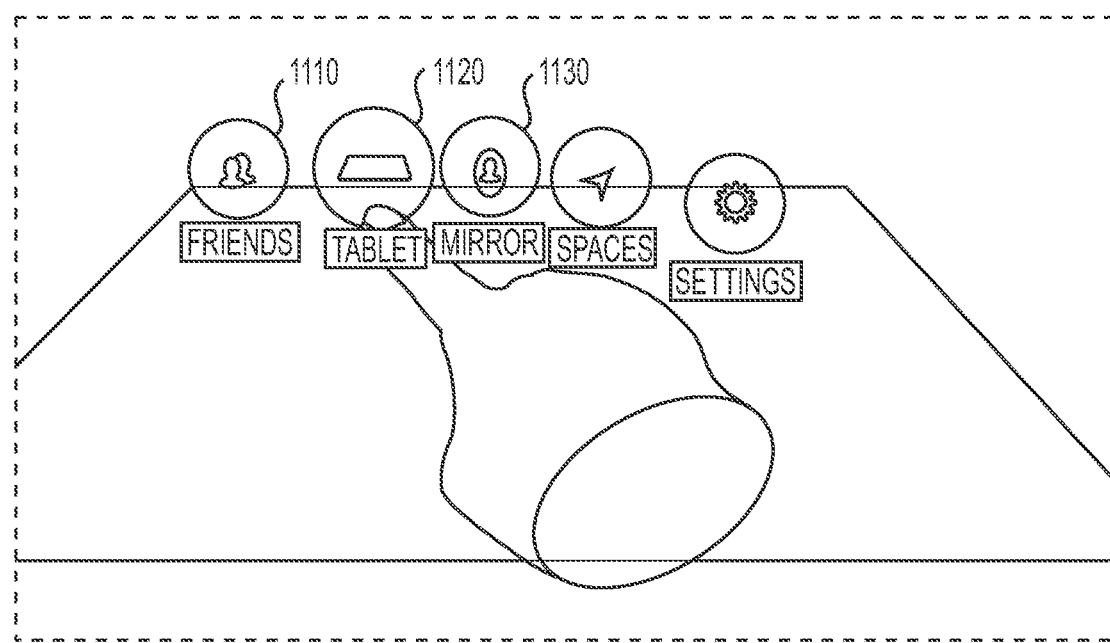
Figure 11B:
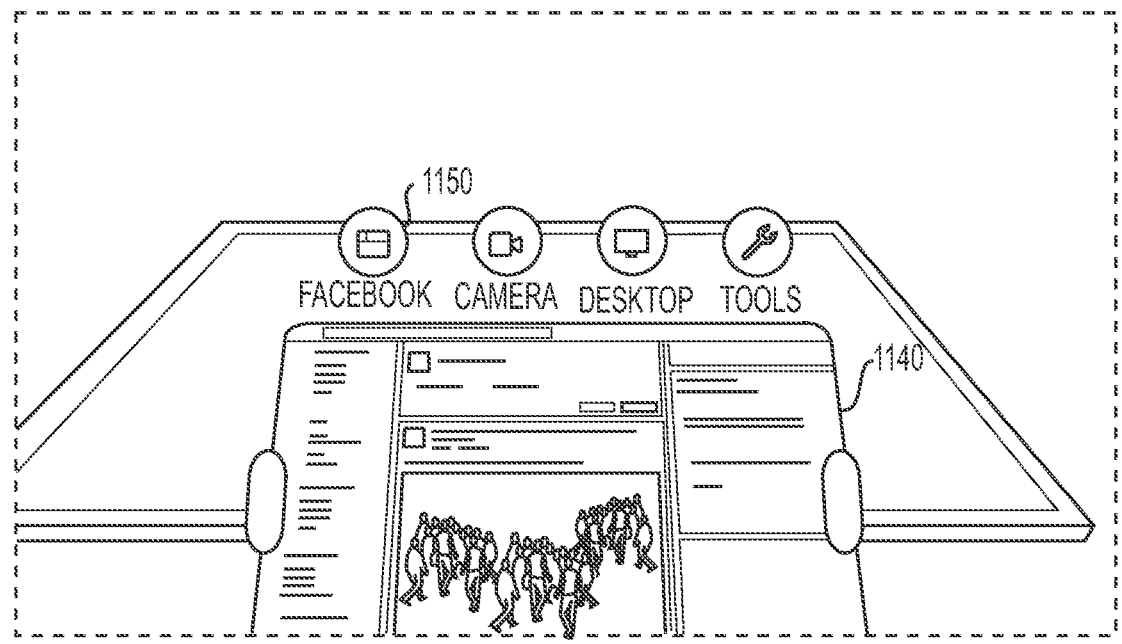
Figure 11C:
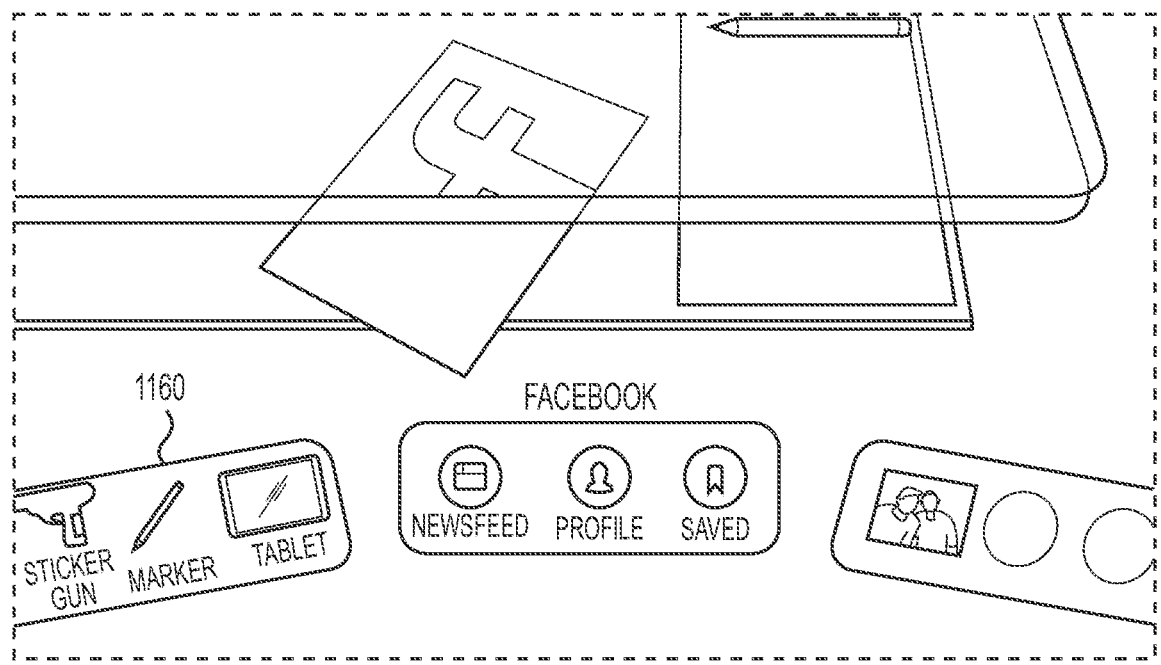
Figure 11D:
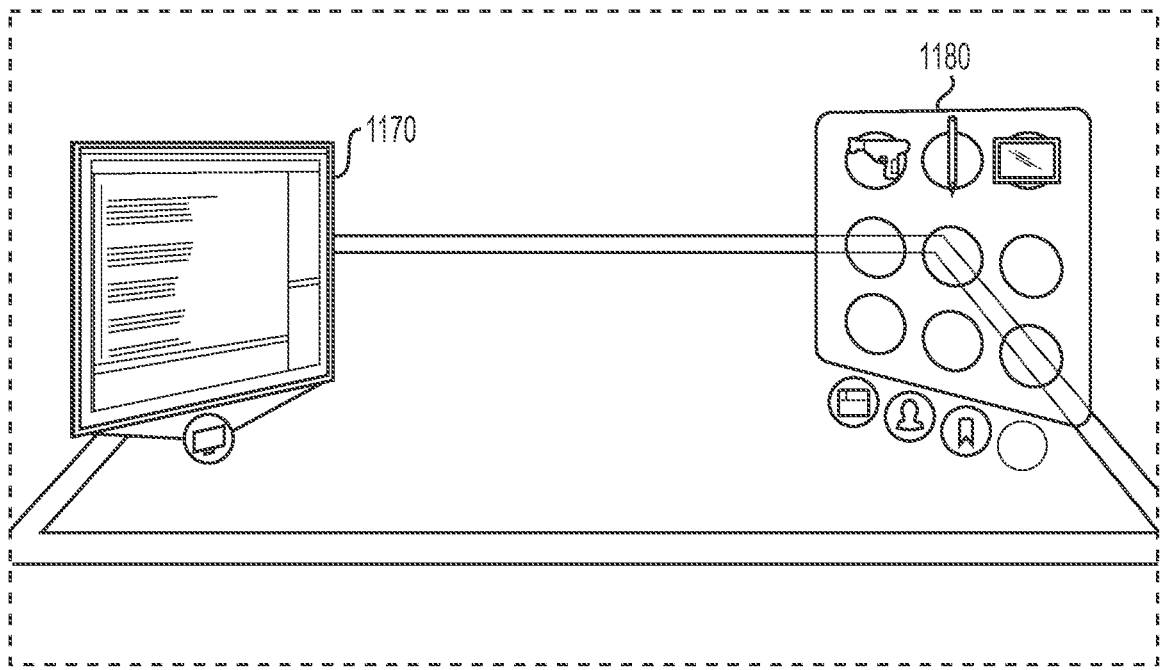

FIG. 10 and FIGS. 11A-11D illustrate example interfaces for selecting one or more virtual tools. In particular embodiments, the virtual reality system may render, in a virtual space, one or more virtual tools, which are items that may be virtually picked up by a user to interact with the virtual space in specific ways. Each tool may have a specific function within the virtual environment. In particular embodiments, a set of tools may be displayed to the user in a suitable location. As an example and not by way of limitation, the tools may appear toward the bottom of the virtual space and the user may be able to view them by adjusting the field of view downward with respect to the virtual space. In particular embodiments, the tools may not always be visible, but may be triggered by a particular input of the user. As an example and not by way of limitation, a particular gaze input (e.g., a gesture traced by the reticle, a gaze downward) or another suitable input (e.g., a tap on a touch-sensitive location on a headset device, a gesture made with a hand) may cause the tools to appear. In particular embodiments, the tools may be rendered to appear in the virtual space as though they were on one or more virtual trays of any suitable form, on a tool belt, in a tool bag, in a drawer, etc. FIG. 10 illustrates an example interface where a set of tools 1010, 1020, and 1030 appear on a virtual tray. The set of tools may be relevant to the current virtual space illustrated in FIG. 10, which may include a rendering of a video. In this example, the user may select the commenting tool 1010 and leave a comment at any time-point in the video, the time-point being specified by the timeline-scrubber element 1040. Similarly, FIG. 11C illustrates an interface where sets of tools appear on different trays (e.g., the tray 1160). In particular embodiments, the tools may simply be displayed as elements floating on the current view. FIG. 11A illustrates a set of virtual tools—e.g., the friend-finder tool 1110, the tablet tool 1120, the virtual mirror tool 1130—that float on the current view. As illustrated in FIG. 11A, the user may be able to select any of the virtual tools (e.g., the tablet tool 1120). FIG. 11B illustrates the result of selecting the social-network tool 1150, which may cause the display of an interface 1140 of an online social network (e.g., Facebook). Similarly, FIG. 11D illustrates an interface where a set of tools appears in the floating menu 1180. FIG. 11D also illustrates a desktop or tablet tool that the user may currently be using to view content, which may be edited using one of the tools in the floating menu 1180.

Figure 12A:
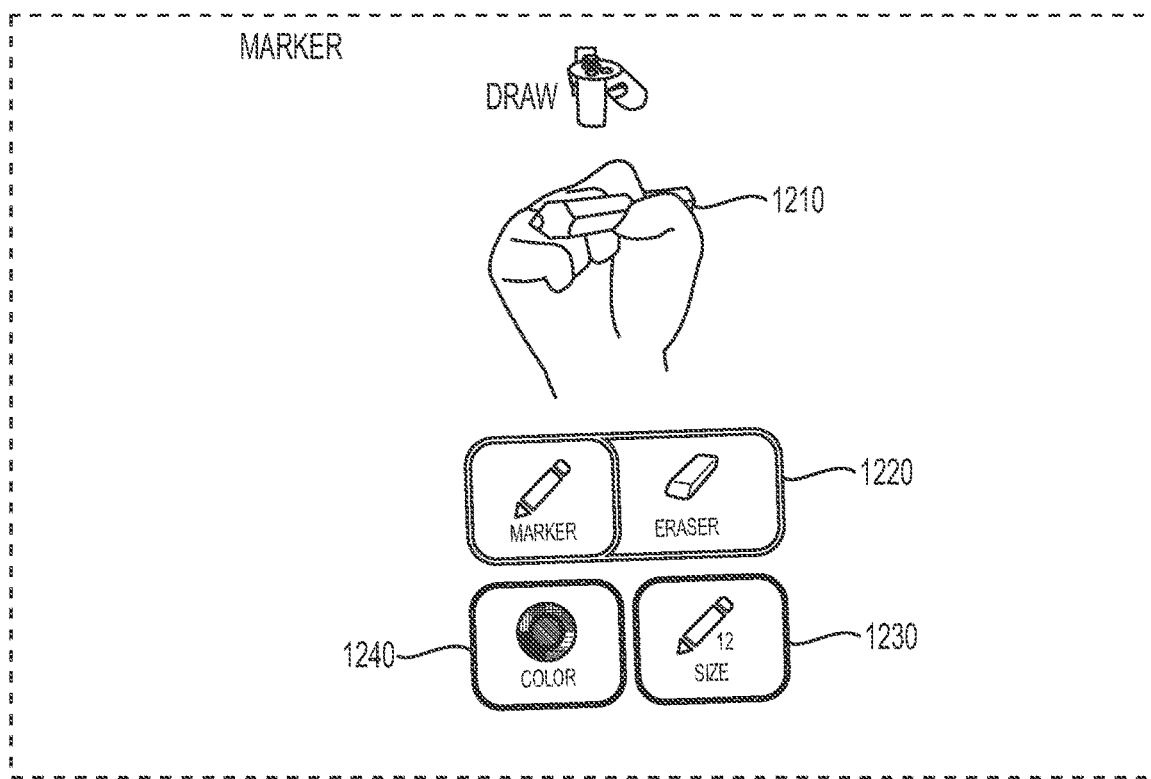
FIGS. 12A-12E illustrate examples of interfaces of handling different virtual tools with different functionalities.
Figure 12B:
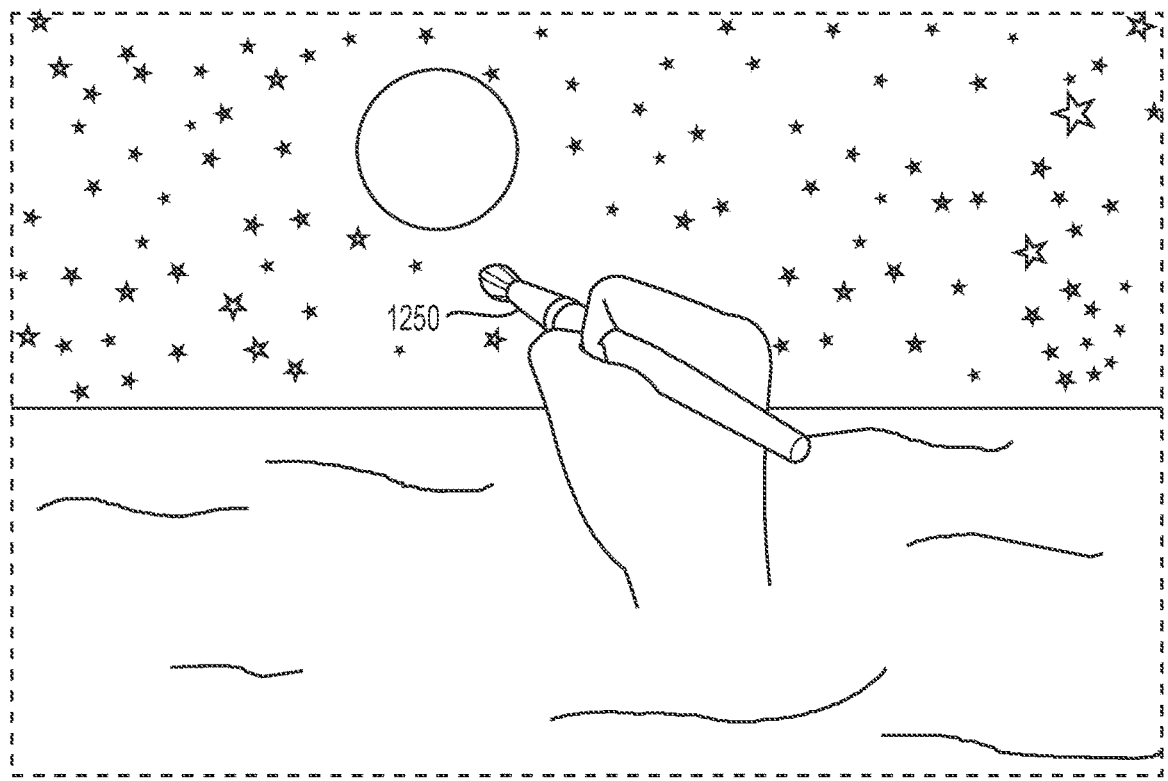
Figure 12C:
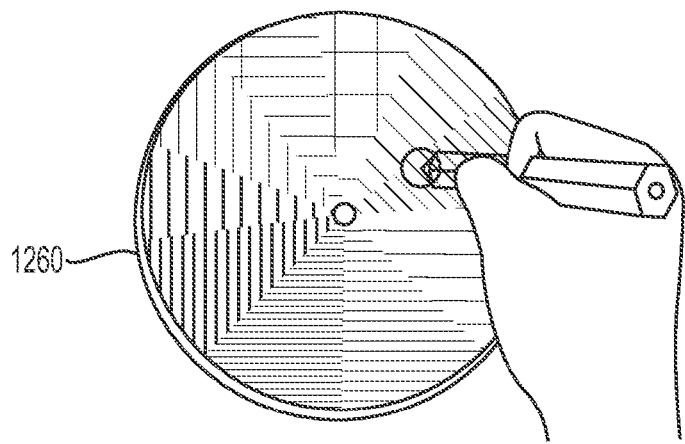
Figure 12D:
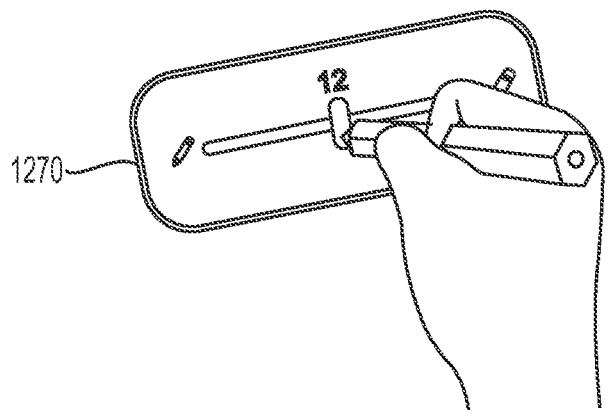
Figure 12E:
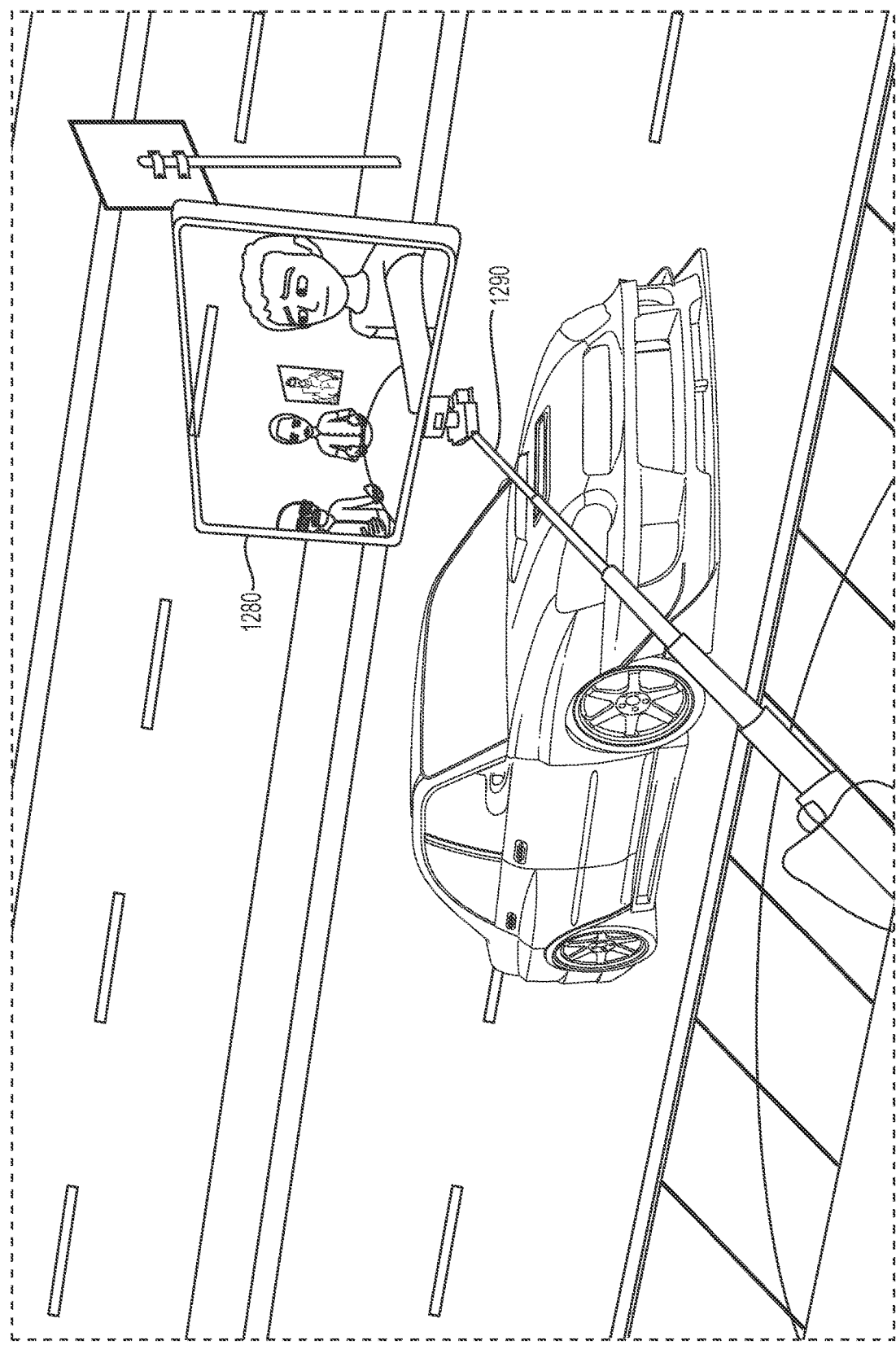

FIGS. 12A-12E illustrate examples of interfaces of handling different virtual tools with different functionalities. In particular embodiments, there may be different tools that perform some of same or similar functions as the different reticle types described herein. As an example and not by way of limitation, the set of tools may include a laser tool or a slingshot tool, a paintbrush tool, a highlighter tool, a camera tool, a marker tool, a sticker tool, a comment tool, a remote-control tool (e.g., which may be used to change currently displayed content), a laser-pointer tool (e.g., which may be used as a presentation aid for presenting a slide deck to other users in a virtual space), or any other suitable tool. The tools may create a more tangible and defined sense of control for the user, with the user able to virtually pick up and "hold" particular tools with particular functions. FIG. 12A illustrates an example of a marker tool 1210 being held by the user. As an example and not by way of limitation, the marker tool 1210 may be used to write or draw in the virtual space (e.g., on content items, on virtual objects, in three dimensions in the virtual space). In particular embodiments, when a particular tool is held, as described further herein, additional relevant options may be presented to the user. As an example and not by way of limitation, referencing FIG. 12A, the interactive element 1220 corresponding to an eraser may be presented to the user (e.g., at a location corresponding to the wrist of the user's hand that is virtually holding the marker tool 1210). As another example and not by way of limitation, elements that may customize features of the tool being held may be provided, such as the color-adjustor element 1230 (e.g., which may be used to adjust the color of the marker tool 1210) or the size-adjustor element 1230 (e.g., which may be used to adjust the size of the tip of the marker tool 1210). FIG. 12C illustrates an example color-adjustment interface that includes the color wheel 1260 for adjusting the color of the marker tool 1210. FIG. 12D illustrates an example size-adjustment interface that includes the size-adjuster 1270 for adjusting the size of the tip of the marker tool 1210. FIG. 12B illustrates an example of a paintbrush tool 1250 being held by the user. As an example and not by way of limitation, the paintbrush tool 1250 may be used to paint or draw in the virtual space (e.g., on content items, on virtual objects, in three dimensions in the virtual space). FIG. 12E illustrates an example of a camera tool 1280 attached to a stick or extension tool 1290 that is being held by a user for taking a selfie image (e.g., of the user's avatar as it appears in the current virtual space).

In particular embodiments, the tools may be selected and virtually held by the user based on one or more inputs submitted to the virtual reality system. As an example and not by way of limitation, the user may aim a reticle (e.g., one that may automatically have become a grab-type reticle) at a particular tool, which may cause the tool to be "picked up" and held by the reticle such that the particular tool may appear to be secured to a location associated with the reticle (such that it may follow the path of the reticle as the user shifts the focal point). In particular embodiments, while the tool remains held by the user, further user inputs (e.g., gaze inputs, hand-gesture inputs) may have effects in the virtual space based on the nature of the tool being held. As an example and not by way of limitation, when the user holds a camera tool, a gaze input at a particular region of the virtual space for a threshold period of time or a tap input on a headset device may cause a picture to be taken of the particular region or a subregion of the particular region (e.g., which may have been displayed in a viewfinder of the camera tool). As another example and not by way of limitation, the user may select a particular sticker (e.g., a GIF, a mini image, an emoji, or any other suitable sticker) from a menu associated with a sticker tool, and when the user holds the sticker tool with this particular sticker selected, the user may be able to gaze for a threshold period at a subregion of currently displayed content in the virtual space (e.g., a visual media item, a newsfeed of an online social network, a document) and thereby cause the sticker to be overlaid on the subregion. As another example and not by way of limitation, the user may select a pen/marker tool and draw on a region of the virtual space by moving the reticle in intended trajectories (with the pen/marker tool following the reticle and tracing a drawing in its wake).

In particular embodiments, the set of tools may include a build tool such as a space-marker tool or something similar (e.g., a sculpting tool) that allows users to quickly create virtual objects in three dimensions. These objects, once created, may behave like other objects in virtual reality, and may have properties (e.g., weight, color, texture, stiffness, tensile strength, malleability) that may be assigned by default and/or may be specified/altered by users (e.g., the creator). As an example and not by way of limitation, a user may be able to draw a sword using a space-marker tool, causing the sword to be created as an object in the virtual space. The user may then be able to interact with the sword just as though it were any other virtual tool (e.g., picking it up, swinging it, hitting other objects with it, etc.). As another example and not by way of limitation, a user may be able to draw a game board with board game pieces. In this example, the user may be able to then play a board game with the board and the pieces later with the user's friends. As another example and not by way of limitation, the user may be able to make furniture or other items that may be placed in the virtual space. As another example and not by way of limitation, the user may be able to create nametags for people in a room by drawing it in the air, or may simply draw words (e.g., their names) in the air for fun. As another example and not by way of limitation, a user may be able to draw a speech bubble, then add text, images, etc., to the speech bubble, and put it over the head of the user's avatar (or another user's avatar, or any other suitable position in the virtual room). As another example and not by way of limitation, the user may be able to create balloons or cakes for a birthday party to be held in a virtual room. In particular embodiments, objects that are created may be saved and kept indefinitely in storage (e.g., associated with the account of the user who created or currently possesses it). In particular embodiments, objects can be cloned. In particular embodiments, objects can be distributed to other users. In particular embodiments, the build tool may be used to modify games as users see fit. As an example and not by way of limitation, the user may be playing an arcade-style game and may choose to create objects that can be used in the game. In particular embodiments, the games may be created on the fly with other users. As an example and not by way of limitation, two users in a virtual room may play a game of three-dimensional tic-tac-toe on a table or in the air. In particular embodiments, the build tool functionality can be integrated with the real world. As an example and not by way of limitation, users (in the same location in real life or in different locations in real life) may play a game similar to "Pictionary," where a user pulls a physical card in real life that includes a word or concept and then draws it in the virtual world to let other users guess what the word or concept was. In this example, the virtual reality system may be presenting an augmented reality to the users, so that they are able to see the cards (or a rendering of the cards) that they are pulling in real life. As another example, and not by way of limitation, a virtual object may be printed out into the real world using a 3D printer, or otherwise manufactured in the real world.

In particular embodiments, the set of tools may include an audio-commenting tool. The audio-commenting tool, when selected and held, may function like a recording device that records the users voice and creates an audio-comment file that may be associated with the virtual space or content in the virtual space. The user (or other users with permission) may later access and play back the audio-comment file. As an example and not by way of limitation, the user may record audio commentary for a set of photos in a slide show that may for example, describe each photo. In this example, another user who accesses the set of photos may be able to listen to the audio commentary as the user views the individual photos in the set of photos. In particular embodiments, the virtual reality system may allow for the same type of functionality with image-comment files (e.g., captured and/or posted by an image-commenting tool), video-comment files (e.g., captured and/or posted by a video-commenting tool), text-comment files (e.g., captured and/or posted by an text-commenting tool), or reaction-comment files (e.g., likes, wows, etc., captured and/or posted by an reaction-commenting tool). In particular embodiments, a visual representation of a comment file (e.g., a suitable icon) may be placed somewhere in the virtual space, such that a user who views the same region of the virtual space may be able to see the virtual representation of the comment file. These comment files may remain at the locations where they are placed and may thereby be used to communicate information about the content with which they are associated. As an example and not by way of limitation, within a photo, a user may record audio comments describing different objects depicted in the photo and place them near the object they describe. In particular embodiments, the virtual reality system may allow the user to use a slingshot tool, a gun tool (e.g., a sticker gun tool), or another suitable tool to launch a comment file (or reactions, stickers, etc.) in the virtual space and thereby place it in a desired location on a region of some displayed content or elsewhere within the virtual space. In particular embodiments, a user may select the comment file (e.g., with a gaze input aimed at an associated icon) and view and/or listen to the commentary. In particular embodiments, the comment files may be overlaid on any suitable content such as images, documents, webpages, and interfaces of an online social network. In particular embodiments, the comment files may be overlaid directly over a region of the virtual space (e.g., a virtual desktop of the user). In particular embodiments, the comment files may be overlaid on video content. In these embodiments, the comments may have a time element (i.e., they may have a temporal component), such that they may only appear or may only be accessible during a specific time period. As an example and not by way of limitation, reaction comments (e.g., a laughing face representing a laughing reaction) may appear when a comedian in a stand-up comedy video delivers a punchline. As another example and not by way of limitation, text comments (or icons corresponding to the comments, the contents of which may be displayed following a gaze input) may appear within a video documentary as the text comments become relevant with respect to the content that is being shown. As another example and not by way of limitation, audio comments may play (or icons for the audio comments may appear) within a video or interactive content showing a walkthrough of a historical site at relevant times. In particular embodiments, some reactions or comments may not have a spatial element but may have a temporal element, in which case, these reactions or comments may appear in some suitable location as their respective times occur. As an example and not by way of limitation, reactions corresponding to different time points may scroll across the bottom, top, center, etc., of a video as a stream of reactions or comments as their respective times occur. In the case of a live video, this may be a live stream of reactions or comments. Although the disclosure focuses on placing reactions or comments in content items (or anywhere in the virtual space, e.g., in a virtual room) using a tool, it contemplates placing reactions or comments in any suitable manner (e.g., using an option of a dock element, using a voice command, etc.).

Figure 13C:
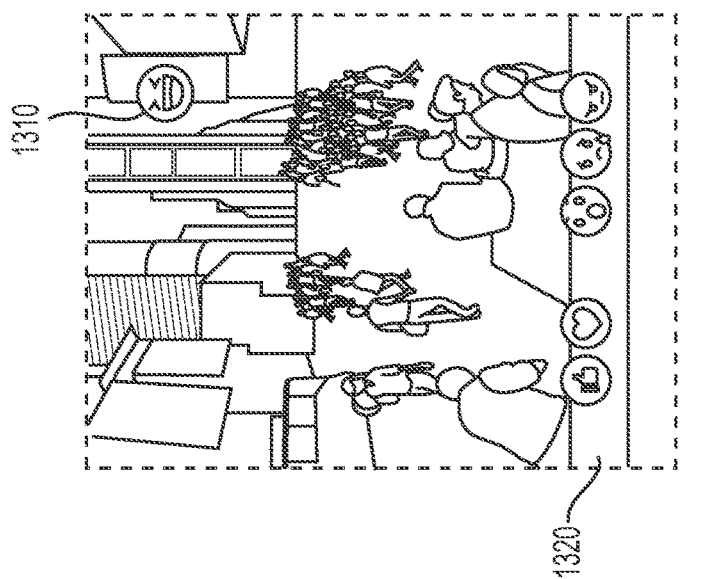
FIGS. 13A-13C illustrate an example of placing a user reaction at a location of a visual media item.
Figure 13B:
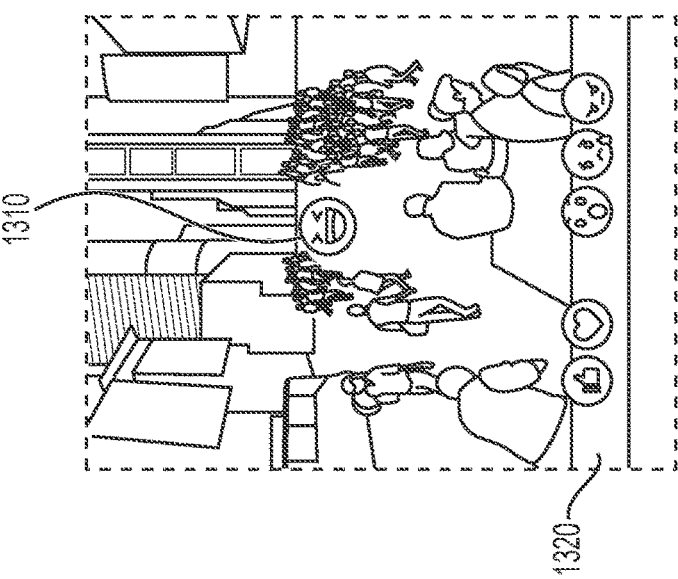
Figure 13A:
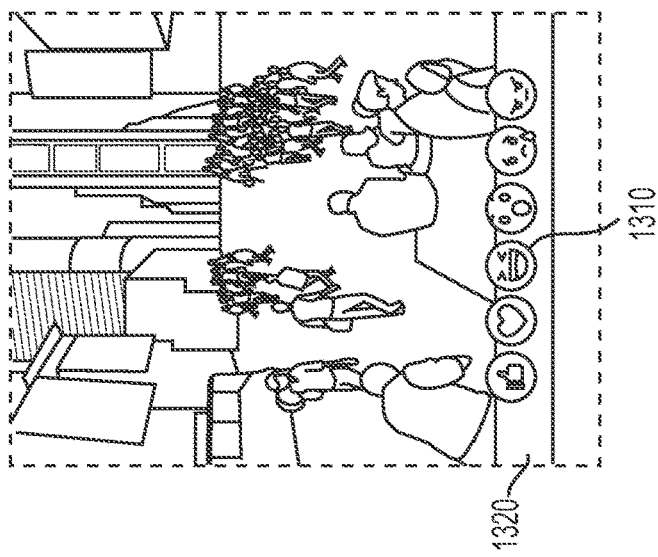
Figure 14B:
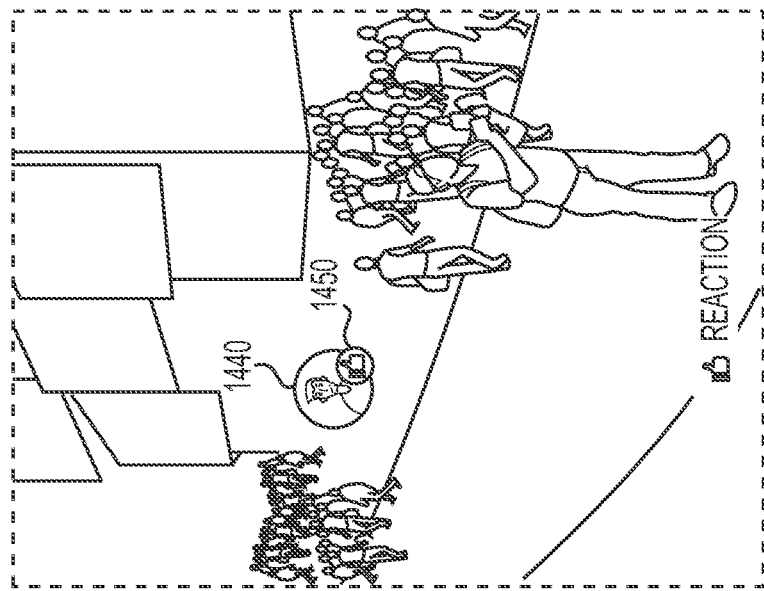
FIGS. 14A-14B illustrate an example of a visual media item with reactions placed in different locations.
Figure 14A:
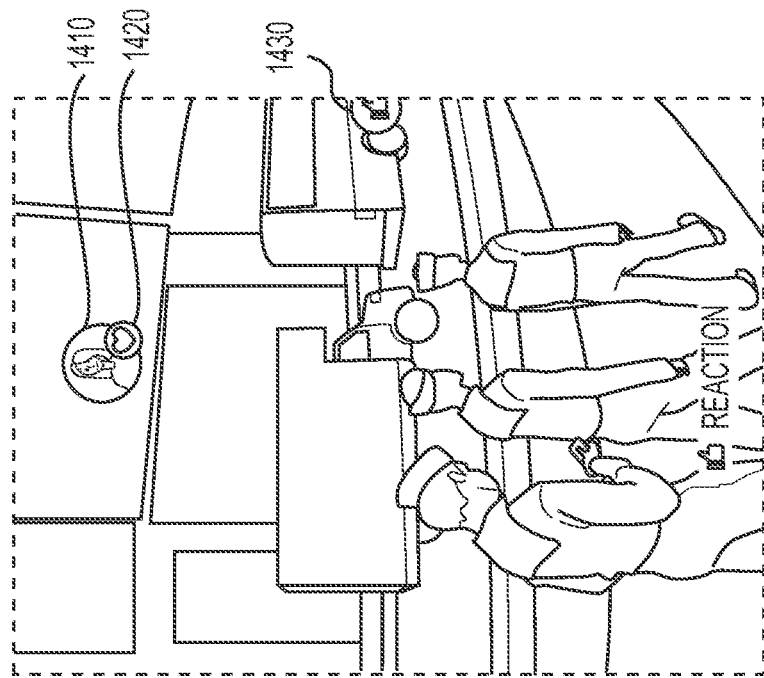

FIGS. 13A-13C illustrate an example of placing a user reaction at a location of a visual media item. FIGS. 14A-B illustrate an example of a visual media item with reactions placed in different locations. In particular embodiments, a user may be able to place reactions or comments (collectively termed herein as "social-commentary items") in content (e.g., visual media items), a virtual room, or any virtual space generally, These social-commentary items may be placed with spatial and/or temporal information specifying where and/or when in the content the social-commentary items are to appear. As an example and not by way of limitation, referencing FIGS. 13A-13C, the user may place the laughing reaction 1310 on the displayed visual media item by grabbing it from the menu bar 1320 and positioning it at the location in FIG. 13C. FIGS. 13A-13C illustrate this sequence of events. In particular embodiments, when a user views content, a virtual room, or any virtual space generally, that has social-commentary items, the user may be able to view other users' social commentary with respect to specific spots, spatial and/or temporal, in the content (or any virtual space, generally). These reactions or comments may be overlaid over the virtual environment (e.g., a laughing icon may appear at a spot corresponding to a laughing reaction). In particular embodiments, there may be identifying information (e.g., a small profile picture, a name) associated with the displayed reactions or comments. As an example and not by way of limitation, referencing FIG. 14A, the heart reaction 1420 may be accompanied by the profile picture 1410 of the user (or multiple profile pictures of multiple users) who had submitted the heart reaction 1420. In this example, if there are more than a maximum number of users who submitted the like (e.g., more users than would be optimal to display identifying information for), the virtual reality system may only display identifying information of a select number of users (e.g., favoring social connections of the user for whom the user has a high affinity, as may be determined by social-graph information of an online social network). In particular embodiments, the field of view displayed to a user may include "hints" or indications of nearby or upcoming reactions or comments (e.g., previously submitted by the user himself/herself or by another user) that are not yet in the field of view. These hints may appear in the periphery (e.g., in the direction of the location of the submitted reactions). As an example and not by way of limitation, referencing FIG. 14A, the like-hint 1430 may indicate that a like reaction exists toward the right of the current view. In this example, when a user shifts the view to the right, the like reaction 1450 (which may correspond to the like-hint 1430) comes into view (along with the profile picture 1440 of the user who submitted the like reaction 1450. Alternatively or additionally, the hints may present some indication (e.g., an arrow symbol) of the direction of the location of the submitted reactions. One advantage of displaying the hints is that they may act to direct the user's attention to interesting areas in a particular content item (e.g., temporal or spatial spots liked by other users). As an example and not by way of limitation, a user, upon viewing a 360 photo, may notice that there is a hint displayed at the right of the user's current field of view (e.g., an indication of a laughing icon with an arrow to the right). In this example, upon turning to the right (thereby shifting the field of view), the user may be able to see the spot corresponding to the laughing icon (e.g., a depiction of a funny cat).

In particular embodiments, the set of tools may include a portal tool that allows the user (and/or one or more other users, e.g., other users in a virtual room with the user) to be transported from the current virtual space to a different virtual space. As an example and not by way of limitation, the user may be able to select the portal tool to exit a particular virtual room (described elsewhere herein) and enter a different virtual room, a user interface for browsing visual media items, a newsfeed of an online social network, a web browser, or any other suitable virtual space.

In particular embodiments, the set of tools may include a virtual mirror tool that may allow the user to view the user's own avatar (e.g., by rendering an image of the avatar within a region of the mirror tool as though it were a reflective item). The virtual mirror may essentially function like a mirror in the virtual space. The virtual mirror concept may also extend to other applications. As an example and not by way of limitation, the virtual mirror concept may be extended to the camera tool such that a user may be able to capture an image (e.g., a "selfie" image) by, for example, picking up the virtual mirror (or a camera tool) and positioning it such that it displays the desired image. As another example and not by way of limitation, the user may be able capture videos with the mirror (or a camera tool) in the same fashion. As another example and not by way of limitation, the user may be able to use the virtual mirror as a means to control what other users see during a communication session with the user, or a one-way broadcast to other users. In this example, the user may be able to position the virtual mirror (or camera tool) such that it captures the desired images and the virtual reality system may stream or broadcast the images as they appear in the virtual mirror. In particular embodiments, two users in a virtual reality space may broadcast communications to a plurality of other users. The users may use the virtual mirror (or camera tool) as a visual aid in framing what the plurality of other users sees. In particular embodiments, the virtual mirror (or camera tool) may auto-position on a region of the user's avatar (e.g., centering on the face or body of the avatar). As an example and not by way of limitation, the virtual mirror (or camera tool) may automatically bias toward an optimal view of the avatar. In particular embodiments, the default position may be set by the user (e.g., center of face, center of body, etc.). In particular embodiments, the virtual mirror (or camera tool) may also smooth out the image by reducing any shakiness that may be present from the user's hands or other input means.

In particular embodiments, the virtual reality system may introduce concepts like reach and distance in the virtual space. The concepts of reach and distance may be useful in making the virtual world more similar to the real world and making interactions in the virtual world more intuitive. In these embodiments, certain interactions with an object may only be available to a user if the object is within the reach of the user's avatar. As an example and not by way of limitation, it may only be picked up by the user if it is within reach of a hand of the user's avatar. The concept of reach may be conveyed by perspective rendering of the virtual space, so that it is obvious (just as in real life) what objects are in reach. In particular embodiments, the virtual reality system may indicate for clarity the objects that are within reach (e.g., by highlighting them or by making them seem more opaque than objects that are out of the user's reach). In particular embodiments, users may be able to bring an object closer to their reach by moving toward it or by using a virtual tool (e.g., a tractor-beam tool or a vacuum tool) to bring the object closer to the user. In particular embodiments, a particular user may ask another user who is close to the object or content to pick it up and pass it to the particular user. The "physical" act of handing items to other users may have the advantage of making for a very real, very human experience for the user, and may help make the virtual world feel more like the real world.

In particular embodiments, the virtual reality system may have a first set of physics for content and a second set of physics for virtual objects. As an example and not by way of limitation, content may float in the virtual world, while objects may have gravity just as though they were real-world objects.

In particular embodiments, a first user may be able to hand a tool (e.g., a premium tool purchased by the user) to a second user in in a virtual space. The second user may then be able to use the tool. In particular embodiments, the second user may only be able to use the tool for a period of time or within particular restrictions, after which the tool may become unavailable to the other user. As an example and not by way of limitation, the first user may hand a premium camera tool (e.g., one that takes high-quality images or one that has a particular filter) to the second user. In this example, the second user may be restricted to using the camera while in the same virtual space as the first user or may only be able to use the camera for duration of ten minutes.

In particular embodiments, the tools that are rendered at a given time in a given virtual space may vary. The particular tools that are rendered may be based on a determined current context, as described herein (e.g., as in the case of the dynamically changing reticle). As an example and not by way of limitation, the user may only be able to view or select tools to which the user has access (e.g., based on whether the user's demographic, based on whether the user has paid for access in the case of a premium tool). As another example and not by way of limitation, certain tools may be more likely to appear in certain virtual spaces. In this example, a pen tool may be more likely to appear in an office-themed virtual space which may be designed for study or work. Similarly, a laser tool may be more likely to occur within a gaming environment. As another example and not by way of limitation, the user may speak an appropriate voice command (e.g., "pen tool") and a pen tool may appear (e.g., appearing to fall from the sky, appearing out of nowhere, etc.). In particular embodiments, the particular tools that are to be rendered may be determined by scoring or ranking the different possible tools, as described elsewhere herein for analogous contexts (e.g., as in the case of the dynamically changing reticle).

In particular embodiments, usage of a tool may affect the availability of a tool, or the continued selection of the tool by a user. As an example and not by way of limitation, after a user has used a pen tool for a defined period of time, the pen tool may be deselected. As another example and not by way of limitation, after a user has taken a defined number of photographs on a camera tool (e.g., as may be defined by an amount of virtual "film" purchased by the user), the camera tool may become unavailable. As another example and not by way of limitation, if a user is using a particular tool irresponsibly (e.g., if the user's usage of the tool has been reported by other users), the particular tool may be made unavailable (e.g., for a period of time). For example, if a user uses a laser tool to destroy virtual objects created by another user, the laser tool may be made unavailable to the user for a period of twenty-four hours. In particular embodiments, the usage of a tool may affect the score or rank calculated for a tool. As an example and not by way of limitation, after a user has used a paintbrush tool for a defined period of time during the past 5 hours, its respective score may decrease (e.g., because the user may have lost interest in the paintbrush tool), and may consequently cause another tool to be more likely to appear than the paintbrush tool (e.g., because the other tool may have a higher score).

In particular embodiments, virtual objects (e.g., virtual tools) in a virtual space may be customized for a user. In particular embodiments, the customization of a virtual object may be based on information associated with the user that may be stored locally in the virtual reality system, in a database associated with the virtual reality system, in a database associated with an online social network, or in a database associated with any suitable third-party system. As an example and not by way of limitation, a virtual object may be customized based on social-graph information that may be present on a social graph of an online social network. In this example, such information may include affinities and preferences of the user (which may have been explicitly specified by the user, or inferred by the user's actions on the online social network). For example, a virtual boom box of a user may have a personalized playlist of music (e.g., based on a music-streaming profile of the user, based on social-graph information of the user, based on a playlist explicitly specified by the user). As another example and not by way of limitation, a virtual TV of the user may have a personalized set of TV shows/movies (e.g., by connecting to a television subscription account of the user, by connecting to media items stored by the user in the virtual reality system or another system associated with the user such as a digital video recorder in the real world, a personal computer, or a cloud platform).

In particular embodiments, the virtual reality system may render a virtual room, which may be a virtual space that allows multiple users to virtually meet. In particular embodiments, the virtual room may have been "created" by a particular user, i.e., the virtual reality system may have rendered the virtual room in response to an input by the particular user requesting that the virtual room be rendered. In particular embodiments, the virtual room may have, as a backdrop, images from a headset camera of a particular user (e.g., the user who created the virtual room) such that all users in the virtual room may perceive themselves as being in the real world at the location of the particular user. In particular embodiments, each user may see a virtual room with a backdrop formed with images from his or her own headset camera (such that each user sees an augmented reality based on their own individual real world). In particular embodiments, the virtual reality system may render avatars of the users within the virtual room. An avatar in the virtual room may be a customizable generated rendition of the respective user. In particular embodiments, the virtual space may render a video-representation of the user (e.g., captured from a camera directed at the respected user). In particular embodiments, the rendered avatar may include one or more elements of the video-representation. As an example and not by way of limitation, the face of the avatar may be a face composed from the face in the video-representation. In particular embodiments, the virtual room may be bounded by walls, such that it resembles an actual room.

In particular embodiments, an initial avatar of the user may be generated by the virtual reality system based on one or more photos (or other image content, such as videos) of the user. As an example and not by way of limitation, the virtual reality system may automatically selected photos of the user from an online social network (e.g., photos that tag the user, profile pictures of the user) or some other suitable resource (e.g., a local or cloud photo database of the user). The virtual reality system may attempt to select optimal pictures by favoring certain types of pictures (e.g., pictures that were profile pictures of the user, pictures that receive a relatively large number of likes or comments, pictures with optimal angles and details of the user's face, etc.).

Figure 15:
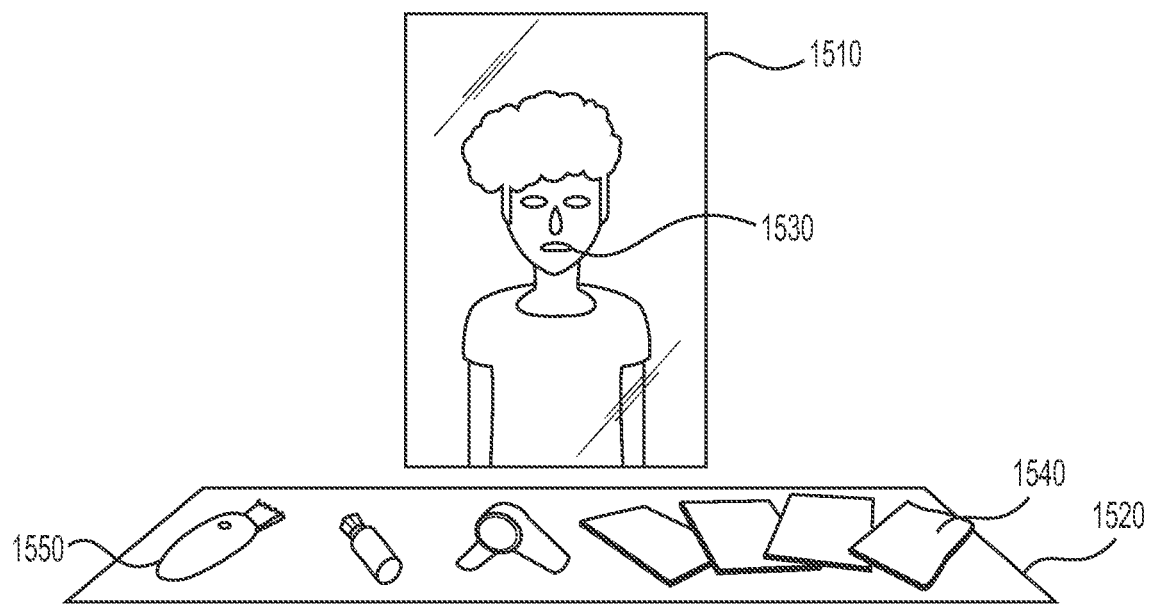
FIG. 15 illustrates an example of an avatar-customization area in a virtual space.
Figure 16A:
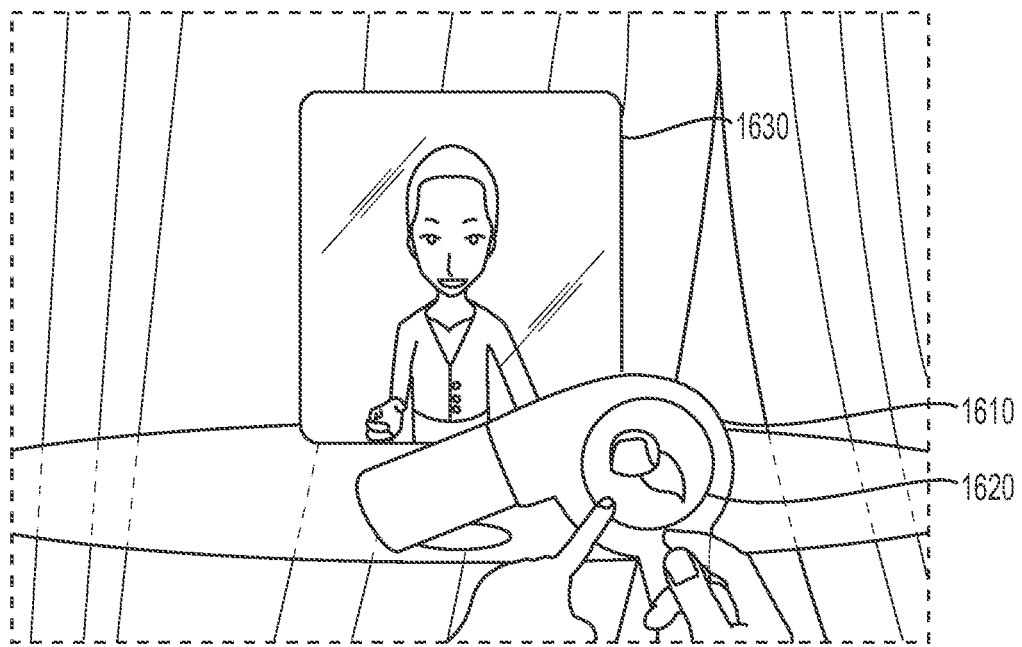
Figure 16B:
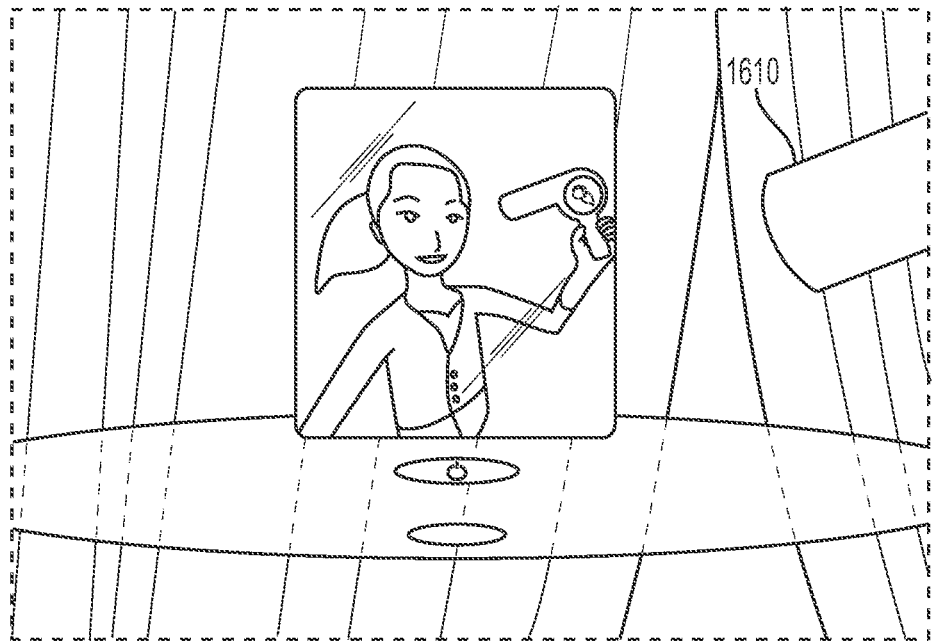
Figure 16C:
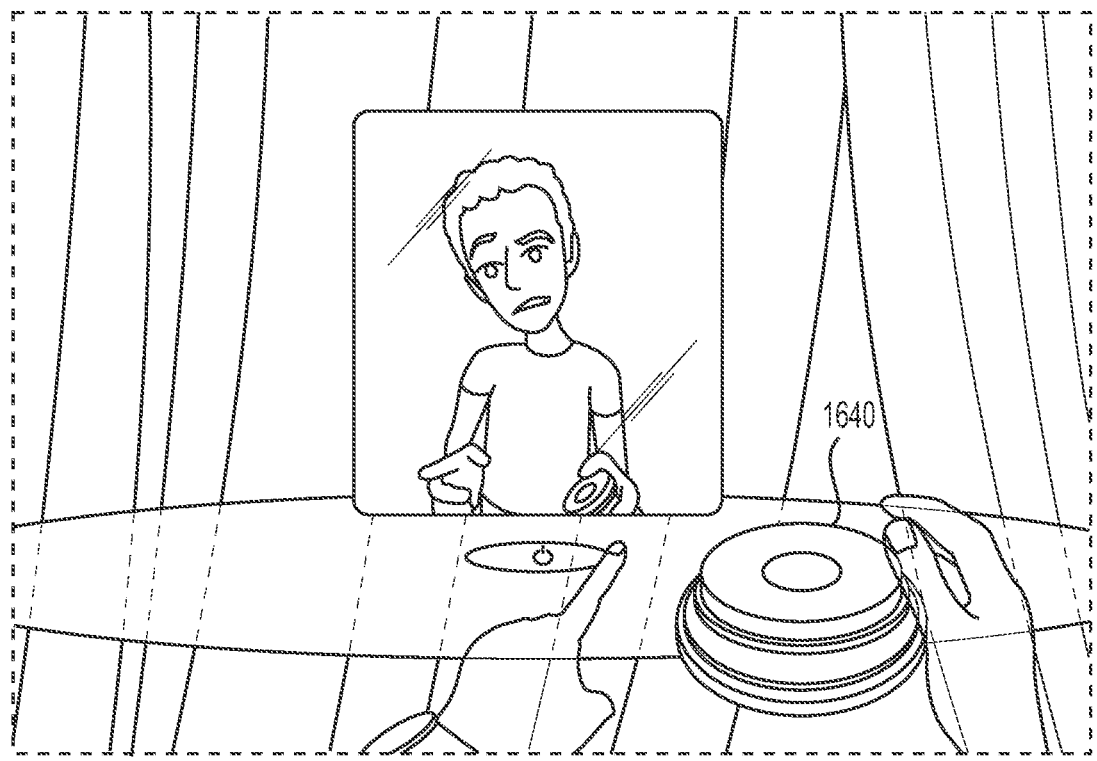
Figure 16D:
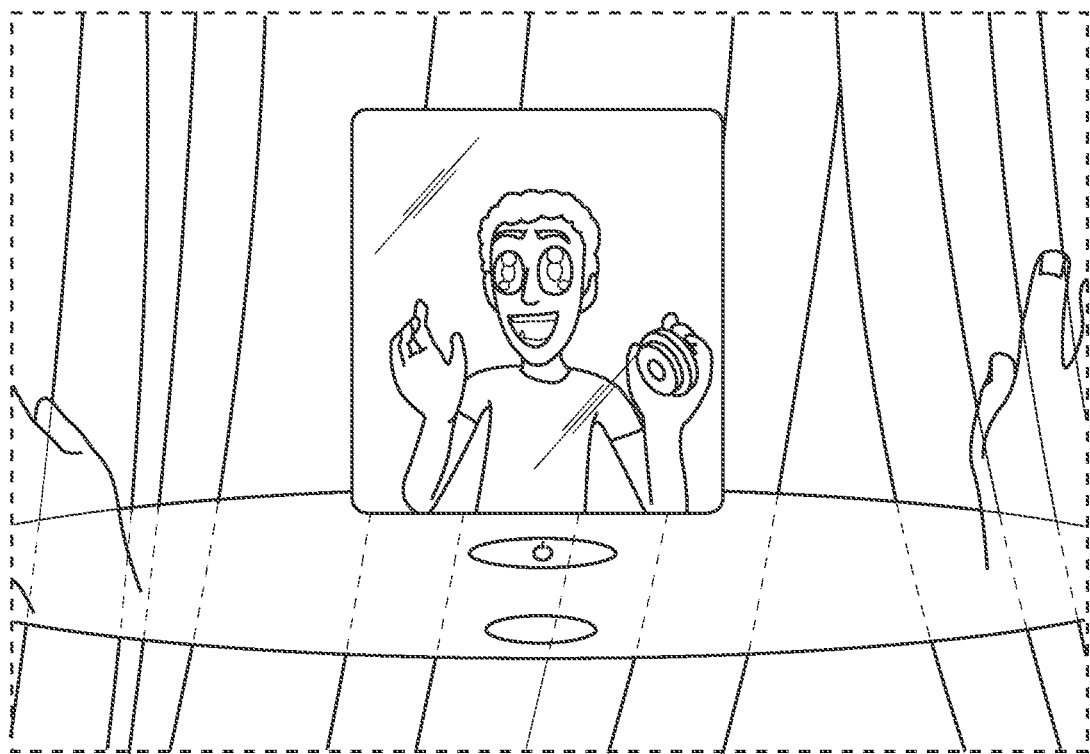

FIG. 15 illustrates an example of an avatar-customization area in a virtual space. FIGS. 16A-16G illustrate example uses of virtual tools to customize an avatar. In particular embodiments, a user may be able to customize the user's avatar. In particular embodiments, the user may be able to alter features of the avatar. Avatar alteration may be desired in cases where the initial avatar was not rendered accurately or optimally, at least based on the user's perception. It may also be desired in cases were users want to make their avatar a reflection of their best self (which may not have been captured in photos) or their ideal self, or it may simply be an imaginative version of themselves that they want to create for fun. In particular embodiments, the user may be able to select (e.g., by pointing/poking with a rendered hand of the user) individual features (e.g., nose, mouth, jaw line, skin color, eye color, facial hair type) on the initial avatar and alter them as desired. As an example and not by way of limitation, the user may be able to switch out existing features for a different feature that may be selected from a group of possible features. As another example and not by way of limitation, the user may be able to alter existing features using any suitable input. For example, the user may make a nose larger by poking at it to select it as a feature, then pulling it out with a gesture; extend the hairline by grabbing the hair and pulling it downward; or change eye color by picking up an eye-change tool and applying new eyes to the avatar (at this point, the avatar's eye may get big, anime style, to allow the user to more clearly see the eye color that was selected). In particular embodiments, to aid with these changes, the user may be presented with a virtual mirror that mirrors the position and movements of the user's avatar. As an example and not by way of limitation, the user may be presented with the virtual mirror 1510. In this example, the user may be able to select a feature (e.g., the mouth 1530) and modify it. In particular embodiments, the user may add accessories to the avatar (e.g., hats, glasses) or customize clothes worn by the avatar. In particular embodiments, the user may alter the appearance of an avatar using virtual tools, such as virtual tools that may be analogous to real-world grooming products. As an example and not by way of limitation, the user may be able to pick up a virtual hair-dryer tool, a virtual hair-straightener tool, a virtual curling-iron tool, virtual hair gel, virtual makeup, virtual hair dye, virtual shaving cream, virtual beard trimmer, virtual hair clippers, virtual razor, virtual hair-growing cream (which may cause hair to grow, e.g., on the face at an accelerated pace), etc., and modify an avatar just as in the real world. Referencing FIG. 15, the virtual tools (e.g., the virtual hair clippers 1550) may appear at an intuitive location such as the dressing table 1520 in front of the virtual mirror 1510. FIGS. 16A-16B illustrate an example of a user using a virtual hair-dryer tool 1610 to modify the hair of the user's avatar. In this example, the user may be able to specify settings for the virtual hair-dryer, and an indication of a specified setting may appear on or near the virtual hair-dryer (e.g., the indicator 1620). The user may be able to see the changes as they happen in the virtual mirror 1630. FIGS. 16E-16G illustrate an example of a user using a virtual hair-growing cream 1650 to modify the beard of the user's avatar. The user may apply the virtual hair-growing cream 1650 in FIG. 16F, which may result in the avatar having a beard in FIG. 16G. In particular embodiments, the user may be able to customize the avatar by simply enabling filters. As an example and not by way of limitation, referencing FIGS. 16C-16D, the user may enable an "anime-eyes" or "googly-eyes" filter (e.g., with the filter tool 1640) that overlays large eyes on the avatar (e.g., for comedic effect), as seen in FIG. 16D. In particular embodiments, different buttons on a physical controller may correspond to different functions for changing appearance with a universal tool. As an example and not by way of limitation, the universal tool may increase hair length, curl hair, straighten hair, gel hair, dye hair, etc., depending on the inputs the user submits via a physical controller (e.g., the buttons pushed, the gestures performed). In particular embodiments, these tools may be manipulated with hand gestures (e.g., by moving hand controllers) to simulate the use of the corresponding products in the real world. In particular embodiments, the customization of the avatar may be facilitated with a virtual mirror that may function like a mirror in the real world, mirroring the movement and features of the user's avatar. In particular embodiments, the mirror may be summoned by the user at any time or place in a virtual space, and/or may be provided to the user when the user enters a virtual dressing room or another personal space (e.g., when the user goes into "pause mode" as described herein). The virtual dressing room (or other personal space) may include tools or options for modifying the avatar (e.g., accessories, a virtual hair-dryer tool). As an example and not by way of limitation, a user may enter a virtual dressing room by entering pause mode, select the nose as a feature (e.g., by pointing to the nose on the corresponding location on the virtual mirror), and select a different nose (e.g., by selecting one out of several possible noses that may be presented to the user in response to the user selecting the nose). In particular embodiments, customization may not only be limited to the head or face, but may also include customization of the torso or limbs (e.g., body size, build, and/or height).

Figure 17A:
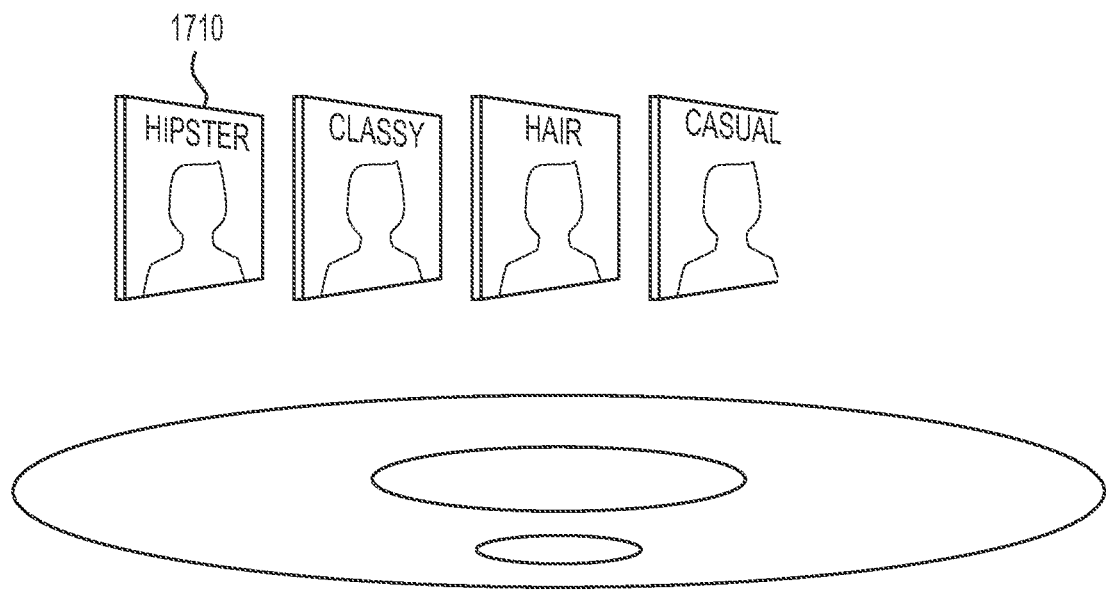
FIGS. 17A-17B illustrate example virtual magazines for customizing an avatar.
Figure 17B:
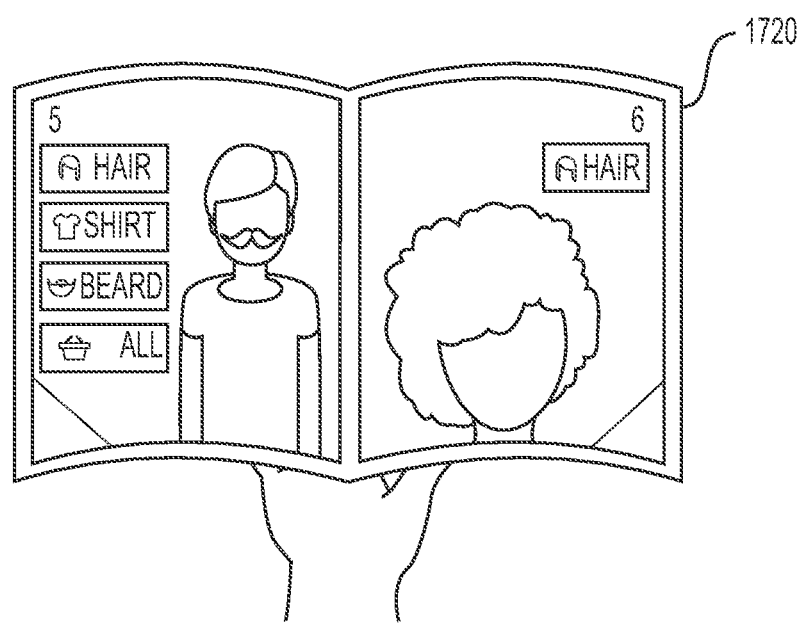

FIGS. 17A-17B illustrate example virtual magazines for customizing an avatar. In particular embodiments, to facilitate customization and/or to provide the user with ideas for customization, the user may be presented with one or more virtual "magazines" (or something similar) that may include various style templates or modeled styles (e.g., on different "pages" that the user may be able to flip through) similar to how a fashion magazine in real life would (e.g., clothing, hairstyle, mustaches, accessories). Each style may feature one or more different features (e.g., different hairstyles, noses) or articles (e.g., different glasses, hats), as illustrated in the example magazine 1720 in FIG. 17B. The magazines may be especially useful for users experimenting with avatar customization they may provide since they may give users a place to start. There may be different magazines for different personalities, and users may pick a magazine closest to their personalities or tastes. As an example and not by way of limitation, referencing FIG. 17A, a variety of different magazines may be presented to the user (e.g., the "Hipster" magazine 1710, which may showcase hipster styles). The magazines may be present in the dressing room (or personal space). As an example and not by way of limitation, referencing FIG. 15, the magazines 1540 may appear on the dressing table 1520. The styles in magazines may be modeled on representations of the user's current avatar within the magazine so that the user may flip through the different styles quickly to see what each style would look like on the user's current. Alternatively or additionally, the styles may be modeled on other avatars or photos of models. The magazine may also display different feature sets (e.g., different noses, eyes, chin, etc., as they could be applied to the current avatar of the user to show the user the different possibilities). Some or all of the magazines may be either free or purchased. The user may be able to browse through the magazines for avatar customization ideas, and may then adjust the user's avatar based on the magazines. In particular embodiments, the user may be able to simply select a particular style (e.g., on a page of the magazine), and the user may immediately be able to see the changes in the user's avatar by looking at a virtual mirror (e.g., in a dressing room). The user may select individual items in a magazine (e.g., a pair of glasses, eye color), or may select an entire style (e.g., adding all features shown on a model in the magazine). If satisfied, the user may be able to accept the changes, and have the avatar immediately customized without having to do anything further. In particular embodiments, the user may hold the magazine just as in real life, with one hand holding the magazine at the spine. In these embodiments, the user may use the other hand to flip through the pages of the magazine (or any other suitable input).

In particular embodiments, the virtual reality system, in rendering an avatar, may render not only a face, but also the body, and may accordingly need to determine where and how to position the various parts of the body. As an example and not by way of limitation, the virtual reality system may determine angles of different joints in the body or the position of the limbs and/or torso. In making these determinations, the virtual reality system may receive various inputs from the user. As an example and not by way of limitation, the virtual reality system may include a camera that may track the movement of the user and the user's various body parts. As another example and not by way of limitation, the virtual reality system may include controllers that may be held or secured to one or more limbs of the user (e.g., tied to the user's feet or knees, held in or secured on the user's hands). In particular embodiments, the virtual reality system may make use of inverse kinematics to continuously determine the movements, angles, and locations of the various body parts and joints. As an example and not by way of limitation, inverse kinematics equations may define the relationships between joint angles and positions of the avatar and input data (e.g., data from cameras tracking the user, data from controllers describing the position of the user's hands and feet), and may use these relationships to determine the locations and orientations of the avatar's joints. As another example and not by way of limitation, inverse kinematics equations may define the relationships between joint angles and positions of the avatar and a determined pose for the avatar. In this example, the pose for the avatar may be determined by the user may be data from cameras tracking the user or data from controllers, but may also be determined based on other factors such as contextual information. For example, if context dictates that the user is shrugging (e.g., as may be determined based on a conversation, based on a specific gesture that triggered a shrugging "virtual emoji"), that informs the virtual reality machine that the avatar should be in a shrugging pose. In this case, the inverse kinematics equations may be used to determine the locations and orientations of the avatar's joints for the shrugging pose.

In particular embodiments, the virtual room may include an "interactive surface," which may be a specific region in the virtual room having special properties. In particular embodiments, the interactive surface may resemble a table, desk, or other such surface that may be visible to all users in the virtual room. In particular embodiments, the interactive surface may afford users within the virtual room a means of sharing in certain interactive experiences. In particular embodiments, the interactive surface may be a means for users to share content with other users in the virtual room. The content that is being shared (e.g., a slide show, a video), may be two-dimensional or three-dimensional, and may be flat or non-flat content (e.g., spherical content, 360-degree content, 180-degree content). In the case of non-flat content, the users who are sharing in the experience may be immersed in the content together (e.g., for spherical content, everyone in the room may find themselves in a room surrounded by the spherical content and may see each other as avatars in the same room).

Figure 18A:
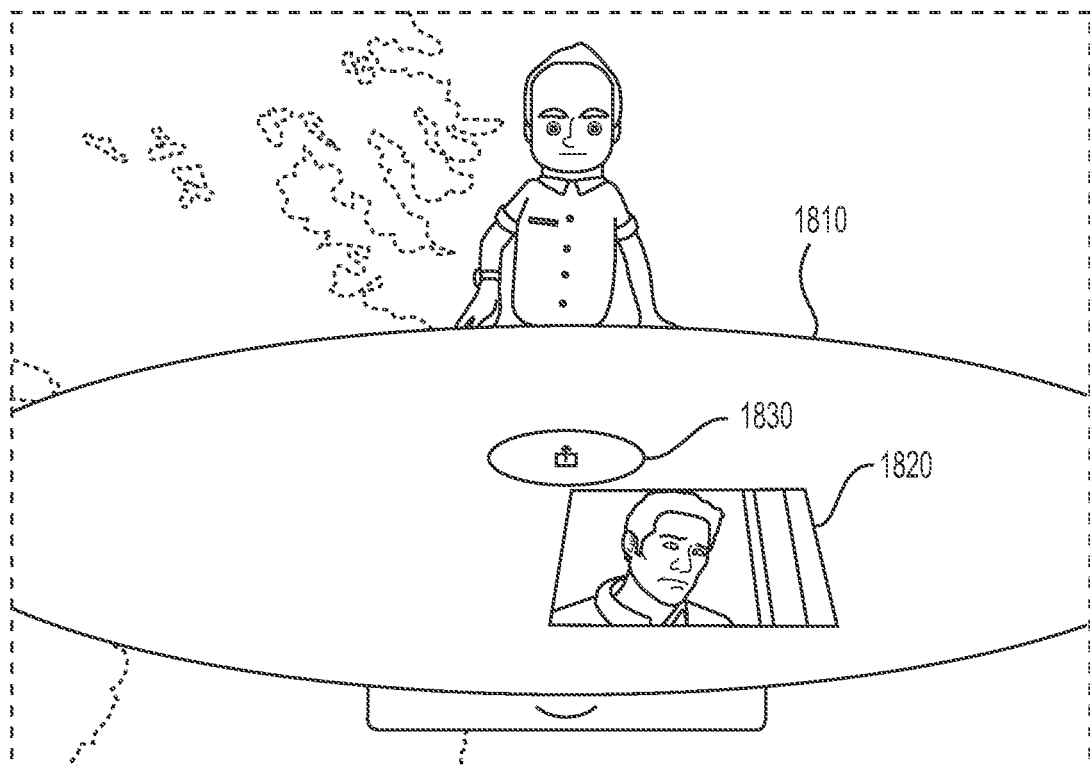
FIGS. 18A-18B illustrate an interactive surface that may be used by users to share content or otherwise share in interactive experiences.
Figure 18B:
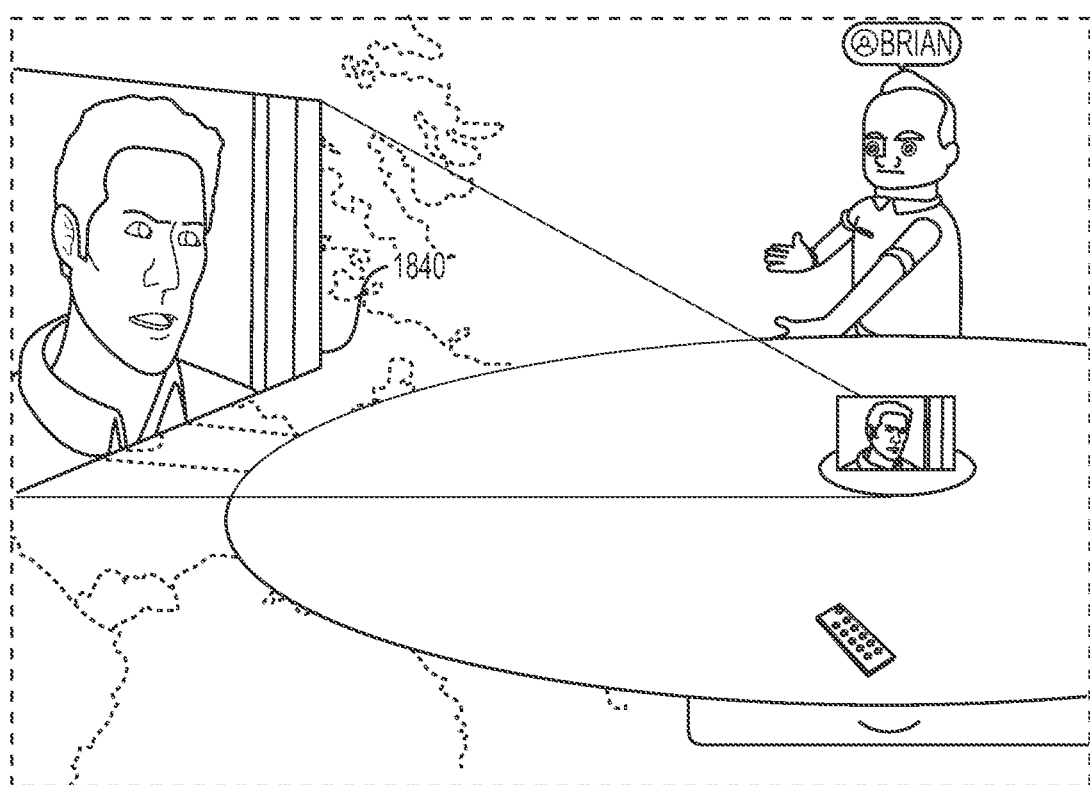
Figure 19:
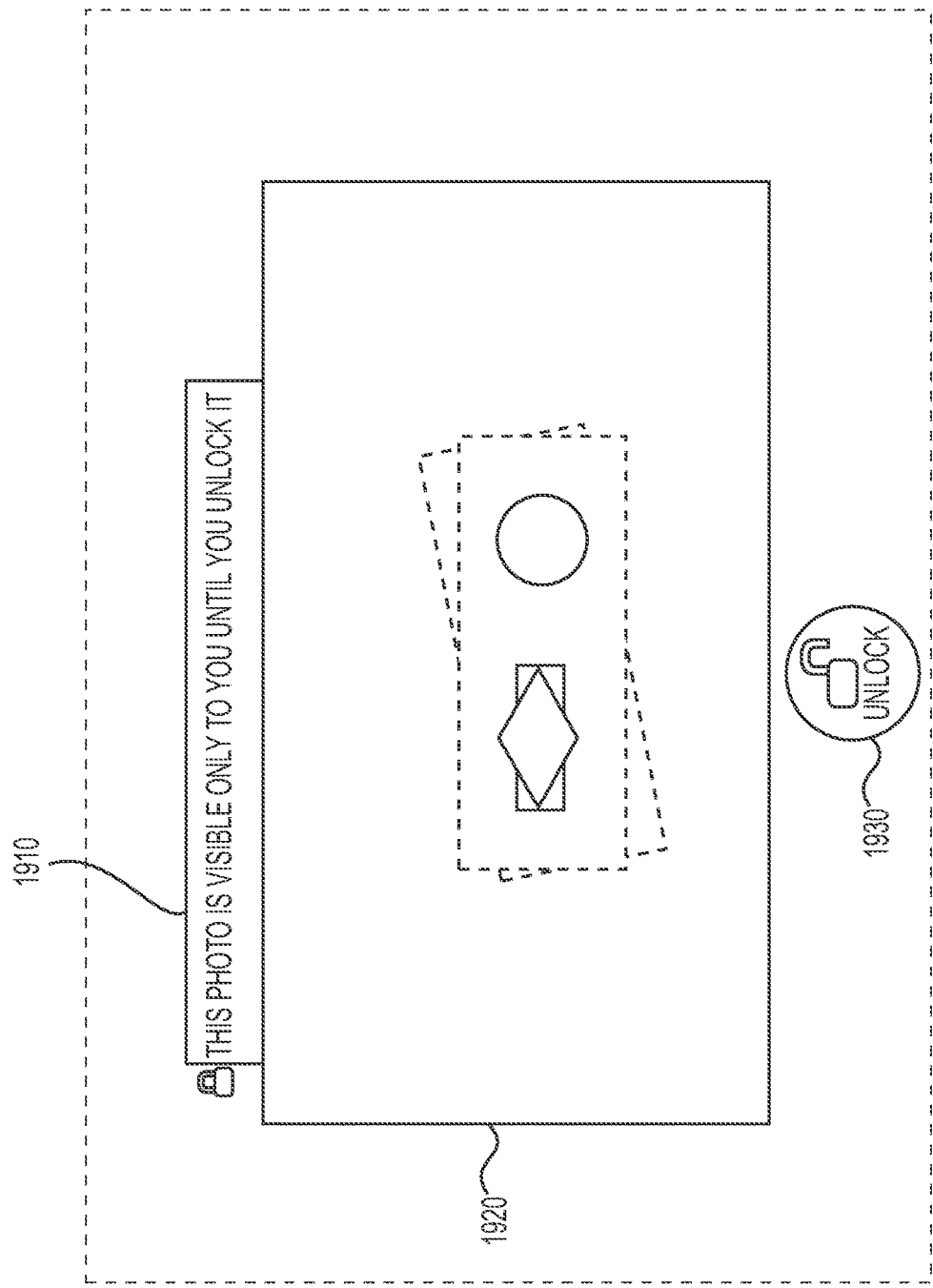
FIG. 19 illustrates an example of a content item that is locked.
Figure 20:
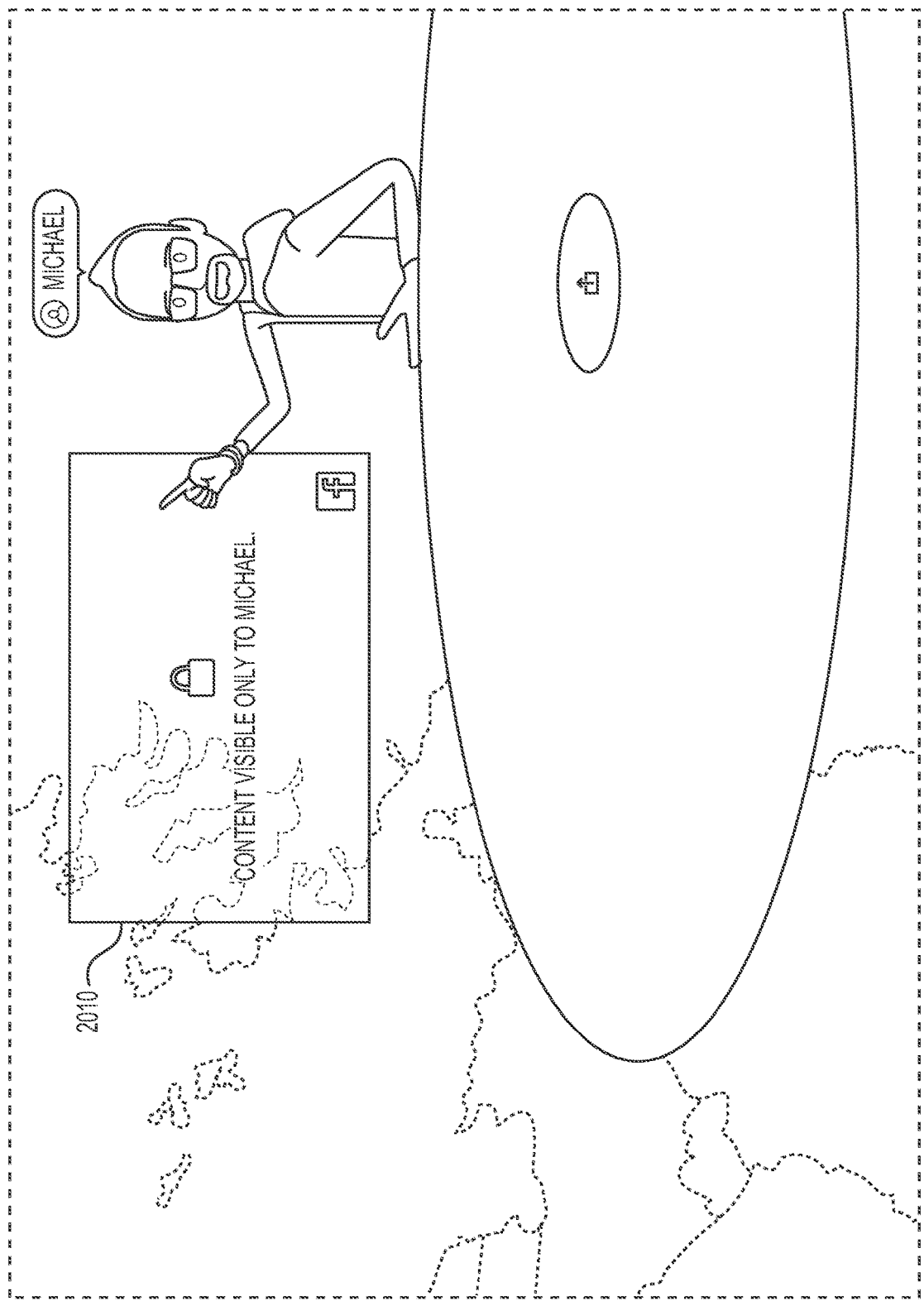
FIG. 20 illustrates an example of a content item representation of a content item that is shown to users for whom the content item is not visible.

FIGS. 18A-18B illustrate an interactive surface that may be used by users to share content or otherwise share in interactive experiences. FIG. 19 illustrates an example of a content item that is locked. FIG. 20 illustrates an example of a content item representation of a content item that is shown to users for whom the content item is not visible. In particular embodiments, a user who is privately browsing or viewing content (e.g., an article, a visual media item, items on a newsfeed of an online social network) while in the room, upon deciding to share the content with other users in the virtual room, may place a virtual object corresponding to the content on the interactive surface. The act of placing the virtual object on the interactive surface may function as an "unlock-content" input, making the corresponding content visible to other user in the virtual room. As an example and not by way of limitation, the user may be browsing a newsfeed of an online social network and may find a video posted on the newsfeed to be interesting. In this example, the user may select and drag a virtual object corresponding to the video onto an interactive surface (e.g., using a gaze input, "grabbing" a thumbnail of the video with a grab-type reticle, and dragging it onto the interactive surface by aiming the reticle on the interactive surface). When the virtual object is placed on the interactive surface, the content associated with the virtual object may be visible to the users in the room or to the users who are within a threshold distance of the interactive surface. As an example and not by way of limitation, a video that is shared in this manner may be projected on the interactive surface or near the interactive surface (e.g., adjacent to the interactive surface, resembling a movie projections screen), or at another suitable location, for users in the virtual room to see. In particular embodiments, a content item may not be unlocked and visible to other users until a user having access to the content item places it on a particular region of the interactive surface. As an example and not by way of limitation, referencing FIG. 18A, the content item 1820 remains locked until it is placed in the region 1830 of the interactive surface 1810. In this example, when the content item is placed in the region 1830, it is projected onto the screen 1840, such that other users in the virtual room (e.g., the user "Brian") may view it. In particular embodiments, content that a user is privately browsing or viewing while in the room might not be visible (or audible) to other users until the user explicitly allows for it (e.g., by placing a virtual object corresponding to the content on the interactive surface). In particular embodiments, the user may choose to make particular content visible only to a subset of users, even within the same virtual room. In these embodiments, while the subset of users may be able to view the content, the other users who are not in the subset of users may not be able to view the content. In particular embodiments, users for whom the content is not visible may only see a content item representation, as described herein. As an example and not by way of limitation, the content item representation may be a privacy screen that looks like a blank screen. In particular embodiments, the content item representation may include an indication that the content is private or that the content is only visible to select users or a group of users. As an example and not by way of limitation, referencing FIG. 20, in the case where a user showing private content in a room has only made that content visible to a particular user named Michael, the content item representation 2010 (which may be shown to all users other than the particular user Michael) may include the text "Content visible only to Michael." Any suitable user interface element may be provided to the user to enable the user to submit an "unlock-content" input, which may allow the user to selectively make content visible to specific other users (or to make it visible to other users generally). As an example and not by way of limitation, referencing FIG. 19, the user may be provided with a virtual button (e.g., the virtual unlock button 1930) or menu item that may be selected to make the content item 1920 visible to other users. In this example, the user may additionally be able to specify particular users for whom the content will be made visible by specifying the particular users from a drop-down menu that may appear following the selection of the virtual unlock button 1930. A notification (e.g., the notification element 1910) may be provided to the user to indicate that the content item is not visible to other users. As another example and not by way of limitation, the user may simply place the content item on an interactive surface, which may make it visible for all other users in the virtual room, or next to the interactive surface.

Figure 21:
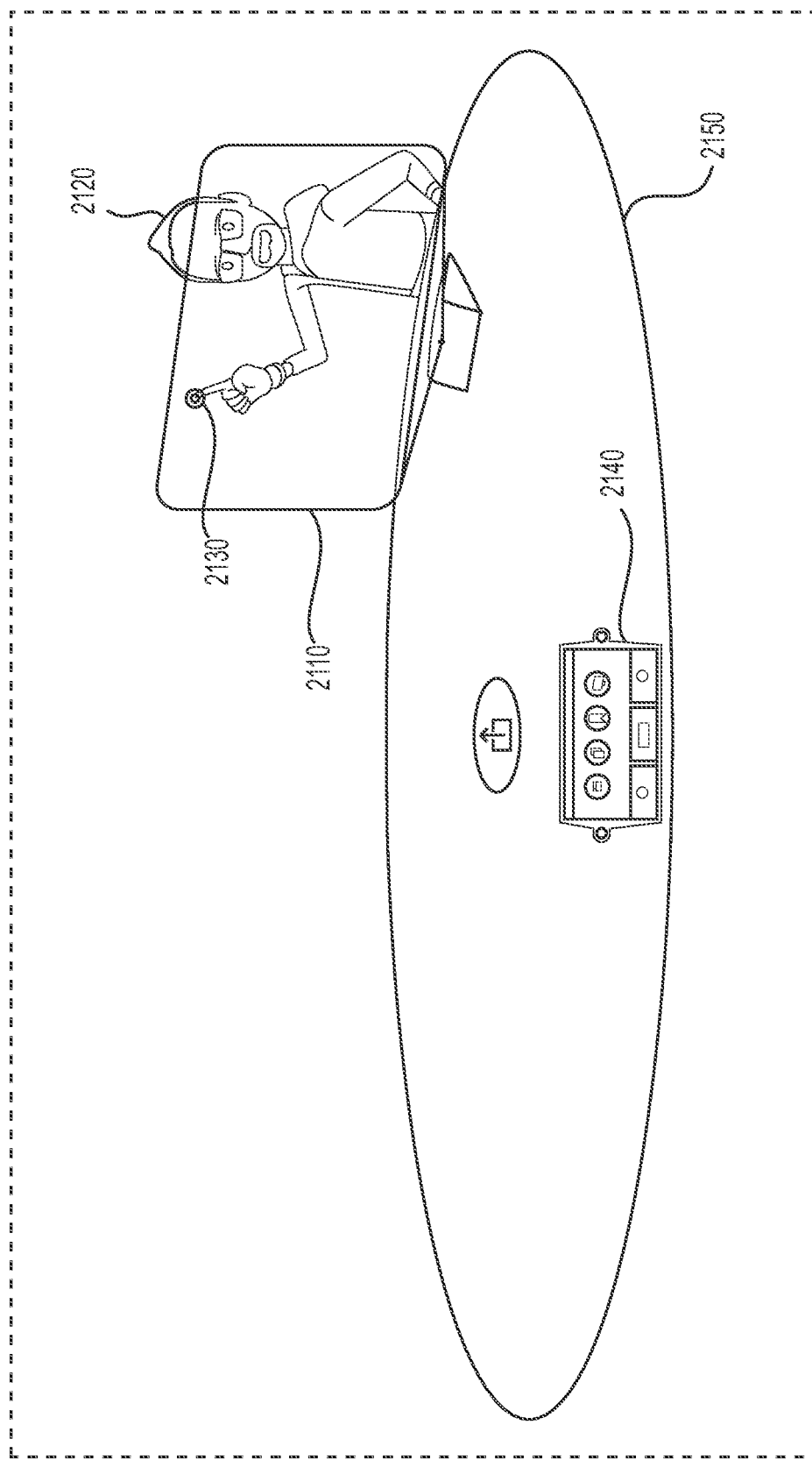
FIG. 21 illustrates an example of a user interacting with a content item from the viewpoint of a user for whom the content item is not visible.

FIG. 21 illustrates an example of a user interacting with a content item from the viewpoint of a user for whom the content item is not visible. User testing reveals that when a user is privately viewing content, the resulting situation may be uncomfortable or awkward (e.g., for other users for whom the content is not viewable). To the other users, it may look like the user privately viewing the content is making wild or random gestures at the air (e.g., when interacting with the content) or simply staring blankly into empty space. This problem may be remedied by displaying some type of content representation in front of the user who is viewing content (e.g., in the location where the content may be expected to be), without any indication as to what the content actually is. As an example and not by way of limitation, referencing FIG. 21, the blank screen 2110 may be displayed as a content representation in front of the user 2120. In this example, the blank screen or privacy screen may represent the back of the content. The content representation may be opaque or transparent. The content representation may indicate user interactions. As an example and not by way of limitation, when a user viewing a private video "touches" a blank-screen representation of a video, the point of "contact" may be highlighted (e.g., with the ring 2130 in FIG. 21) to indicate that the user is interacting with the content and not just pointing. The content representation may take any suitable shape and may adjust with the content. As an example and not by way of limitation, if the user is viewing a panel of private videos, other users may see a panel of blank screens. In particular embodiments, the content representation may include an indication that the content item it represents is private. In particular embodiments, the content representation may further indicate the users for whom the content is visible. As an example and not by way of limitation, to a user Thomas (e.g., a user to whom the content is not visible) it may include the text "Content visible only to Jane and Jim" (e.g., Jane and Jim being users for whom the content was made visible. Although the disclosure focuses on particular ways of making private content viewable by other users, it contemplates any suitable means of doing so. As an example and not by way of limitation, a user may make the user's own private content viewable by performing a suitable gesture (e.g., a particular swipe gesture, a secret gesture), speaking a password, pressing a button (e.g., a rendered button in the virtual space or a button on a physical controller), etc.

In particular embodiments, the virtual reality system may alter the interactive surface based on a current context. The interactive surface may be altered in its shape, size, color, physics (e.g., texture, the springiness of the virtual material that may, for example, allow for different levels of bounce for a virtual object that is dropped on the interactive surface), or any other suitable characteristic. As an example and not by way of limitation, a ping pong table interactive surface and a pool-table interactive surface may be of different shapes, sizes, colors, and physics (e.g., high-density fiber board vs. felt). The current context may be determined based on any combination of the factors described within this disclosure (e.g., current time of day, information about one or more of the users in the room). In particular embodiments, the particular interactive surface that is to be rendered may be determined by scoring or ranking the different possible interactive surface, as described elsewhere herein for analogous contexts (e.g., as in the case of the dynamically changing reticle).

Figure 22A:
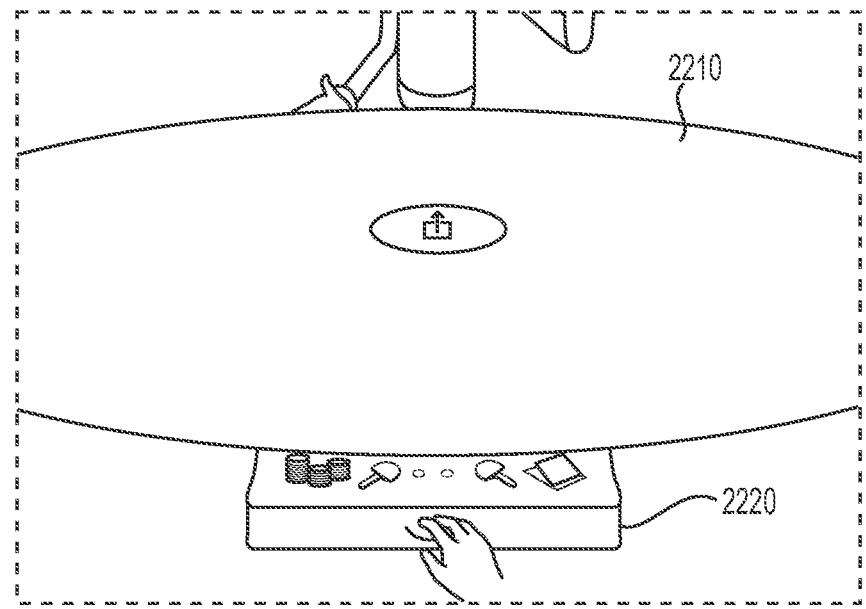
FIGS. 22A-22B illustrate an example interactive surface that is altered based on a tool selected by a user.
Figure 22B:
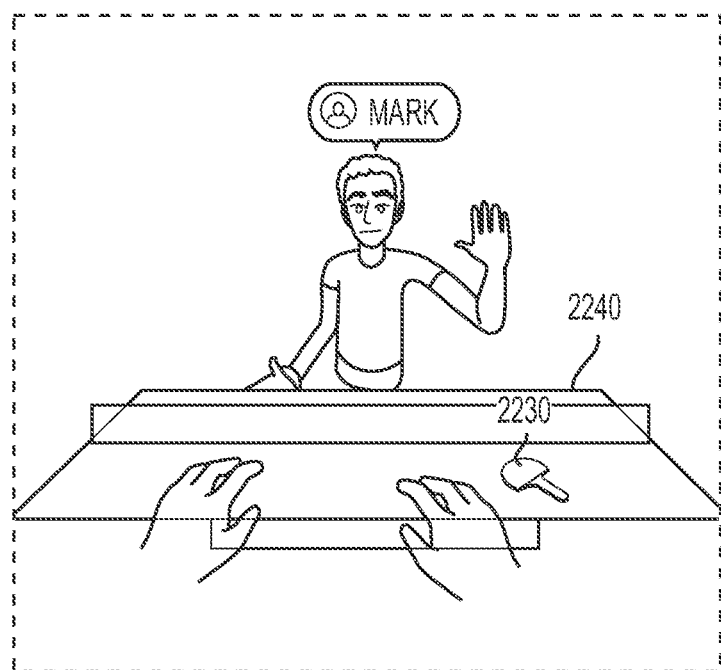

FIGS. 22A-22B illustrate an example interactive surface that is altered based on a tool selected by a user. In particular embodiments, the current context may be based on one or more tools selected by a user. In particular embodiments, the interactive surface may have associated with it one or more tools, which may appear in any suitable location in the virtual room. As an example and not by way of limitation, referencing FIG. 22A, the tools may be located within the virtual drawer 2220 associated with the interactive surface 2210 (e.g., a drawer connected to the interactive surface that the user may pull open with a gaze input with a headset device, a pull input with a hand-held controller as illustrated in FIG. 22A, or another suitable input). Alternatively or additionally, the tools may have been associated with the user (e.g., a tool from a tool belt of the user). In particular embodiments, one or more of the tools may have specifications that change the one or more properties of the interactive surface, such that when the user picks up a relevant tool, the interactive surface may be altered according to the specifications. Any of the tools described within this disclosure may appear in the virtual room (e.g., pen/marker tools, paintbrush tools, laser tools, etc.). In particular embodiments, the tools may include items associated with specific games that may be played on the interactive surface and that require a specific layout. As an example and not by way of limitation, referencing FIGS. 22A-22B, one of the tools may resemble a ping pong paddle (e.g., the ping pong paddle tool 2230). In this example, when the user picks up the ping pong paddle tool (or places the ping pong paddle tool on the interactive surface 2210), the interactive surface 2210 may be altered to look like a ping pong table (e.g., having a net and lines drawn on the interactive surface according to ping pong regulations), as illustrated in FIG. 22B with the altered interactive surface 2240. As another example and not by way of limitation, one of the tools may resemble a poker chip. In this example, when the user picks up the poker chip tool, the interactive surface may be altered to look like a casino table. As another example and not by way of limitation, one of the tools may resemble a laser. In this example, when the user picks up the laser tool, what appears to be a projection screen may appear on or near the interactive surface and a game may be initiated (e.g., one that includes targets that may be shot at by users in the room holding laser tools). Any suitable alterations may occur to accommodate different games (e.g., air hockey, pool, foosball, etc.). In particular embodiments, the interactive surface may only be altered if the user picks up a tool and performs some suitable action with it. As an example and not by way of limitation, the interactive surface may only be altered if the user places the tool on the interactive surface or on a particular region of the interactive surface.

Figure 23:
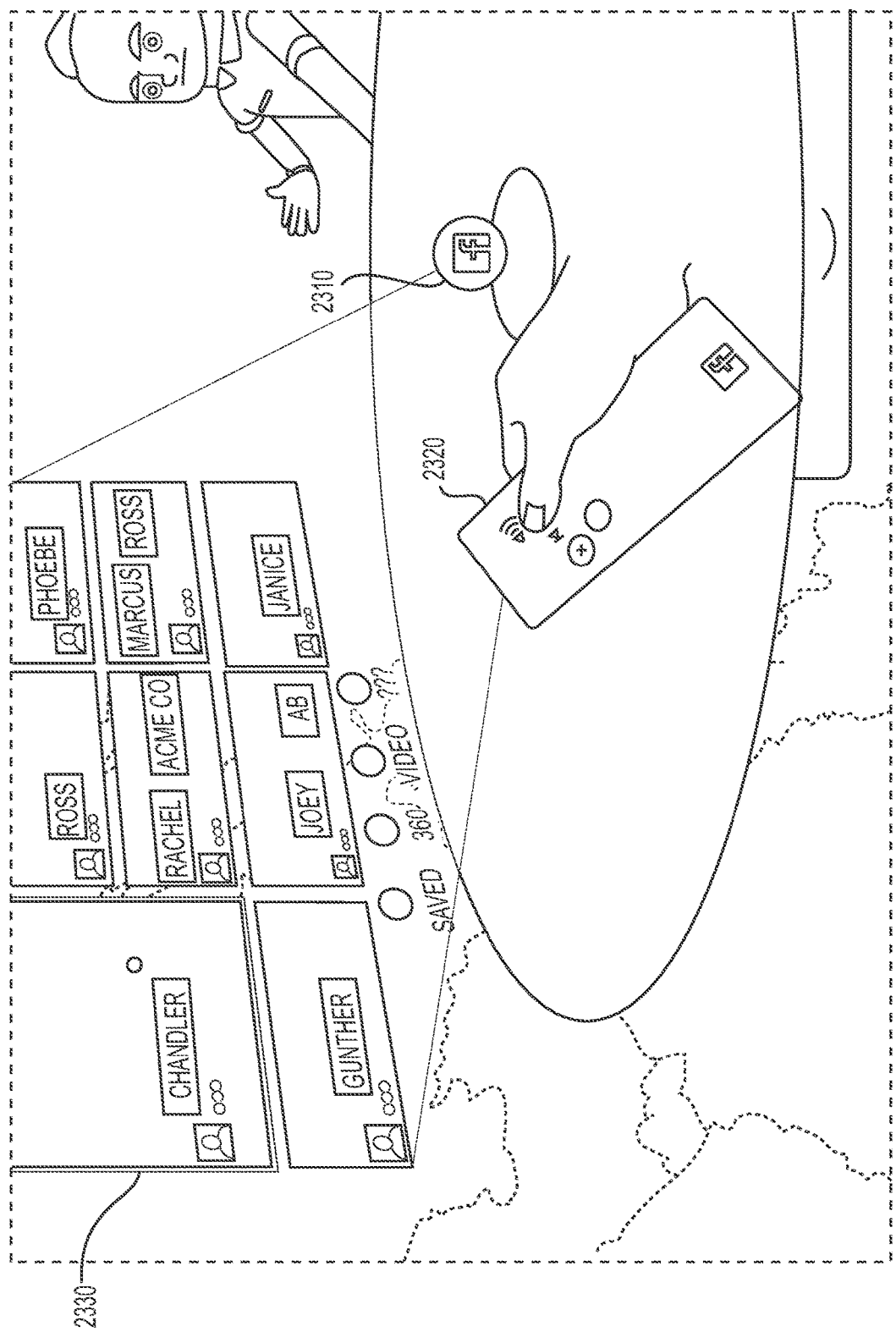
FIG. 23 illustrates an example of an interactive surface that has been altered to become a content-browser surface.

FIG. 23 illustrates an example of an interactive surface that has been altered to become a content-browser surface. In particular embodiments, an interactive surface may be altered to facilitate content browsing and playing (e.g., among users in a virtual room) if a user selects a content-browser tool. As an example and not by way of limitation, referencing FIG. 23, the user may have selected the content-browser tool 2310 (e.g., a content-browser tool for browsing content on the social-networking system 160), which may alter the surface to project a menu of content in a region of the virtual space. In this example, the user may then use the remote-control tool 2320 to select a particular content item (e.g., the content item 2330). The users in the virtual room may view the content item, add reactions or comments to the content item, or otherwise interact with the content item.

FIG. 24 illustrates an example of an interactive surface that has been altered to become a content-player surface. In particular embodiments, the current context may be based on a virtual object selected by a user. As an example and not by way of limitation, the user may select a content item (e.g., a photo, a video). In this example, when the user selects the content item or places the content item on the interactive surface, the interactive surface may be altered to become a content-player surface (e.g., with a projection screen in the middle that may be used to project the content item). As another example and not by way of limitation, referencing FIG. 24, the content item may be projected as though it were projected on the screen 2410 facing the interactive surface and within view of users 2420, 2430, and 2440. Referencing FIG. 24, the virtual space may include a rendering of a suitable 360 image (e.g., an image associated with the content item projected on the screen 2410), for example to set the mood or otherwise enhance the experience.

In particular embodiments, the interactive surface may be altered by a voice command. As an example and not by way of limitation, the user may speak the word "ping pong table," which may cause the interactive surface to be transformed into a ping pong table.

Figure 25A:
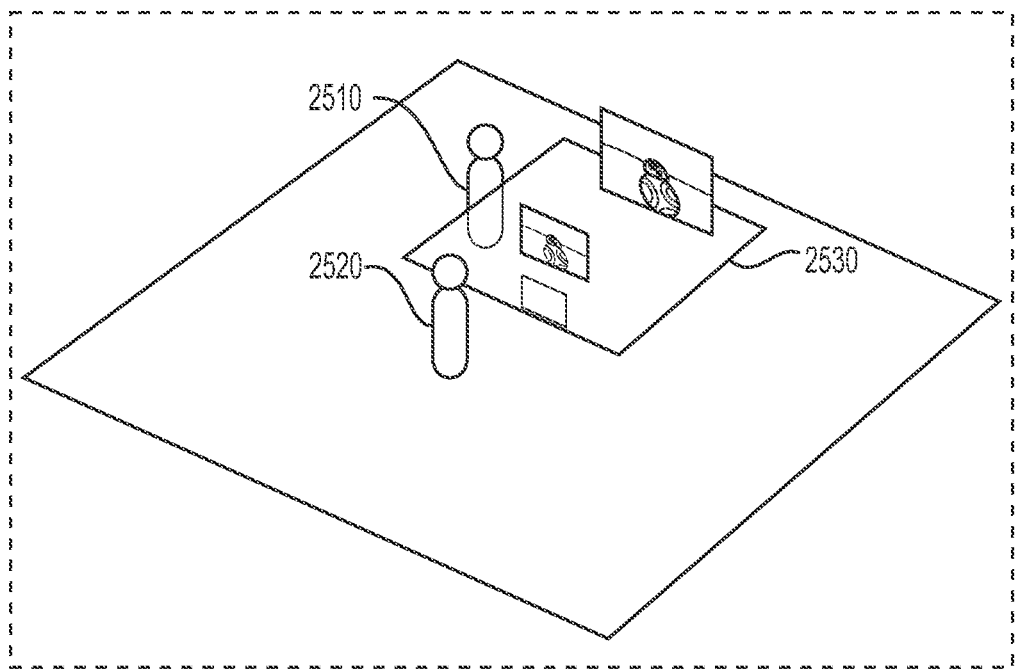
FIGS. 25A-25B illustrate an example of an interactive surface that is altered based on the number of users near it.
Figure 25B:
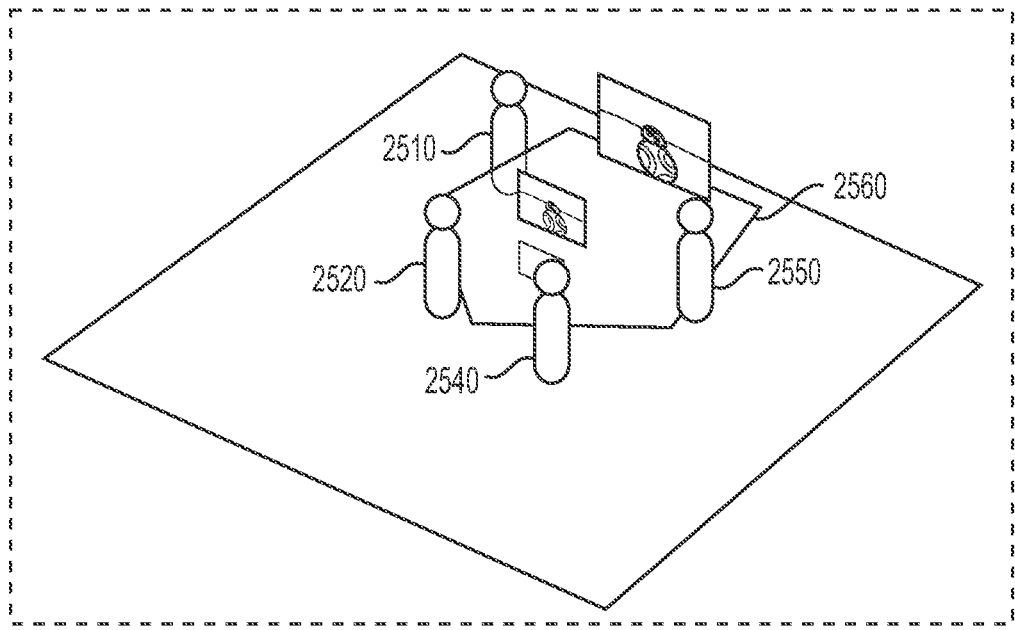

FIGS. 25A-25B illustrate an example of an interactive surface that is altered based on the number of users near it. In particular embodiments, the interactive surface may be altered based on the number of users in the virtual room or within a threshold distance of the interactive surface. As an example and not by way of limitation, referencing FIGS. 25A-25B, the rectangular interactive surface 2530 that appears when there are two users (e.g., users 2510 and 2520) may be altered to become the pentagonal interactive surface 2560 when there are four users (e.g., users 2510, 2520, 2530, and 2540). In particular embodiments, the virtual reality system may position or re-position avatars of users as needed based on information associated with the interactive surface. As an example and not by way of limitation, referencing FIGS. 25A-25B, the avatars of users 2510 and 2520 may be re-positioned from their initial positions in FIG. 25A to their positions in FIG. 25B (e.g., to accommodate the shape of the table). As another example and not by way of limitation, when an interactive surface is altered to be a ping pong table, users who were near the interactive surface may be re-positioned on opposite ends of the interactive surface (e.g., so that they can play ping pong against each other). In particular embodiments, the virtual reality system may employ transition effects (e.g., a telescoping effect) in re-positioning users.

In particular embodiments, the virtual room itself may be altered based on a current context. As an example and not by way of limitation, on a user's birthday, the virtual room may have birthday decorations. In particular embodiments, the interactive surface and/or the virtual room may be altered based on explicit inputs from a user requesting specific alterations. As an example and not by way of limitation, a user in the virtual room may request that the users be virtually "transported" to a particular virtual space corresponding to a particular visual media item (e.g., by accessing a portal tool and selecting a particular visual media item). In this example, the users in the virtual room may find themselves in a virtual room displaying the particular visual media item (i.e., in a virtual space that plays the particular visual media item). As another example and not by way of limitation, the user may simply access a suitable menu-option element while in the virtual room that accomplishes the same result. In particular embodiments, the virtual room may be altered by a voice command. As an example and not by way of limitation, the user may speak the word "disco room," which may cause the virtual room to be transformed into a disco-themed room.

In particular embodiments, there may be multiple interactive surfaces in a single virtual room. In particular embodiments, users in the virtual room can select one or more interactive surfaces from the available interactive surfaces with which they want to interact and may be able to switch among the available interactive surfaces at any point. At any given time, each of the interactive surfaces may have different activities in progress. In particular embodiments, users who are in the virtual room, just as in real life, may look around at the different interactive surfaces to see the different activities in progress. In particular embodiments, users may only be able to hear audio from other users who are at the same interactive surface (e.g., conversations among users who are at one interactive surface may not be audible to users who are at a different interactive surface). In particular embodiments, users in the room may be able to create a new interactive surface at any point to engage in a different activity with a different set of users. Alternatively, one or more of the users may simply exit the virtual room and create a new virtual room.

In particular embodiments, the virtual reality system may place restrictions on the users who may enter the virtual room. In particular embodiments, the virtual room may limit the number of users who may be in the virtual room. As an example and not by way of limitation, the virtual reality system may deny access to the virtual room when it reaches twenty users. In particular embodiments, the virtual room may restrict certain users based on information associated with the users. As an example and not by way of limitation, the virtual room may have privacy settings associated with it (e.g., as specified by a user who may have created the virtual room), such that only certain users may have access to it based on the privacy settings. In this example, the user who created the virtual room may specify that only friends of the user (e.g., first-degree connections on an online social network) may enter the virtual room, that only certain invited users may enter the virtual room, that only users of certain demographics or users with certain interests may enter the virtual room, or that only users who are members of certain groups (e.g., members of the group named "Cat Lovers Club"). As another example and not by way of limitation, the virtual room may have a minimum age requirement of eighteen, such that users below the age of eighteen are not permitted.

In particular embodiments, a user may be able to move around a virtual space such as a virtual room, just as though it were a physical room. As an example and not by way of limitation, the user may be able to use a controller joystick or some other form of input (e.g., gestures, gaze inputs, buttons, walking motions performed by the user) to move from one place to another within the room. In particular embodiments, the user may be able to move to pre-defined locations within the room. As an example and not by way of limitation, the user may be able to switch positions around a virtual surface by selecting a desired position. In particular embodiments, the switching of positions may be done with a transition effect like telescoping (e.g., to prevent the experience from being too jarring). In particular embodiments, to facilitate moving around a virtual space, the user may be provided with the ability to, at any time, summon an aerial view of at least a portion of the virtual space, from which the user may be able to select a location to move to. As an example and not by way of limitation, a user in a virtual room, at any point during a meeting, summon an aerial view of the room, and select a different location. As an example and not by way of limitation, the user may select a location corresponding to any of one or more empty "seats" around an interactive surface. In this example, the user may be prevented from selecting a seat that is occupied. In particular embodiments, a transition effect may be applied in transitioning between the aerial view and the ground view, or vice versa.

In particular embodiments, the virtual reality system may receive inputs from a controller system that may accept additional inputs from the user (i.e., inputs in addition to gaze inputs, tap inputs, or other inputs originating from the headset). The controller system may include one or more controllers. The controller system may provide an additional layer of control to the user for interacting more completely with the virtual space. In particular embodiments, the controller system may include a detection mechanism that determines the motion and/or location of one or more of the controllers. In particular embodiments, the detection mechanism may include a camera or other sensor that detects the location of the one or more controllers. The camera or other sensor may be positioned in a location remote from the controllers and/or may be positioned on the controller. In particular embodiments, the detection mechanism may also track the pitch, yaw, and roll of the controllers (e.g., tracking two or more infrared LED markers on each controller) to determine its orientation in six degrees of freedom. In particular embodiments, the detection mechanism may include a motion-tracking device (e.g., an inertial measuring unit that continuously tracks the controller's position and orientation in six degrees of freedom) within each of the controllers that may detect gestures and other types of motion inputs. Alternatively, the detection mechanism may employ outside-in tracking. In particular embodiments, the controllers may be held by or otherwise affixed to the person of the user (e.g., attached to the hands, the feet, the torso, etc.).

In particular embodiments, the user may be able to interact with the virtual space by physically interacting with the controller system. The controller system may interface with the virtual space to create an intuitive input means for the user to interact with the virtual space. In particular embodiments, the user may be able to see a rendering in the virtual space associated with the controllers. In particular embodiments, the rendering may include a representation of the user's hands, feet, torso, or other body areas, whose locations, orientations, proportions, and/or other properties may be based on inputs from the controllers. As an example and not by way of limitation, the user may be able to see renderings of both hands in the virtual space, with the locations and orientations of the hands corresponding to the locations and orientations of the respective controllers. In particular embodiments, the renderings may function as virtual objects in the virtual space that can cause real-time effects in the virtual space.

In particular embodiments, the user may be able to interact with virtual objects or the virtual space generally using inputs from the controllers. As an example and not by way of limitation, a rendering of the user's hand may be able to push or pull a virtual ball in the virtual space by correspondingly moving an associated controller (e.g., a handheld controller) in the direction of the intended push or pull when the rendering is near the virtual ball. As another example and not by way of limitation, the user may be able to kick a virtual ball by correspondingly moving an associated controller (e.g., a controller strapped to a foot) in an appropriate manner. In particular embodiments, the user may be able to hold tools (e.g., tools such as the ones described herein) and interact with virtual objects and the virtual space generally with those tools. As an example and not by way of limitation, the user may be able to pick up a ping pong paddle tool and play ping pong with another user on an interactive surface in a virtual room. As another example and not by way of limitation, the user may be able to hold a camera tool affixed to a rendering of the user's hand and may take a picture of a region of the virtual space with a suitable input. As another example and not by way of limitation, the user may be able to pull open a drawer of an interactive surface in a virtual room to pick up one or more tools. In particular embodiments, the user may be able to interact with the virtual space using voice commands. As an example and not by way of limitation, the user may be able to speak the words "delete ball," which may cause the virtual ball to disappear from the virtual space.

Figure 26A:
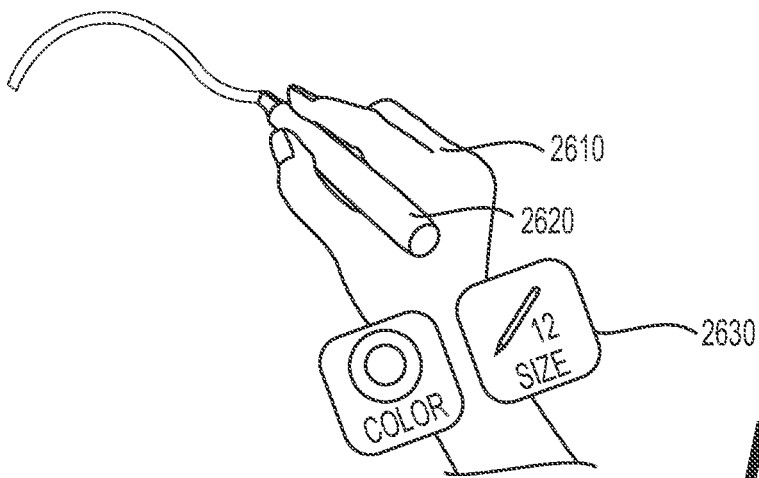
FIGS. 26A-26C illustrate example methods of interacting with the virtual space with multiple controllers.
Figure 26B:
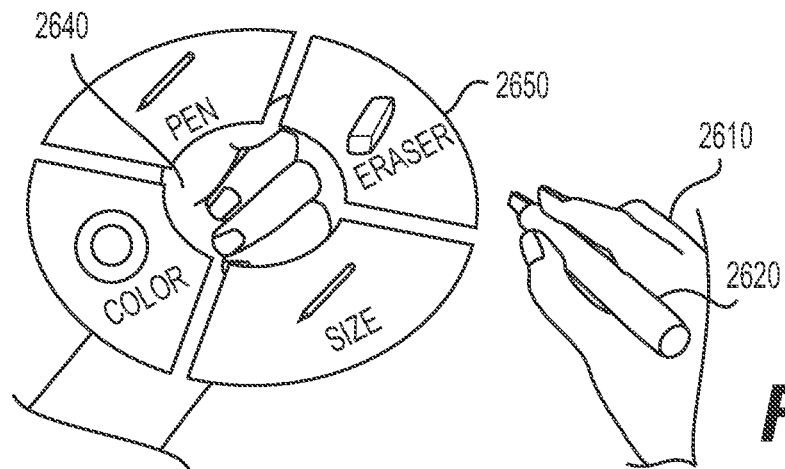
Figure 26C:
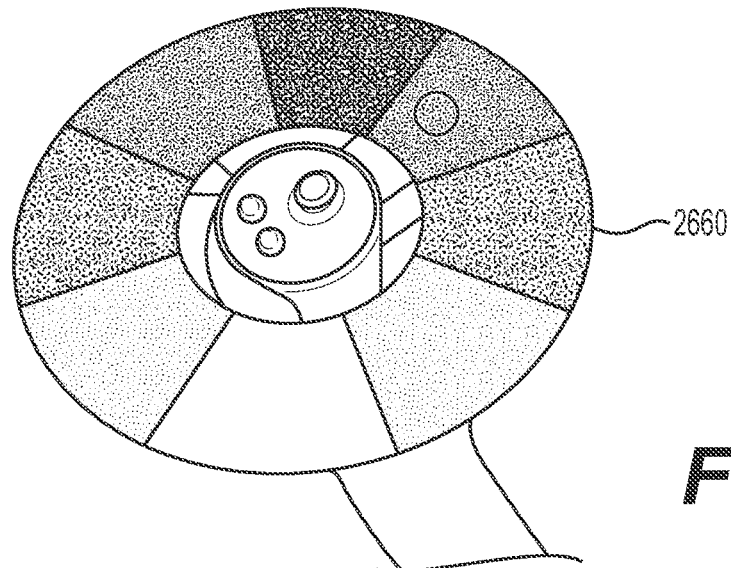

FIGS. 26A-26C illustrate example methods of interacting with the virtual space with multiple controllers. In particular embodiments, the controller system may allow for a method of interaction that uses inputs from at least two controllers that work synergistically for certain types of interaction. As an example and not by way of limitation, referencing FIG. 26A, when a user has selected the marker tool 2620 using a first controller associated with the rendering of the first hand 2610, one or more interactive elements (e.g., the size-adjustor element 2630) may be presented at a location in association with the rendering of the first hand 2610 (e.g., whenever the marker tool 2620 is held by the first hand, or following a trigger gesture). In this example, the user may, using a second controller associated with a rendering of a second hand, select one or more of the interactive elements to alter the size or color of the marker tool 2620. As another example and not by way of limitation, referencing FIG. 26B, a first controller (e.g., held by or positioned on the left hand of the user, corresponding to the rendering of the left hand 2640) may be used to perform a trigger gesture (which may involve, for example, rotating the forearm of the left hand to display the underside of the wrist), upon which the panel (or menu) of items 2650 may be displayed in the virtual space. In particular embodiments, the panel of items may appear in a region associated with the first controller such that the panel of items moves along with the first controller. As an example and not by way of limitation, referencing FIG. 26B, the panel of items may be positioned on the rendering of the left hand 2640 of the user, such that in the virtual place, the panel may follow the motions of the rendering of the left hand 2640. In particular embodiments, to make the usage of the menu of items intuitive for the user, the panel of items may appear to be present at a location in the virtual space that conceptually corresponds to an easily accessible region of the user's body (e.g., a rendering of the hand holding the first controller, a rendering of the user's torso). In particular embodiments, the menu of items that appear in the panel may be based on a current context, such as a property of a particular tool that the user may be holding or about to hold (or otherwise select), information associated with the user, a property associated with the current virtual space, any other contextual factors described herein, etc. As an example and not by way of limitation, if the user is holding a paintbrush tool (e.g., in association with a rendering of the user's right hand associated with a second controller, in association with a reticle), the menu of items may be a menu of different colors. Similarly, the manner in which the panel of items appears may be based on a current context. Building on the previous example and not by way of limitation, if the user is holding a paintbrush tool, the menu of different colors may appear on a rendering of an artist's palette that appears to be resting on a rendering of the hand associated with the first controller (e.g., the left hand). As another example and not by way of limitation, the virtual reality system may determine that the user is reaching for a paintbrush tool and may pre-emptively display the menu of items associated with the paintbrush tool (including, for example, a virtual palette of colors) in a suitable area. As another example and not by way of limitation, if the user is in a virtual space associated with a particular interactive game, the virtual reality system may determine that based on the context (as determined by a property associated with the virtual space), the menu of items should include one or more items related to the particular interactive game.

In particular embodiments, the second controller (e.g., held by or positioned on the right hand of the user) may be used to select an item among the panel of items. As an example and not by way of limitation, the user may move, in the virtual space, a rendering of a hand associated with the second controller (e.g., referencing FIG. 26B, the rendering of the right hand 2610) by correspondingly moving the second controller to a desired item and select it by simply "pointing" a finger or a tool held by the rendering of the hand associated with the second controller at the desired item with the rendering of the hand (e.g., for a threshold period of time) or by pointing and then performing a suitable gesture (e.g., with the controller, with the reticle, etc.). In this example, the user may press a button on the associated controller (e.g., the second controller) to initiate pointing. Alternatively or additionally, the user may simply raise a finger that was in contact with a button on the controller such that it is no longer in contact with the button (e.g., as may happen naturally and intuitively if the user attempts to point in real life), the detection of which may initiate pointing of the corresponding rendering. Referencing FIGS. 26B-26C, the user may have selected the interactive element corresponding to a color adjuster in FIG. 26B, which may trigger the display of the color palette 2660 in FIG. 26C.

In particular embodiments, the controllers may include buttons or touch-detection sites to provide further inputs to the virtual reality system. Building on the previous examples and not by way of limitation, the user may select an item in a menu of items by pointing at it and then pushing an appropriate button. As another example and not by way of limitation, once the user picks up a camera tool, the user may take a picture by tapping an appropriate touch-detection sites on the controller.

In particular embodiments, the menu of items may be caused to appear at any time in response to a suitable user input (e.g., pressing a virtual button or a physical button on a controller). The menu of items may appear in any suitable location. As an example and not by way of limitation, it may appear floating in front of the user in a particular location of the virtual space. As another example and not by way of limitation, it may appear floating above a forearm or hand of the user and may be associated with that forearm or hand such that it follows the motions of the forearm or hand to remain hovering over it.

Figure 27:
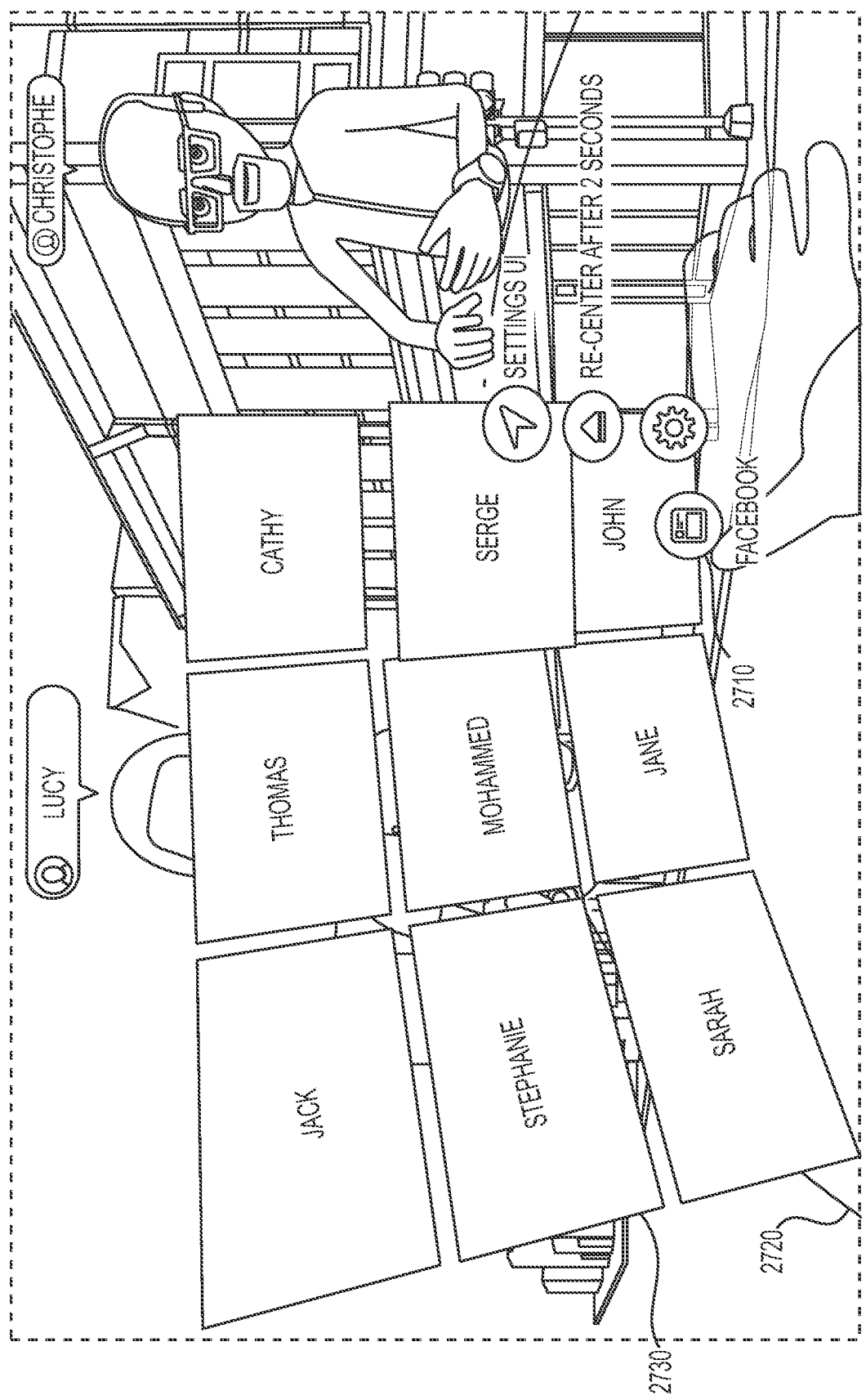
FIG. 27 illustrates an example of a user in a virtual room browsing a friend list.

FIG. 27 illustrates an example of a user in a virtual room browsing a friend list. In particular embodiments, the virtual reality system may allow for real-time virtual communications among users. In particular embodiments, the communications may be associated or integrated with a communications application (e.g., a communications application associated with the social-networking system 160) that has information about the user's friends or contacts. Users may be able to access a friend or contact list and quickly initiate communications with other users. As an example and not by way of limitation, referencing FIG. 27, a user may activate an interactive element associated with an online social network (e.g., the element 2710 associated with the social-networking system 160), which may summon a menu of contact-items (e.g., the contact item 2730 corresponding to a contact named "Stephanie"), any of which may be activate to initiate a communication with the corresponding contact. In particular embodiments, as described elsewhere herein, these communications may occur within a virtual room (i.e., a virtual room may be a communication session among the users present in the virtual room). In these embodiments, a particular user may join or create a virtual room, and other users may join subsequently (e.g., on their own initiative if they have the requisite permissions, or upon receiving an invite). A user in the virtual room may be able to see avatars of other users. As an example and not by way of limitation, referencing FIG. 27, the user may be in a virtual room with two other users (e.g., the users "Lucy" and "Christophe"), whose avatars may be positioned around the interactive surface 2720. The avatars may move in real-time to reflect motions made by the respective users. As an example and not by way of limitation, when a user raises a right hand, the avatar of the user may correspondingly raise its hand. As another example and not by way of limitation, when a user speaks, the avatar of the user may correspondingly move its mouth to convey that the respective user is speaking. In particular embodiments, as further described elsewhere herein, the virtual room may allow for communications among the users within. The users may have microphones that capture audio that is then streamed to the other users in the virtual room, allowing the users in the communication session to communicate among themselves. The combination of the audio with the avatar renderings (e.g., renderings that simulate body language, speech, and other motions of the user) may make for a more natural and immersive experience for the user, simulating a real-life conversation. In particular embodiments, each user may be able to choose whether or not to have the user's audio or video captured and streamed (e.g., by activating or deactivating a "mute" button or a "camera off" button).

In particular embodiments, the users in a communication session may be able to specify the types of communication (termed "communication types" herein) from each user that are to be streamed or rendered in the virtual space during the communication session, and the virtual reality system may accommodate those specifications to the extent possible. In particular embodiments, each user may specify what the virtual reality system may render or stream to the other users in the communication session. As an example and not by way of limitation, a particular user may specify that only the voice of the particular user may be streamed to the other users in the communication session. As another example and not by way of limitation, the particular user may specify that only an avatar of the particular user may be rendered for the other users in the communication session. In this example, the other users may be able to see the avatar representation of the particular user and may be able to view any body language (e.g., a hand wave, a particular stance), facial expressions, or sign language communications, but may not be able to hear audio from the particular user. As another example and not by way of limitation, the particular user may specify that only a video of the particular user (e.g., a video captured in real-time by a camera device directed at the particular user) may be streamed to the other users in the communication session. Just as in the previous example, in this example, the other users may be able to see the avatar representation of the particular user and may be able to view any body language or sign language communications. As another example and not by way of limitation, the particular user may specify that voice and video, or voice and an avatar, or voice and an avatar and a video (e.g., the video appearing separately, or jointly with the avatar such that the face of the avatar may be a video of the user's face) may be streamed and/or rendered to the other users. In particular embodiments, the particular user may be able to specify that a first set of users in the communication session may receive certain types of communications while a second set of users in the communication session may receive different types of communications. As an example and not by way of limitation, the particular user may specify that in a communication session including a friend and several strangers, only the friend may view a video and an avatar of the particular user, while the strangers may be only permitted to view an avatar of the particular user. In particular embodiments, a particular user may also specify the types of communication to be received from another user in the communication session. As an example and not by way of limitation, the particular user may specify that a certain other user in the communication session may not send video to the particular user. In particular embodiments, the types of communication that a particular user may receive from another user in the communication session may be the same as the types of communication the particular user sends to the other user. As an example and not by way of limitation, if the particular user only sends audio to the other user, the particular user may only receive audio from the other user. By contrast, in particular embodiments, the types of communication that a particular user may receive from another user in the communication session may not necessarily be the same as the types of communication the particular user sends to the other user. As an example and not by way of limitation, if the particular user only sends audio to the other user, the particular user may still receive audio and video from the other user. In addition to the examples described herein, any suitable combination of communication types may be sent and received among one or more users in the communication session in any suitable manner (e.g., as individually specified by each of one or more users). In particular embodiments, users may be able to change the types of communications sent and/or received at any point in the communication session.

In particular embodiments, a communication session may be a one-way communication. The one-way communication can be directed at a single other user, a group of users, or to the public generally. In particular embodiments, the user may record a communication and may save it. In these embodiments, the user may subsequently send the recorded communication to a single other user, a group of users, or to the public generally. In particular embodiments, the user may also receive one-way communications and/or recorded communications.

In particular embodiments, these communication sessions may not be limited to a virtual room and may occur at any point. A caller-user may initiate a communication session with one or more callee-users by sending them a communication request. As an example and not by way of limitation, the caller-user may be in a virtual space of a game. In this example, while the game is still ongoing, the caller-user may send a communication request to one or more callee-users (e.g., social connections on an online social network, other users of a gaming network associated with the current game). Similarly, a callee-user may accept or refuse a communication request from a caller-user at any point. As an example and not by way of limitation, a callee-user may be watching a 360 video in a virtual space when the callee-user receives a communication request form a caller-user. The callee-user may choose to either accept or refuse the communication request by submitting the appropriate input. In this example, from the callee-user's perspective, the callee-user may see an avatar or other representation of the caller-user and may also see an indication asking to join a virtual space (e.g., a virtual room, a virtual space of a game) together. If the callee-user accepts, the avatar or other representation of the caller-user may morph into the virtual space of the callee-user. In particular embodiments, a current activity of the caller-user or the callee-users may continue uninterrupted during the communication session. As an example and not by way of limitation, a callee-user may be in the middle of playing a game on the virtual reality system when a communication request is received and accepted. In this example, when the callee-user accepts the communication request, one or more windows may appear within the game environment (e.g., on a corner of the display) displaying the videos or avatars of other users part of the communication session. Alternatively, the videos or avatars may be seamlessly integrated into the video game environment (e.g., inserting avatars of the other users within the game environment). The game may continue without interruption as the callee-user communicates with the other users in the communication session.

Figure 28:
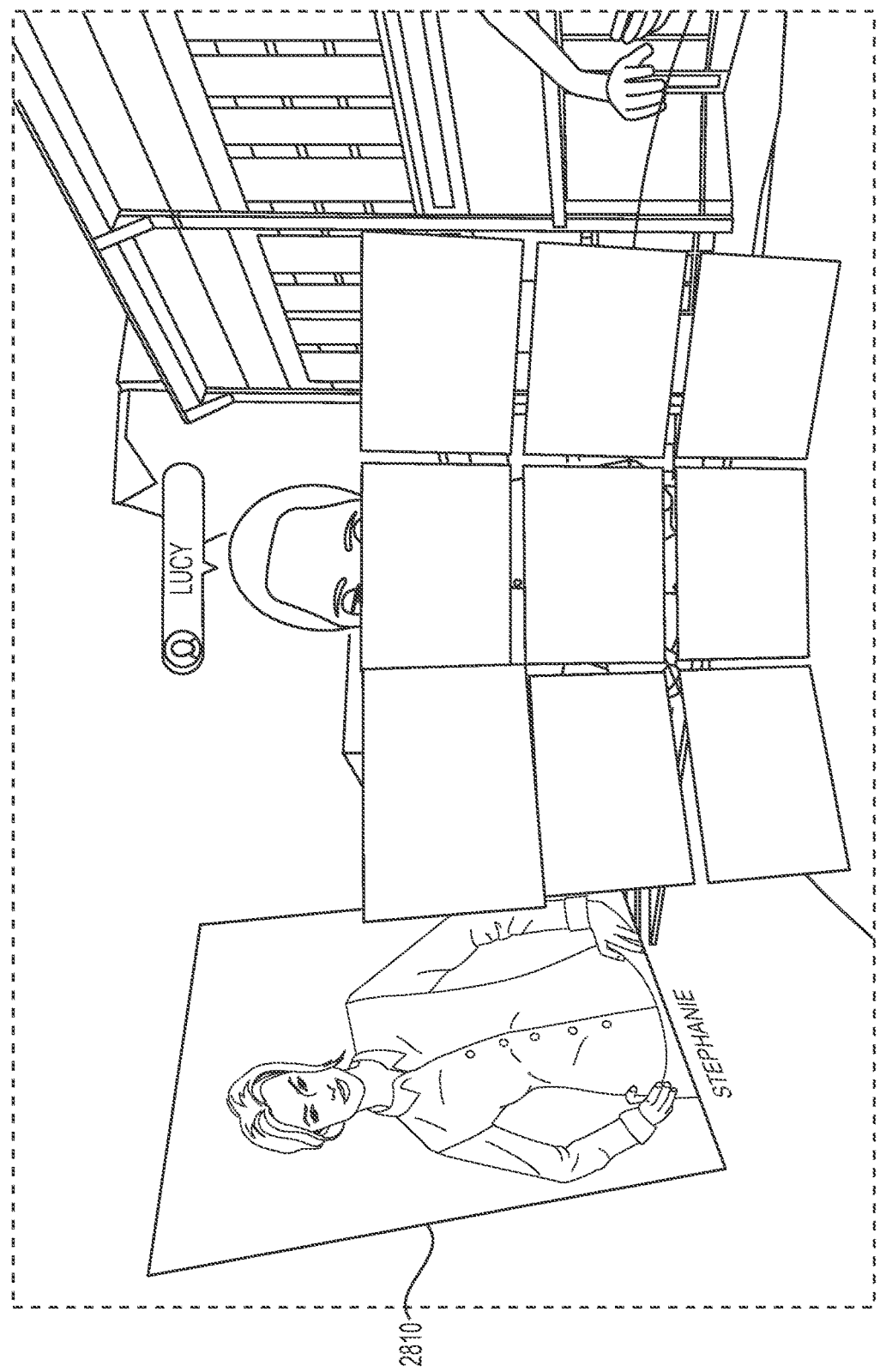
FIG. 28 illustrates an example of a communication session in a virtual room including a user who is not using a virtual reality system.

FIG. 28 illustrates an example of a communication session in a virtual room including a user who is not using a virtual reality system. In particular embodiments, a communication session may include a particular user who may not be using a virtual reality system to communicate. As an example and not by way of limitation, the particular user may be communicating via a device that does not have virtual reality functionality (e.g., a phone without such functionality). In such cases, the virtual reality system may render in the virtual space any available information that the particular user has permitted it to render. As an example and not by way of limitation, the particular user may have permitted the virtual reality system to stream the voice of the particular user (e.g., captured on a phone of the particular user) in the virtual space to the other users in the communication session. As another example and not by way of limitation, referencing FIG. 28, the particular user (e.g., "Stephanie") may have permitted the virtual reality system to stream a video or image of the particular user (e.g., captured on a front-facing camera of the phone of the particular user). In this example, the other users in the communication session may be able to view a subregion in the display (e.g., within the window object 2810) that streams the image or video of the particular user (e.g., "Stephanie"). In this example, on the particular user's device, an associated display screen may display a view of the virtual space (e.g., a virtual room in which avatars of the other users in the communication session may be present).

In particular embodiments, the subregion may be within a window object that one or more of the other users in the communication session may be able to manipulate and move around within the virtual space (e.g., using a controller input or a gaze input). As an example and not by way of limitation, the window object may appear within a virtual room and may display a video of a user who is not using a virtual reality system. In this example, the other users (who may be using a virtual reality system) may have corresponding avatars and may appear to be around an interactive surface. The other users in this example may move the window object around the virtual room. In particular embodiments, moving the window object may adjust the perspective of the user associated with the window object (e.g., the user who is not using a virtual reality system). As an example and not by way of limitation, the window object may behave as though there were a camera affixed to the window object that streams video to the user associated with the window object, such that the user associated with the window object sees a region of the virtual space that the window object faces. In this example, from the viewpoint of the user associated with the window object, this window may function as a "virtual window" into the virtual space.

Figure 29A:
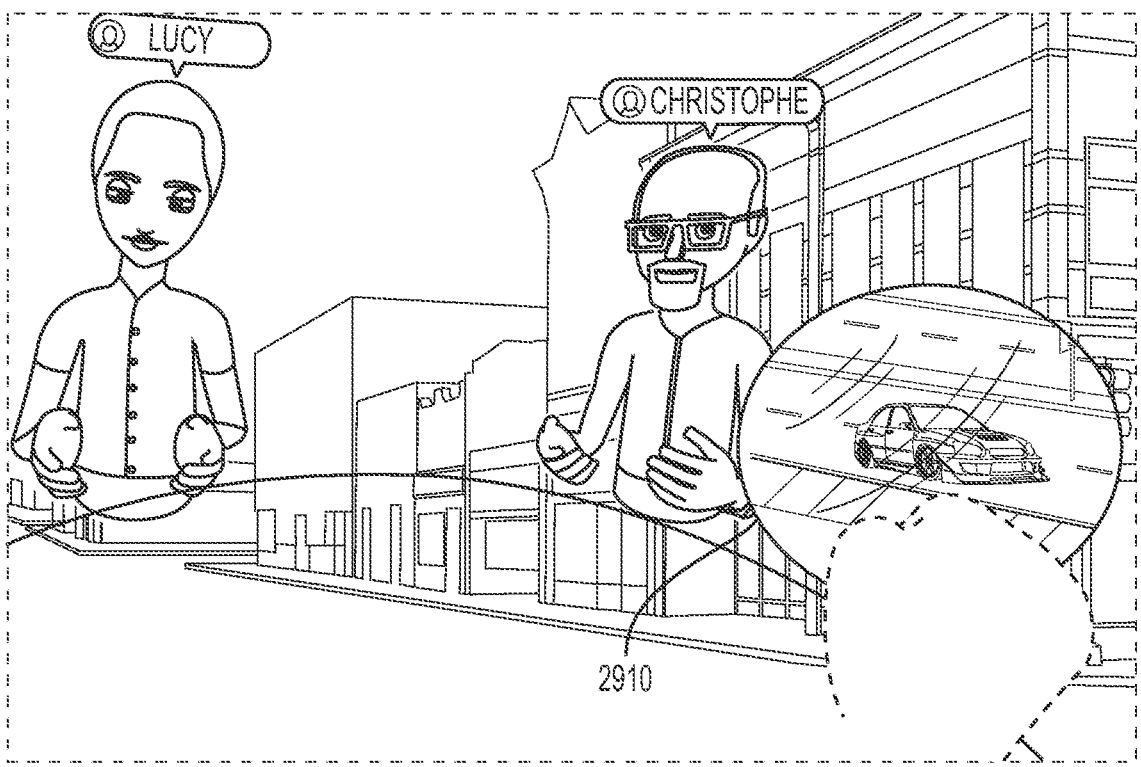
FIGS. 29A-29C illustrate an example of sharing and interacting with immersive content in a virtual room.
Figure 29B:
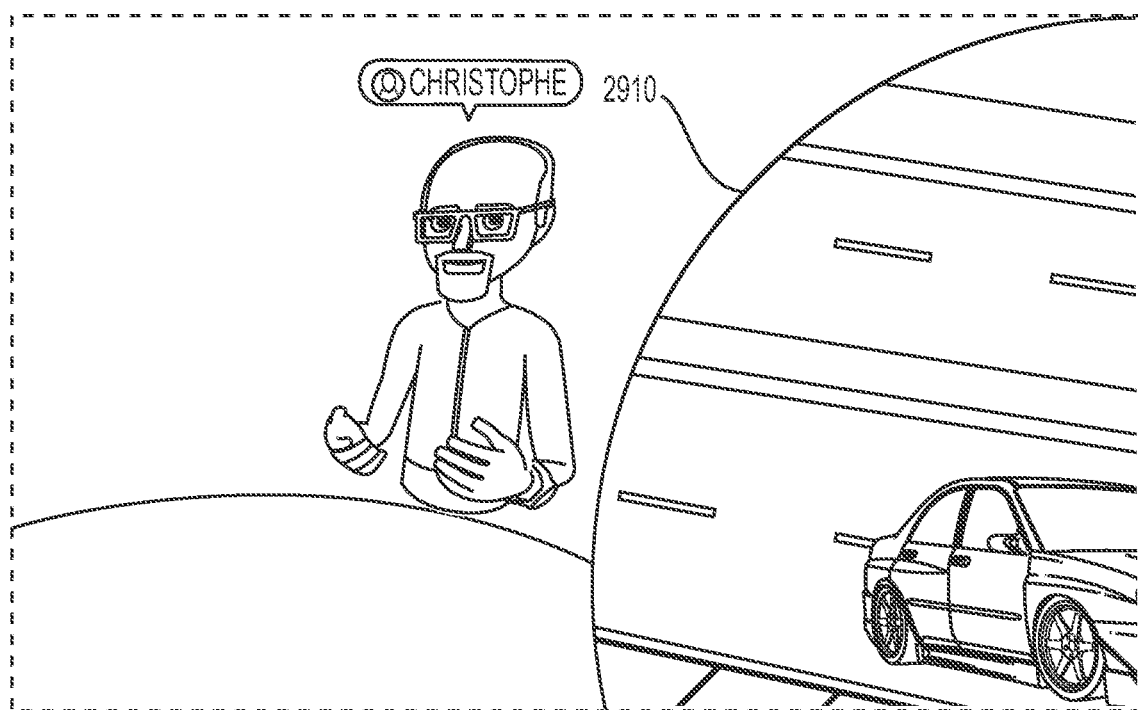
Figure 29C:
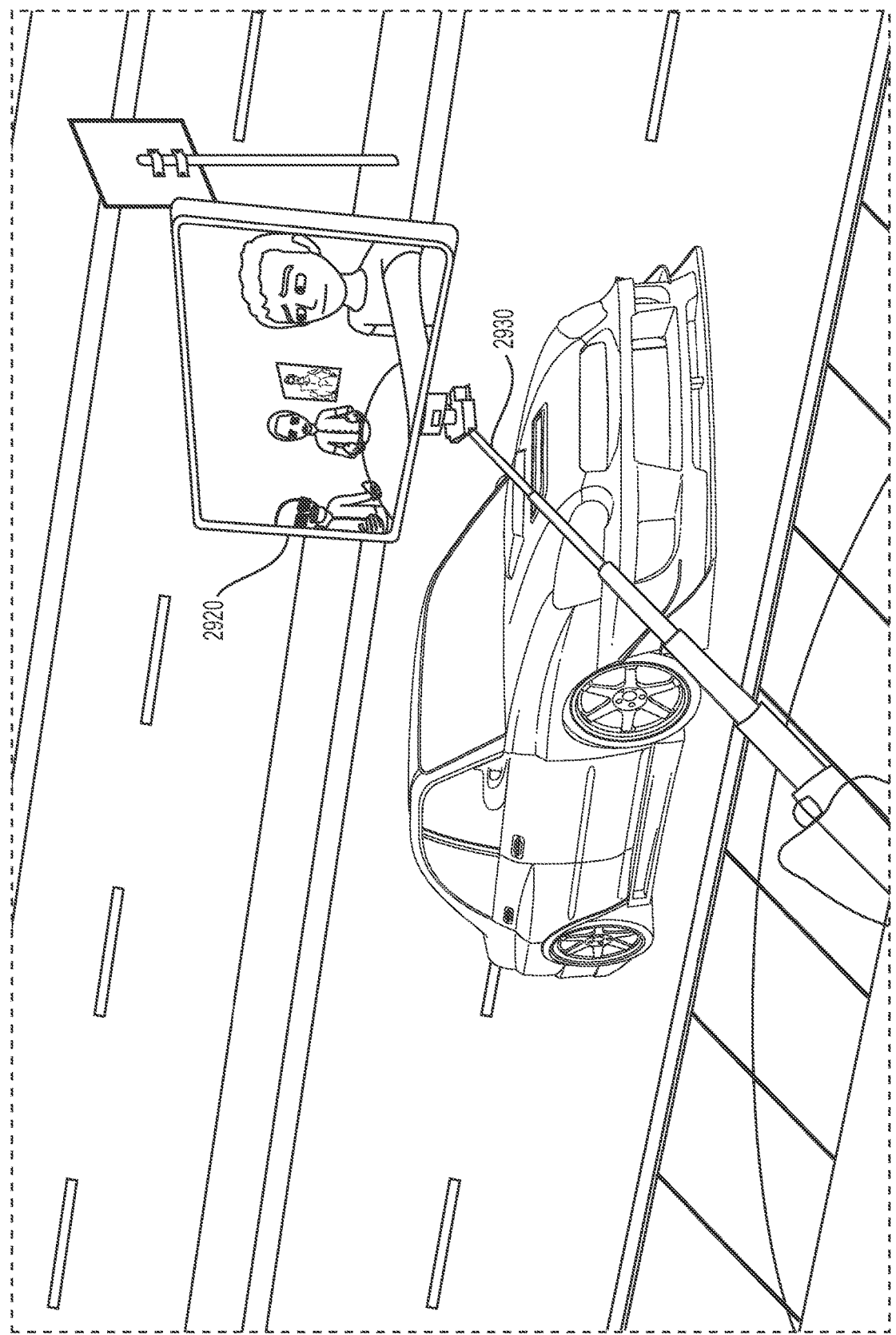

FIGS. 29A-29C illustrate an example of sharing and interacting with immersive content in a virtual room. In particular embodiments, users in the communication session can share in one or more of the interactive experiences described herein. As an example and not by way of limitation, for a communication session hosted in a virtual room, the users may be able to pick up a ping pong paddle tool and play ping pong with each other during the communication session. As another example and not by way of limitation, the users may be able to view a slide show presentation, an image, or a video together. In this example, the content that is being watched (e.g., a slide show, a video), may be two-dimensional or three-dimensional, and may be flat or non-flat content (e.g., spherical content, 360-degree content, 180-degree content). For example, referencing FIGS. 29A-29B, a particular user may select the spherical content 2910 for sharing with other users in the illustrated virtual room (e.g., with a grab input using a hand controller of the particular user, and pulling it toward the particular user to enlarge it as illustrated in the sequence of FIGS. 29A-29B). In this example, referencing FIG. 29C, the virtual space in which the spherical content 2910 may have As another example and not by way of limitation, referencing FIG. 29C, the users may be able to pick up the camera tool 2920 and take a picture of the virtual space. In this example, the camera tool may be attached to the virtual stick or extension 2930 to allow for the capturing of "selfie" images (e.g., a user may pick up the virtual stick with the camera tool, gather together the avatars, windows, or other representations of the users in the communication session and capture a group selfie image). The functionalities described in the context of the virtual mirror tool may also apply to the camera tool.

In particular embodiments, when a callee-user accepts a communication from a caller-user, the communication may appear in the virtual space as a window (e.g., if the caller-user is not using a virtual reality system) or as an avatar (e.g., if the caller-user is using a virtual reality system) visible and/or audible to only the callee-user and not to any other users in the virtual space (e.g., if the callee-user is in a virtual room or elsewhere with other users in a communication session). Likewise, in particular embodiments, the caller-user may not be able to see or hear anything from the other users. In particular embodiments, the callee-user may be able to make the communication visible and/or audible to the other users in the virtual space by performing a suitable input (e.g., by picking up the window or avatar with a gesture and placing the window or avatar in a particular region of the virtual space, such as on an interactive surface). In particular embodiments, at this point, any other users in the virtual space may also be able to see the window or the avatar, and may be able to communicate with the caller-user, who may likewise be able to see and hear the other users in the virtual space. In particular embodiments, the virtual reality system may also render a window that shows the callee-user (and/or other the other users) what the caller-user is seeing of the virtual space that the callee-user is in. This window may function like the virtual mirror tool described herein.

Figure 30A:
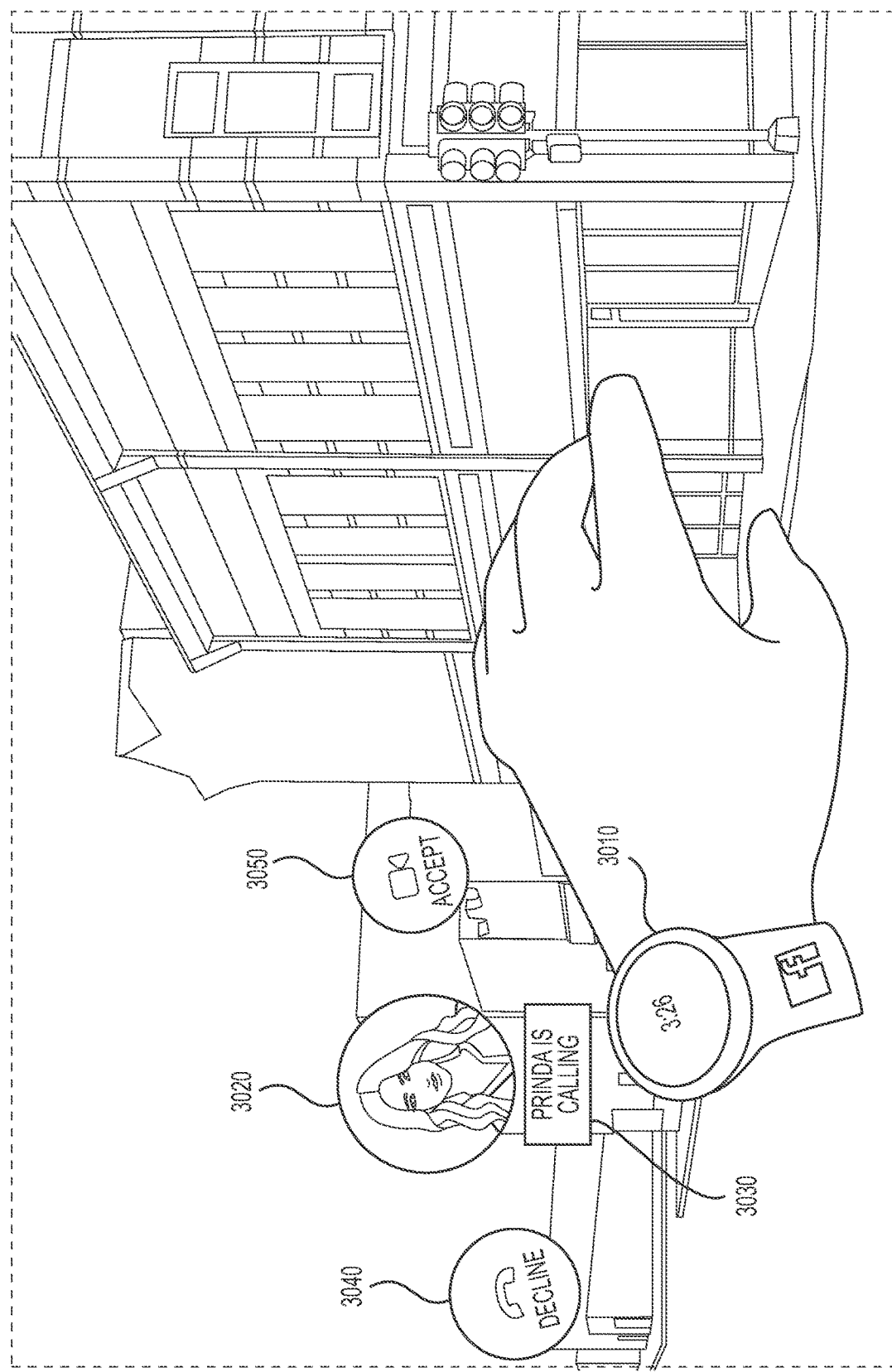
FIGS. 30A-30B illustrate an example of the receipt of an incoming communication on a virtual watch.
Figure 30B:
Figure 31A:
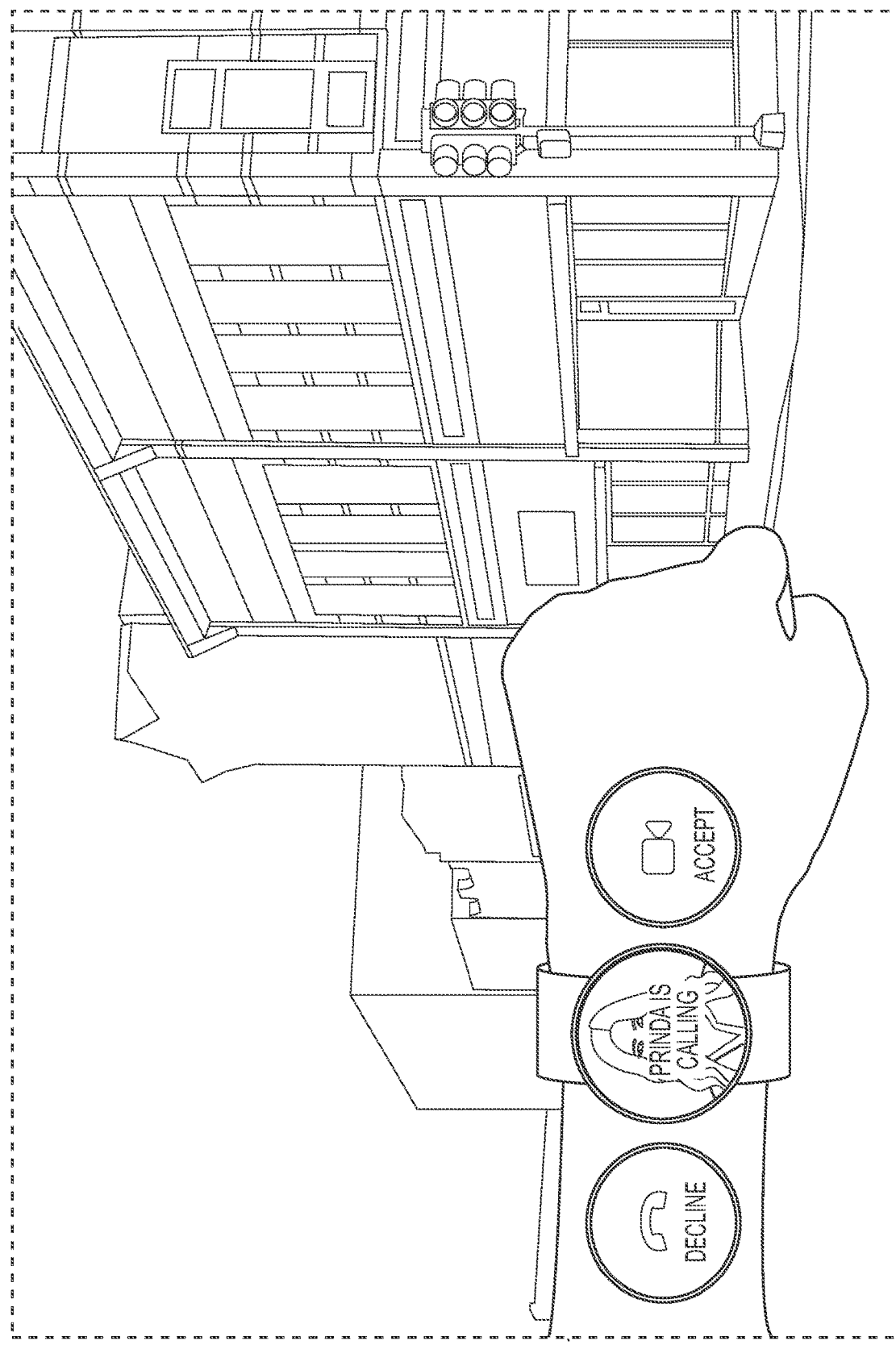
FIGS. 31A-31B illustrate another example of the receipt of an incoming communication on a virtual watch.
Figure 31B:
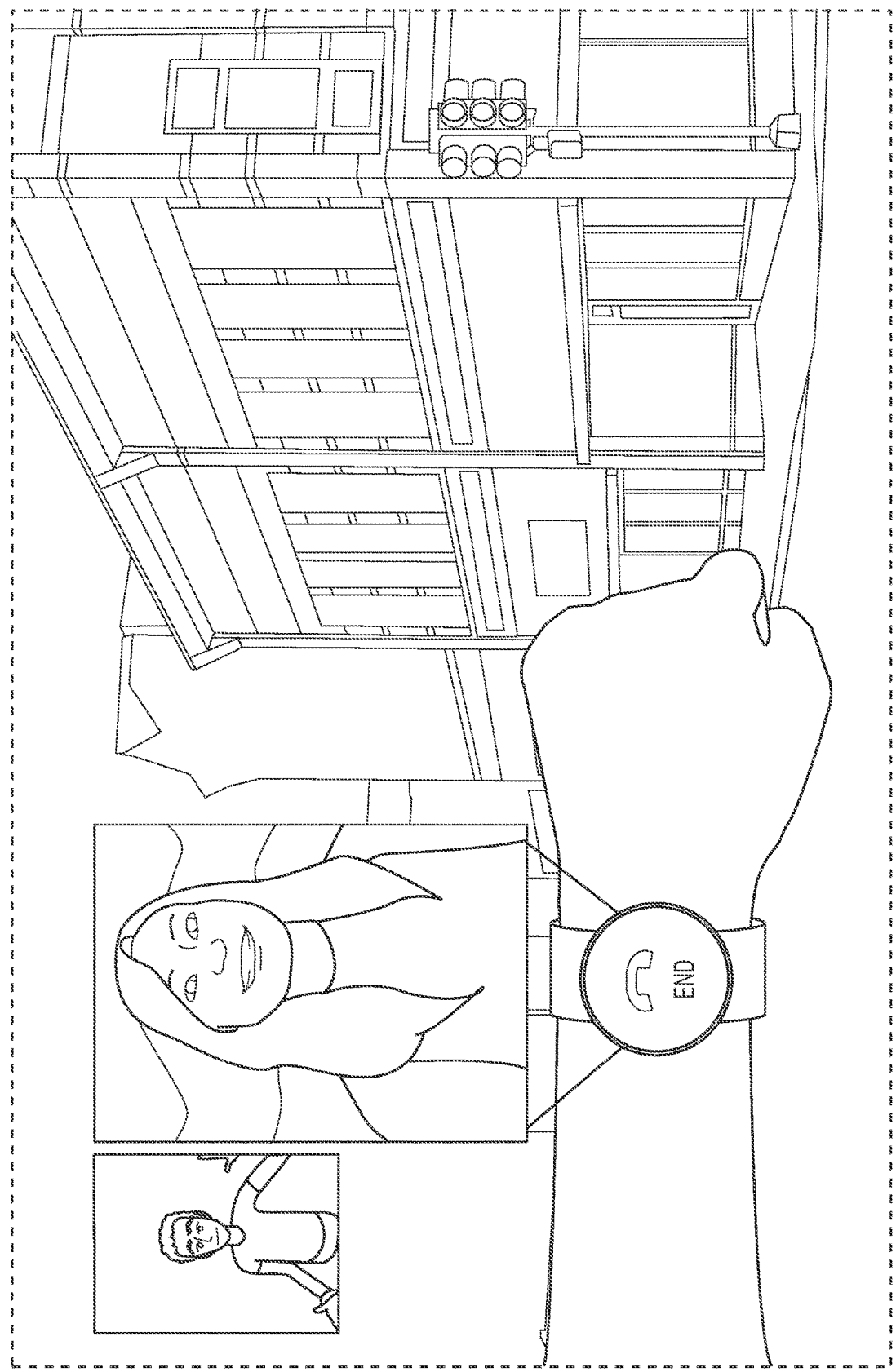

FIGS. 30A-30B illustrate an example of the receipt of an incoming communication on a virtual watch. FIGS. 31A-31B illustrate another example of the receipt of an incoming communication on a virtual watch. In particular embodiments, communication requests may be received via a virtual watch (or via another similar virtual device such as a virtual phone, or a wristband) that may be secured to a rendering of one of the user's hands or otherwise associated with a body area of the user (e.g., on a rendering of a torso, belt, or pants pocket of the user). Within the virtual space, the virtual watch may appear to be a watch (e.g., one that displays the current time or other suitable information) attached to a rendering of the user's hand such that the user may be able to look at the virtual watch at any point by bringing the rendering of the hand into the display region (e.g., by aiming the user's head toward the user's hand, by raising an associated controller to be in the user's line of sight in the virtual space, etc.). Receiving a communication request in such a manner may be conceptually intuitive to the user. In particular embodiments, when the user receives a communication request, the user may be notified in a suitable manner to check the virtual watch. As an example and not by way of limitation, a notification may appear on a heads up display, prompting the user to check the virtual watch. As another example and not by way of limitation, a controller associated with a hand that virtually "wears" the watch (e.g., a controller held by or strapped to the user's left hand) may vibrate, prompting the user to check the virtual watch. In particular embodiments, the user may check the virtual watch by raising the associated controller to the field of the view of the user, thereby causing the display of a rendering of the hand and the watch. In particular embodiments, displayed on or adjacent to the watch may be menu-option elements for accepting or refusing the communication session. As an example and not by way of limitation, referencing FIG. 30A, when a user raises a controller associated with a rendered hand wearing the virtual watch 3010, one or more notification elements may be presented in association with the virtual watch. In this example, these notification elements may include the image element 3030 (e.g., a profile picture/video of the user who is sending the communication request, a live-streaming video or other representation of the user who is sending the communication request, etc.) and the text-notification element 3030. In this example, along with the notification elements, the "Decline" interactive element 3040 and the "Accept" interactive element 3050 may be presented to allow the user associated with the virtual watch to either decline or accept the communication request. In particular embodiments, any suitable relevant menu-option elements may be displayed to facilitate communication, such as an element to send a text communication (e.g., a text communication that reads, "I can't talk right now") or an element to adjust one or more settings. In particular embodiments, if a user chooses to accept a communication request, a communication session may be initiated. If the user who requested the communication is using a virtual reality system, an avatar of that user may be rendered in the virtual space along with the user who accepted the communication request. If the user who requested the communication is not using a virtual reality system, but is using a device with video (or audio) capability, the communication session may be in the form of a video stream (or audio stream). As an example and not by way of limitation, referencing FIG. 30B, the user who requested the communication (e.g., the user "Prinda") may be using a phone (or another non-virtual reality device with video and audio capabilities), in which case a video stream of the user who requested the communication (e.g., the user "Prinda") may be displayed in the window object 3060. In this example a representation of what is being transmitted to the user who requested the communication (e.g., the user "Prinda") may be displayed in the window object 3070. FIGS. 31A-31B illustrate a similar sequence of events as in FIGS. 30A-30B, with a slightly different interface.

The user may select a desired element (e.g., on a virtual watch) using any suitable input, such as the ones described herein. As an example and not by way of limitation, the user may aim a reticle at the desired element for a threshold period of time. As another example and not by way of limitation, the user may press an appropriate button on a controller. As another example and not by way of limitation, the user may bring a rendering of the user's other hand (i.e., the hand that is not "wearing" the virtual watch) and select the desired element by pointing at it for a threshold period of time or by pointing at it and pressing a button on a controller associated with the other hand. In particular embodiments, when the user chooses the element for accepting a communication session, other elements may appear that allow the user to specify the types of communication that are to be streamed or rendered to the other users in the communication session and the types of communication that are to be received. As an example and not by way of limitation, the user may wish to reduce bandwidth and may opt to not receive video streams.

Figure 32:
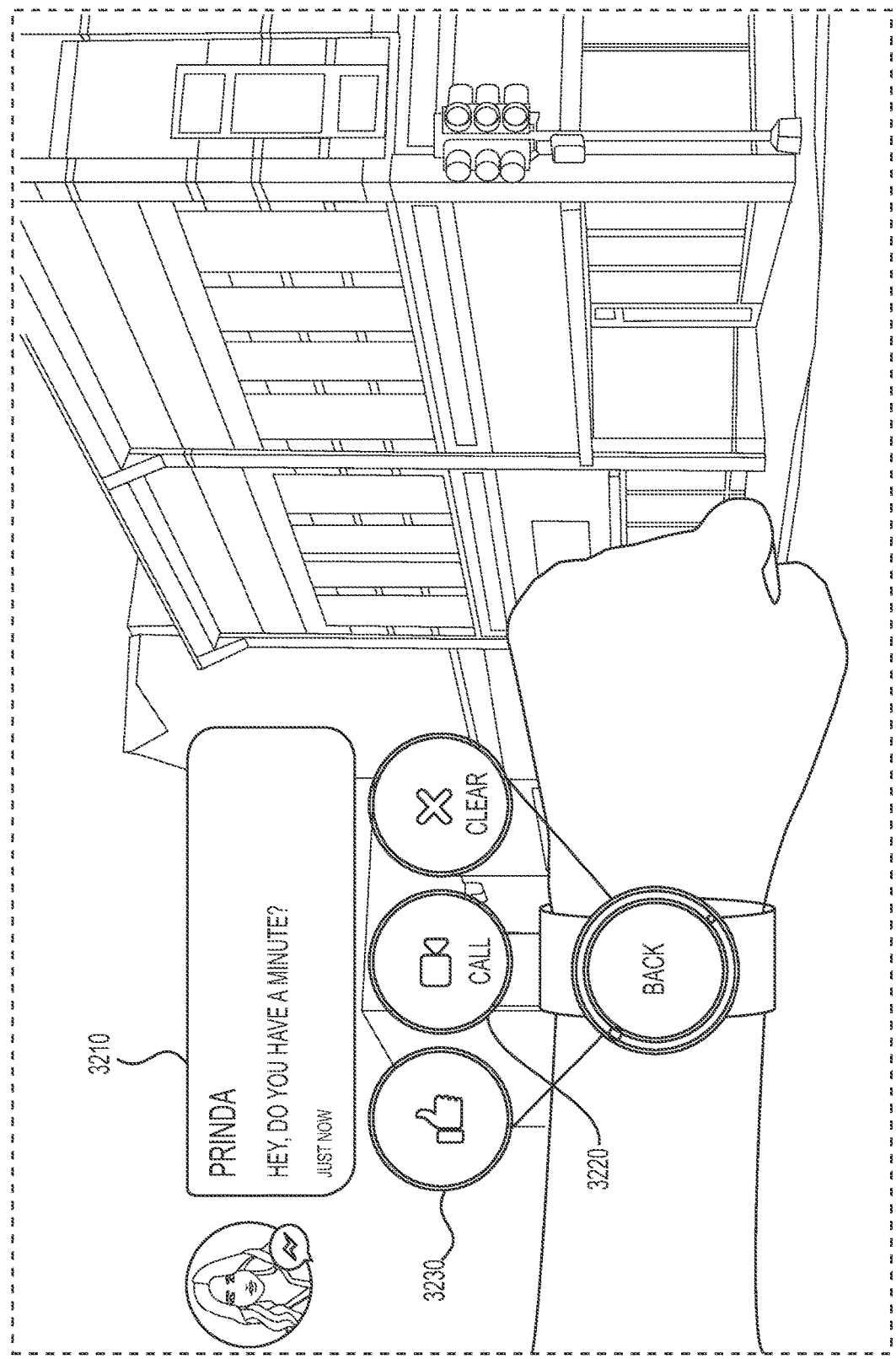
FIG. 32 illustrates an example of the receipt of a text communication on a virtual watch.

FIG. 32 illustrates an example of the receipt of a text communication on a virtual watch. In particular embodiments, the virtual watch may be a gateway for receiving text communications from other users. As an example and not by way of limitation, referencing FIG. 32, a user may receive a text message within the text notification element 3210. In this example, the user who received the text message may initiate a communication request with the user who sent the text message (e.g., the user "Prinda") by selecting the interactive element 3220, submit a suggested text message reply (e.g., by selecting the interactive element 3230, which is currently suggesting replying with a thumbs-up emoji), or compose a message to send back (e.g., a text message, an audio message, a video message, etc.).

Figure 33:
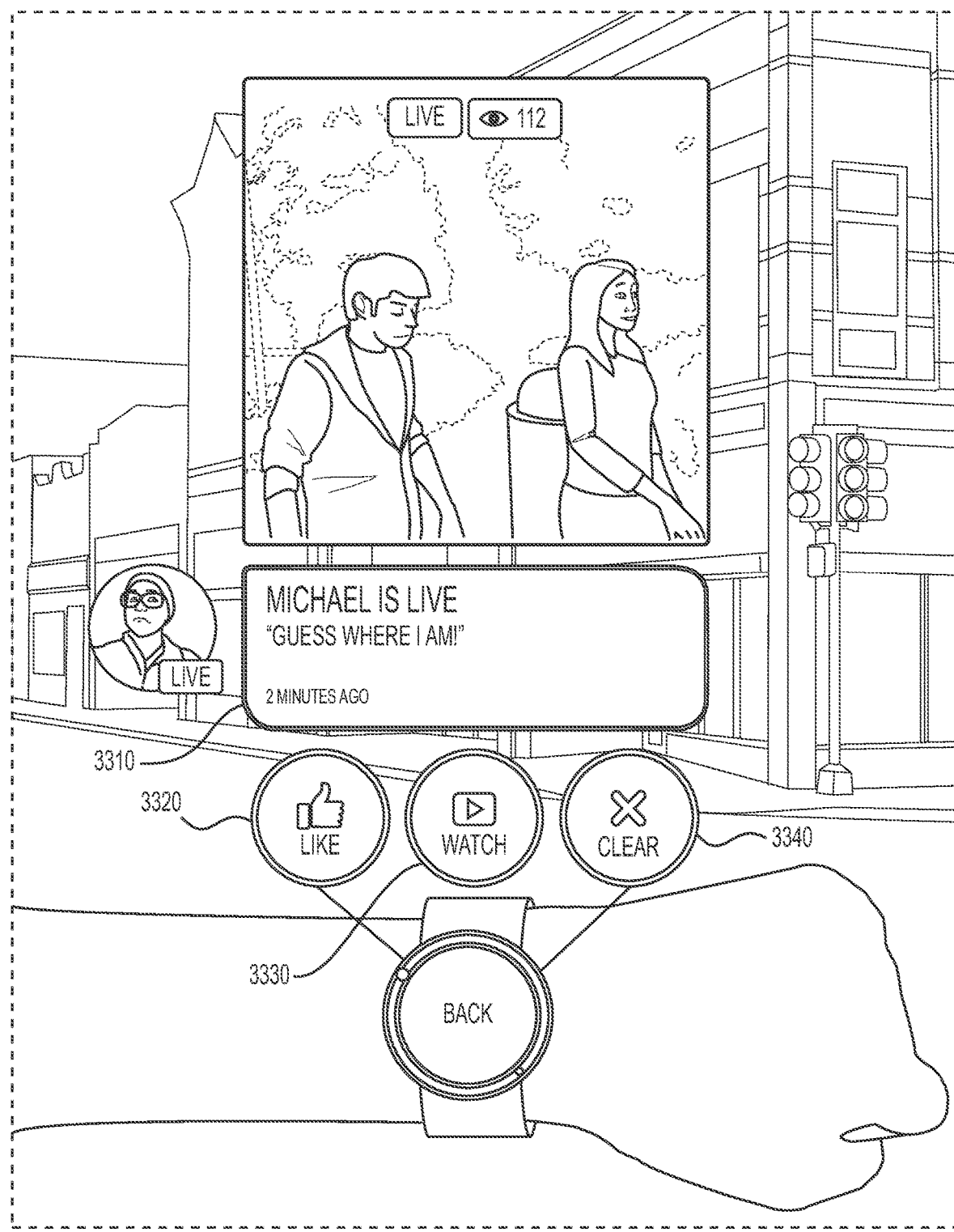
FIG. 33 illustrates an example of the receipt of a live broadcast communication on a virtual watch.

FIG. 33 illustrates an example of the receipt of a live broadcast communication on a virtual watch. In particular embodiments, a live broadcast transmitted by a broadcasting user may be sent to a recipient user while the recipient user is in a virtual space. As an example and not by way of limitation, referencing FIG. 33, the recipient user may receive one or more notification elements indicating a broadcast. For example, the recipient user may receive the image element 3340 (e.g., which may be a single image frame of the broadcast, a silent video of the broadcast, a low-quality version of the broadcast, etc.) and the message notification 3310 (e.g., including a message from the user that describes, discusses, or is otherwise related to the broadcast). In this example, the user may choose to submit a reaction (e.g., by selecting the "like" button 3320), watch the broadcast (e.g., by selecting the "watch" button 3330), or clear all notifications about the broadcast (e.g., by selecting the "clear" button 3340). The live broadcast may either have been targeted at the recipient user (or a group of users, including the recipient user) or may have been pushed to all contacts of the broadcasting user. Although the disclosure of the concepts above focus on a virtual watch, it is contemplated that the same concepts could be applied in any other suitable manner (e.g., with a different type of virtual tool, or without any specific tool).

In particular embodiments, as mentioned elsewhere herein, the virtual reality system may render facial expressions and body language on a user avatar (e.g., during a conversation with another user, in recording a video/photo message with the avatar). Expressions and body language may enhance communications with other users by providing verbal cues and context and by making the conversation appear more natural (e.g., users may want other users to react with expressions as they would in real life). In particular embodiments, the virtual reality system may also simulate mouth movements (and movements in the rest of face, which may morph with the mouth movements) while the user corresponding to the avatar is speaking to make it appear like the words are coming out of the avatar's mouth. In doing so, the virtual reality system may use any combination of a series of different techniques. As an example and not by way of limitation, the virtual reality system may use a camera that tracks the movement of the user's mouth region and may make corresponding changes on the user's avatar. As another example and not by way of limitation, the virtual reality system may make use of visemes or other similar approximations that correspond to speech (e.g., speech phonemes) to render, in real time, movements on the avatar's face to reflect what the user is saying. In particular embodiments, the virtual reality system may also track the user's eyes (e.g., using one or more cameras in a headset) to determine the direction of the user's gaze and the corresponding location and angle of the user's pupils within the user's eyes. The virtual reality system may accordingly render the eyes of the avatar to reflect the user's gaze. Having the avatar's eyes reflect the user's gaze may make for a more natural and fluid conversation, because much nonverbal communication may occur through the eyes. As an example and not by way of limitation, users may gaze in a direction to indicate a point of interest or to show what it is that they are looking at, roll their eyes to express exasperation or impatience. Having the avatar's eyes reflect the user's gaze may also help make conversation more natural, because perceived eye contact with an avatar may make the user feel more connected to the user corresponding to the avatar. In particular embodiments, additional options may become available to a user based on the determined eye gaze. As an example and not by way of limitation, when two users make eye contact, an option to shake hands, fist-bump, or high-five may appear. As another example and not by way of limitation, when a user's eye is determined to be looking at a particular object, options that are specific to that object may appear (e.g., for interacting with the object).

In particular embodiments, users may be able to further express themselves by causing their avatars to emote using "avatar emojis," which may be characterized as particular pre-defined poses, gestures, or other displays associated with an avatar that may correspond to particular emotions or concepts. Conveying emotions using avatar emojis may assist in communication among users and/or may make avatars appear more realistic or natural (e.g., in conversation, in a video). In particular embodiments, a user may cause an avatar (e.g., the user's own avatar) to perform an avatar emoji by submitting a trigger input (e.g., by performing a gesture with the user's hands or feet, by pressing a button in the virtual world or on a controller in the real world, by a voice command). In particular embodiments, upon detecting the trigger input, the virtual reality system may determine one or more corresponding avatar emojis, and may select an optimal avatar emoji to display. As an example and not by way of limitation, if the user raises his or her hands (in real life) above the head, that may trigger an avatar emoji for excitement (which may not only cause the avatar to raise its hands excitedly but may also translate to appropriate facial expressions of excitement on the avatar). As another example and not by way of limitation, if the user drops his or hands on the sides and turns them over, that may trigger an avatar emoji for confusion. As another example and not by way of limitation, if the user drops his or her hands and shakes closed fists on either side of the hips, that may trigger an avatar emoji for anger. As another example and not by way of limitation, if the user raises both hands to the cheeks, that may trigger an avatar emoji for surprise. In particular embodiments, the avatar emojis may not necessarily be natural gestures, but may still be somehow associated with an avatar to convey some communicative concept. As an example and not by way of limitation, when a particular user presses a particular virtual button (e.g., a button that hovers over a palette of possible avatar emojis), a light bulb may appear over the user's head, which may communicate to other users that the particular user has an idea.

In particular embodiments, the virtual reality system may determine avatar emojis further based on contextual information that it may collect. As an example and not by way of limitation, for a user's avatar, the contextual information may be based on information about the user (e.g., demographic information; historical usage of avatar emojis or emojis in other contexts such as text messages, posts on an online social network, etc.). As another example and not by way of limitation, the contextual information may include the substance of a conversation (e.g., if the conversation was a serious conversation, the virtual reality system may not favor the determination of avatar emojis that may be perceived as flippant, silly, or may otherwise be perceived as being insensitive. As another example and not by way of limitation, the contextual information may include a tone of a conversation (e.g., as determined by the voices of the users in the conversation). In this example, if users are in a heated conversation with raised voices, avatar emojis reflecting anger may be favored. As another example and not by way of limitation, the contextual information may include other forms of vocal expression such as laughter. In this example, if the virtual reality system detects that a user is laughing, the virtual reality system may determine an avatar emoji corresponding to laughter for the user's avatar (e.g., causing it to appear as though the avatar were laughing. As another example and not by way of limitation, the contextual information may include characteristics of a virtual room and/or of the users in view (e.g., users in a virtual room). As an example and not by way of limitation, if the virtual room was created for purposes of a business meeting, avatar emojis that are "not safe for work" may not be favored. As another example and not by way of limitation, the virtual reality system may determine avatar emojis based on demographic, occupational, educational or other suitable characteristics of the users in view. In this example, certain avatar emojis may be more popular among certain age groups or geographical areas and the virtual reality system may account for those popularities in determining an avatar emoji.

In particular embodiments, the available avatar emojis may be restricted. As an example and not by way of limitation, there may be age restrictions on the virtual emojis (e.g., preventing users who are below a threshold age from using certain emojis). As another example and not by way of limitation, certain avatar emojis may only be available after purchase.

In particular embodiments, avatar emojis may be customizable. As an example and not by way of limitation, a user may be able to tweak the expressions of particular avatar emojis (e.g., adjusting the degree of a smile, adding/removing tear drops on an avatar emoji corresponding to sadness). In particular embodiments, the virtual reality system may automatically customize avatar emojis for the user. As an example and not by way of limitation, the virtual reality system may base its customization on photos or videos of the user to adjust features like smiles or frowns on an avatar emoji based on the features on the photos or videos of the user.

In particular embodiments, the virtual reality system may employ a series of techniques to bring avatars out of the uncanny valley, to make users more comfortable interacting with other users' avatars. As an example and not by way of limitation, special line arts may be adopted for avatar mouths to make them less eerie to users. In particular embodiments, the virtual reality system may add secondary motion or animation to avatars to make them more lifelike. Secondary motion is an animation concept that may be described as movements occurring as a reaction to a primary motion by an actor (e.g., an avatar). It may serve to enhance an avatar's motion via effects that appear to be driven by the motion, and may thereby cause the avatar's movements to appear more natural. As an example and not by way of limitation, as an avatar walks from one location to another, its primary motion of walking with the legs may be enhanced by secondary motions of the head bobbing up and down, arms swinging back and forth, clothes moving with the torso, body jiggling in response, etc. In particular embodiments, the virtual reality system may also add passive motions such as body-sway motion to avatars, even when they avatar is standing still. Body sway refers to the minor movements the body makes in real life (e.g., for postural stability). These movements may be very subtle (e.g., an inch or two in each direction), but their absence may be noticeable. Adding body-sway motions may make for more realistic avatars.

In particular embodiments, the virtual reality system may render avatar eyes in 2D or 3D. In particular embodiments, 3D eyes may have the advantage of being more realistic. However, they may be more resource intensive to render. As such, it may be technically advantageous to render 2D eyes, particularly when dealing with a large number of users communicating using the virtual reality system. Additionally, in particular embodiments, 2D eyes may seem friendlier than 3D eyes, and may be more "charming" or endearing to users.

In particular embodiments, the user may have multiple virtual devices in the virtual space. Each of these virtual devices may offer different functionality. The user may associate each virtual device with different functionality, which may be advantageous in that it may allow for an intuitive experience that may correspond with the real world (e.g., where users similarly interact with different devices for different functionality). As an example and not by way of limitation, the user may wear a watch that may display the time, act as a gateway to incoming and outgoing communications (e.g., voice/video calls, messages), provide context-specific functionality (e.g., based on a tool that is being held by the user, based on a type of virtual space that the user is in), or display information connected to the real world (e.g., news, weather, etc.). In this example, the user may also wear a wristband that may provide notifications about new user experiences or features that the user may not be aware of (e.g., a notification that a particular tool can be used in a particular way to perform a particular function, a notification about a feature associated with a particular virtual room). The new user experience for which a notification may be provided may be identified based on information associated with the user. As an example and not by way of limitation, a user who has never used a particular feature, or a user who is determined to not possess a pre-determined experience level with the feature (as determined based on, for example, the user not having used the particular feature a threshold number of times), may receive a notification regarding that feature as a new user experience, while a user who is more familiar with that feature may not receive such a notification. The new user experience for which a notification may be provided may be identified based on a current context. As an example and not by way of limitation, when a user picks up a camera tool, the user may receive a notification about adding a filter to modify a virtual lens of the camera tool (and thereby modify pictures taken with the camera tool). For example, a user-interface element may be displayed on the wristband, and the activation of this element may trigger a display of information (e.g., in the form of text, a video, a photo, audio) that describes how to add filters. As another example, the information may be displayed in association with the wristband without any further user input (e.g., by way of scrolling text on the wristband, by way of a projection of a video from the wristband). In particular embodiments, the wristband may include a button to enter "pause mode" (which is a state that is described in further detail herein). The functionality described herein is not intended to be limited to particular virtual devices. As an example and not by way of limitation, the wristband may be a gateway to communications (e.g., providing notifications of incoming calls).

In particular embodiments, the virtual devices may be customizable, such that the user may be able to tailor the virtual devices according to personal tastes or needs (e.g., changing appearance, functionality). In particular embodiments, the user may be able to purchase or otherwise acquire different virtual devices or add-ons to virtual devices. As an example and not by way of limitation, the user may be able to purchase different types of watches or wristbands that may appear different (e.g., designer brand wristbands or watches) or may perform specific functions (e.g., a watch that collects and displays stock exchange information, a wristband that displays the user's heart rate or other physiological parameters).

In particular embodiments, when a callee-user accepts a communication from a caller-user via the virtual watch (or another similar virtual device), the communication may appear in the virtual space as a window or as an avatar attached or otherwise associated with the virtual watch. As an example and not by way of limitation, the communication may appear as a projection emanating from the virtual watch. In particular embodiments, at this point, the window or avatar may not by visible and/or audible to any other users in the virtual space (e.g., if the callee-user is in a virtual room or elsewhere with other users in a communication session). Likewise, in particular embodiments, the caller-user may not be able to see or hear anything from the other users. In particular embodiments, the callee-user may be able to detach the window or avatar from the virtual watch and move it into the virtual space (e.g., by picking up the window or avatar with a gesture from the other hand and placing the window or avatar in a region of the virtual space detached from the virtual watch). In particular embodiments, at this point, any other users in the virtual space may also be able to see the window or the avatar, and may be able to communicate with the caller-user, who may likewise be able to see and hear the other users in the virtual space. In particular embodiments, the virtual reality system may also render a window that shows the callee-user (and/or other the other users) what the caller-user is seeing of the virtual space that the callee-user is in. In particular embodiments, the virtual watch may also be used to initiate calls. As an example and not by way of limitation, a user may be in the middle of a game and may, while still in the game, raise a controller associated with the watch and send a communication request without interrupting the gameplay.

In particular embodiments, the virtual watch (or another similar virtual device like a wristband) may include a functionality similar to the portal tool described herein. As an example and not by way of limitation, the user may be able to select a menu-item element on the virtual watch to access a newsfeed, a page of one or more visual media items (e.g., saved visual media items), a game, or any other suitable content. In particular embodiments, the virtual watch (or another similar virtual device like a wristband) may offer a contextual menu similar to a right-click button on a personal computer. As further described herein, the options in the contextual menu may depend on the context (e.g., the objects the user is holding, the virtual room the user is in, the date, etc.). In particular embodiments, the user may be able to transport other users to the selected content. As an example and not by way of limitation, a particular user may be in a virtual room with two other users when the particular user selects a visual media item of an underwater scene. All the users in the virtual room may be transported to a virtual space displaying the underwater scene and may interact with the virtual space just like any other virtual space (e.g., taking pictures of the virtual space with a camera tool). In particular embodiments, a virtual watch, a virtual wristband, a portal tool, or other similar virtual object/tool (or a dock element as described below) may be able to transport a user to a central/default location (e.g., a home screen). As an example and not by way of limitation, the user may press a virtual button appears on a virtual watch or wristband to immediately be transported to a home screen, from which the user can access applications, content, browsers, etc.

Figure 34A:
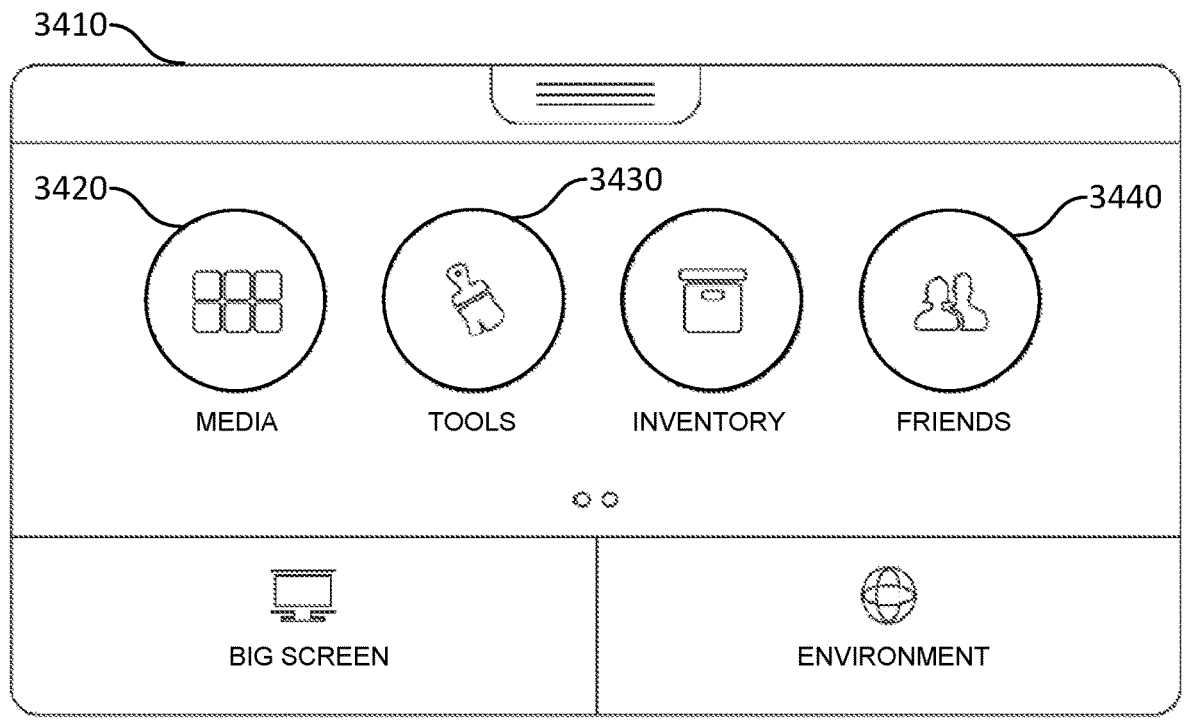
FIGS. 34A-34B illustrate example dock-element interfaces.
Figure 34B:
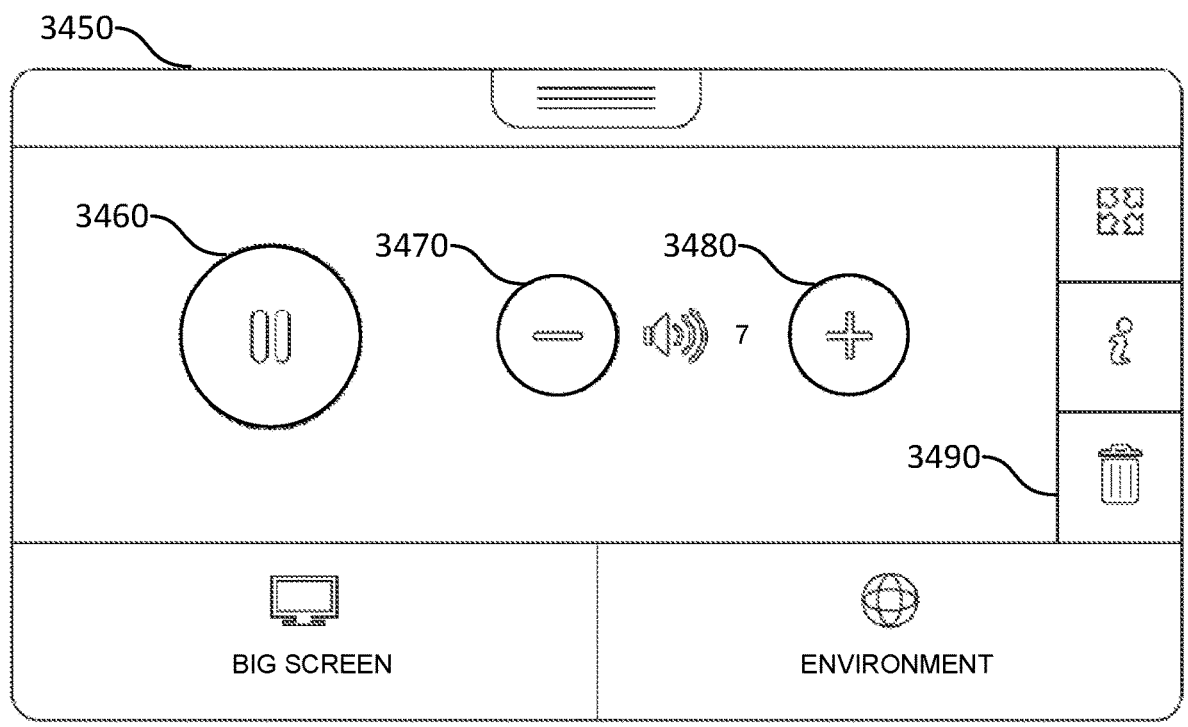

FIGS. 34A-34B illustrate example dock-element interfaces. In particular embodiments, similar functionality may be provided by a dock element, which may be a user interface element that offers a menu of different options for interacting with the virtual space or with content in the virtual space, or for otherwise controlling the user experience in the virtual space (e.g., presented as interactive buttons). In particular embodiments, a user may navigate through a menu on the dock element using gesture inputs generally, or by manipulating a scrubber on a scrubber element (e.g., using a gaze input with a headset device, a grab input with a controller) or any other suitable interface. In particular embodiments, the options may vary according to a current context. As an example and not by way of limitation, referencing FIG. 34A, when the user is on a home screen the dock element 3410 may display home-screen controls (e.g., the interactive element 3420 to access media content items, the interactive element 3430 to access virtual tools, the interactive element 3440 to search for and communicate with friends, an interactive element to access settings, an interactive element to access a dressing room or personal space, etc.). As another example and not by way of limitation, referencing FIG. 34B, when the user is viewing a video, the dock element 3450 may display video controls (e.g., the interactive element 3460 to pause the video, the interactive element 3470 to decrease the volume, the interactive element 3480 to increase volume, the interactive element 3490 to delete the video, interactive elements to fast forward or rewind the video, a scrubber control to skip through the video, an interactive element for sharing the video, an interactive element to maximize the video to encompass a bigger area of the field of view, an interactive element to exit the video and return to a home screen, etc.). As another example and not by way of limitation, when the user is viewing a photo, the dock element may display photo controls (e.g., filter or other editing tools, an option to share, an option to maximize the video to encompass a bigger area of the field of view, an option to exit the video and return to a home screen). As another example and not by way of limitation, when the user is browsing content online (e.g., webpages), the dock element may display browser controls (e.g., previous page, bookmarks, history). As another example and not by way of limitation, the dock element may provide display settings (e.g., brightness level) or other settings affecting user experience. In particular embodiments, the dock element may resemble a tablet or a panel. In particular embodiments, the dock element may appear at a particular area of the user's field of view (e.g., in the bottom left of the field of view, regardless of the direction in which the user is looking) or a particular area of the virtual space (e.g., appearing as the dock element 2140 on the interactive surface 2150 in FIG. 21D or another suitable location in the virtual space, appearing when the user looks toward a particular direction in the virtual space with respect to a point of reference). In particular embodiments, the dock element may be portrayed as hovering over an area. In particular embodiments, the dock element may be invisible or not present at times—e.g., this may be a "dormant state" (or a "de-activated state"), as opposed to an "active state." As an example and not by way of limitation, the dock element may remain invisible or not present until the virtual reality system determines that the user intends to interact with the dock options on the dock element (or is likely to interact with it, if presented with the dock element). In this example, the virtual reality system may make this determination based on a suitable user input (e.g., a gesture with a controller or hand, a gaze input of the user, a tap on the headset, a push of a button on a controller). Once this determination is made, the dock element may appear. In particular embodiments, rather than being completely invisible or not present, the dock element may remain present but may be more transparent or translucent than in its active state. Alternatively, the dock element may simply always be present in its active state. In particular embodiments, the dock element may appear to surround the user's field of view, for example, with options being presented on the periphery or otherwise overlaid on the field of view (e.g., in the center). This may be similar to a heads-up display. As an example and not by way of limitation, when the user is watching a video, the dock element may appear (e.g., in a dormant state until the virtual reality system determines that the user may intend to interact with the dock element) with options being presented below and on the right- or left-hand side of the field of view. In particular embodiments, the dock element may surround a location on the virtual space that is displaying a content item (e.g., a video). As an example and not by way of limitation, the user may be watching a video on a virtual "television" and the dock element may present options on the edges of the virtual television's screen.

In particular embodiments, the dock element may be used to initiate a communication. As an example and not by way of limitation, using the dock element, a user may be able to pull up an interface that includes a friend list or contact list (e.g., by selecting a suitable virtual button on the dock element or by submitting any other suitable input). In this example, the user may be able to scroll through the list and select one or more friends or contacts (e.g., to initiate a video, audio, or text communication such as a message or a text chat). In this example, the friend list or contact list may be friends or contacts on an online social network (e.g., social graph connections).

In particular embodiments, a virtual watch may act as a central hub for user interaction. In particular embodiments, the user may be able to pull up the virtual watch in any virtual space (e.g., by raising a hand associated with the watch into the user's field of view). The virtual watch may allow for customized interaction and functionality in the virtual space, depending on a determined current context (which may be determined using any combination of the factors described herein). In particular embodiments, the customized interactions and functionality provided by the virtual watch may depend on a virtual tool or another virtual object that is currently picked up or otherwise selected by the user. In this way the virtual watch may be customized based on properties of a virtual tool or other virtual object. As an example and not by way of limitation, if the user picks up a laser tool, the watch may be customized to display a current power level of the laser tool and/or allow the user to select different levels of power for the laser tool. As another example and not by way of limitation, if the user picks up a marker tool, the watch may be customized to display a current ink color of the marker and/or allow the user to select different ink color. As another example and not by way of limitation, if the user picks up a virtual ball, the watch may display a weight or other property associated with the virtual ball. In particular embodiments, the virtual watch may be a means for the user to change the virtual environment (e.g., the virtual space itself and/or virtual objects in the virtual space). As an example and not by way of limitation, the user may be able to pick up a virtual ball, select a "delete" button on the virtual watch, and thereby cause the virtual ball to disappear from the virtual space.

In particular embodiments, a particular user may be able to, at any time or place in a virtual space, enter into a "pause mode," where the virtual experience may essentially be paused or put on hold. User testing has determined that sometimes, users may want to quickly remove themselves temporarily from the virtual experience and feel "unplugged" for a period. As an example and not by way of limitation, users may find themselves in uncomfortable social situations that they may want to at least temporarily escape from. As another example and not by way of limitation, users may find an experience overwhelming or frightening (e.g., when viewing a rollercoaster video, when playing a game that simulates climbing tall mountains).

Figure 35A:
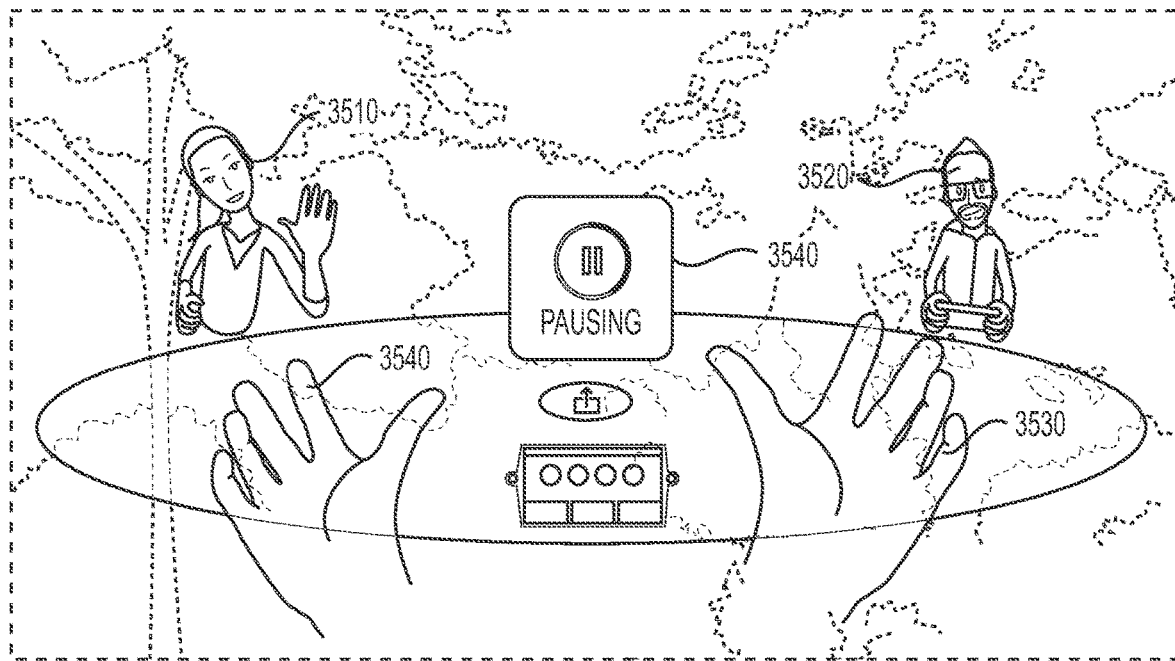
FIGS. 35A-35B illustrate example inputs for entering pause mode.
Figure 35B:
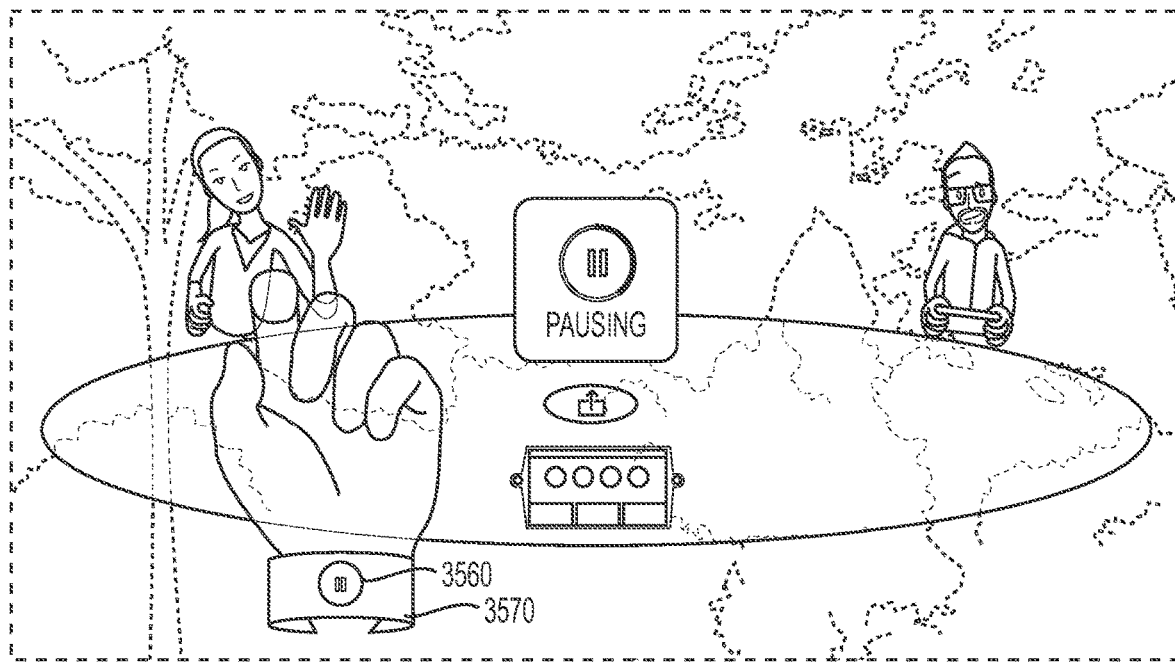

FIGS. 35A-35B illustrate example inputs for entering pause mode. In particular embodiments, the particular user may be able to enter pause mode by submitting a suitable input. As an example and not by way of limitation, referencing FIGS. 35A-35B, the particular user may be able to enter pause mode by performing a "safety gesture" (e.g., a gesture performed by crossing both arms resulting in the left hand represented by the rendering 3530 to be on the right side of the user and the right hand represented by 3540 to be on the left side of the user), selecting an appropriate interactive element (e.g., the pause button 3560 on the virtual wristband 3570 or on a watch, a button on a dock element, a button at some location in the virtual space, a button on a physical controller in the real world), speaking a particular word, etc. In this example, the notification 3550 may be presented to the user indicating that the user is going to enter pause mode. The notification 3550 may include a timer element that initiates a countdown period, during which the user may be able to cancel entry into pause mode (e.g., by uncrossing the user's arms). The particular user may be able to exit pause mode at any time by performing any suitable input. As an example and not by way of limitation, the particular user may perform a gesture (e.g., a thumbs-up gesture), select an appropriate interactive element (e.g., a pause button on a virtual wristband or watch, a button on a dock element, a button at some location in the virtual space, a button on a physical controller), speak a particular word, etc. In particular embodiments, the particular user may be able to opt to only "unpause" with respect to a subset of the other users. In the embodiments, to the other users who are not in the subset, the particular user may remain paused, but to the other users in the subset, the user may be unpaused (e.g., they may be able to see the avatar of the particular user as normal, they may be able to interact or communicate with the particular user as normal). The user may be able to submit any suitable input as described herein (e.g., gestures, pressing buttons, speaking a word) to accomplish this selective unpausing. As an example and not by way of limitation, the user may perform a handshake or "fist-bump" gesture (e.g., by reaching out a hand toward another user, at which point the other user may see the particular user and return the handshake or fist-bump) or a tapping or pointing gesture (e.g., by tapping on the shoulder of another user, pointing to the other user in a particular manner).

Figure 35C:
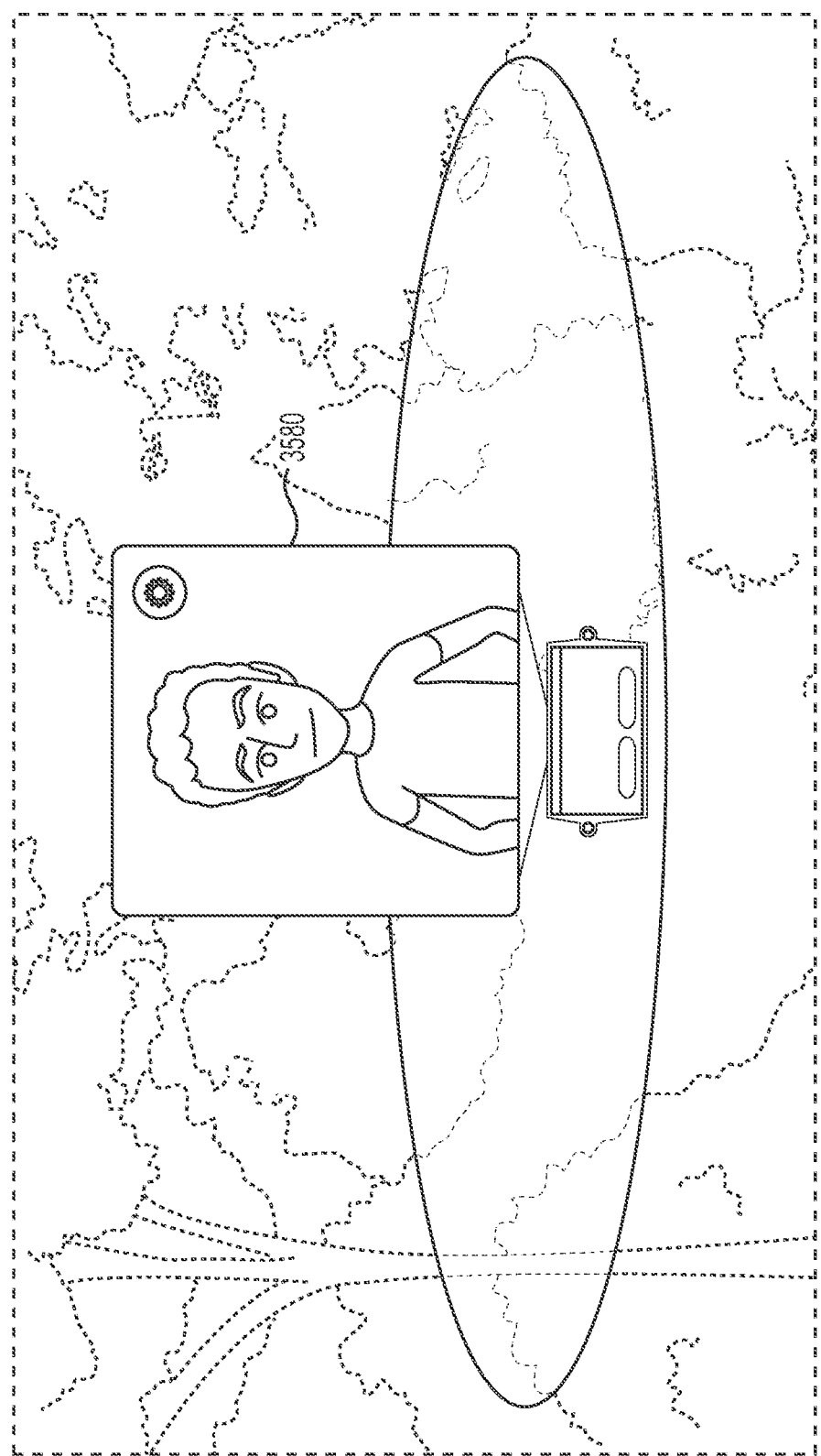
FIG. 35C illustrates an example pause-mode interface.

FIG. 35C illustrates an example pause-mode interface. Once a particular user enters pause mode, other users (e.g., other users in a virtual room that the particular user was in before entering pause mode) may be prevented from getting any information about the particular user. In particular embodiments, the particular user's avatar may disappear from the point of view of the other users. In particular embodiments, the particular user's avatar may remain, but may be in a state that does not provide additional information about the particular user (or at most may only provide limited information about the user). As an example and not by way of limitation, the other users may see a frozen, blurry, faded, distorted, or other such image of the particular user. This may indicate to the other users that the particular user is in pause mode or otherwise indisposed (e.g., due to a connection problem). In particular embodiments, when the particular user enters pause mode, the particular user may not get additional information, or may at most get limited information, from the virtual space and other users in the virtual space. As an example and not by way of limitation, the entire virtual space or content (e.g., content that was being presented in the virtual space) may become disappear or become frozen, blurry, faded, distorted, etc. As another example and not by way of limitation, the virtual space may remain as it was, but some or all information from the other users may be prevented from reaching the particular user. For example, avatars of the other users may disappear or become frozen, blurry, faded, distorted, etc. In particular embodiments, the user may be transported to a personal space. The personal space may resemble a room that the particular user is comfortable with. In particular embodiments, the personal space may be customized or customizable. As an example and not by way of limitation, the personal space may be a room that a user can decorate according to personal tastes (e.g., adding custom couches, armchairs, a fireplace, windows, etc.). In particular embodiments, the personal space may include a mirror with which the particular user may be able to see himself/herself. As an example and not by way of limitation, referencing FIG. 35C, the particular user may be presented with the virtual mirror 3580 when in pause mode. As described further herein, in the personal space, the user may be able to alter the user's appearance (e.g., put on glasses or a hat). The use of pause mode may not be restricted to times when the user wants to remove himself or herself from an experience. As an example and not by way of limitation, a user may enter pause mode to look at notifications (e.g., messages, notifications about new user features or new user experiences that the user may be interested in engaging in within the virtual space, etc.) or content privately, entering different applications, tweaking the user's avatar or settings, and/or transitioning between virtual spaces or locations within virtual spaces.

In particular embodiments, once in pause mode, the user may be presented with one or more experience-control options. As an example and not by way of limitation, the user may be given the option to report issues (e.g., technical issues, abuse by other users), block other users, kick out other users (e.g., from a virtual room). In particular embodiments, these experience-control options may be summoned at any time and a user may not need to first enter pause mode.

In particular embodiments, the virtual reality system may create a "bubble" around user avatars, e.g., to prevent other user avatars from getting too close and violating a user's personal space in the virtual world. Just as in the real world, a user may find it uncomfortable in the virtual world if other user avatars get too close to the user. In particular embodiments, a user may choose to turn on or off the bubble.

Figure 36A:
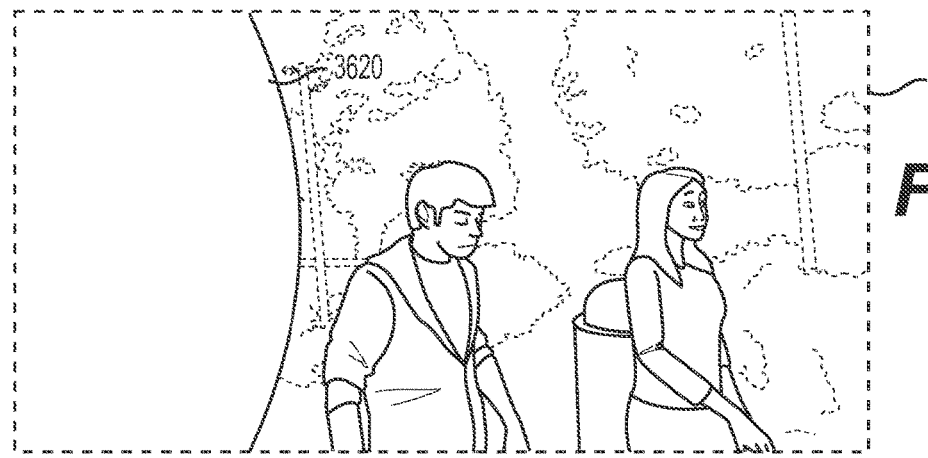
FIGS. 36A-36C illustrate an example in which an opaque display region completes a 360-degree perspective in a virtual space.
Figure 36B:
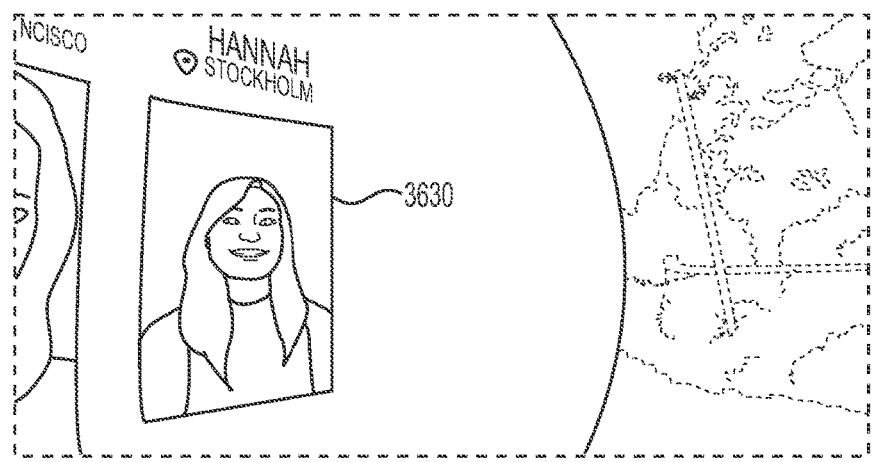
Figure 36C:
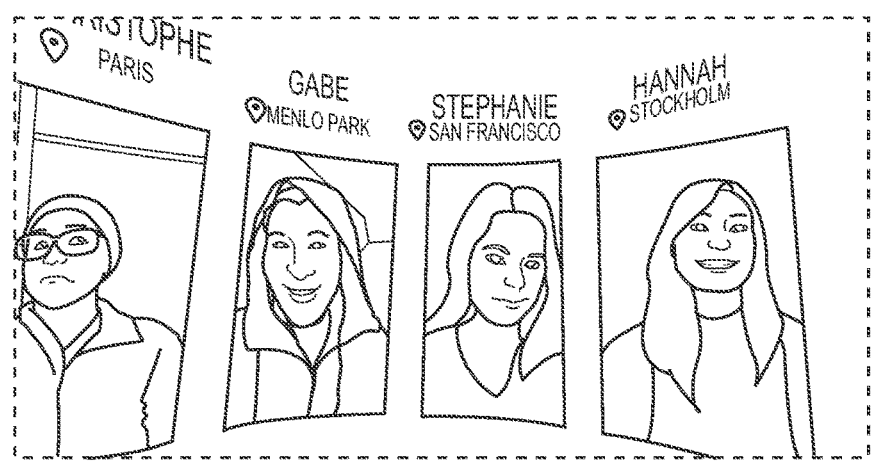

FIGS. 36A-36C illustrate an example in which an opaque display region completes a 360-degree perspective. In particular embodiments, a portion of the 360-degree perspective rendered by the virtual reality system may display items that are external to a current virtual environment (e.g., an environment provided by visual information of a content item, an environment provided by visual information of a live video stream of a user). The portion may be a display area that may be an opaque region. Alternatively, it may simply be an overlay (e.g., overlaying items over the virtual environment) or a modification of the virtual environment. As an example and not by way of limitation, referencing FIG. 36A, the 360-degree perspective 3610 may include the opaque region 3620. In particular embodiments, the display area may display content items (e.g., slides, photos), a web browser, an interface of a content browser (e.g., a home screen for navigating to particular content), an interface to search for and communicate with other users (e.g., friends, users of an online social network), an interface of an online social network (e.g., an online social network associated with the social-networking system 160), incoming video from other users (e.g., incoming video from users who may not be in virtual reality but may be calling in via a non-virtual-reality system such as a phone or laptop with a camera). As an example and not by way of limitation, a user may be able to pull up an interface that includes a friend list or contact list. In this example, the user may be able to scroll through the list and select one or more friends or contacts (e.g., to initiate a video, audio, or text communication such as a message or a text chat). In this example, the friend list or contact list may be friends or contacts on an online social network (e.g., social graph connections). In particular embodiments, the user may choose to turn on or off the display area. In particular embodiments, the display area may be automatically turned on in instances where there is not sufficient information to render a full spherical view. In such instances, the display area may be particularly advantageous in that it may provide useful information or points of interaction for the user in an area that otherwise may not have been used to display anything of use. As an example and not by way of limitation, if a particular user is communicating with another user who is transmitting video with a 180-degree camera, at least a portion the remainder of the view from the perspective of the particular user may be taken up by the display area (e.g., because there is no information from the other user for that portion). In this example, the particular user may see the 180-degree video being transmitted by other user, and in the display area may see other items such as browser window. In particular embodiments, display area may include video from other users (e.g., windows displaying incoming video from users who may be calling in via a non-virtual-reality system such as a phone or laptop with a camera). As an example and not by way of limitation, referencing FIGS. 36A-36B, the opaque region 3620 may include the video stream 3630 from a user (e.g., "Hannah") who is part of a current communication session. In this example, FIG. 36C illustrates video streams from additional users that may become visible (e.g., as the user keeps turning toward the opaque region 3620). The described portion of the view may be presented when a video that is being viewed (e.g., a video content item, an incoming video from another user in a communication) is not fully spherical (e.g., in the case of a 180-degree camera), or it may even be presented otherwise (e.g., as a transparent overlay on a portion of even a spherical view).

Figure 37A:
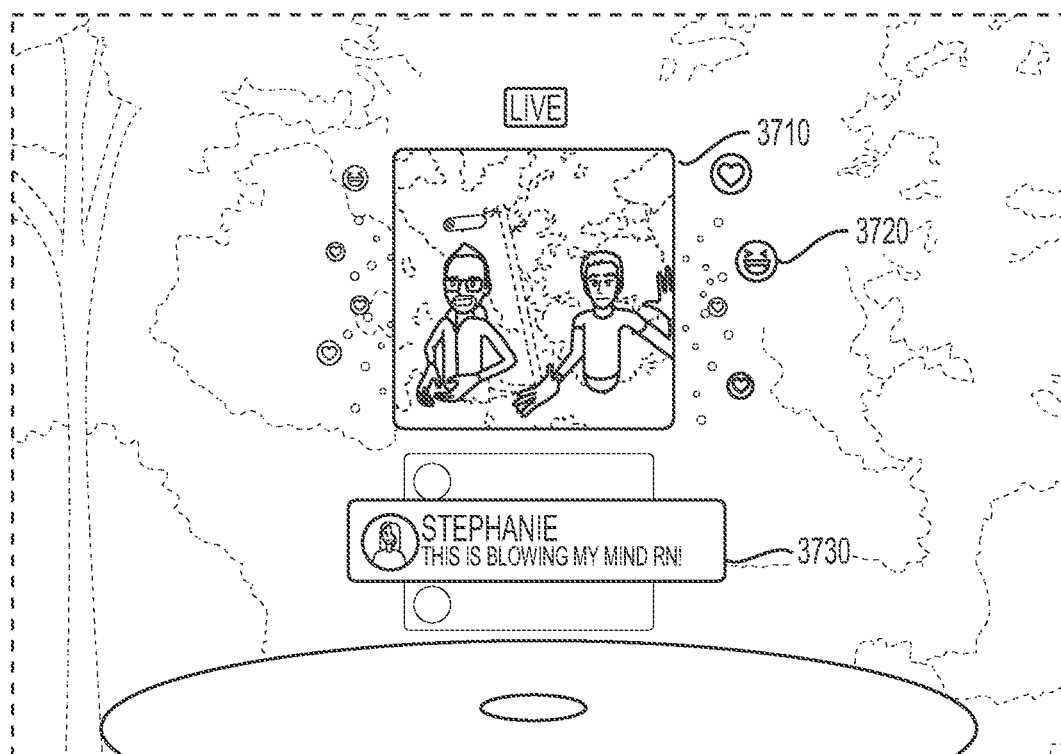
FIGS. 37A-37B illustrate example virtual signs for presenting notifications in a virtual room.
Figure 37B:
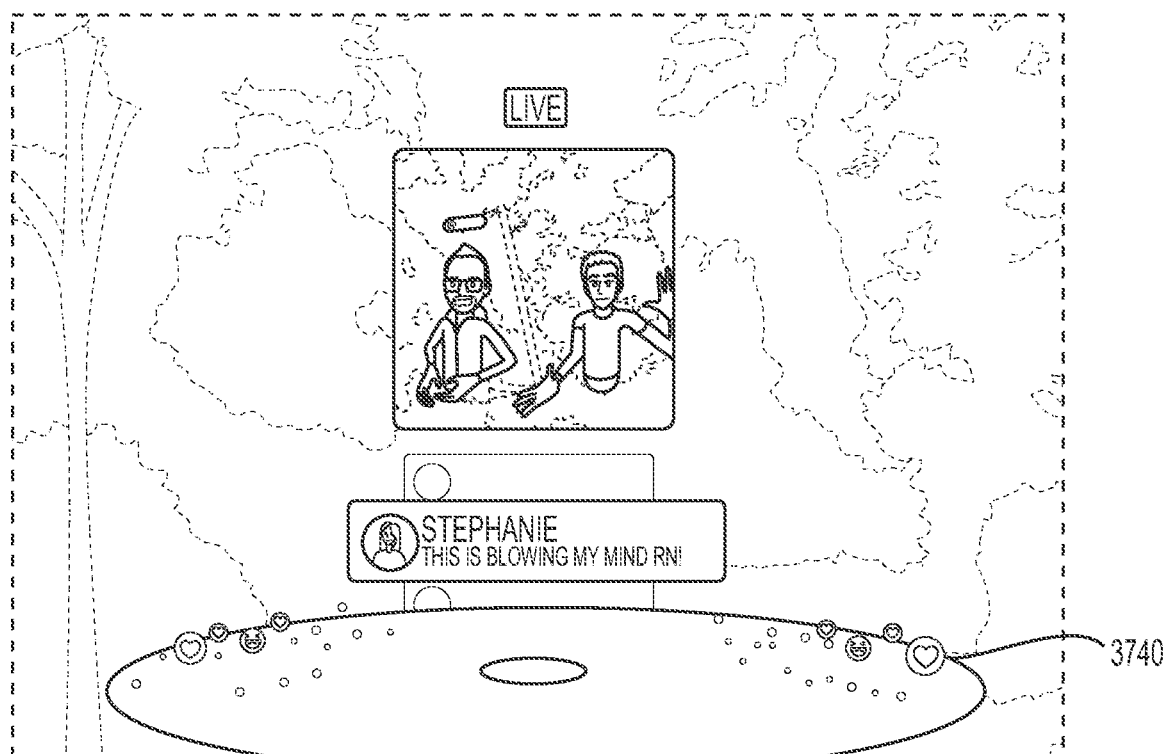
Figure 38:
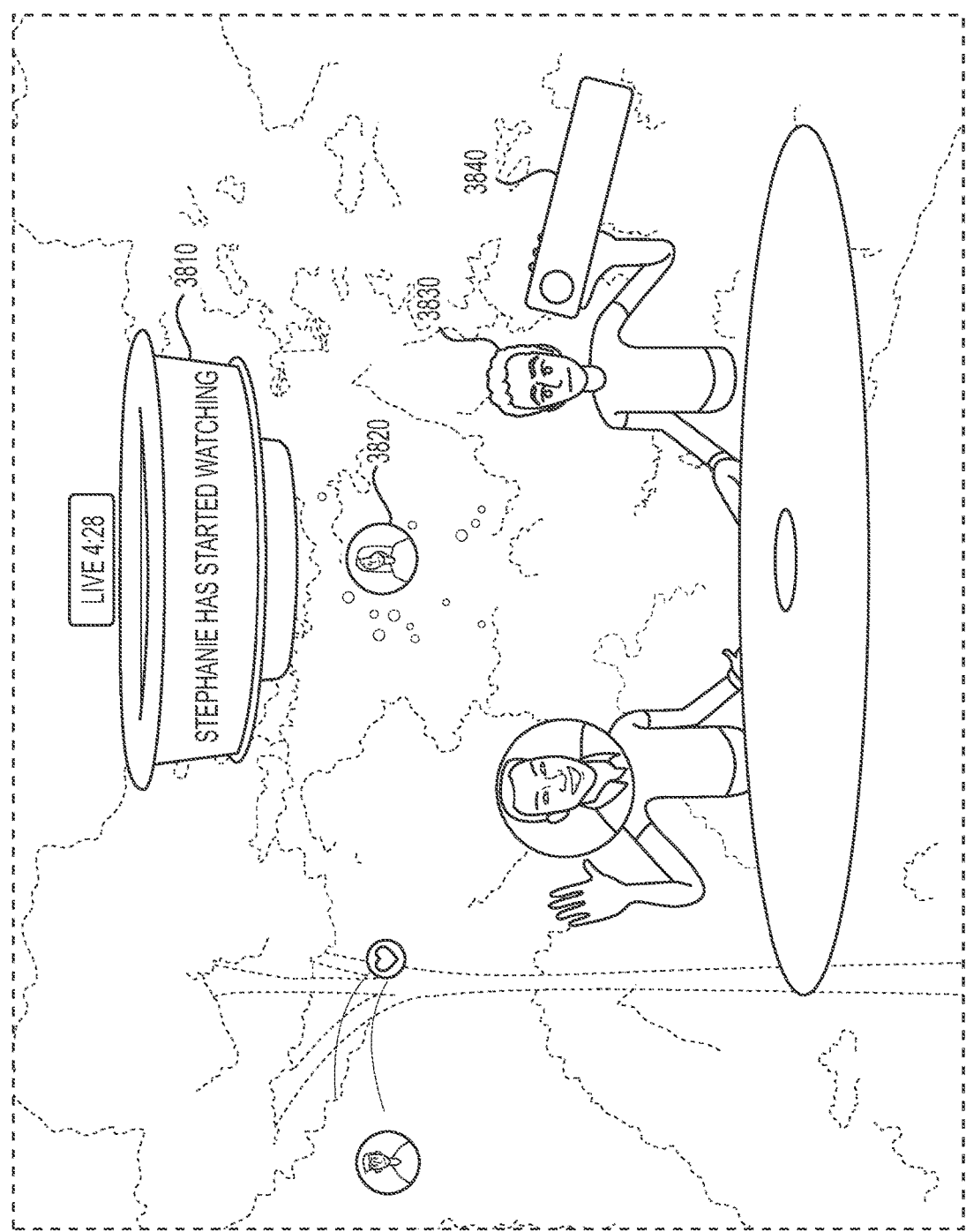
FIG. 38 illustrates an alternative virtual signs for presenting notifications in a virtual room.

FIGS. 37A-37B illustrate example virtual signs for presenting notifications in a virtual room. FIG. 38 illustrates an alternative virtual sign for presenting notifications in a virtual room. In particular embodiments, a virtual space may include a virtual sign (e.g., a banner element) that may present relevant notifications to users in the virtual space. As an example and not by way of limitation, the virtual sign may identify a user who just joined a meeting (e.g., in a virtual room) or started viewing a video that is being viewed by users in a virtual room. As another example and not by way of limitation, the virtual sign may display comments or reactions as they occur (e.g., in a video). As an example and not by way of limitation, referencing FIG. 37A, virtual signs may appear along the sides of the video 3710, which may be a live video that is being viewed by users in the depicted virtual room. In this example, there may be two vertically scrolling virtual sign that display elements such as reactions (e.g., the "laughing" reaction 3720) as they become relevant (e.g., as they are submitted/posted by users). As another example and not by way of limitation, referencing FIG. 37B, the virtual sign may be displayed on or near an interactive surface in the virtual room (e.g., the virtual sign including the "heart" reaction 3740). In particular embodiments, the virtual sign may resemble something like a jumbotron (e.g., above an interactive surface in a virtual room) or a revolving virtual sign (e.g., with text or other notification elements revolving around in a particular direction). The virtual sign may function like a stock ticker display (e.g., with text or other notification elements scrolling across it). As an example and not by way of limitation, referencing FIG. 38, the virtual sign 3810 may include a scrolling display of the text "Stephanie has started watching" to indicate to users in the room that a user named "Stephanie" has started watching a live broadcast of the virtual room. In this example, the element 3820 (which may include, for example, a profile picture associated with the user Stephanie) may appear to drop out of the virtual sign 3810 and into the virtual room. Similarly, in this example, other elements may also appear to drop out of the virtual sign 3810 as they become relevant (e.g., user reactions such as likes as they are submitted, user comments such as the comment 3840). Alternatively or additionally, relevant elements may appear from any suitable location. As an example and not by way of limitation, referencing FIG. 37A, the comment 3730 may simply appear within the virtual room when it becomes relevant (e.g., when it is posted). In particular embodiments, users in the virtual room may "pick up" or otherwise interact with the elements dropping out of a virtual sign. As an example and not by way of limitation, referencing FIG. 38, the user 3830 may pick up and show a particular element (e.g., the comment 3840).

In particular embodiments, there may be a large number of relevant notifications, in which case, the virtual reality system may determine a subset of the relevant notifications to display. This subset may be determined by scoring the relevant notifications based on any suitable factors (e.g., the affinity of the users in the virtual space for the information conveyed by a relevant notification, the affinity of the users in the virtual space to an author of a comment associated with a relevant notification, the affinity of the users in the virtual space to a user associated with a relevant notification, the number of reactions there are to a comment associated with a relevant notification), and selecting notifications having a score greater than a threshold score.

Figure 39A:
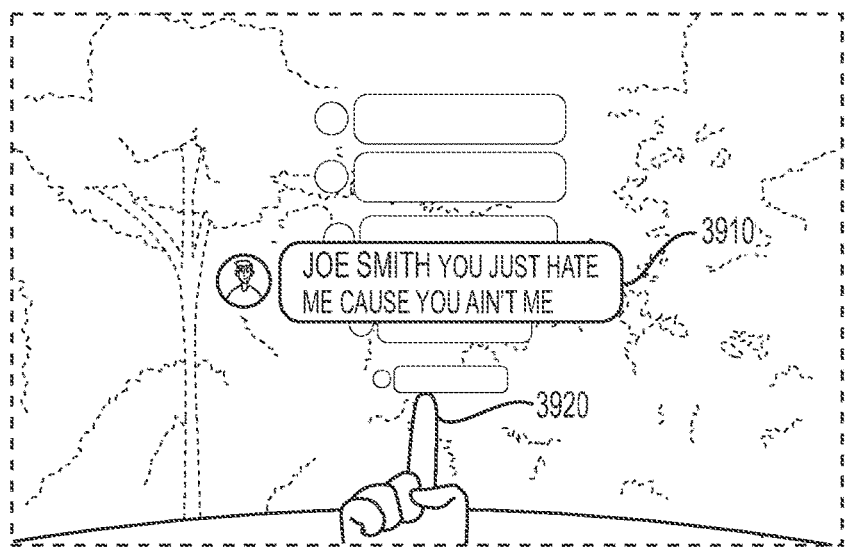
FIGS. 39A-39C illustrate an example of a user manipulating a comment element in a virtual space.
Figure 39B:
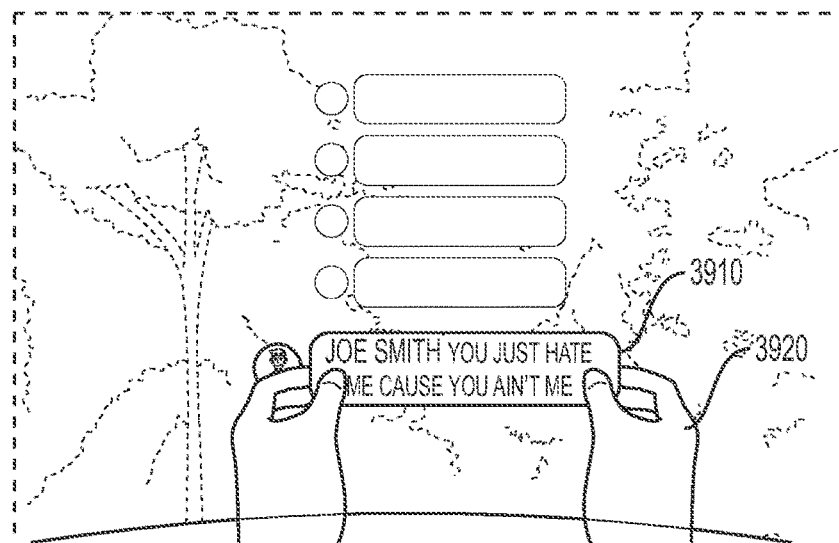
Figure 39C:
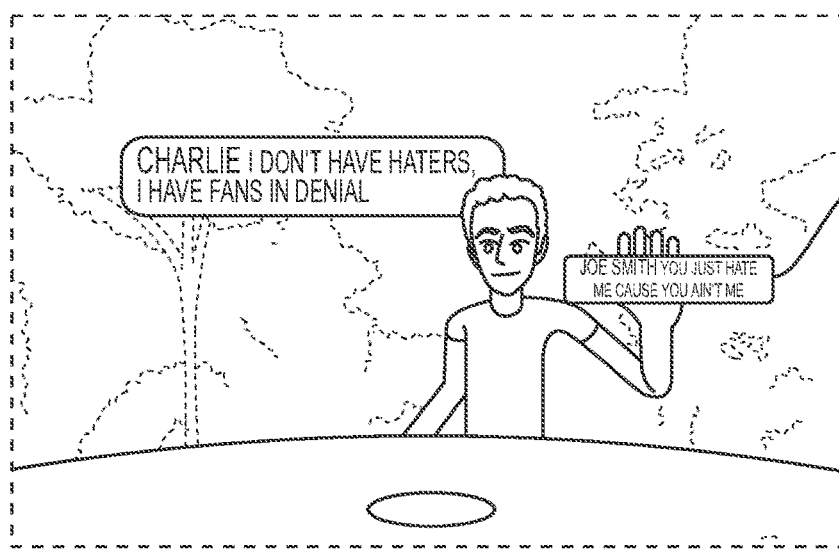

FIGS. 39A-39C illustrate an example of a user manipulating a comment element in a virtual space. In particular embodiments, the user may be able to interact with comments, posts, reactions, or other such elements (e.g., elements related to social networks). As an example and not by way of limitation, these elements may be virtual objects that may be manipulable such that the user may by "grab" them with a suitable input (e.g., by way of a gaze input, hand controllers) and placing them somewhere in the virtual space. The user may also be able to grab and "throw" any of these elements away with a flicking gesture outward (which may result in the element being deleted or simply removed from the virtual environment). The user may also be able to hand the virtual object to another user in the virtual space. This type of interaction may be more intuitive to users and may simulate the real world by offering a more tangible form of interaction means. FIGS. 39A-39C illustrate an example sequence of events showcasing how a comment element may be manipulated within a virtual space. Referencing FIG. 39A, a user may select the comment element 3910 using a controller corresponding to the rendering of the user's hand 3920. Referencing FIG. 39B, the user may grab or hold the comment element 3910. Referencing FIG. 39C, the user may display (or otherwise manipulate) the comment element 3910 within the virtual space (e.g., to show the comment element 3910 to other users in the virtual space). In particular embodiments, the virtual sign described herein may be configured to release manipulable elements into the virtual space. As an example and not by way of limitation, the virtual sign may resemble a jumbotron device with a hole in the bottom, out of which the elements may drop (e.g., as they become relevant). In particular embodiments, the elements may be taken from a webpage on a browser application or some other content location (e.g., from a video or photo) on which content is being viewed either privately, or collaboratively with others in the virtual space.

Figures 40A, 40B, 40C:
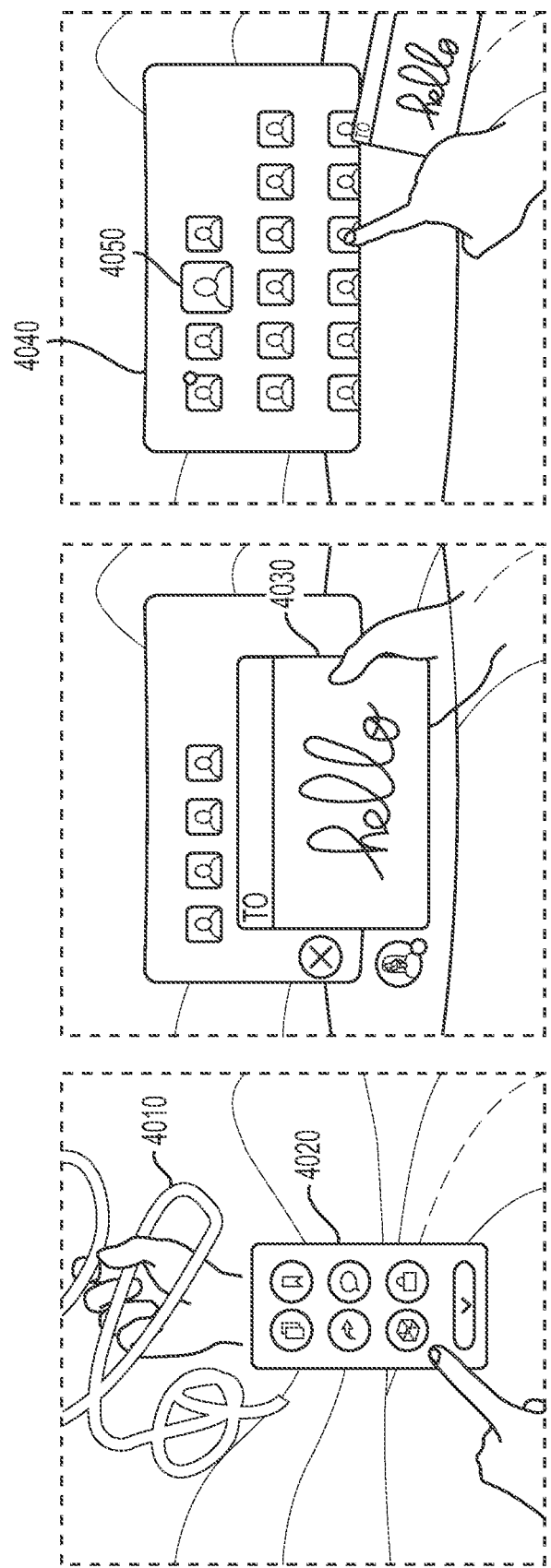
FIGS. 40A-40C illustrate an example of a user writing a message on a content item.

FIGS. 40A-40C illustrate an example of a user writing a message on a content item. In particular embodiments, the virtual reality system may allow users to alter a content item while in the virtual space and send, share, or present the altered content item to other users. As an example and not by way of limitation, a user may be able to add filters, change colors, change brightness, etc. As another example and not by way of limitation, referencing FIG. 40A, a user may be able to doodle/write the message 4010 (e.g., the word "Hello") or a drawing (e.g., a picture of a cat) somewhere on a photo or video (e.g., which may be flat content, 360-degree content, etc.). In this example, the user may use a suitable virtual tool, such as a pen or a marker to doodle/write on the content item. In the case of a video, the doodle/writing may or may not be temporally limited (e.g., associated with only particular time points in the video). In particular embodiments, the user may be able to send the altered content item or photos/videos (flat content, 360-degree content, etc.) to specific other users, share it online (e.g., on an online social network), or present the altered content in a virtual space (e.g., in a meeting with other users in a virtual room). As an example and not by way of limitation, referencing FIGS. 40A-40C, the user may select a "Send" button in the panel 4020, and send the altered content item 4030 to one or more contacts (e.g., the user 4050) selected from a menu of contacts 4040. As another example and not by way of limitation, the user may share the altered content item on an online social network (e.g., referencing FIG. 40A, by selecting the "Share" button in the panel 4020). In particular embodiments, the altering may also be done live, with others in the virtual space watching as a user alters a content item. In particular embodiments, users may collaborate on altering a content item. As an example and not by way of limitation, multiple users within a virtual room may collaborate to doodle/write on a single content item (e.g., users in a business meeting may doodle/write on a single chart or spreadsheet that is visible to those in the virtual room).

Figure 41:
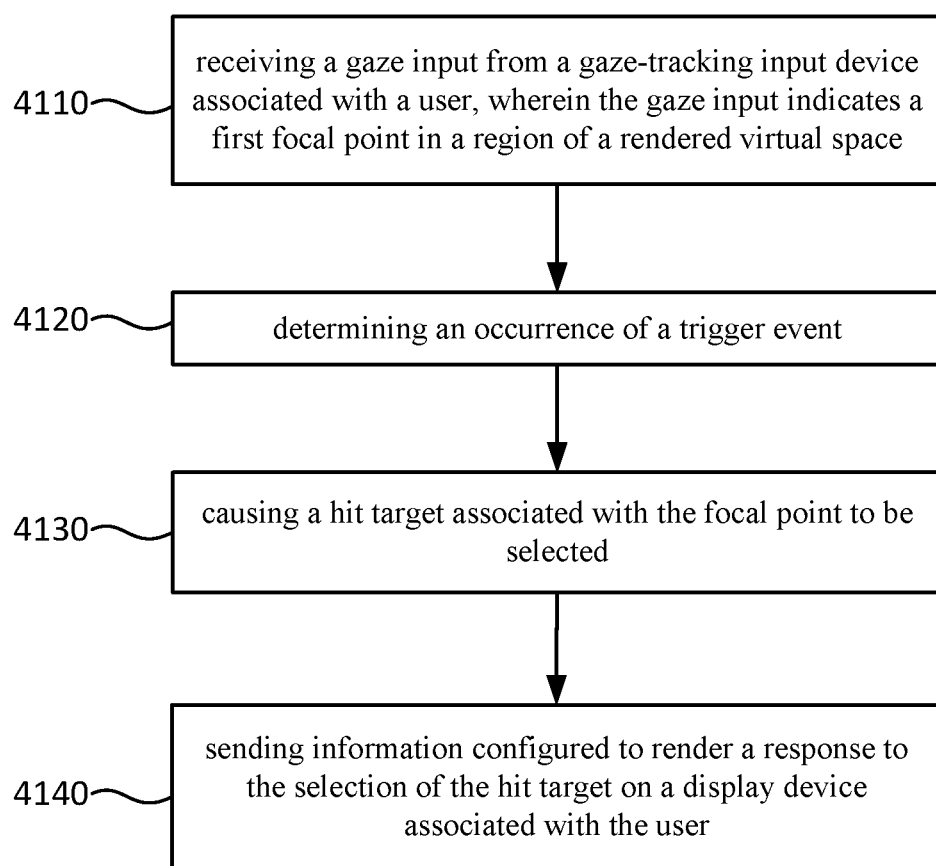
FIG. 41 illustrates an example method for selecting a hit target based on a gaze input.

FIG. 41 illustrates an example method 4100 for selecting a hit target based on a gaze input. The method may begin at step 4110, where a computing system may receive a gaze input from a gaze-tracking input device associated with a user, wherein the gaze input indicates a first focal point in a region of a rendered virtual space. At step 4120, the computing system may determine an occurrence of a trigger event. At step 4130, the computing system may cause a hit target associated with the focal point to be selected. At step 4140, the computing system may send information configured to render a response to the selection of the hit target on a display device associated with the user. Particular embodiments may repeat one or more steps of the method of FIG. 41, where appropriate. Although this disclosure describes and illustrates particular steps of the method of FIG. 41 as occurring in a particular order, this disclosure contemplates any suitable steps of the method of FIG. 41 occurring in any suitable order. Moreover, although this disclosure describes and illustrates an example method for selecting a hit target based on a gaze input, including the particular steps of the method of FIG. 41, this disclosure contemplates any suitable method for selecting a hit target based on a gaze input, including any suitable steps, which may include all, some, or none of the steps of the method of FIG. 41, where appropriate. Furthermore, although this disclosure describes and illustrates particular components, devices, or systems carrying out particular steps of the method of FIG. 41, this disclosure contemplates any suitable combination of any suitable components, devices, or systems carrying out any suitable steps of the method of FIG. 41.

Figure 42:
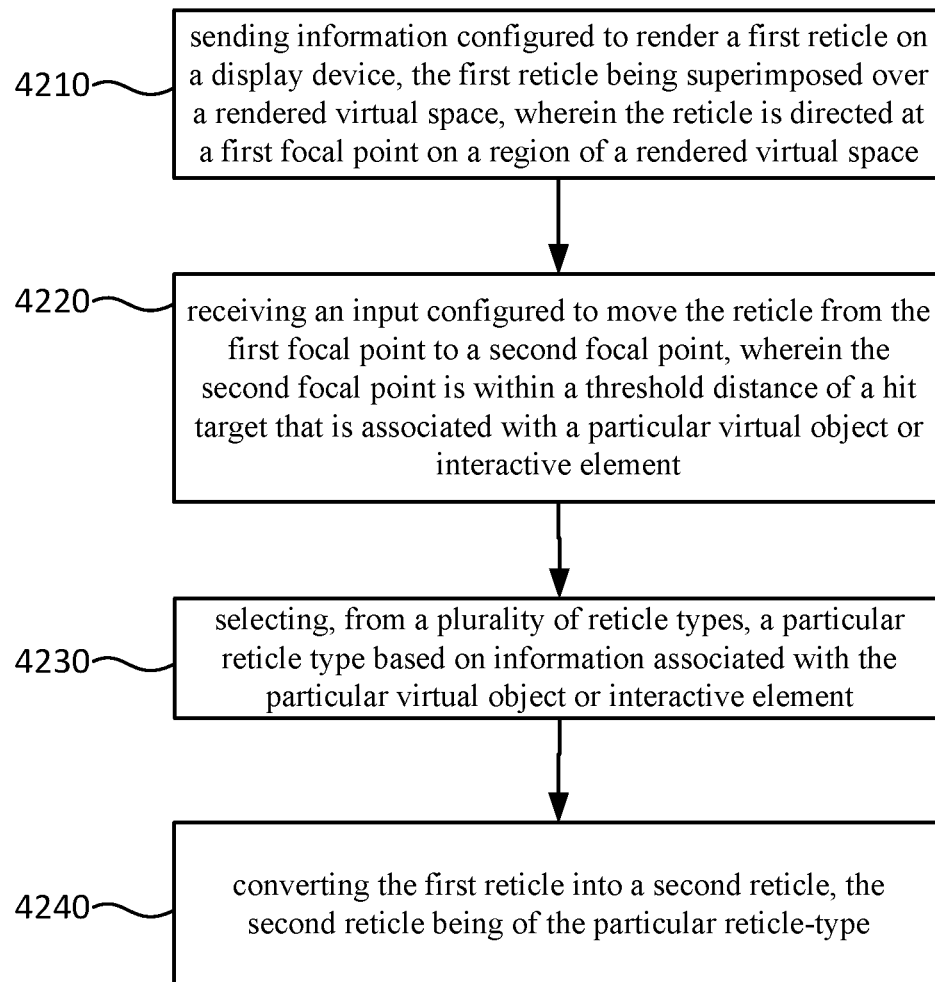
FIG. 42 illustrates an example method for determining a reticle type to render.

FIG. 42 illustrates an example method 4200 for determining a reticle type to render. The method may begin at step 4210, where a computing system may send information configured to render a first reticle on a display device, the first reticle being superimposed over a rendered virtual space, wherein the reticle is directed at a first focal point on a region of a rendered virtual space. At step 4220, the computing system may receive an input configured to move the reticle from the first focal point to a second focal point, wherein the second focal point is within a threshold distance of a hit target that is associated with a particular virtual object or interactive element. At step 4230, the computing system may select, from a plurality of reticle types, a particular reticle type based on information associated with the particular virtual object or interactive element. At step 4240, the computing system may convert the first reticle into a second reticle, the second reticle being of the particular reticle type. Particular embodiments may repeat one or more steps of the method of FIG. 42, where appropriate. Although this disclosure describes and illustrates particular steps of the method of FIG. 42 as occurring in a particular order, this disclosure contemplates any suitable steps of the method of FIG. 42 occurring in any suitable order. Moreover, although this disclosure describes and illustrates an example method for determining a reticle type to render, including the particular steps of the method of FIG. 42, this disclosure contemplates any suitable method for determining a reticle type to render, including any suitable steps, which may include all, some, or none of the steps of the method of FIG. 42, where appropriate. Furthermore, although this disclosure describes and illustrates particular components, devices, or systems carrying out particular steps of the method of FIG. 42, this disclosure contemplates any suitable combination of any suitable components, devices, or systems carrying out any suitable steps of the method of FIG. 42.

Figure 43:
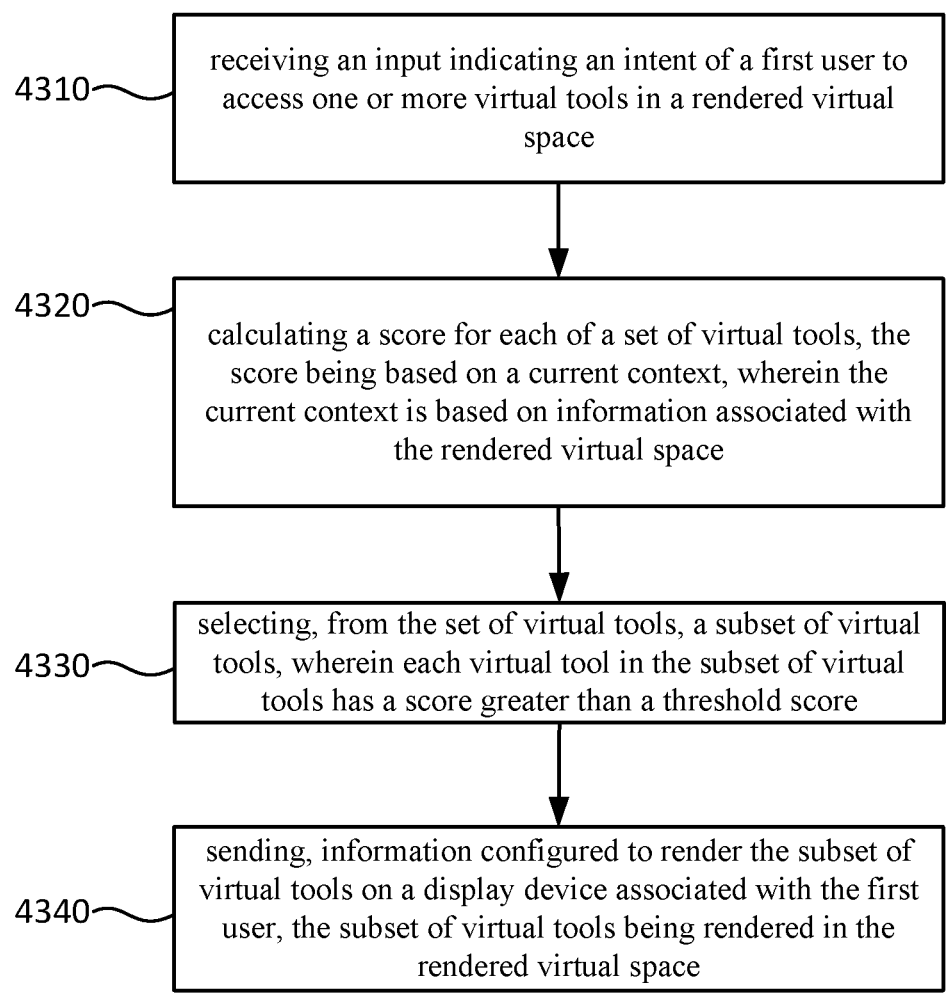
FIG. 43 illustrates an example method for determining a subset of tools to present to a user.

FIG. 43 illustrates an example method 4300 for determining a subset of tools to present to a user. The method may begin at step 4310, where a computing system may receive an input indicating an intent of a first user to access one or more virtual tools in a rendered virtual space. At step 4320, the computing system may calculate a score for each of a set of virtual tools, the score being based on a current context, wherein the current context is based on information associated with the rendered virtual space. At step 4330, the computing system may select from the set of virtual tools, a subset of virtual tools, wherein each virtual tool in the subset of virtual tools has a score greater than a threshold score. At step 4340, the computing system may send information configured to render the subset of virtual tools on a display device associated with the first user, the subset of virtual tools being rendered in the rendered virtual space. Particular embodiments may repeat one or more steps of the method of FIG. 43, where appropriate. Although this disclosure describes and illustrates particular steps of the method of FIG. 43 as occurring in a particular order, this disclosure contemplates any suitable steps of the method of FIG. 43 occurring in any suitable order. Moreover, although this disclosure describes and illustrates an example method for determining a subset of tools to present to a user, including the particular steps of the method of FIG. 43, this disclosure contemplates any suitable method for determining a subset of tools to present to a user, including any suitable steps, which may include all, some, or none of the steps of the method of FIG. 43, where appropriate. Furthermore, although this disclosure describes and illustrates particular components, devices, or systems carrying out particular steps of the method of FIG. 43, this disclosure contemplates any suitable combination of any suitable components, devices, or systems carrying out any suitable steps of the method of FIG. 43.

Figure 44:
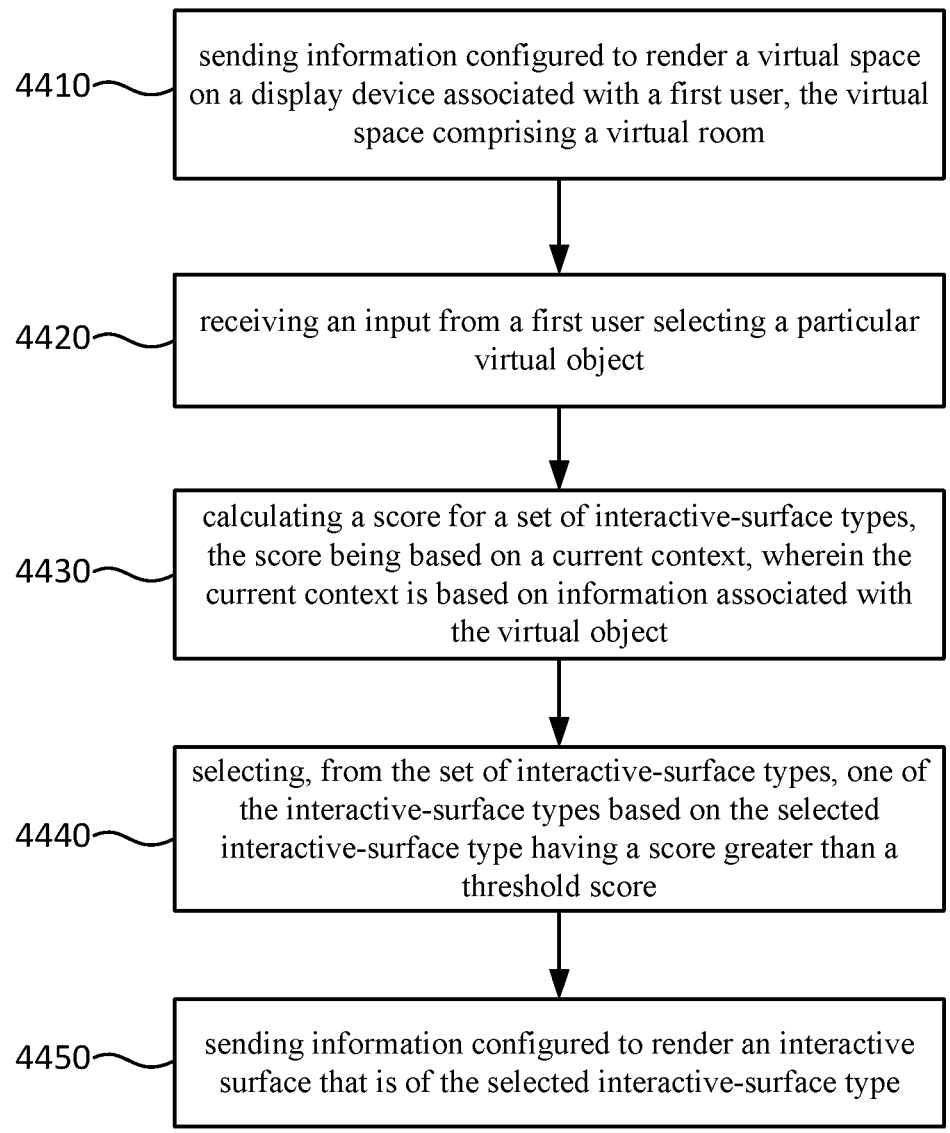
FIG. 44 illustrates an example method for determining a type of interactive surface to render.

FIG. 44 illustrates an example method 4400 for determining a type of interactive surface to render. The method may begin at step 4410, where a computing system may send information configured to render a virtual space on a display device associated with a first user, the virtual space comprising a virtual room. At step 4420, the computing system may receive an input from a first user selecting a particular virtual object. At step 4430, the computing system may calculate a score for a set of interactive-surface types, the score being based on a current context, wherein the current context is based on information associated with the virtual object. At step 4440, the computing system may select, from the set of interactive-surface types, one of the interactive-surface types based on the selected interactive-surface type having a score greater than a threshold score. At step 4450, the computing system may send information configured to render an interactive surface that is of the selected interactive-surface type. Particular embodiments may repeat one or more steps of the method of FIG. 44, where appropriate. Although this disclosure describes and illustrates particular steps of the method of FIG. 44 as occurring in a particular order, this disclosure contemplates any suitable steps of the method of FIG. 44 occurring in any suitable order. Moreover, although this disclosure describes and illustrates an example method for determining a type of interactive surface to render, including the particular steps of the method of FIG. 44, this disclosure contemplates any suitable method determining a type of interactive surface to render, including any suitable steps, which may include all, some, or none of the steps of the method of FIG. 44, where appropriate. Furthermore, although this disclosure describes and illustrates particular components, devices, or systems carrying out particular steps of the method of FIG. 44, this disclosure contemplates any suitable combination of any suitable components, devices, or systems carrying out any suitable steps of the method of FIG. 44.

Figure 45:
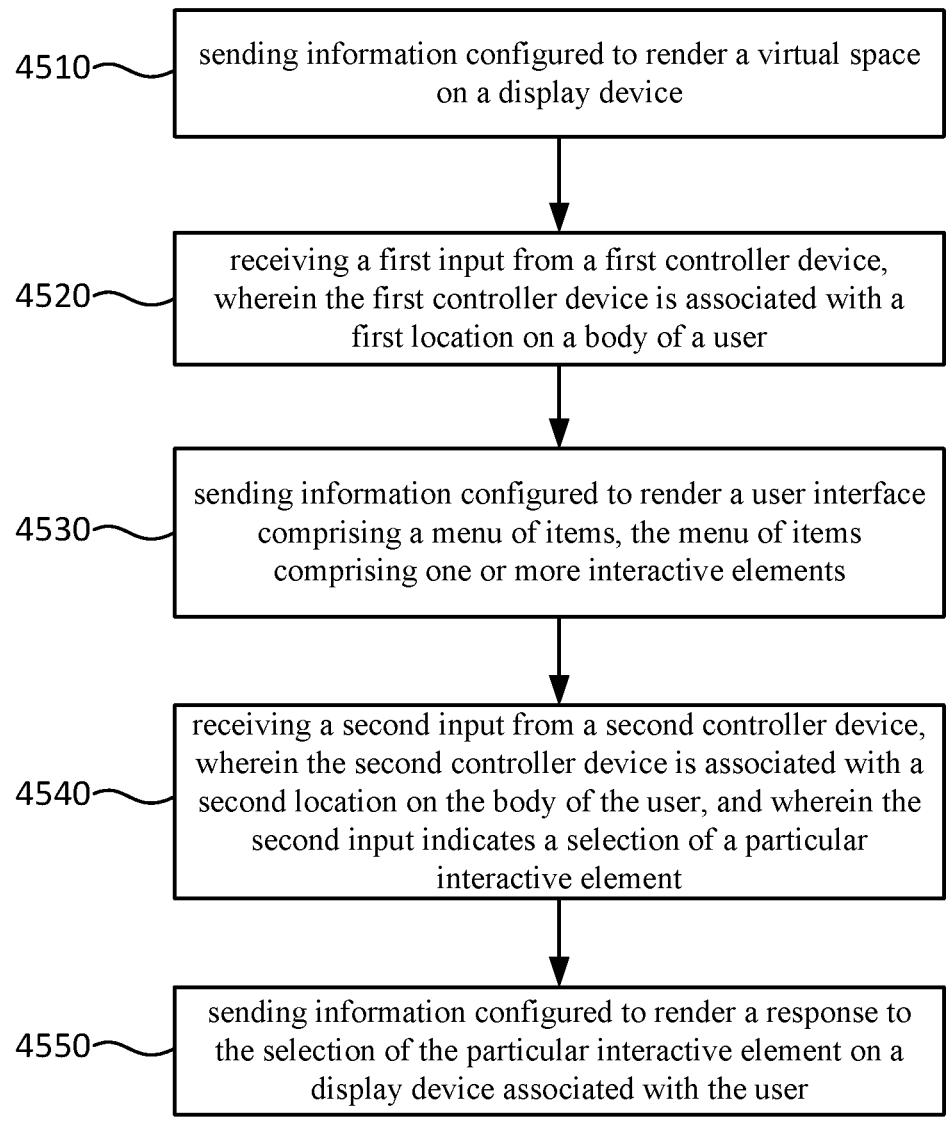
FIG. 45 illustrates an example method for receiving inputs from controllers associated with locations on the body of a user.

FIG. 45 illustrates an example method 4500 for receiving inputs from controllers associated with locations on the body of a user. The method may begin at step 4510, where a computing system may send information configured to render a virtual space on a display device. At step 4520, the computing system may receive a first input from a first controller device, wherein the first controller device is associated with a first location on a body of a user. At step 4530, the computing system may send information configured to render a user interface comprising a menu of items, the menu of items comprising one or more interactive elements. At step 4540, the computing system may receive a second input from a second controller device, wherein the second controller device is associated with a second location on the body of the user, and wherein the second input indicates a selection of a particular interactive element. At step 4550, the computing system may send information configured to render a response to the selection of the particular interactive element on a display device associated with the user. Particular embodiments may repeat one or more steps of the method of FIG. 45, where appropriate. Although this disclosure describes and illustrates particular steps of the method of FIG. 45 as occurring in a particular order, this disclosure contemplates any suitable steps of the method of FIG. 45 occurring in any suitable order. Moreover, although this disclosure describes and illustrates an example method for receiving inputs from controllers associated with locations on the body of a user, including the particular steps of the method of FIG. 45, this disclosure contemplates any suitable method for receiving inputs from controllers associated with locations on the body of a user, including any suitable steps, which may include all, some, or none of the steps of the method of FIG. 45, where appropriate. Furthermore, although this disclosure describes and illustrates particular components, devices, or systems carrying out particular steps of the method of FIG. 45, this disclosure contemplates any suitable combination of any suitable components, devices, or systems carrying out any suitable steps of the method of FIG. 45.

Figure 46:
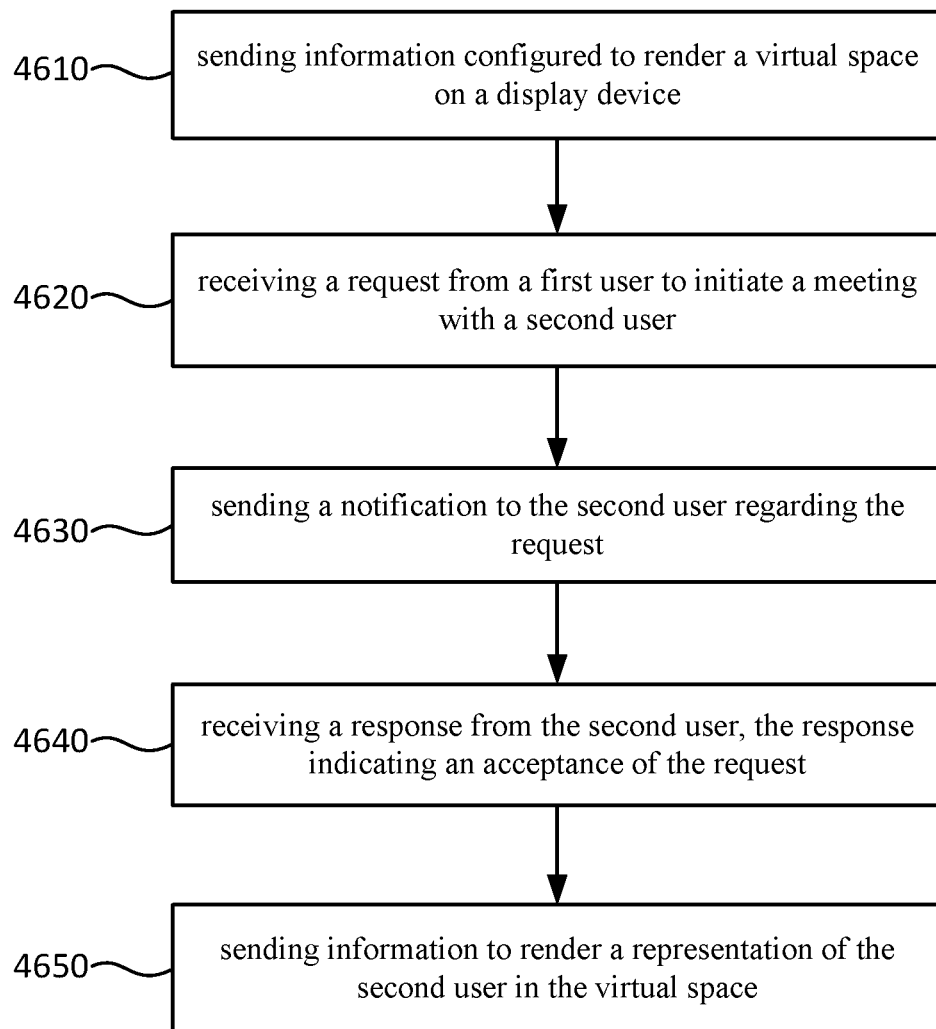
FIG. 46 illustrates an example method for initiating a virtual meeting.

FIG. 46 illustrates an example method 4600 for initiating a virtual meeting. The method may begin at step 4610, where a computing system may send information configured to render a virtual space on a display device. At step 4620, the computing system may receive a first user to initiate a meeting with a second user. At step 4630, the computing system sends a notification to the second user regarding the request. At step 4640, the computing system may receive a response from the second user, the response indicating an acceptance of the request. At step 4650, the computing system may send information to render a representation of the second user in the virtual space. Particular embodiments may repeat one or more steps of the method of FIG. 46, where appropriate. Although this disclosure describes and illustrates particular steps of the method of FIG. 46 as occurring in a particular order, this disclosure contemplates any suitable steps of the method of FIG. 46 occurring in any suitable order. Moreover, although this disclosure describes and illustrates an example method for initiating a virtual meeting, including the particular steps of the method of FIG. 46, this disclosure contemplates any suitable method for initiating a virtual meeting, including any suitable steps, which may include all, some, or none of the steps of the method of FIG. 46, where appropriate. Furthermore, although this disclosure describes and illustrates particular components, devices, or systems carrying out particular steps of the method of FIG. 46, this disclosure contemplates any suitable combination of any suitable components, devices, or systems carrying out any suitable steps of the method of FIG. 46.

Figure 47:
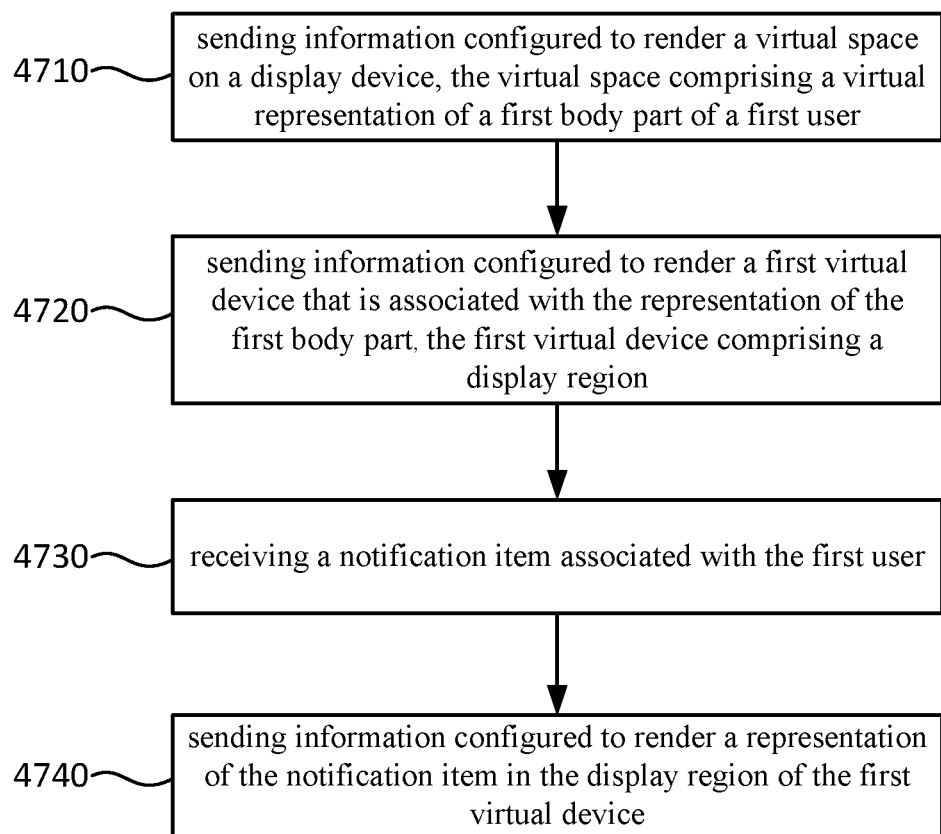
FIG. 47 illustrates an example method for receiving notifications on a virtual device.

FIG. 47 illustrates an example method 4700 for receiving notifications on a virtual device. The method may begin at step 4710, where a computing system may send information configured to render a virtual space on a display device, the virtual space comprising a virtual representation of a first body part of a first user. At step 4720, the computing system may send information configured to render a first virtual device that is associated with the representation of the first body part, the first virtual device comprising a display region. At step 4730, the computing system may receive a notification item associated with the first user. At step 4740, the computing system may send information configured to render a representation of the notification item in the display region of the first virtual device. Particular embodiments may repeat one or more steps of the method of FIG. 47, where appropriate. Although this disclosure describes and illustrates particular steps of the method of FIG. 47 as occurring in a particular order, this disclosure contemplates any suitable steps of the method of FIG. 47 occurring in any suitable order. Moreover, although this disclosure describes and illustrates an example method for receiving notifications on a virtual device, including the particular steps of the method of FIG. 47, this disclosure contemplates any suitable method for receiving notifications on a virtual device, including any suitable steps, which may include all, some, or none of the steps of the method of FIG. 47, where appropriate. Furthermore, although this disclosure describes and illustrates particular components, devices, or systems carrying out particular steps of the method of FIG. 47, this disclosure contemplates any suitable combination of any suitable components, devices, or systems carrying out any suitable steps of the method of FIG. 47.

Figure 48:
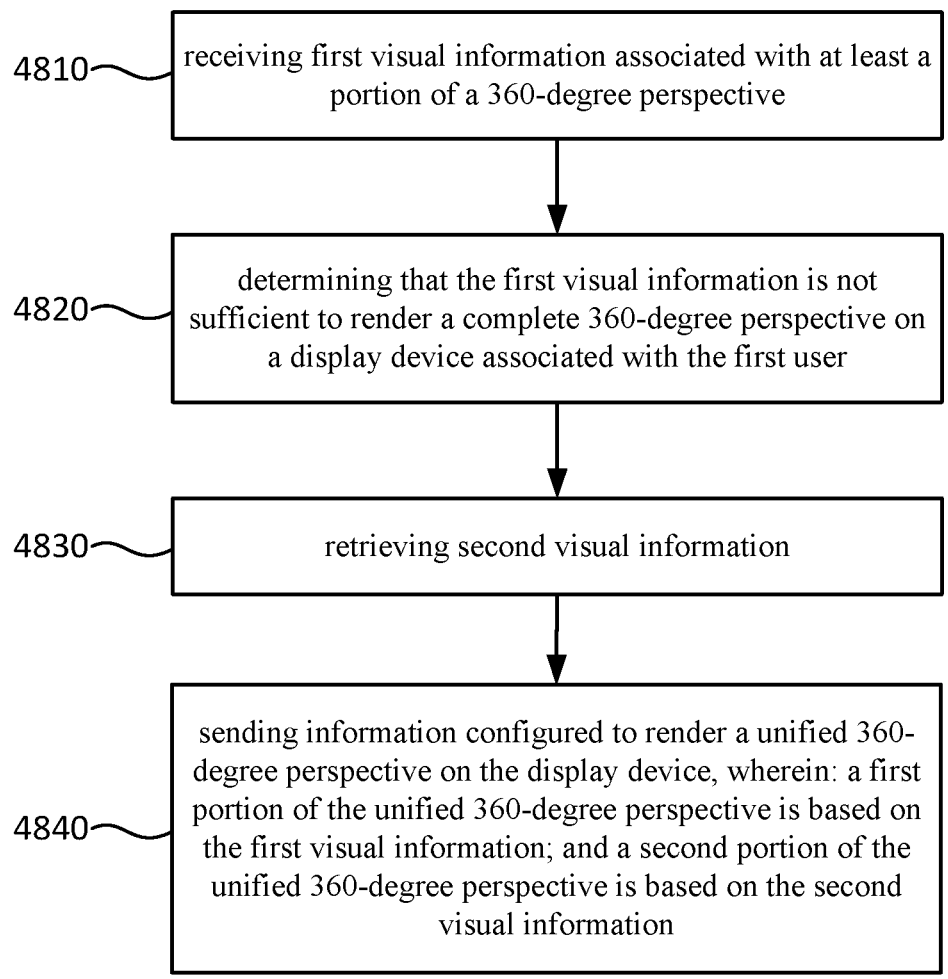
FIG. 48 illustrates an example method for rendering a unified 360-degree perspective having two portions.

FIG. 48 illustrates an example method 4800 for rendering a unified 360-degree perspective having two portions. The method may begin at step 4810, where a computing system may receive first visual information associated with at least a portion of a 360-degree perspective. At step 4820, the computing system may determine that the first visual information is not sufficient to render a complete 360-degree perspective on a display device associated with the first user. At step 4830, the computing system may retrieve second visual information. At step 4840, the computing system may send information configured to render a unified 360-degree perspective on the display device, wherein: a first portion of the unified 360-degree perspective is based on the first visual information; and a second portion of the unified 360-degree perspective is based on the second visual information. Particular embodiments may repeat one or more steps of the method of FIG. 48, where appropriate. Although this disclosure describes and illustrates particular steps of the method of FIG. 48 as occurring in a particular order, this disclosure contemplates any suitable steps of the method of FIG. 48 occurring in any suitable order. Moreover, although this disclosure describes and illustrates an example method for rendering a unified 360-degree perspective having two portions, including the particular steps of the method of FIG. 48, this disclosure contemplates any suitable method for rendering a unified 360-degree perspective having two portions, including any suitable steps, which may include all, some, or none of the steps of the method of FIG. 48, where appropriate. Furthermore, although this disclosure describes and illustrates particular components, devices, or systems carrying out particular steps of the method of FIG. 48, this disclosure contemplates any suitable combination of any suitable components, devices, or systems carrying out any suitable steps of the method of FIG. 48.

Figure 49:
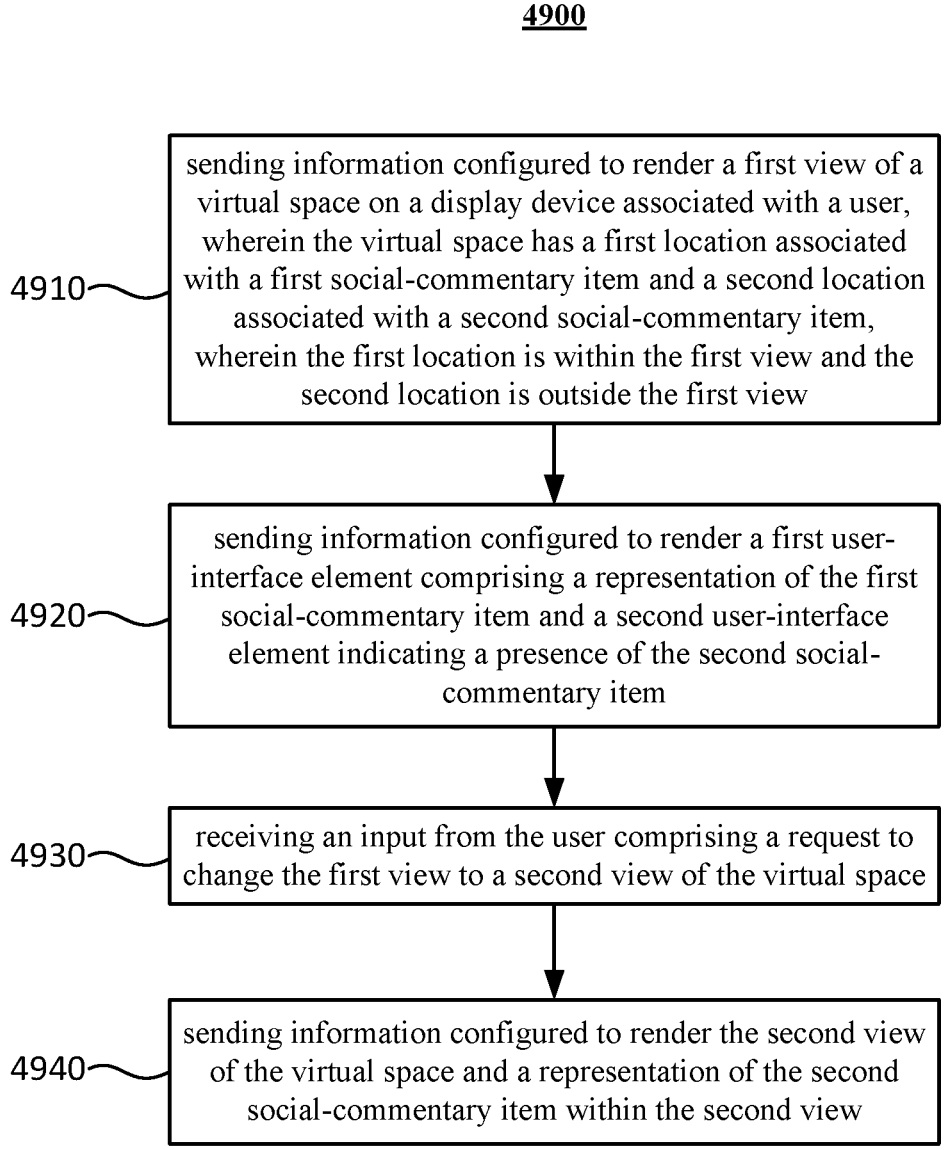
FIG. 49 illustrates an example method for displaying social-commentary items in respective associated locations in a virtual space.

FIG. 49 illustrates an example method 4900 for displaying social-commentary items in respective associated locations in a virtual space. The method may begin at step 4910, where a computing system may send information configured to render a first view of a virtual space on a display device associated with a user, wherein the virtual space has a first location associated with a first social-commentary item and a second location associated with a second social-commentary item, wherein the first location is within the first view and the second location is outside the first view. At step 4920, the computing system may send information configured to render a first user-interface element comprising a representation of the first social-commentary item and a second user-interface element indicating a presence of the second social-commentary item. At step 4930, the computing system may receive an input from the user comprising a request to change the first view to a second view of the virtual space. At step 4940, the computing system may send information configured to render the second view of the virtual space and a representation of the second social-commentary item within the second view. Particular embodiments may repeat one or more steps of the method of FIG. 49, where appropriate. Although this disclosure describes and illustrates particular steps of the method of FIG. 49 as occurring in a particular order, this disclosure contemplates any suitable steps of the method of FIG. 49 occurring in any suitable order. Moreover, although this disclosure describes and illustrates an example method for displaying social-commentary items in respective associated locations in a virtual space, including the particular steps of the method of FIG. 49, this disclosure contemplates any suitable method displaying social-commentary items in respective associated locations in a virtual space, including any suitable steps, which may include all, some, or none of the steps of the method of FIG. 49, where appropriate. Furthermore, although this disclosure describes and illustrates particular components, devices, or systems carrying out particular steps of the method of FIG. 49, this disclosure contemplates any suitable combination of any suitable components, devices, or systems carrying out any suitable steps of the method of FIG. 49.

Figure 50:
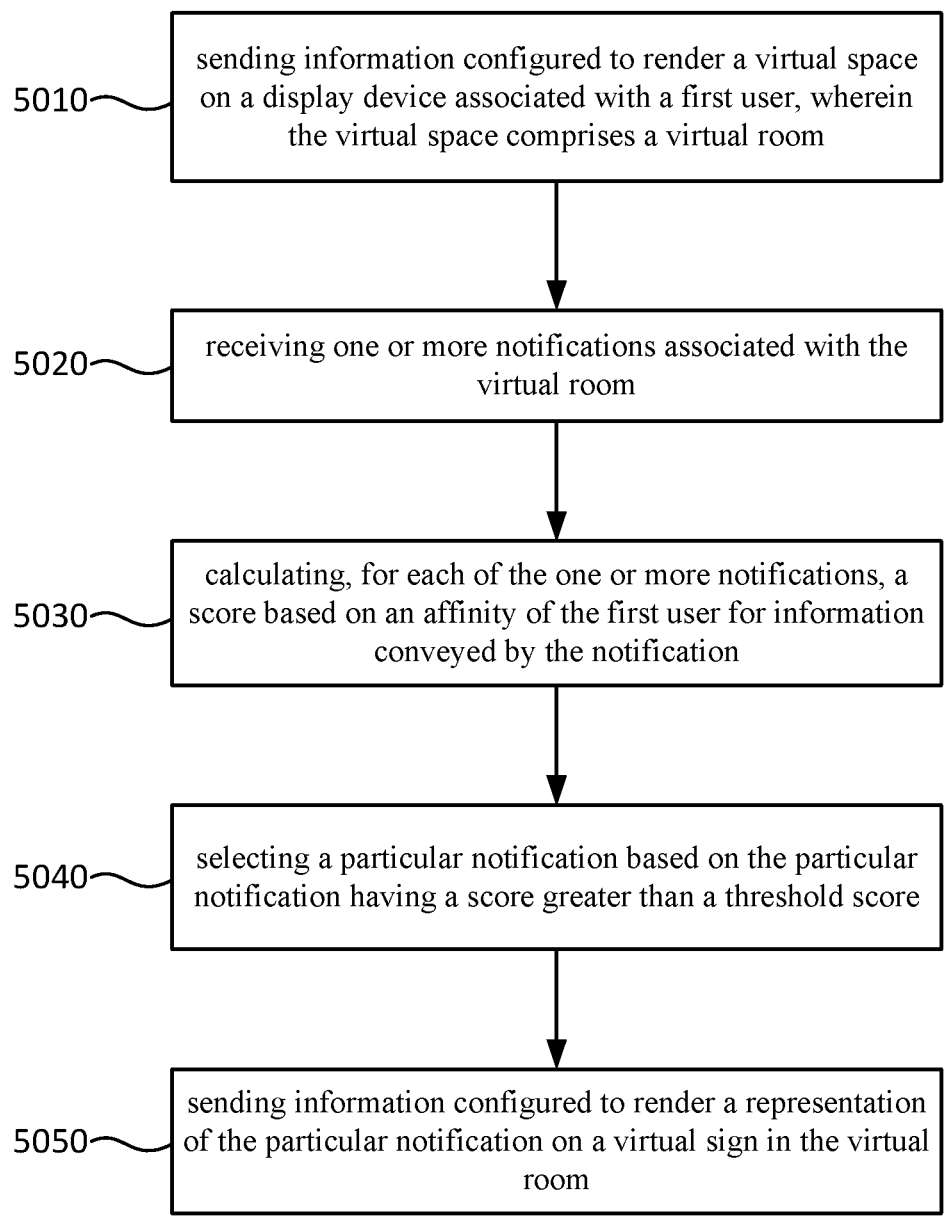
FIG. 50 illustrates an example method for displaying notifications on a virtual sign.

FIG. 50 illustrates an example method 5000 for displaying notifications on a virtual sign. The method may begin at step 5010, where a computing system may send information configured to render a virtual space on a display device associated with a first user, wherein the virtual space comprises a virtual room. At step 5020, the computing system may receive one or more notifications associated with the virtual room. At step 5030, the computing system may calculate, for each of the one or more notifications, a score based on an affinity of the first user for information conveyed by the notification. At step 5040, the computing system may select a particular notification based on the particular notification having a score greater than a threshold score. At step 5050, the computing system may send information configured to render a representation of the particular notification on a virtual sign in the virtual room. Particular embodiments may repeat one or more steps of the method of FIG. 50, where appropriate. Although this disclosure describes and illustrates particular steps of the method of FIG. 50 as occurring in a particular order, this disclosure contemplates any suitable steps of the method of FIG. 50 occurring in any suitable order. Moreover, although this disclosure describes and illustrates an example method for displaying notifications on a virtual sign, including the particular steps of the method of FIG. 50, this disclosure contemplates any suitable method for displaying notifications on a virtual sign, including any suitable steps, which may include all, some, or none of the steps of the method of FIG. 50, where appropriate. Furthermore, although this disclosure describes and illustrates particular components, devices, or systems carrying out particular steps of the method of FIG. 50, this disclosure contemplates any suitable combination of any suitable components, devices, or systems carrying out any suitable steps of the method of FIG. 50.

Figure 51:
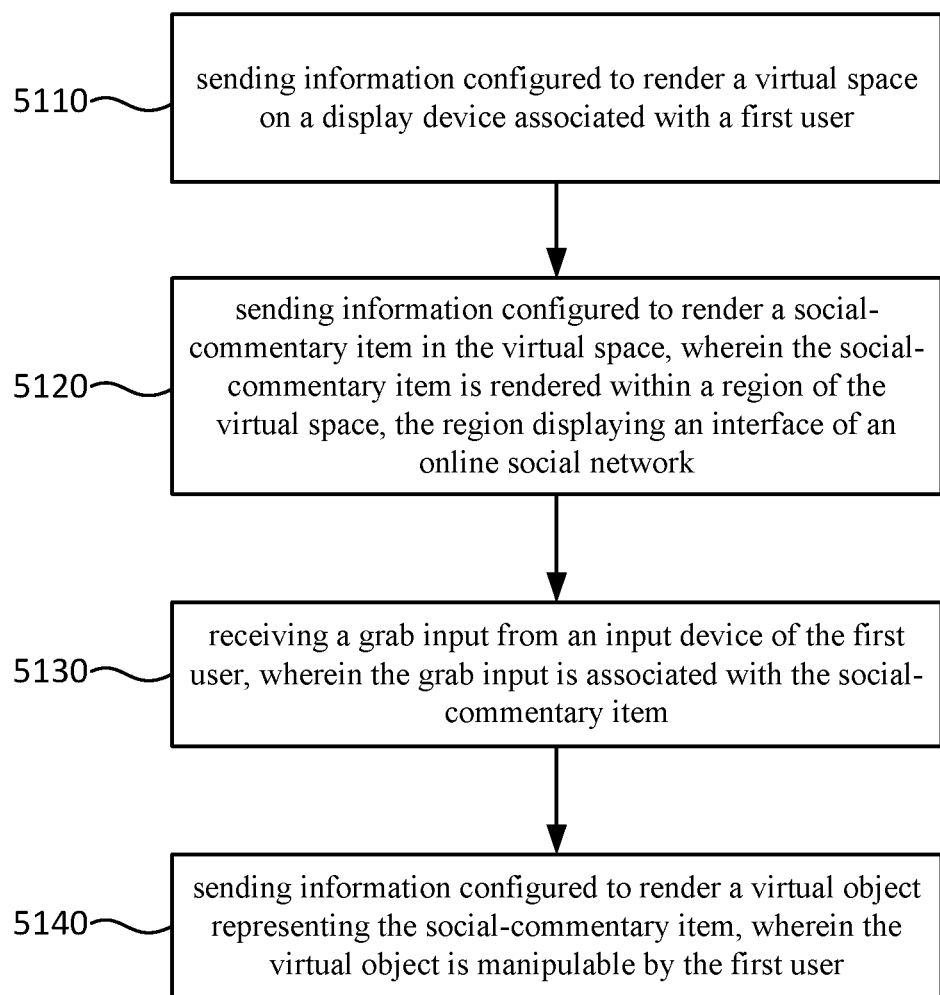
FIG. 51 illustrates an example method for rendering a manipulable virtual object representing a social-commentary item.

FIG. 51 illustrates an example method 5100 for rendering a manipulable virtual object representing a social-commentary item. The method may begin at step 5110, where a computing system may send information configured to render a virtual space on a display device associated with a first user. At step 5120, the computing system may send information configured to render a social-commentary item in the virtual space, wherein the social-commentary item is rendered within a region of the virtual space, the region displaying an interface of an online social network. At step 5130, the computing system may receive a grab input from an input device of the first user, wherein the grab input is associated with the social-commentary item. At step 5140, the computing system may send information configured to render a virtual object representing the social-commentary item, wherein the virtual object is manipulable by the first user. Particular embodiments may repeat one or more steps of the method of FIG. 51, where appropriate. Although this disclosure describes and illustrates particular steps of the method of FIG. 51 as occurring in a particular order, this disclosure contemplates any suitable steps of the method of FIG. 51 occurring in any suitable order. Moreover, although this disclosure describes and illustrates an example method for rendering a manipulable virtual object representing a social-commentary item, including the particular steps of the method of FIG. 51, this disclosure contemplates any suitable method for rendering a manipulable virtual object representing a social-commentary item, including any suitable steps, which may include all, some, or none of the steps of the method of FIG. 51, where appropriate. Furthermore, although this disclosure describes and illustrates particular components, devices, or systems carrying out particular steps of the method of FIG. 51, this disclosure contemplates any suitable combination of any suitable components, devices, or systems carrying out any suitable steps of the method of FIG. 51.

Figure 52:
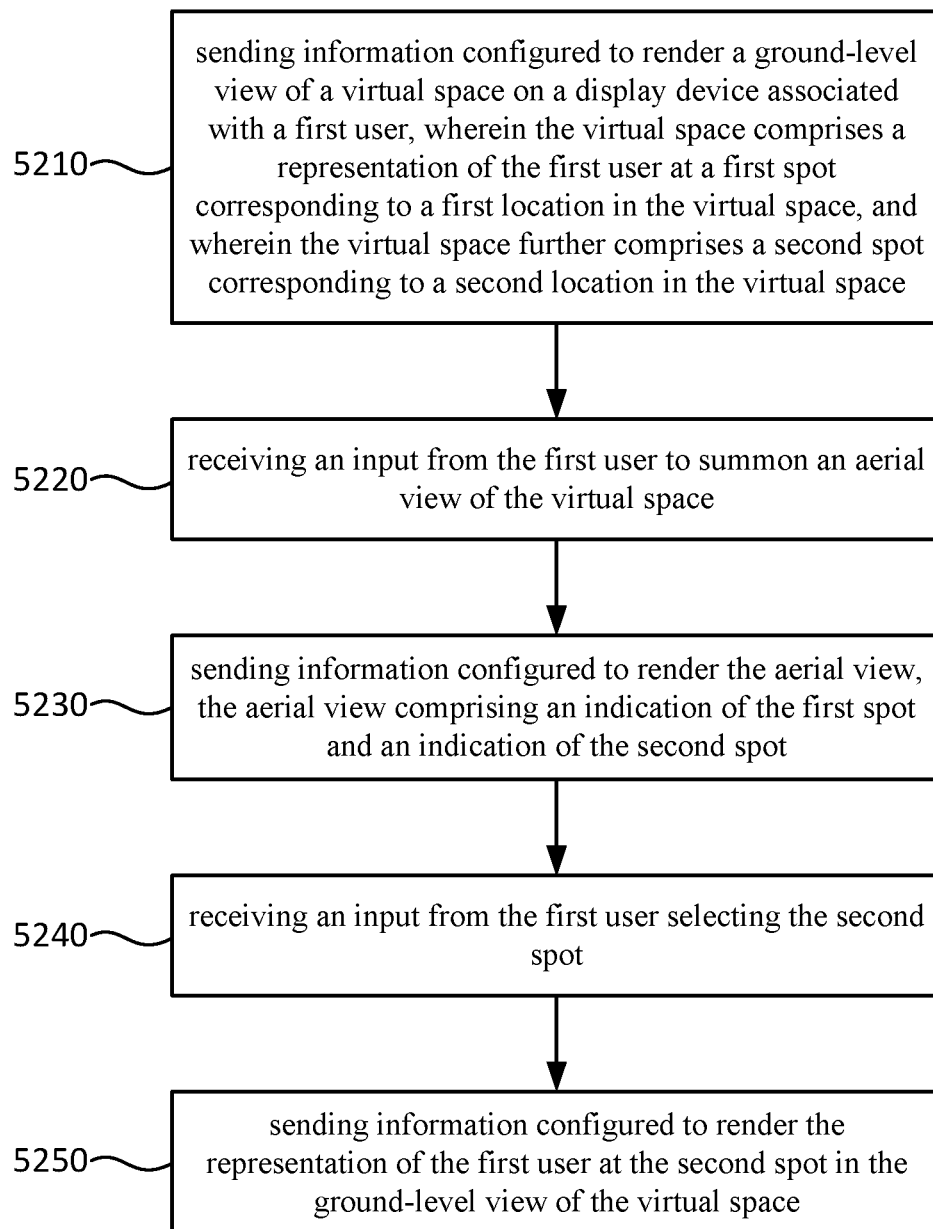
FIG. 52 illustrates an example method for presenting an aerial view of a virtual space and re-positioning a user within the virtual space.

FIG. 52 illustrates an example method 5200 for presenting an aerial view of a virtual space and re-positioning a user within the virtual space. The method may begin at step S210, where a computing system may send information configured to render a ground-level view of a virtual space on a display device associated with a first user, wherein the virtual space comprises a representation of the first user at a first spot corresponding to a first location in the virtual space, and wherein the virtual space further comprises a second spot corresponding to a second location in the virtual space. At step 5220, the computing system may receive an input from the first user to summon an aerial view of the virtual space. At step 5230, the computing system may send information configured to render the aerial view, the aerial view comprising an indication of the first spot and an indication of the second spot. At step 5240, the computing system may receive an input from the first user selecting the second spot. At step 5250, the computing system may send information configured to render the representation of the first user at the second spot in the ground-level view of the virtual space. Particular embodiments may repeat one or more steps of the method of FIG. 52, where appropriate. Although this disclosure describes and illustrates particular steps of the method of FIG. 52 as occurring in a particular order, this disclosure contemplates any suitable steps of the method of FIG. 52 occurring in any suitable order. Moreover, although this disclosure describes and illustrates an example method for presenting an aerial view of a virtual space and re-positioning a user within the virtual space, including the particular steps of the method of FIG. 52, this disclosure contemplates any suitable method for presenting an aerial view of a virtual space and re-positioning a user within the virtual space, including any suitable steps, which may include all, some, or none of the steps of the method of FIG. 52, where appropriate. Furthermore, although this disclosure describes and illustrates particular components, devices, or systems carrying out particular steps of the method of FIG. 52, this disclosure contemplates any suitable combination of any suitable components, devices, or systems carrying out any suitable steps of the method of FIG. 52.

Figure 53:
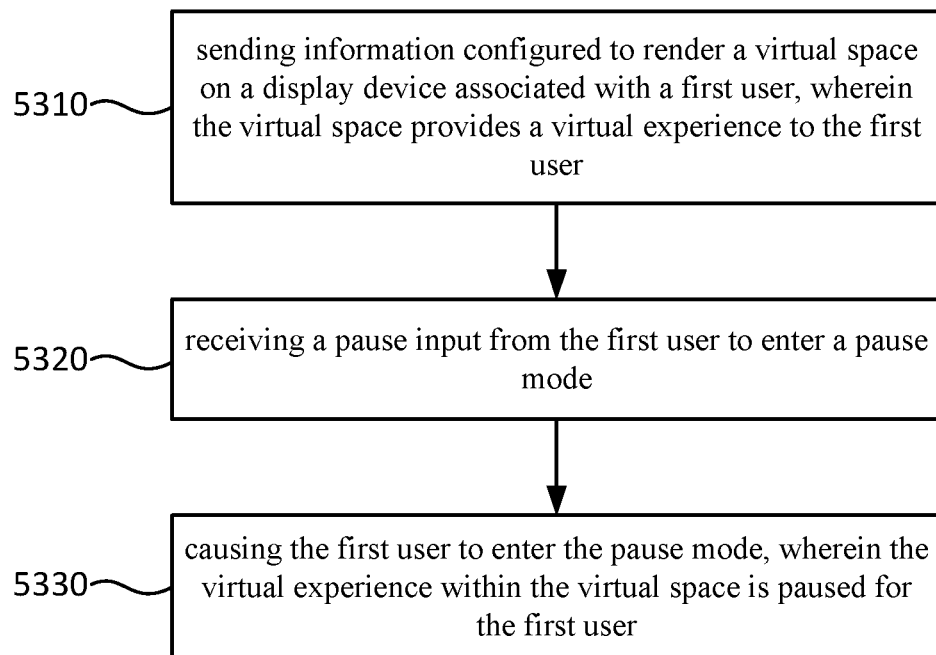
FIG. 53 illustrates an example method for pausing a virtual experience.

FIG. 53 illustrates an example method 5300 for pausing a virtual experience. The method may begin at step 5310, where a computing system may send information configured to render a virtual space on a display device associated with a first user, wherein the virtual space provides a virtual experience to the first user. At step 5320, the computing system may receive a pause input from the first user to enter a pause mode. At step 5330, the computing system may cause the first user to enter the pause mode, wherein the virtual experience within the virtual space is paused for the first user. Particular embodiments may repeat one or more steps of the method of FIG. 53, where appropriate. Although this disclosure describes and illustrates particular steps of the method of FIG. 53 as occurring in a particular order, this disclosure contemplates any suitable steps of the method of FIG. 53 occurring in any suitable order. Moreover, although this disclosure describes and illustrates an example method for pausing a virtual experience, including the particular steps of the method of FIG. 53, this disclosure contemplates any suitable method for pausing a virtual experience, including any suitable steps, which may include all, some, or none of the steps of the method of FIG. 53, where appropriate. Furthermore, although this disclosure describes and illustrates particular components, devices, or systems carrying out particular steps of the method of FIG. 53, this disclosure contemplates any suitable combination of any suitable components, devices, or systems carrying out any suitable steps of the method of FIG. 53.

Figure 54:
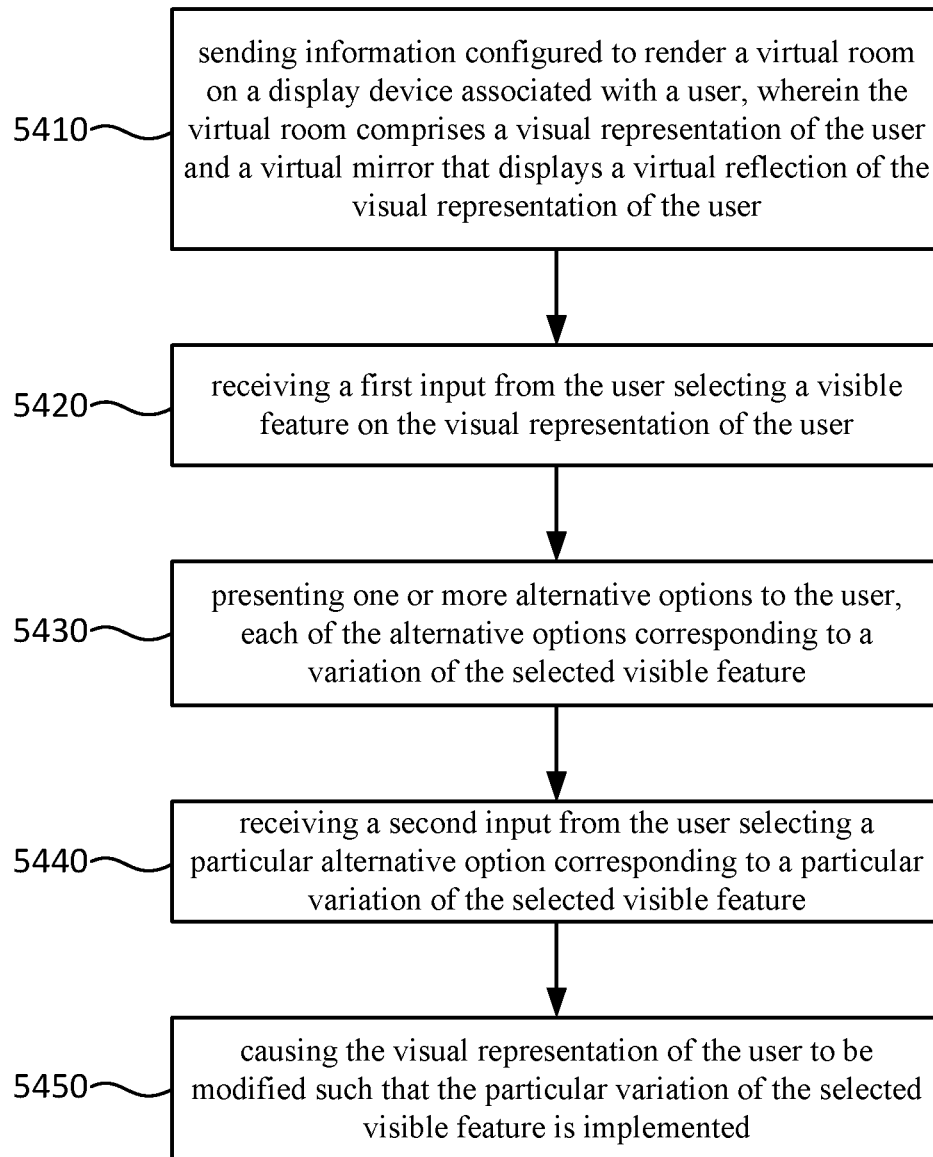
FIG. 54 illustrates an example method for customizing a virtual representation of a user.

FIG. 54 illustrates an example method 5400 for customizing a virtual representation of a user. The method may begin at step 5410, where a computing system may send information configured to render a virtual room on a display device associated with a user, wherein the virtual room comprises a visual representation of the user and a virtual mirror that displays a virtual reflection of the visual representation of the user. At step 5420, the computing system may receive a first input from the user selecting a visible feature on the visual representation of the user. At step 5430, the computing system may present one or more alternative options to the user, each of the alternative options corresponding to a variation of the selected visible feature. At step 5440, the computing system may receive a second input from the user selecting a particular alternative option corresponding to a particular variation of the selected visible feature. At step 5450, the computing system may cause the visual representation of the user to be modified such that the particular variation of the selected visible feature is implemented. Particular embodiments may repeat one or more steps of the method of FIG. 54, where appropriate. Although this disclosure describes and illustrates particular steps of the method of FIG. 54 as occurring in a particular order, this disclosure contemplates any suitable steps of the method of FIG. 54 occurring in any suitable order. Moreover, although this disclosure describes and illustrates an example method for customizing a virtual representation of a user, including the particular steps of the method of FIG. 54, this disclosure contemplates any suitable method for customizing a virtual representation of a user, including any suitable steps, which may include all, some, or none of the steps of the method of FIG. 54, where appropriate. Furthermore, although this disclosure describes and illustrates particular components, devices, or systems carrying out particular steps of the method of FIG. 54, this disclosure contemplates any suitable combination of any suitable components, devices, or systems carrying out any suitable steps of the method of FIG. 54.

Figure 55:
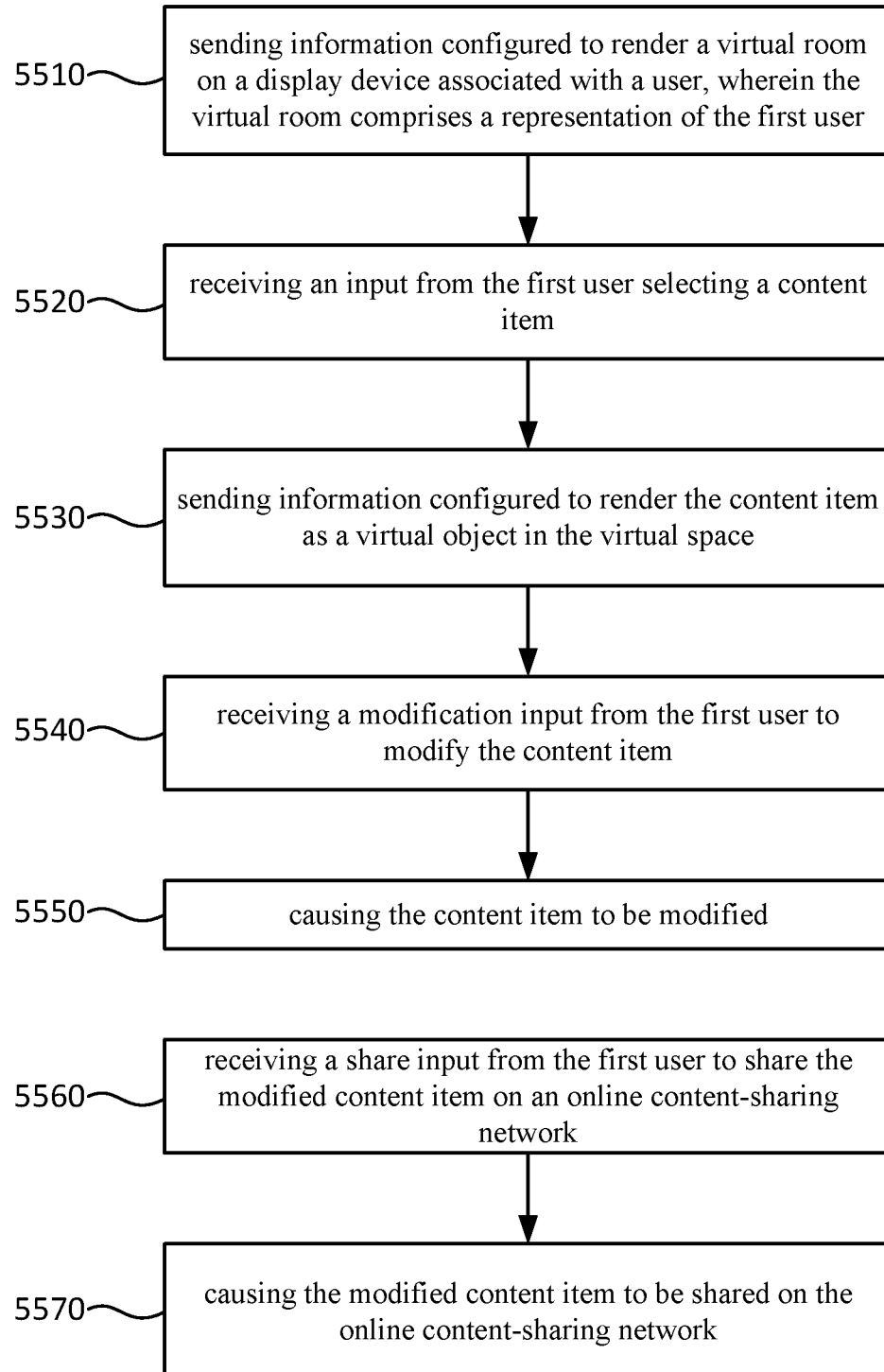
FIG. 55 illustrates an example method for altering and sharing virtual content.

FIG. 55 illustrates an example method 5500 for altering and sharing virtual content. The method may begin at step 5510, where a computing system may send information configured to render a virtual room on a display device associated with a user, wherein the virtual room comprises a representation of the first user. At step 5520, the computing system may receive an input from the first user selecting a content item. At step 5530, the computing system may send information configured to render the content item as a virtual object in the virtual space. At step 5540, the computing system may receive a modification input from the first user to modify the content item. At step 5550, the computing system may cause the content item to be modified. At step 5560, the computing system may receive a share input from the first user to share the modified content item on an online content-sharing network. At step 5570, the computing system may cause the modified content item to be shared on the online content-sharing network. Particular embodiments may repeat one or more steps of the method of FIG. 55, where appropriate. Although this disclosure describes and illustrates particular steps of the method of FIG. 55 as occurring in a particular order, this disclosure contemplates any suitable steps of the method of FIG. 55 occurring in any suitable order. Moreover, although this disclosure describes and illustrates an example method for altering and sharing virtual content, including the particular steps of the method of FIG. 55, this disclosure contemplates any suitable method for altering and sharing virtual content, including any suitable steps, which may include all, some, or none of the steps of the method of FIG. 55, where appropriate. Furthermore, although this disclosure describes and illustrates particular components, devices, or systems carrying out particular steps of the method of FIG. 55, this disclosure contemplates any suitable combination of any suitable components, devices, or systems carrying out any suitable steps of the method of FIG. 55.

Figure 56:
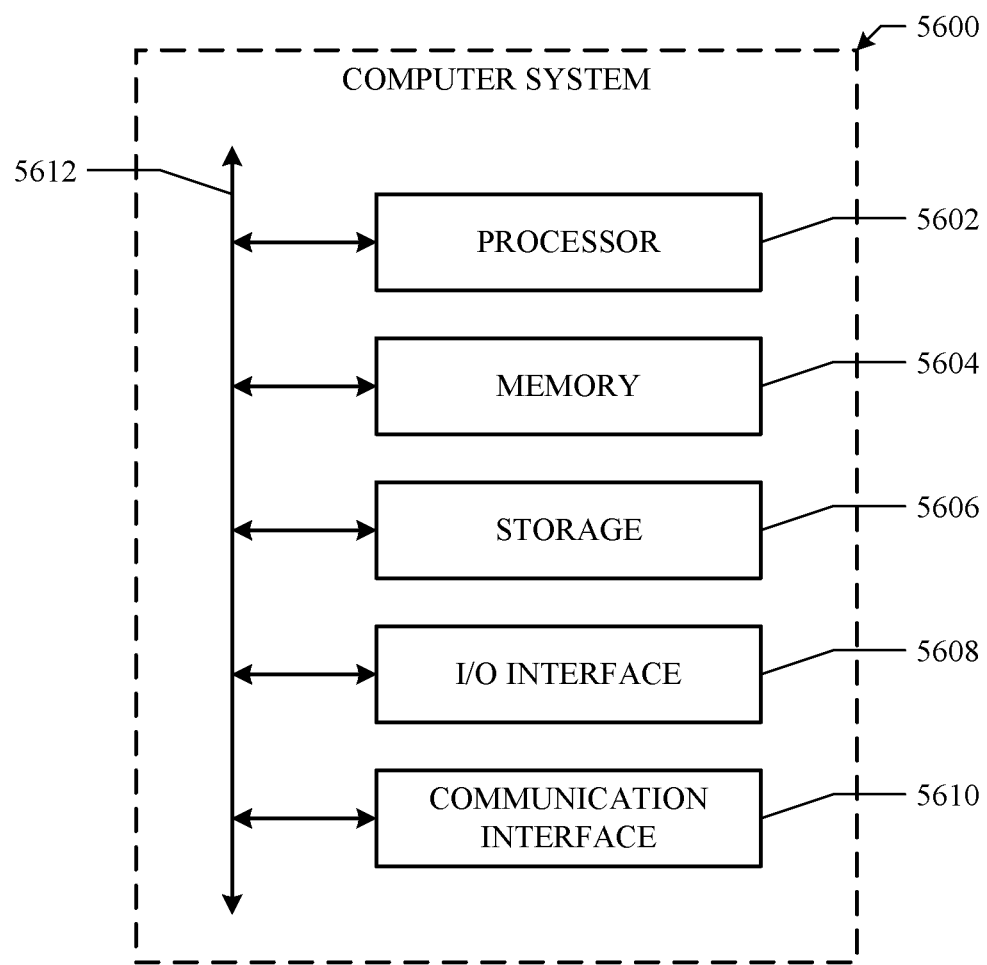
FIG. 56 illustrates an example computer system.

FIG. 56 illustrates an example computer system 5600. In particular embodiments, one or more computer systems 5600 perform one or more steps of one or more methods described or illustrated herein. In particular embodiments, one or more computer systems 5600 provide functionality described or illustrated herein. In particular embodiments, software running on one or more computer systems 5600 performs one or more steps of one or more methods described or illustrated herein or provides functionality described or illustrated herein. Particular embodiments include one or more portions of one or more computer systems 5600. Herein, reference to a computer system may encompass a computing device, and vice versa, where appropriate. Moreover, reference to a computer system may encompass one or more computer systems, where appropriate.

This disclosure contemplates any suitable number of computer systems 5600. This disclosure contemplates computer system 5600 taking any suitable physical form. As example and not by way of limitation, computer system 5600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 5600 may include one or more computer systems 5600; be unitary or distributed; span multiple locations; span multiple machines; span multiple data centers; or reside in a cloud, which may include one or more cloud components in one or more networks. Where appropriate, one or more computer systems 5600 may perform without substantial spatial or temporal limitation one or more steps of one or more methods described or illustrated herein. As an example and not by way of limitation, one or more computer systems 5600 may perform in real time or in batch mode one or more steps of one or more methods described or illustrated herein. One or more computer systems 5600 may perform at different times or at different locations one or more steps of one or more methods described or illustrated herein, where appropriate.

In particular embodiments, computer system 5600 includes a processor 5602, memory 5604, storage 5606, an input/output (I/O) interface 5608, a communication interface 5610, and a bus 5612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 5602 includes hardware for executing instructions, such as those making up a computer program. As an example and not by way of limitation, to execute instructions, processor 5602 may retrieve (or fetch) the instructions from an internal register, an internal cache, memory 5604, or storage 5606; decode and execute them; and then write one or more results to an internal register, an internal cache, memory 5604, or storage 5606. In particular embodiments, processor 5602 may include one or more internal caches for data, instructions, or addresses. This disclosure contemplates processor 5602 including any suitable number of any suitable internal caches, where appropriate. As an example and not by way of limitation, processor 5602 may include one or more instruction caches, one or more data caches, and one or more translation lookaside buffers (TLBs). Instructions in the instruction caches may be copies of instructions in memory 5604 or storage 5606, and the instruction caches may speed up retrieval of those instructions by processor 5602. Data in the data caches may be copies of data in memory 5604 or storage 5606 for instructions executing at processor 5602 to operate on; the results of previous instructions executed at processor 5602 for access by subsequent instructions executing at processor 5602 or for writing to memory 5604 or storage 5606; or other suitable data. The data caches may speed up read or write operations by processor 5602. The TLBs may speed up virtual-address translation for processor 5602. In particular embodiments, processor 5602 may include one or more internal registers for data, instructions, or addresses. This disclosure contemplates processor 5602 including any suitable number of any suitable internal registers, where appropriate. Where appropriate, processor 5602 may include one or more arithmetic logic units (ALUs); be a multi-core processor; or include one or more processors 5602. Although this disclosure describes and illustrates a particular processor, this disclosure contemplates any suitable processor.

In particular embodiments, memory 5604 includes main memory for storing instructions for processor 5602 to execute or data for processor 5602 to operate on. As an example and not by way of limitation, computer system 5600 may load instructions from storage 5606 or another source (such as, for example, another computer system 5600) to memory 5604. Processor 5602 may then load the instructions from memory 5604 to an internal register or internal cache. To execute the instructions, processor 5602 may retrieve the instructions from the internal register or internal cache and decode them. During or after execution of the instructions, processor 5602 may write one or more results (which may be intermediate or final results) to the internal register or internal cache. Processor 5602 may then write one or more of those results to memory 5604. In particular embodiments, processor 5602 executes only instructions in one or more internal registers or internal caches or in memory 5604 (as opposed to storage 5606 or elsewhere) and operates only on data in one or more internal registers or internal caches or in memory 5604 (as opposed to storage 5606 or elsewhere). One or more memory buses (which may each include an address bus and a data bus) may couple processor 5602 to memory 5604. Bus 5612 may include one or more memory buses, as described below. In particular embodiments, one or more memory management units (MMUs) reside between processor 5602 and memory 5604 and facilitate accesses to memory 5604 requested by processor 5602. In particular embodiments, memory 5604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 5604 may include one or more memories 5604, where appropriate. Although this disclosure describes and illustrates particular memory, this disclosure contemplates any suitable memory.

In particular embodiments, storage 5606 includes mass storage for data or instructions. As an example and not by way of limitation, storage 5606 may include a hard disk drive (HDD), a floppy disk drive, flash memory, an optical disc, a magneto-optical disc, magnetic tape, or a Universal Serial Bus (USB) drive or a combination of two or more of these. Storage 5606 may include removable or non-removable (or fixed) media, where appropriate. Storage 5606 may be internal or external to computer system 5600, where appropriate. In particular embodiments, storage 5606 is non-volatile, solid-state memory. In particular embodiments, storage 5606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 5606 taking any suitable physical form. Storage 5606 may include one or more storage control units facilitating communication between processor 5602 and storage 5606, where appropriate. Where appropriate, storage 5606 may include one or more storages 5606. Although this disclosure describes and illustrates particular storage, this disclosure contemplates any suitable storage.

In particular embodiments, I/O interface 5608 includes hardware, software, or both, providing one or more interfaces for communication between computer system 5600 and one or more I/O devices. Computer system 5600 may include one or more of these I/O devices, where appropriate. One or more of these I/O devices may enable communication between a person and computer system 5600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 5608 for them. Where appropriate, I/O interface 5608 may include one or more device or software drivers enabling processor 5602 to drive one or more of these I/O devices. I/O interface 5608 may include one or more I/O interfaces 5608, where appropriate. Although this disclosure describes and illustrates a particular I/O interface, this disclosure contemplates any suitable I/O interface.

In particular embodiments, communication interface 5610 includes hardware, software, or both providing one or more interfaces for communication (such as, for example, packet-based communication) between computer system 5600 and one or more other computer systems 5600 or one or more networks. As an example and not by way of limitation, communication interface 5610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 5610 for it. As an example and not by way of limitation, computer system 5600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 5600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 5600 may include any suitable communication interface 5610 for any of these networks, where appropriate. Communication interface 5610 may include one or more communication interfaces 5610, where appropriate. Although this disclosure describes and illustrates a particular communication interface, this disclosure contemplates any suitable communication interface.

In particular embodiments, bus 5612 includes hardware, software, or both coupling components of computer system 5600 to each other. As an example and not by way of limitation, bus 5612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 5612 may include one or more buses 5612, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    sending information configured to display a virtual reality space using a physical display device associated with a first user, the virtual reality space comprising a virtual room depicting an interactive surface capable of registering interactions initiated by one or more users having a virtual presence in the virtual room;
    receiving an input from the first user selecting a particular virtual object, wherein the input comprises the first user causing the particular virtual object to interact with the interactive surface;
    calculating, in response to receiving the input, a score for each interactive-surface type of a set of interactive-surface types, the score being based on a current context, wherein the current context is based on information associated with the particular virtual object;
    selecting, from the set of interactive-surface types, one of the interactive-surface types based on the selected interactive-surface type having a score greater than a threshold score; and
    sending information to alter the interactive surface based on the selected interactive-surface type.

2. The method of claim 1, wherein each of the interactive-surface types in the set of interactive-surface types specifies information about one or more properties for a respective interactive surface, the one or more properties comprising shape, size, colors, or physics of the respective interactive surface.

3. The method of claim 1, wherein the particular virtual object is a content item, and wherein the selected interactive-surface type is of a content-player type, further comprising:
    receiving an input from the first user placing the content item on the interactive surface; and
    sending information configured to display the content item in a region of the virtual space associated with the interactive surface.

4. The method of claim 3, wherein the altered interactive surface comprises a projection device that projects the content item in the region of the virtual space.

5. The method of claim 3, wherein the content item is a video item, a photo item, an audio item, a document, or an interactive item.

6. The method of claim 3, wherein there are one or more second users in the virtual room, further comprising sending information configured to display the content item on one or more display devices associated with the second users in response to receiving the input from the first user placing the content item on the interactive surface.

7. The method of claim 3, wherein there are one or more second users in the virtual room, further comprising:
    receiving an unlock-content input from the first user that specifies a subset of the second users; and
    sending information configured to display the content item to the subset of the second users.

8. The method of claim 3, wherein there are one or more second users in the virtual room, further comprising:
    sending information configured to display a content-item representation on one or more display devices associated with the second users, wherein the content item representation is a privacy screen, the privacy screen displaying no indication of content information associated with the content item.

9. The method of claim 8, further comprising:
    receiving an unlock-content input from the first user that specifies a subset of the second users; and
    sending information configured to display, in place of the privacy screen, the content item on one or more display devices associated with the second users.

10. The method of claim 1, wherein the particular virtual object is a virtual tool.

11. The method of claim 10, wherein the virtual tool is a content-browser tool or a remote-control tool, wherein the altered interactive surface displays or projects one or more content items, and wherein the virtual tool allows the first user to interact with one or more of the content items.

12. The method of claim 10, wherein the virtual tool is a ping pong paddle, and wherein the altered interactive surface is a ping pong table.

13. The method of claim 10, wherein the virtual tool is a poker chip tool, and wherein the altered interactive surface is a casino table.

14. The method of claim 1, further comprising re-positioning a virtual representation of the first user from a first location to a second location in the virtual room based on information associated with the selected interactive-surface type.

15. The method of claim 14, wherein a transition effect is employed in re-positioning the virtual representation of the first user, the transition effect being a telescoping effect.

16. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to a first user associated with the display device; and
a plurality of second nodes corresponding to a plurality of concepts or second users associated with an online social network, respectively; and
wherein the score is further based on information associated with the first node.

17. The method of claim 16, wherein the score is further based on information associated with a subset of the plurality of second nodes, the subset of the plurality of second nodes corresponding to second users who are first-degree connections of the first user.

18. The method of claim 1, wherein the score is further based on contextual information associated with an environment external to the virtual space.

19. The method of claim 18, wherein the contextual information associated with the environment is based on a current time of day or a current date.

20. The method of claim 18, wherein the contextual information associated with the environment is based on a current or future event as determined based on a calendar associated with a user of the display device.

21. The method of claim 1, wherein the score is further based on a voice command input submitted by a user of the display device.

22. The method of claim 1, wherein the computing system comprises a remote server.

23. One or more computer-readable non-transitory storage media embodying software that is operable when executed to:
send information configured to display a virtual reality space using a physical display device associated with a first user, the virtual reality space comprising a virtual room depicting an interactive surface capable of registering interactions initiated by one or more users having a virtual presence in the virtual room;
receive an input from the first user selecting a particular virtual object, wherein the input comprises the first user causing the particular virtual object to interact with the interactive surface;
calculate, in response to receiving the input, a score for each interactive-surface type of a set of interactive-surface types, the score being based on a current context, wherein the current context is based on information associated with the particular virtual object;
select, from the set of interactive-surface types, one of the interactive-surface types based on the selected interactive-surface type having a score greater than a threshold score; and
send information to alter the interactive surface based on the selected interactive-surface type.

24. A system comprising: one or more processors; and a non-transitory memory coupled to the processors comprising instructions executable by the processors, the processors operable when executing the instructions to:
send information configured to display a virtual reality space using a physical display device associated with a first user, the virtual reality space comprising a virtual room depicting an interactive surface capable of registering interactions initiated by one or more users having a virtual presence in the virtual room;
receive an input from the first user selecting a particular virtual object, wherein the input comprises the first user causing the particular virtual object to interact with the interactive surface;
calculate, in response to receiving the input, a score for each interactive-surface type of a set of interactive-surface types, the score being based on a current context, wherein the current context is based on information associated with the particular virtual object;
select, from the set of interactive-surface types, one of the interactive-surface types based on the selected interactive-surface type having a score greater than a threshold score; and
send information to alter the interactive surface based on the selected interactive-surface type.

* * * * *